US011790413B2

(12) United States Patent
Hoffberg

(10) Patent No.: US 11,790,413 B2
(45) Date of Patent: Oct. 17, 2023

(54) SYSTEM AND METHOD FOR COMMUNICATION

(71) Applicant: Hoffberg Family Trust 2, Wilmington, DE (US)

(72) Inventor: Steven Mark Hoffberg, West Harrison, NY (US)

(73) Assignee: Hoffberg Family Trust 2, Wilmington, DE (US)

( * ) Notice: Subject to any disclaimer, the term of this patent is extended or adjusted under 35 U.S.C. 154(b) by 257 days.

(21) Appl. No.: 17/249,648

(22) Filed: Mar. 8, 2021

(65) Prior Publication Data

US 2021/0192582 A1  Jun. 24, 2021

Related U.S. Application Data

(60) Continuation of application No. 15/811,488, filed on Nov. 13, 2017, now Pat. No. 10,943,273, which is a
(Continued)

(51) Int. Cl.
*G06Q 10/10* (2023.01)
*G06Q 10/06* (2023.01)
(Continued)

(52) U.S. Cl.
CPC ..... *G06Q 30/0282* (2013.01); *G06Q 30/0207* (2013.01); *G06Q 30/08* (2013.01);
(Continued)

(58) Field of Classification Search
CPC ........... G06Q 30/0282; G06Q 30/0207; G06Q 30/08; G07F 17/32; G07F 17/323; G07F 17/3237
(Continued)

(56) References Cited

U.S. PATENT DOCUMENTS 3,568,161 A   3/1971 Knickel et al.
3,573,747 A   4/1971 Adams et al.
(Continued)

FOREIGN PATENT DOCUMENTS

JP       9236650       3/2015
WO    WO9002382    3/1990
(Continued)

OTHER PUBLICATIONS

US 6,009,171 A, 12/1999, Ciacelli et al. (withdrawn)
(Continued)

*Primary Examiner* — Jonathan P Ouellette
(74) *Attorney, Agent, or Firm* — Hoffberg & Associates; Steven M. Hoffberg

(57) ABSTRACT

A digital communication method, comprising: providing a digital packet radio transceiver which communicates through an antenna array, defining a directional pattern with distinct spatial communication channels using a plurality of frequency channels; detecting channel conditions based on a feedback protocol between the digital packet radio transceiver and a remote digital packet radio system, selectively controlling the digital packet transceiver to transmit information responsive to the channel conditions; detecting another digital packet radio transceiver concurrently using the same frequency channels, and selectively controlling an interference with the other digital packet radio transceiver in dependence on information from the other digital packet radio transceiver, by one of deferring to transmissions by the other digital packet radio transceiver, and competing with transmissions by the other digital packet radio transceiver.

20 Claims, 5 Drawing Sheets

Related U.S. Application Data continuation of application No. 14/089,022, filed on Nov. 25, 2013, now Pat. No. 10,163,137, which is a division of application No. 12/837,502, filed on Jul. 16, 2010, now Pat. No. 8,600,830, and a continuation of application No. 12/837,504, filed on Jul. 16, 2010, said application No. 15/811,488 is a continuation of application No. 10/771,182, filed on Feb. 3, 2004, now Pat. No. 9,818,136, said application No. 12/837,502 is a division of application No. 10/771,182, filed on Feb. 3, 2004, now Pat. No. 9,818,136, said application No. 12/837,504 is a division of application No. 10/771,182, filed on Feb. 3, 2004, now Pat. No. 9,818,136.

(60) Provisional application No. 60/445,346, filed on Feb. 5, 2003.

(51) Int. Cl.
  *G06Q 30/06* (2023.01)
  *G06Q 30/02* (2023.01)
  *G06Q 30/0282* (2023.01)
  *G06Q 30/0207* (2023.01)
  *G07F 17/32* (2006.01)
  *G06Q 30/08* (2012.01)

(52) U.S. Cl.
  CPC ............ *G07F 17/32* (2013.01); *G07F 17/323* (2013.01); *G07F 17/3237* (2013.01)

(58) Field of Classification Search
  USPC .................................................. 705/1.1, 345
  See application file for complete search history.

(56) References Cited

U.S. PATENT DOCUMENTS

| | | |
|---|---|---|
| 3,581,072 A | 5/1971 | Nymeyer et al. |
| 3,582,926 A | 6/1971 | Hassan et al. |
| 3,630,079 A | 12/1971 | Hughes et al. |
| 3,664,701 A | 5/1972 | Kondur et al. |
| 3,683,114 A | 8/1972 | Egan et al. |
| 3,689,882 A | 9/1972 | Dessailly et al. |
| 3,769,710 A | 11/1973 | Reister |
| 3,771,483 A | 11/1973 | Bond |
| 3,772,688 A | 11/1973 | Smit et al. |
| 3,848,254 A | 11/1974 | Drebinger et al. |
| 3,922,673 A | 11/1975 | Bishop |
| 3,956,797 A | 5/1976 | Brandestini et al. |
| 3,986,119 A | 10/1976 | Hemmer, Jr. et al. |
| 3,993,955 A | 11/1976 | Belcher et al. |
| 4,002,983 A | 1/1977 | Kavalir et al. |
| 4,010,619 A | 3/1977 | Hightower et al. |
| 4,024,382 A | 5/1977 | Fowler |
| 4,028,662 A | 6/1977 | Young |
| 4,048,452 A | 9/1977 | Oehring et al. |
| 4,077,005 A | 2/1978 | Bishop |
| 4,084,323 A | 4/1978 | McMurtry |
| 4,114,155 A | 9/1978 | Raab |
| 4,152,693 A | 5/1979 | Ashworth, Jr. |
| 4,155,042 A | 5/1979 | Permut et al. |
| 4,168,499 A | 9/1979 | Matsumura et al. |
| 4,168,576 A | 9/1979 | McMurtry |
| 4,185,265 A | 1/1980 | Griffin et al. |
| 4,200,770 A | 4/1980 | Hellman et al. |
| 4,218,582 A | 8/1980 | Hellman et al. |
| 4,229,620 A | 10/1980 | Schaible |
| 4,229,737 A | 10/1980 | Heldwein et al. |
| 4,235,441 A | 11/1980 | Ciccarello |
| 4,239,415 A | 12/1980 | Blikken |
| 4,240,079 A | 12/1980 | Zhilin |
| 4,244,123 A | 1/1981 | Lazure et al. |
| 4,264,782 A | 4/1981 | Konheim |
| 4,274,560 A | 6/1981 | Cater |
| 4,286,118 A | 8/1981 | Mehaffey et al. |
| 4,291,749 A | 9/1981 | Ootsuka et al. |
| 4,306,111 A | 12/1981 | Lu et al. |
| 4,309,569 A | 1/1982 | Merkle |
| 4,313,263 A | 2/1982 | McMurtry |
| 4,314,232 A | 2/1982 | Tsunoda |
| 4,323,921 A | 4/1982 | Guillou |
| 4,326,098 A | 4/1982 | Bouricius et al. |
| 4,333,238 A | 6/1982 | McMurtry |
| 4,337,821 A | 7/1982 | Saito |
| 4,349,823 A | 9/1982 | Tagami et al. |
| 4,350,970 A | 9/1982 | von Tomkewitsch |
| 4,351,982 A | 9/1982 | Miller et al. |
| 4,359,733 A | 11/1982 | O'Neill |
| 4,365,110 A | 12/1982 | Lee et al. |
| 4,369,426 A | 1/1983 | Merkel |
| 4,384,293 A | 5/1983 | Deem et al. |
| 4,386,233 A | 5/1983 | Smid et al. |
| 4,393,269 A | 7/1983 | Konheim et al. |
| 4,393,270 A | 7/1983 | van den Berg |
| 4,399,323 A | 8/1983 | Henry |
| 4,401,848 A | 8/1983 | Tsunoda |
| 4,402,049 A | 8/1983 | Gray |
| 4,403,291 A | 9/1983 | Von Tomkewitsch |
| 4,405,829 A | 9/1983 | Rivest et al. |
| 4,407,564 A | 10/1983 | Ellis |
| 4,419,730 A | 12/1983 | Ito et al. |
| 4,424,414 A | 1/1984 | Hellman et al. |
| 4,424,415 A | 1/1984 | Lin |
| 4,428,057 A | 1/1984 | Setliff et al. |
| 4,437,151 A | 3/1984 | Hurt et al. |
| 4,438,824 A | 3/1984 | Mueller-Schloer |
| 4,441,405 A | 4/1984 | Takeuchi |
| 4,445,118 A | 4/1984 | Taylor et al. |
| 4,450,477 A | 5/1984 | Lovett |
| 4,451,887 A | 5/1984 | Harada et al. |
| 4,453,074 A | 6/1984 | Weinstein |
| 4,458,109 A | 7/1984 | Mueller-Schloer |
| 4,459,667 A | 7/1984 | Takeuchi |
| 4,463,357 A | 7/1984 | MacDoran |
| 4,471,164 A | 9/1984 | Henry |
| 4,471,273 A | 9/1984 | Melocik et al. |
| 4,472,663 A | 9/1984 | Melocik |
| 4,477,874 A | 10/1984 | Ikuta et al. |
| 4,485,383 A | 11/1984 | Maher |
| 4,486,853 A | 12/1984 | Parsons |
| 4,492,036 A | 1/1985 | Beckwith, Jr. |
| 4,494,114 A | 1/1985 | Kaish |
| 4,508,999 A | 4/1985 | Melocik et al. |
| 4,511,947 A | 4/1985 | Melocik et al. |
| 4,514,592 A | 4/1985 | Miyaguchi |
| 4,514,665 A | 4/1985 | Melocik et al. |
| 4,518,902 A | 5/1985 | Melocik et al. |
| 4,521,885 A | 6/1985 | Melocik et al. |
| 4,523,450 A | 6/1985 | Herzog |
| 4,528,588 A | 7/1985 | Lofberg |
| 4,529,870 A | 7/1985 | Chaum |
| 4,529,919 A | 7/1985 | Melocik et al. |
| 4,536,739 A | 8/1985 | Nobuta |
| 4,543,577 A | 9/1985 | Tachibana et al. |
| 4,547,778 A | 10/1985 | Hinkle et al. |
| 4,550,317 A | 10/1985 | Moriyama et al. |
| 4,552,456 A | 11/1985 | Endo |
| 4,555,651 A | 11/1985 | Melocik et al. |
| 4,558,176 A | 12/1985 | Arnold et al. |
| 4,564,018 A | 1/1986 | Hutchison et al. |
| 4,564,085 A | 1/1986 | Melocik et al. |
| 4,564,840 A | 1/1986 | Brisse et al. |
| 4,567,600 A | 1/1986 | Massey et al. |
| 4,567,757 A | 2/1986 | Melocik et al. |
| 4,571,847 A | 2/1986 | McMurtry |
| 4,575,621 A | 3/1986 | Dreifus |
| 4,578,531 A | 3/1986 | Everhart et al. |
| 4,578,678 A | 3/1986 | Hurd |
| 4,582,389 A | 4/1986 | Wood et al. |
| 4,590,470 A | 5/1986 | Koenig |
| 4,591,730 A | 5/1986 | Pennoni |
| 4,595,950 A | 6/1986 | Lofberg |

(56) References Cited

U.S. PATENT DOCUMENTS

| | | |
|---|---|---|
| 4,596,988 A | 6/1986 | Wanka |
| 4,599,620 A | 7/1986 | Evans |
| 4,600,921 A | 7/1986 | Thomas |
| 4,602,279 A | 7/1986 | Freeman |
| 4,613,867 A | 9/1986 | Golinsky |
| 4,622,557 A | 11/1986 | Westerfield |
| 4,625,076 A | 11/1986 | Okamoto et al. |
| 4,626,850 A | 12/1986 | Chey |
| 4,630,685 A | 12/1986 | Huck, Jr. et al. |
| 4,633,036 A | 12/1986 | Hellman et al. |
| 4,633,966 A | 1/1987 | Fotheringham |
| 4,636,782 A | 1/1987 | Nakamura et al. |
| 4,637,488 A | 1/1987 | Fotheringham et al. |
| 4,638,445 A | 1/1987 | Mattaboni |
| 4,644,351 A | 2/1987 | Zabarsky et al. |
| 4,644,368 A | 2/1987 | Mutz |
| 4,646,096 A | 2/1987 | Brown |
| 4,647,784 A | 3/1987 | Stephens |
| 4,651,157 A | 3/1987 | Gray et al. |
| 4,652,884 A | 3/1987 | Starker |
| 4,653,003 A | 3/1987 | Kirstein |
| 4,654,879 A | 3/1987 | Goldman et al. |
| 4,656,463 A | 4/1987 | Anders et al. |
| 4,656,476 A | 4/1987 | Tavtigian |
| 4,658,094 A | 4/1987 | Clark |
| 4,659,970 A | 4/1987 | Melocik |
| 4,667,203 A | 5/1987 | Counselman, III |
| 4,668,952 A | 5/1987 | Imazeki et al. |
| 4,672,572 A | 6/1987 | Alsberg |
| 4,673,936 A | 6/1987 | Kotoh |
| 4,674,048 A | 6/1987 | Okumura |
| 4,677,555 A | 6/1987 | Goyet |
| 4,677,663 A | 6/1987 | Szlam |
| 4,677,686 A | 6/1987 | Hustig et al. |
| 4,678,329 A | 7/1987 | Lukowski, Jr. et al. |
| 4,679,147 A | 7/1987 | Tsujii et al. |
| 4,680,715 A | 7/1987 | Pawelek |
| 4,682,953 A | 7/1987 | Doerfel et al. |
| 4,684,247 A | 8/1987 | Hammill, III |
| 4,688,244 A | 8/1987 | Hannon et al. |
| 4,690,610 A | 9/1987 | Fotheringham |
| 4,691,149 A | 9/1987 | Baumgartner et al. |
| 4,691,385 A | 9/1987 | Tupman |
| 4,697,281 A | 9/1987 | O'Sullivan |
| 4,698,632 A | 10/1987 | Baba et al. |
| 4,700,191 A | 10/1987 | Manor |
| 4,700,301 A | 10/1987 | Dyke |
| 4,701,760 A | 10/1987 | Raoux |
| 4,701,934 A | 10/1987 | Jasper |
| 4,703,444 A | 10/1987 | Storms, Jr. et al. |
| 4,704,610 A | 11/1987 | Smith et al. |
| 4,706,086 A | 11/1987 | Panizza |
| 4,706,772 A | 11/1987 | Dawson et al. |
| 4,707,788 A | 11/1987 | Tashiro et al. |
| 4,709,195 A | 11/1987 | Hellekson et al. |
| 4,709,407 A | 11/1987 | Baba |
| 4,713,767 A | 12/1987 | Sato et al. |
| 4,718,080 A | 1/1988 | Serrano et al. |
| 4,722,410 A | 2/1988 | Melocik et al. |
| 4,725,840 A | 2/1988 | Orazietti |
| 4,727,492 A | 2/1988 | Reeve et al. |
| 4,727,962 A | 3/1988 | Nelson |
| 4,728,922 A | 3/1988 | Christen et al. |
| 4,730,690 A | 3/1988 | McNutt et al. |
| 4,731,613 A | 3/1988 | Endo et al. |
| 4,731,769 A | 3/1988 | Schaefer et al. |
| 4,731,841 A | 3/1988 | Rosen et al. |
| 4,734,564 A | 3/1988 | Boston et al. |
| 4,736,203 A | 4/1988 | Sidlauskas |
| 4,737,983 A | 4/1988 | Frauenthal et al. |
| 4,740,778 A | 4/1988 | Harding et al. |
| 4,740,779 A | 4/1988 | Cleary et al. |
| 4,740,780 A | 4/1988 | Brown et al. |
| 4,741,245 A | 5/1988 | Malone |
| 4,741,412 A | 5/1988 | Sable |
| 4,743,913 A | 5/1988 | Takai |
| 4,744,761 A | 5/1988 | Doerfel et al. |
| 4,750,197 A | 6/1988 | Denekamp et al. |
| 4,750,215 A | 6/1988 | Biggs |
| 4,751,512 A | 6/1988 | Longaker |
| 4,751,983 A | 6/1988 | Leskovec et al. |
| 4,752,676 A | 6/1988 | Leonard et al. |
| 4,752,824 A | 6/1988 | Moore |
| 4,754,280 A | 6/1988 | Brown et al. |
| 4,754,283 A | 6/1988 | Fowler |
| 4,755,905 A | 7/1988 | Telecky, Jr. |
| 4,757,450 A | 7/1988 | Etoh |
| 4,757,529 A | 7/1988 | Glapa et al. |
| 4,758,959 A | 7/1988 | Thoone et al. |
| 4,761,742 A | 8/1988 | Hanabusa et al. |
| 4,768,221 A | 8/1988 | Green et al. |
| 4,772,410 A | 9/1988 | Sato |
| 4,774,671 A | 9/1988 | Itoh et al. |
| 4,774,674 A | 9/1988 | Otake |
| 4,776,750 A | 10/1988 | Griswold, Jr. et al. |
| 4,777,818 A | 10/1988 | McMurtry |
| 4,781,514 A | 11/1988 | Schneider |
| 4,785,463 A | 11/1988 | Janc et al. |
| 4,786,164 A | 11/1988 | Kawata |
| 4,787,039 A | 11/1988 | Murata |
| 4,789,928 A | 12/1988 | Fujisaki |
| 4,789,929 A | 12/1988 | Nishimura et al. |
| 4,790,402 A | 12/1988 | Field et al. |
| 4,791,420 A | 12/1988 | Baba |
| 4,791,572 A | 12/1988 | Green, III et al. |
| 4,792,995 A | 12/1988 | Harding |
| 4,795,223 A | 1/1989 | Moss |
| 4,796,189 A | 1/1989 | Nakayama et al. |
| 4,796,191 A | 1/1989 | Honey et al. |
| 4,797,911 A | 1/1989 | Szlam et al. |
| 4,797,920 A | 1/1989 | Stein |
| 4,799,062 A | 1/1989 | Sanderford, Jr. et al. |
| 4,799,156 A | 1/1989 | Shavit et al. |
| 4,801,938 A | 1/1989 | Holmes |
| 4,804,893 A | 2/1989 | Melocik |
| 4,804,937 A | 2/1989 | Barbiaux et al. |
| 4,805,215 A | 2/1989 | Miller |
| 4,805,231 A | 2/1989 | Whidden |
| 4,807,131 A | 2/1989 | Clegg |
| 4,807,279 A | 2/1989 | McClure et al. |
| 4,807,714 A | 2/1989 | Blau et al. |
| 4,809,005 A | 2/1989 | Counselman, III |
| 4,809,178 A | 2/1989 | Ninomiya et al. |
| 4,809,180 A | 2/1989 | Saitoh |
| 4,812,628 A | 3/1989 | Boston et al. |
| 4,812,820 A | 3/1989 | Chatwin |
| 4,812,845 A | 3/1989 | Yamada et al. |
| 4,812,991 A | 3/1989 | Hatch |
| 4,814,711 A | 3/1989 | Olsen et al. |
| 4,815,020 A | 3/1989 | Cormier |
| 4,815,213 A | 3/1989 | McCabe et al. |
| 4,818,048 A | 4/1989 | Moss |
| 4,818,171 A | 4/1989 | Burkholder |
| 4,818,997 A | 4/1989 | Holmes |
| 4,819,053 A | 4/1989 | Halavais |
| 4,819,174 A | 4/1989 | Furuno et al. |
| 4,819,195 A | 4/1989 | Bell et al. |
| 4,819,267 A | 4/1989 | Cargile et al. |
| 4,819,860 A | 4/1989 | Hargrove et al. |
| 4,821,294 A | 4/1989 | Thomas, Jr. |
| 4,821,309 A | 4/1989 | Namekawa |
| 4,823,264 A | 4/1989 | Deming |
| 4,823,901 A | 4/1989 | Harding |
| 4,825,457 A | 4/1989 | Lebowitz |
| 4,827,508 A | 5/1989 | Shear |
| 4,827,518 A | 5/1989 | Feustel et al. |
| 4,827,520 A | 5/1989 | Zeinstra |
| 4,829,372 A | 5/1989 | McCalley et al. |
| 4,829,442 A | 5/1989 | Kadonoff et al. |
| 4,831,539 A | 5/1989 | Hagenbuch |
| 4,831,551 A | 5/1989 | Schalk et al. |
| 4,833,469 A | 5/1989 | David |
| 4,833,477 A | 5/1989 | Tendler |
| 4,837,551 A | 6/1989 | Iino |

(56) References Cited

U.S. PATENT DOCUMENTS

| | | |
|---|---|---|
| 4,837,700 A | 6/1989 | Ando et al. |
| 4,839,835 A | 6/1989 | Hagenbuch |
| 4,841,302 A | 6/1989 | Henry |
| 4,846,297 A | 7/1989 | Field et al. |
| 4,847,862 A | 7/1989 | Braisted et al. |
| 4,849,731 A | 7/1989 | Melocik |
| 4,852,146 A | 7/1989 | Hathcock et al. |
| 4,852,149 A | 7/1989 | Zwick et al. |
| 4,853,687 A | 8/1989 | Isomura et al. |
| 4,855,915 A | 8/1989 | Dallaire |
| 4,860,216 A | 8/1989 | Linsenmayer |
| 4,860,352 A | 8/1989 | Laurance et al. |
| 4,861,220 A | 8/1989 | Smith |
| 4,862,175 A | 8/1989 | Biggs et al. |
| 4,864,284 A | 9/1989 | Crayton et al. |
| 4,864,592 A | 9/1989 | Lee |
| 4,866,450 A | 9/1989 | Chisholm |
| 4,866,754 A | 9/1989 | Hashimoto |
| 4,866,776 A | 9/1989 | Kasai et al. |
| 4,868,376 A | 9/1989 | Lessin et al. |
| 4,868,859 A | 9/1989 | Sheffer |
| 4,868,866 A | 9/1989 | Williams, Jr. |
| 4,869,635 A | 9/1989 | Krahn |
| 4,870,422 A | 9/1989 | Counselman, III |
| 4,876,594 A | 10/1989 | Schiffman |
| 4,876,659 A | 10/1989 | Devereux et al. |
| 4,878,243 A | 10/1989 | Hashimoto |
| 4,879,658 A | 11/1989 | Takashima et al. |
| 4,881,178 A | 11/1989 | Holland et al. |
| 4,882,689 A | 11/1989 | Aoki |
| 4,882,696 A | 11/1989 | Nimura et al. |
| 4,884,348 A | 12/1989 | Zeller et al. |
| 4,887,068 A | 12/1989 | Umehara |
| 4,887,818 A | 12/1989 | Escott |
| 4,888,699 A | 12/1989 | Knoll et al. |
| 4,888,890 A | 12/1989 | Studebaker et al. |
| 4,890,323 A | 12/1989 | Beker et al. |
| 4,891,650 A | 1/1990 | Sheffer |
| 4,891,761 A | 1/1990 | Gray et al. |
| 4,893,301 A | 1/1990 | Andrews et al. |
| 4,894,655 A | 1/1990 | Joguet et al. |
| 4,894,662 A | 1/1990 | Counselman |
| 4,894,857 A | 1/1990 | Szlam et al. |
| 4,896,363 A | 1/1990 | Taylor et al. |
| 4,896,370 A | 1/1990 | Kasparian et al. |
| 4,897,642 A | 1/1990 | DiLullo et al. |
| 4,899,285 A | 2/1990 | Nakayama et al. |
| 4,901,340 A | 2/1990 | Parker et al. |
| 4,903,201 A | 2/1990 | Wagner |
| 4,903,211 A | 2/1990 | Ando |
| 4,903,212 A | 2/1990 | Yokouchi et al. |
| 4,904,983 A | 2/1990 | Mitchell |
| 4,907,159 A | 3/1990 | Mauge et al. |
| 4,908,629 A | 3/1990 | Apsell et al. |
| 4,910,493 A | 3/1990 | Chambers et al. |
| 4,910,677 A | 3/1990 | Remedio et al. |
| 4,912,475 A | 3/1990 | Counselman, III |
| 4,912,643 A | 3/1990 | Beirne |
| 4,912,645 A | 3/1990 | Kakihara et al. |
| 4,914,609 A | 4/1990 | Shimizu et al. |
| 4,914,705 A | 4/1990 | Nigawara |
| 4,918,425 A | 4/1990 | Greenberg et al. |
| 4,918,609 A | 4/1990 | Yamawaki |
| 4,918,728 A | 4/1990 | Matyas et al. |
| 4,924,402 A | 5/1990 | Ando et al. |
| 4,924,417 A | 5/1990 | Yuasa |
| 4,924,501 A | 5/1990 | Cheeseman et al. |
| 4,924,699 A | 5/1990 | Kuroda et al. |
| 4,926,325 A | 5/1990 | Benton et al. |
| 4,926,336 A | 5/1990 | Yamada |
| 4,926,480 A | 5/1990 | Chaum |
| 4,928,105 A | 5/1990 | Langner |
| 4,928,106 A | 5/1990 | Ashjaee et al. |
| 4,928,107 A | 5/1990 | Kuroda et al. |
| 4,930,073 A | 5/1990 | Cina, Jr. |
| 4,930,150 A | 5/1990 | Katz |
| 4,932,910 A | 6/1990 | Hayday |
| 4,933,964 A | 6/1990 | Girgis |
| 4,935,956 A | 6/1990 | Hellwarth et al. |
| 4,937,751 A | 6/1990 | Nimura et al. |
| 4,937,752 A | 6/1990 | Nanba et al. |
| 4,939,521 A | 7/1990 | Burin |
| 4,939,678 A | 7/1990 | Beckwith, Jr. |
| 4,941,168 A | 7/1990 | Kelly, Jr. |
| 4,941,173 A | 7/1990 | Boule et al. |
| 4,943,925 A | 7/1990 | Moroto et al. |
| 4,945,501 A | 7/1990 | Bell et al. |
| 4,947,151 A | 8/1990 | Rosenberger |
| 4,949,088 A | 8/1990 | Ryan et al. |
| 4,949,268 A | 8/1990 | Nishikawa et al. |
| 4,951,212 A | 8/1990 | Kurihara et al. |
| 4,952,928 A | 8/1990 | Carroll et al. |
| 4,952,936 A | 8/1990 | Martinson |
| 4,952,937 A | 8/1990 | Allen |
| 4,953,204 A | 8/1990 | Cuschleg, Jr. et al. |
| 4,954,828 A | 9/1990 | Orr |
| 4,954,837 A | 9/1990 | Baird et al. |
| 4,954,959 A | 9/1990 | Moroto et al. |
| 4,958,371 A | 9/1990 | Damoci et al. |
| 4,961,074 A | 10/1990 | Martinson |
| 4,961,142 A | 10/1990 | Elliott et al. |
| 4,963,865 A | 10/1990 | Ichikawa et al. |
| 4,963,889 A | 10/1990 | Hatch |
| 4,967,178 A | 10/1990 | Saito et al. |
| 4,968,981 A | 11/1990 | Sekine et al. |
| 4,970,652 A | 11/1990 | Nagashima |
| 4,972,431 A | 11/1990 | Keegan |
| 4,972,476 A | 11/1990 | Nathans |
| 4,974,170 A | 11/1990 | Bouve et al. |
| 4,975,707 A | 12/1990 | Smith |
| 4,975,841 A | 12/1990 | Kehnemuyi et al. |
| 4,976,619 A | 12/1990 | Carlson |
| 4,977,595 A | 12/1990 | Ohta et al. |
| 4,977,679 A | 12/1990 | Saito et al. |
| 4,979,171 A | 12/1990 | Ashley |
| 4,983,980 A | 1/1991 | Ando |
| 4,986,384 A | 1/1991 | Okamoto et al. |
| 4,987,587 A | 1/1991 | Jolissaint |
| 4,988,976 A | 1/1991 | Lu |
| 4,989,151 A | 1/1991 | Nuimura |
| 4,989,248 A | 1/1991 | Schalk et al. |
| 4,991,304 A | 2/1991 | McMurtry |
| 4,993,068 A | 2/1991 | Piosenka et al. |
| 4,995,258 A | 2/1991 | Frank |
| 4,996,645 A | 2/1991 | Schneyderberg Van Der Zon |
| 4,996,703 A | 2/1991 | Gray |
| 4,996,959 A | 3/1991 | Akimoto |
| 4,998,272 A | 3/1991 | Hawkins, Jr. et al. |
| 5,001,777 A | 3/1991 | Liautaud |
| 5,003,317 A | 3/1991 | Gray et al. |
| 5,006,829 A | 4/1991 | Miyamoto et al. |
| 5,006,855 A | 4/1991 | Braff |
| 5,007,000 A | 4/1991 | Baldi |
| 5,007,078 A | 4/1991 | Masson et al. |
| 5,010,491 A | 4/1991 | Biasillo et al. |
| 5,014,206 A | 5/1991 | Scribner et al. |
| 5,014,298 A | 5/1991 | Katz |
| 5,016,170 A | 5/1991 | Pollalis et al. |
| 5,016,270 A | 5/1991 | Katz |
| 5,017,926 A | 5/1991 | Ames et al. |
| 5,020,095 A | 5/1991 | Morganstein et al. |
| 5,020,097 A | 5/1991 | Tanaka et al. |
| 5,020,105 A | 5/1991 | Rosen et al. |
| 5,020,411 A | 6/1991 | Rowan |
| 5,021,792 A | 6/1991 | Hwang |
| 5,021,794 A | 6/1991 | Lawrence |
| 5,025,261 A | 6/1991 | Ohta et al. |
| 5,030,957 A | 7/1991 | Evans |
| 5,031,104 A | 7/1991 | Ikeda et al. |
| 5,036,329 A | 7/1991 | Ando |
| 5,036,461 A | 7/1991 | Elliott et al. |
| 5,036,535 A | 7/1991 | Gechter et al. |
| 5,036,537 A | 7/1991 | Jeffers et al. |
| 5,039,979 A | 8/1991 | McClive |

(56) References Cited

U.S. PATENT DOCUMENTS

| | | |
|---|---|---|
| 5,040,208 A | 8/1991 | Jolissaint |
| 5,041,833 A | 8/1991 | Weinberg |
| 5,043,736 A | 8/1991 | Darnell et al. |
| 5,043,902 A | 8/1991 | Yokoyama et al. |
| 5,045,861 A | 9/1991 | Duffett-Smith |
| 5,046,011 A | 9/1991 | Kakihara et al. |
| 5,046,130 A | 9/1991 | Hall et al. |
| 5,048,075 A | 9/1991 | Katz |
| 5,049,884 A | 9/1991 | Jaeger et al. |
| 5,049,885 A | 9/1991 | Orr |
| 5,051,735 A | 9/1991 | Furukawa |
| 5,054,110 A | 10/1991 | Comroe et al. |
| 5,055,851 A | 10/1991 | Sheffer |
| 5,056,106 A | 10/1991 | Wang et al. |
| 5,056,141 A | 10/1991 | Dyke |
| 5,056,147 A | 10/1991 | Turner et al. |
| 5,059,969 A | 10/1991 | Sakaguchi et al. |
| 5,061,936 A | 10/1991 | Suzuki |
| 5,063,385 A | 11/1991 | Caschera |
| 5,063,522 A | 11/1991 | Winters |
| 5,065,326 A | 11/1991 | Sahm |
| 5,065,429 A | 11/1991 | Lang |
| 5,067,082 A | 11/1991 | Nimura et al. |
| 5,067,162 A | 11/1991 | Driscoll, Jr. et al. |
| 5,068,656 A | 11/1991 | Sutherland |
| 5,068,663 A | 11/1991 | Valentine et al. |
| 5,070,323 A | 12/1991 | Iino et al. |
| 5,070,404 A | 12/1991 | Bullock et al. |
| 5,070,453 A | 12/1991 | Duffany |
| 5,070,525 A | 12/1991 | Szlam et al. |
| 5,070,526 A | 12/1991 | Richmond et al. |
| 5,070,931 A | 12/1991 | Kalthoff et al. |
| 5,072,227 A | 12/1991 | Hatch |
| 5,073,890 A | 12/1991 | Danielsen |
| 5,073,929 A | 12/1991 | Katz |
| 5,073,950 A | 12/1991 | Colbert et al. |
| 5,075,693 A | 12/1991 | McMillan et al. |
| 5,077,557 A | 12/1991 | Ingensand |
| 5,077,665 A | 12/1991 | Silverman et al. |
| 5,077,789 A | 12/1991 | Clark, Jr. et al. |
| 5,079,553 A | 1/1992 | Orr |
| 5,081,667 A | 1/1992 | Drori et al. |
| 5,081,711 A | 1/1992 | Rickman, Jr. |
| 5,083,129 A | 1/1992 | Valentine et al. |
| 5,083,256 A | 1/1992 | Trovato et al. |
| 5,084,822 A | 1/1992 | Hayami |
| 5,086,390 A | 2/1992 | Matthews |
| 5,087,919 A | 2/1992 | Odagawa et al. |
| 5,089,826 A | 2/1992 | Yano et al. |
| 5,097,269 A | 3/1992 | Takayama et al. |
| 5,097,528 A | 3/1992 | Gursahaney et al. |
| 5,101,356 A | 3/1992 | Timothy et al. |
| 5,101,416 A | 3/1992 | Fenton et al. |
| 5,102,360 A | 4/1992 | Eycleshimer |
| 5,103,400 A | 4/1992 | Yamada et al. |
| 5,103,449 A | 4/1992 | Jolissaint |
| 5,103,459 A | 4/1992 | Gilhousen et al. |
| 5,103,476 A | 4/1992 | Waite et al. |
| 5,109,399 A | 4/1992 | Thompson |
| 5,111,390 A | 5/1992 | Ketcham |
| 5,115,223 A | 5/1992 | Moody |
| 5,117,232 A | 5/1992 | Cantwell |
| 5,119,102 A | 6/1992 | Barnard |
| 5,119,301 A | 6/1992 | Shimizu et al. |
| 5,119,504 A | 6/1992 | Durboraw, III |
| 5,121,326 A | 6/1992 | Moroto et al. |
| 5,121,422 A | 6/1992 | Kudo |
| 5,122,802 A | 6/1992 | Marin |
| 5,122,803 A | 6/1992 | Stann et al. |
| 5,122,957 A | 6/1992 | Hattori |
| 5,124,915 A | 6/1992 | Krenzel |
| 5,126,748 A | 6/1992 | Ames et al. |
| 5,128,874 A | 7/1992 | Bhanu et al. |
| 5,128,979 A | 7/1992 | Reich et al. |
| 5,128,984 A | 7/1992 | Katz |
| 5,131,020 A | 7/1992 | Liebesny et al. |
| 5,131,038 A | 7/1992 | Puhl et al. |
| 5,134,406 A | 7/1992 | Orr |
| 5,136,501 A | 8/1992 | Silverman et al. |
| 5,144,317 A | 9/1992 | Duddek et al. |
| 5,144,318 A | 9/1992 | Kishi |
| 5,146,226 A | 9/1992 | Valentine et al. |
| 5,146,227 A | 9/1992 | Papadopoulos |
| 5,146,231 A | 9/1992 | Ghaem et al. |
| 5,148,002 A | 9/1992 | Kuo et al. |
| 5,148,179 A | 9/1992 | Allison |
| 5,148,452 A | 9/1992 | Kennedy et al. |
| 5,151,496 A | 9/1992 | Bertram et al. |
| 5,151,701 A | 9/1992 | Valentine et al. |
| 5,153,598 A | 10/1992 | Alves, Jr. |
| 5,153,836 A | 10/1992 | Fraughton et al. |
| 5,155,490 A | 10/1992 | Spradley, Jr. et al. |
| 5,155,491 A | 10/1992 | Ando |
| 5,155,591 A | 10/1992 | Wachob |
| 5,155,680 A | 10/1992 | Wiedemer |
| 5,155,688 A | 10/1992 | Tanaka et al. |
| 5,155,689 A | 10/1992 | Wortham |
| 5,157,691 A | 10/1992 | Ohkubo et al. |
| 5,161,181 A | 11/1992 | Zwick |
| 5,161,886 A | 11/1992 | De Jong et al. |
| 5,162,997 A | 11/1992 | Takahashi |
| 5,163,083 A | 11/1992 | Dowden et al. |
| 5,163,087 A | 11/1992 | Kaplan |
| 5,163,094 A | 11/1992 | Prokoski et al. |
| 5,164,729 A | 11/1992 | Decker et al. |
| 5,164,904 A | 11/1992 | Sumner |
| 5,164,981 A | 11/1992 | Mitchell et al. |
| 5,166,974 A | 11/1992 | Morganstein et al. |
| 5,168,452 A | 12/1992 | Yamada et al. |
| 5,168,517 A | 12/1992 | Waldman |
| 5,170,171 A | 12/1992 | Brown |
| 5,172,321 A | 12/1992 | Ghaem et al. |
| 5,173,710 A | 12/1992 | Kelley et al. |
| 5,175,557 A | 12/1992 | King et al. |
| 5,177,684 A | 1/1993 | Harker et al. |
| 5,177,685 A | 1/1993 | Davis et al. |
| 5,182,670 A | 1/1993 | Khan et al. |
| 5,184,123 A | 2/1993 | Bremer et al. |
| 5,185,610 A | 2/1993 | Ward et al. |
| 5,185,761 A | 2/1993 | Kawasaki |
| 5,185,786 A | 2/1993 | Zwick |
| 5,187,805 A | 2/1993 | Bertiger et al. |
| 5,189,612 A | 2/1993 | Lemercier et al. |
| 5,189,619 A | 2/1993 | Adachi et al. |
| 5,191,611 A | 3/1993 | Lang |
| 5,192,957 A | 3/1993 | Kennedy |
| 5,193,110 A | 3/1993 | Jones et al. |
| 5,193,215 A | 3/1993 | Olmer |
| 5,193,855 A | 3/1993 | Shamos |
| 5,194,871 A | 3/1993 | Counselman, III |
| 5,198,797 A | 3/1993 | Daidoji |
| 5,202,829 A | 4/1993 | Geier |
| 5,203,499 A | 4/1993 | Knittel |
| 5,204,670 A | 4/1993 | Stinton |
| 5,206,651 A | 4/1993 | Valentine et al. |
| 5,206,903 A | 4/1993 | Kohler et al. |
| 5,208,756 A | 5/1993 | Song |
| 5,208,858 A | 5/1993 | Vollert et al. |
| 5,210,540 A | 5/1993 | Masumoto |
| 5,210,787 A | 5/1993 | Hayes et al. |
| 5,214,413 A | 5/1993 | Okabayashi et al. |
| 5,214,688 A | 5/1993 | Szlam et al. |
| 5,214,707 A | 5/1993 | Fujimoto et al. |
| 5,218,367 A | 6/1993 | Sheffer et al. |
| 5,218,620 A | 6/1993 | Mori et al. |
| 5,218,635 A | 6/1993 | Bonvallet et al. |
| 5,220,507 A | 6/1993 | Kirson |
| 5,220,509 A | 6/1993 | Takemura et al. |
| 5,223,844 A | 6/1993 | Mansell et al. |
| 5,224,153 A | 6/1993 | Katz |
| 5,224,162 A | 6/1993 | Okamoto et al. |
| 5,224,163 A | 6/1993 | Gasser et al. |
| 5,224,173 A | 6/1993 | Kuhns et al. |
| 5,225,842 A | 7/1993 | Brown et al. |

(56) References Cited

U.S. PATENT DOCUMENTS

| | | |
|---|---|---|
| 5,228,094 A | 7/1993 | Villa |
| 5,228,695 A | 7/1993 | Meyer |
| 5,228,854 A | 7/1993 | Eldridge |
| 5,229,764 A | 7/1993 | Matchett et al. |
| 5,235,166 A | 8/1993 | Fernadez |
| 5,235,633 A | 8/1993 | Dennison et al. |
| 5,235,680 A | 8/1993 | Bijnagte |
| 5,237,159 A | 8/1993 | Stephens et al. |
| 5,237,514 A | 8/1993 | Curtin |
| 5,239,296 A | 8/1993 | Jenkins |
| 5,239,574 A | 8/1993 | Brandman et al. |
| 5,245,329 A | 9/1993 | Gokcebay |
| 5,245,537 A | 9/1993 | Barber |
| 5,247,306 A | 9/1993 | Hardange et al. |
| 5,247,440 A | 9/1993 | Capurka et al. |
| 5,247,569 A | 9/1993 | Cave |
| 5,250,951 A | 10/1993 | Valentine et al. |
| 5,251,252 A | 10/1993 | Katz |
| 5,253,165 A | 10/1993 | Leiseca et al. |
| 5,253,289 A | 10/1993 | Tanaka |
| 5,254,843 A | 10/1993 | Hynes et al. |
| 5,255,349 A | 10/1993 | Thakoor et al. |
| 5,257,190 A | 10/1993 | Crane |
| 5,257,195 A | 10/1993 | Hirata |
| 5,257,369 A | 10/1993 | Skeen et al. |
| 5,260,778 A | 11/1993 | Kauffman et al. |
| 5,265,025 A | 11/1993 | Hirata |
| 5,265,221 A | 11/1993 | Miller |
| 5,266,958 A | 11/1993 | Durboraw, III |
| 5,268,689 A | 12/1993 | Ono et al. |
| 5,269,067 A | 12/1993 | Waeldele et al. |
| 5,270,706 A | 12/1993 | Smith |
| 5,270,921 A | 12/1993 | Hornick |
| 5,272,483 A | 12/1993 | Kato |
| 5,272,638 A | 12/1993 | Martin et al. |
| 5,272,754 A | 12/1993 | Boerbert |
| 5,274,387 A | 12/1993 | Kakihara et al. |
| 5,274,560 A | 12/1993 | LaRue |
| 5,274,667 A | 12/1993 | Olmstead |
| 5,275,400 A | 1/1994 | Weingardt et al. |
| 5,276,451 A | 1/1994 | Odagawa |
| 5,276,732 A | 1/1994 | Stent et al. |
| 5,276,737 A | 1/1994 | Micali |
| 5,278,424 A | 1/1994 | Kagawa |
| 5,278,532 A | 1/1994 | Hegg et al. |
| 5,278,568 A | 1/1994 | Enge et al. |
| 5,278,898 A | 1/1994 | Cambray et al. |
| 5,280,425 A | 1/1994 | Hogge |
| 5,280,527 A | 1/1994 | Gullman et al. |
| 5,283,431 A | 2/1994 | Rhine |
| 5,283,731 A | 2/1994 | Lalonde et al. |
| 5,283,818 A | 2/1994 | Klausner et al. |
| 5,285,523 A | 2/1994 | Takahashi |
| 5,289,530 A | 2/1994 | Reese |
| 5,291,550 A | 3/1994 | Levy et al. |
| 5,291,560 A | 3/1994 | Daugman |
| 5,292,254 A | 3/1994 | Miller et al. |
| 5,293,115 A | 3/1994 | Swanson |
| 5,293,318 A | 3/1994 | Fukushima |
| 5,296,861 A | 3/1994 | Knight |
| 5,297,146 A | 3/1994 | Ogawa |
| 5,297,195 A | 3/1994 | Thorne et al. |
| 5,299,132 A | 3/1994 | Wortham |
| 5,300,932 A | 4/1994 | Valentine et al. |
| 5,301,368 A | 4/1994 | Hirata |
| 5,302,955 A | 4/1994 | Schutte et al. |
| 5,305,007 A | 4/1994 | Orr et al. |
| 5,305,386 A | 4/1994 | Yamato |
| 5,309,474 A | 5/1994 | Gilhousen et al. |
| 5,309,504 A | 5/1994 | Morganstein |
| 5,309,505 A | 5/1994 | Szlam et al. |
| 5,309,513 A | 5/1994 | Rose |
| 5,311,574 A | 5/1994 | Livanos |
| 5,311,577 A | 5/1994 | Madrid et al. |
| 5,313,516 A | 5/1994 | Afshar et al. |
| 5,315,302 A | 5/1994 | Katsukura et al. |
| 5,315,658 A | 5/1994 | Micali |
| 5,317,320 A | 5/1994 | Grover et al. |
| 5,317,321 A | 5/1994 | Sass |
| 5,319,543 A | 6/1994 | Wilhelm |
| 5,319,548 A | 6/1994 | Germain |
| 5,319,703 A | 6/1994 | Drory |
| 5,319,705 A | 6/1994 | Halter et al. |
| 5,321,745 A | 6/1994 | Drory et al. |
| 5,323,322 A | 6/1994 | Mueller et al. |
| 5,324,028 A | 6/1994 | Luna |
| 5,325,292 A | 6/1994 | Crockett |
| 5,325,294 A | 6/1994 | Keene |
| 5,327,490 A | 7/1994 | Cave |
| 5,329,579 A | 7/1994 | Brunson |
| 5,331,327 A | 7/1994 | Brocia et al. |
| 5,333,190 A | 7/1994 | Eyster |
| 5,334,974 A | 8/1994 | Simms et al. |
| 5,334,986 A | 8/1994 | Fernhout |
| 5,335,276 A | 8/1994 | Thompson et al. |
| 5,335,288 A | 8/1994 | Faulkner |
| 5,335,743 A | 8/1994 | Gillbrand et al. |
| 5,339,392 A | 8/1994 | Risberg et al. |
| 5,341,138 A | 8/1994 | Ono et al. |
| 5,341,412 A | 8/1994 | Ramot et al. |
| 5,341,414 A | 8/1994 | Popke |
| 5,341,428 A | 8/1994 | Schatz |
| 5,341,429 A | 8/1994 | Stringer et al. |
| 5,343,527 A | 8/1994 | Moore |
| 5,345,549 A | 9/1994 | Appel et al. |
| 5,345,817 A | 9/1994 | Grenn et al. |
| 5,347,120 A | 9/1994 | Decker et al. |
| 5,347,285 A | 9/1994 | MacDoran et al. |
| 5,347,286 A | 9/1994 | Babitch |
| 5,347,452 A | 9/1994 | Bay, Jr. |
| 5,347,456 A | 9/1994 | Zhang et al. |
| 5,347,578 A | 9/1994 | Duxbury |
| 5,347,580 A | 9/1994 | Molva et al. |
| 5,349,531 A | 9/1994 | Sato et al. |
| 5,351,041 A | 9/1994 | Ikata et al. |
| 5,351,285 A | 9/1994 | Katz |
| 5,359,332 A | 10/1994 | Allison et al. |
| 5,359,645 A | 10/1994 | Katz |
| 5,361,165 A | 11/1994 | Stringfellow et al. |
| 5,361,202 A | 11/1994 | Doue |
| 5,363,105 A | 11/1994 | Ono et al. |
| 5,363,453 A | 11/1994 | Gagne et al. |
| 5,364,093 A | 11/1994 | Huston et al. |
| 5,365,055 A | 11/1994 | Decker et al. |
| 5,365,447 A | 11/1994 | Dennis |
| 5,365,450 A | 11/1994 | Schuchman et al. |
| 5,365,516 A | 11/1994 | Jandrell |
| 5,365,575 A | 11/1994 | Katz |
| 5,369,695 A | 11/1994 | Chakravarti et al. |
| 5,371,510 A | 12/1994 | Miyauchi et al. |
| 5,375,059 A | 12/1994 | Kyrtsos et al. |
| 5,377,095 A | 12/1994 | Maeda et al. |
| 5,379,224 A | 1/1995 | Brown et al. |
| 5,381,470 A | 1/1995 | Cambray et al. |
| 5,382,957 A | 1/1995 | Blume |
| 5,382,958 A | 1/1995 | FitzGerald |
| 5,383,127 A | 1/1995 | Shibata |
| 5,389,930 A | 2/1995 | Ono |
| 5,389,934 A | 2/1995 | Kass |
| 5,390,125 A | 2/1995 | Sennott et al. |
| 5,390,236 A | 2/1995 | Klausner et al. |
| 5,390,330 A | 2/1995 | Talati |
| 5,392,052 A | 2/1995 | Eberwine |
| 5,392,353 A | 2/1995 | Morales |
| 5,394,324 A | 2/1995 | Clearwater |
| 5,400,045 A | 3/1995 | Aoki |
| 5,400,254 A | 3/1995 | Fujita |
| 5,400,393 A | 3/1995 | Knuth et al. |
| 5,402,347 A | 3/1995 | McBurney et al. |
| 5,402,441 A | 3/1995 | Washizu et al. |
| 5,402,474 A | 3/1995 | Miller et al. |
| 5,404,443 A | 4/1995 | Hirata |
| 5,404,661 A | 4/1995 | Sahm et al. |
| 5,406,491 A | 4/1995 | Lima |

(56) References Cited

U.S. PATENT DOCUMENTS

| | | |
|---|---|---|
| 5,406,492 A | 4/1995 | Suzuki |
| 5,408,415 A | 4/1995 | Inoue et al. |
| 5,410,750 A | 4/1995 | Cantwell et al. |
| 5,412,727 A | 5/1995 | Drexler et al. |
| 5,414,432 A | 5/1995 | Penny, Jr. et al. |
| 5,414,439 A | 5/1995 | Groves et al. |
| 5,414,755 A | 5/1995 | Bahler et al. |
| 5,416,318 A | 5/1995 | Hegyi |
| 5,416,712 A | 5/1995 | Geier et al. |
| 5,418,537 A | 5/1995 | Bird |
| 5,418,538 A | 5/1995 | Lau |
| 5,420,592 A | 5/1995 | Johnson |
| 5,420,593 A | 5/1995 | Niles |
| 5,420,594 A | 5/1995 | FitzGerald et al. |
| 5,420,852 A | 5/1995 | Anderson et al. |
| 5,420,919 A | 5/1995 | Arnaud et al. |
| 5,422,565 A | 6/1995 | Swanson |
| 5,422,816 A | 6/1995 | Sprague et al. |
| 5,424,951 A | 6/1995 | Nobe et al. |
| 5,425,093 A | 6/1995 | Trefzger |
| 5,428,544 A | 6/1995 | Shyu |
| 5,428,683 A | 6/1995 | Indeck et al. |
| 5,430,279 A | 7/1995 | Fernadez |
| 5,430,792 A | 7/1995 | Jesurum et al. |
| 5,430,948 A | 7/1995 | Vander Wal, III |
| 5,432,520 A | 7/1995 | Schneider et al. |
| 5,432,542 A | 7/1995 | Thibadeau et al. |
| 5,432,835 A | 7/1995 | Hashimoto |
| 5,432,841 A | 7/1995 | Rimer |
| 5,432,864 A | 7/1995 | Lu et al. |
| 5,432,904 A | 7/1995 | Wong |
| 5,433,446 A | 7/1995 | Lindstedt, Jr. |
| 5,434,574 A | 7/1995 | Hayashi et al. |
| 5,434,787 A | 7/1995 | Okamoto et al. |
| 5,434,788 A | 7/1995 | Seymour et al. |
| 5,434,789 A | 7/1995 | Fraker et al. |
| 5,434,906 A | 7/1995 | Robinson et al. |
| 5,434,913 A | 7/1995 | Tung et al. |
| 5,436,967 A | 7/1995 | Hanson |
| 5,440,428 A | 8/1995 | Hegg et al. |
| 5,442,363 A | 8/1995 | Remondi |
| 5,442,553 A | 8/1995 | Parrillo |
| 5,442,693 A | 8/1995 | Hays et al. |
| 5,446,923 A | 8/1995 | Martinson et al. |
| 5,448,045 A | 9/1995 | Clark |
| 5,448,624 A | 9/1995 | Hardy et al. |
| 5,448,631 A | 9/1995 | Cain |
| 5,448,638 A | 9/1995 | Johnson et al. |
| 5,450,321 A | 9/1995 | Crane |
| 5,450,329 A | 9/1995 | Tanner |
| 5,450,613 A | 9/1995 | Takahara et al. |
| 5,451,964 A | 9/1995 | Babu |
| 5,453,601 A | 9/1995 | Rosen |
| 5,455,407 A | 10/1995 | Rosen |
| 5,457,747 A | 10/1995 | Drexler et al. |
| 5,459,761 A | 10/1995 | Monica et al. |
| 5,459,781 A | 10/1995 | Kaplan et al. |
| 5,461,365 A | 10/1995 | Schlager et al. |
| 5,461,383 A | 10/1995 | Ono et al. |
| 5,465,082 A | 11/1995 | Chaco |
| 5,465,286 A | 11/1995 | Clare et al. |
| 5,465,413 A | 11/1995 | Enge et al. |
| 5,467,391 A | 11/1995 | Donaghue, Jr. et al. |
| 5,469,506 A | 11/1995 | Berson et al. |
| 5,471,218 A | 11/1995 | Talbot et al. |
| 5,473,538 A | 12/1995 | Fujita et al. |
| 5,475,399 A | 12/1995 | Borsuk |
| 5,475,839 A | 12/1995 | Watson et al. |
| 5,478,993 A | 12/1995 | Derksen |
| 5,479,482 A | 12/1995 | Grimes |
| 5,479,487 A | 12/1995 | Hammond |
| 5,479,501 A | 12/1995 | Lai |
| 5,481,596 A | 1/1996 | Comerford |
| 5,481,613 A | 1/1996 | Ford et al. |
| 5,483,601 A | 1/1996 | Faulkner |
| 5,483,632 A | 1/1996 | Kuwamoto et al. |
| 5,485,161 A | 1/1996 | Vaughn |
| 5,485,312 A | 1/1996 | Horner et al. |
| 5,485,506 A | 1/1996 | Recht et al. |
| 5,485,519 A | 1/1996 | Weiss |
| 5,486,840 A | 1/1996 | Borrego et al. |
| 5,487,168 A | 1/1996 | Geiner et al. |
| 5,488,570 A | 1/1996 | Agarwal |
| 5,490,247 A | 2/1996 | Tung et al. |
| 5,491,800 A | 2/1996 | Goldsmith et al. |
| 5,493,658 A | 2/1996 | Chiang et al. |
| 5,493,690 A | 2/1996 | Shimazaki |
| 5,494,097 A | 2/1996 | Straub et al. |
| 5,495,419 A | 2/1996 | Rostoker et al. |
| 5,495,523 A | 2/1996 | Stent et al. |
| 5,495,528 A | 2/1996 | Dunn et al. |
| 5,497,271 A | 3/1996 | Mulvanny et al. |
| 5,497,339 A | 3/1996 | Bernard |
| 5,497,430 A | 3/1996 | Sadovnik et al. |
| 5,499,293 A | 3/1996 | Behram et al. |
| 5,500,899 A | 3/1996 | Snow |
| 5,502,688 A | 3/1996 | Recchione et al. |
| 5,502,762 A | 3/1996 | Andrew et al. |
| 5,504,482 A | 4/1996 | Schreder |
| 5,504,491 A | 4/1996 | Chapman |
| 5,504,622 A | 4/1996 | Oikawa et al. |
| 5,506,595 A | 4/1996 | Fukano et al. |
| 5,506,898 A | 4/1996 | Costantini et al. |
| 5,506,954 A | 4/1996 | Arshi et al. |
| 5,508,912 A | 4/1996 | Schneiderman |
| 5,508,942 A | 4/1996 | Agarwal |
| 5,510,793 A | 4/1996 | Gregg, III et al. |
| 5,511,003 A | 4/1996 | Agarwal |
| 5,511,112 A | 4/1996 | Szlam |
| 5,511,117 A | 4/1996 | Zazzera |
| 5,511,121 A | 4/1996 | Yacobi |
| 5,511,724 A | 4/1996 | Freiberger et al. |
| 5,513,110 A | 4/1996 | Fujita et al. |
| 5,515,296 A | 5/1996 | Agarwal |
| 5,515,421 A | 5/1996 | Sikand et al. |
| 5,517,566 A | 5/1996 | Smith et al. |
| 5,519,403 A | 5/1996 | Bickley et al. |
| 5,519,410 A | 5/1996 | Smalanskas et al. |
| 5,519,620 A | 5/1996 | Talbot et al. |
| 5,519,718 A | 5/1996 | Yokev et al. |
| 5,519,760 A | 5/1996 | Borkowski et al. |
| 5,519,773 A | 5/1996 | Dumas et al. |
| 5,519,778 A | 5/1996 | Leighton et al. |
| 5,521,696 A | 5/1996 | Dunne |
| 5,521,722 A | 5/1996 | Colvill et al. |
| 5,523,559 A | 6/1996 | Swanson |
| 5,523,739 A | 6/1996 | Manneschi |
| 5,524,140 A | 6/1996 | Klausner et al. |
| 5,524,147 A | 6/1996 | Bean |
| 5,525,977 A | 6/1996 | Suman |
| 5,525,989 A | 6/1996 | Holt |
| 5,525,996 A | 6/1996 | Aker et al. |
| 5,526,417 A | 6/1996 | Dezonno |
| 5,526,428 A | 6/1996 | Arnold |
| 5,528,234 A | 6/1996 | Mani et al. |
| 5,528,245 A | 6/1996 | Aker et al. |
| 5,528,246 A | 6/1996 | Henderson et al. |
| 5,528,248 A | 6/1996 | Steiner et al. |
| 5,528,492 A | 6/1996 | Fukushima |
| 5,528,496 A | 6/1996 | Brauer et al. |
| 5,528,516 A | 6/1996 | Yemini et al. |
| 5,528,666 A | 6/1996 | Weigand et al. |
| 5,529,139 A | 6/1996 | Kurahashi et al. |
| 5,530,235 A | 6/1996 | Stefik et al. |
| 5,530,931 A | 6/1996 | Cook-Hellberg et al. |
| 5,533,103 A | 7/1996 | Peavey et al. |
| 5,533,107 A | 7/1996 | Irwin et al. |
| 5,533,109 A | 7/1996 | Baker |
| 5,533,123 A | 7/1996 | Force et al. |
| 5,534,855 A | 7/1996 | Shockley et al. |
| 5,534,888 A | 7/1996 | Lebby et al. |
| 5,534,975 A | 7/1996 | Stefik et al. |
| 5,535,257 A | 7/1996 | Goldberg et al. |
| 5,535,383 A | 7/1996 | Gower |

(56) References Cited

U.S. PATENT DOCUMENTS

| | | |
|---|---|---|
| 5,537,470 A | 7/1996 | Lee |
| 5,539,645 A | 7/1996 | Mandhyan et al. |
| 5,539,869 A | 7/1996 | Spoto et al. |
| 5,541,590 A | 7/1996 | Nishio |
| 5,544,220 A | 8/1996 | Trefzger |
| 5,544,225 A | 8/1996 | Kennedy, III et al. |
| 5,544,232 A | 8/1996 | Baker et al. |
| 5,544,255 A | 8/1996 | Smithies et al. |
| 5,546,452 A | 8/1996 | Andrews et al. |
| 5,546,456 A | 8/1996 | Vilsoet et al. |
| 5,546,462 A | 8/1996 | Indeck et al. |
| 5,546,580 A | 8/1996 | Seliger et al. |
| 5,547,125 A | 8/1996 | Hennessee et al. |
| 5,550,055 A | 8/1996 | Reinherz et al. |
| 5,553,145 A | 9/1996 | Micali |
| 5,553,155 A | 9/1996 | Kuhns et al. |
| 5,553,661 A | 9/1996 | Beyerlein et al. |
| 5,555,172 A | 9/1996 | Potter |
| 5,555,286 A | 9/1996 | Tendler |
| 5,555,290 A | 9/1996 | McLeod et al. |
| 5,555,295 A | 9/1996 | Bhusri |
| 5,555,502 A | 9/1996 | Opel |
| 5,557,533 A | 9/1996 | Koford et al. |
| 5,557,668 A | 9/1996 | Brady |
| 5,557,765 A | 9/1996 | Lipner et al. |
| 5,557,798 A | 9/1996 | Skeen et al. |
| 5,559,520 A | 9/1996 | Barzegar et al. |
| 5,559,867 A | 9/1996 | Langsenkamp et al. |
| 5,559,878 A | 9/1996 | Keys et al. |
| 5,559,885 A | 9/1996 | Drexler et al. |
| 5,560,011 A | 9/1996 | Uyama |
| 5,561,711 A | 10/1996 | Muller |
| 5,561,718 A | 10/1996 | Trew et al. |
| 5,563,071 A | 10/1996 | Augurt |
| 5,563,607 A | 10/1996 | Loomis et al. |
| 5,565,874 A | 10/1996 | Rode |
| 5,568,540 A | 10/1996 | Greco et al. |
| 5,570,419 A | 10/1996 | Cave et al. |
| 5,572,204 A | 11/1996 | Timm et al. |
| 5,572,576 A | 11/1996 | Klausner et al. |
| 5,572,586 A | 11/1996 | Ouchi |
| 5,572,596 A | 11/1996 | Wildes et al. |
| 5,573,244 A | 11/1996 | Mindes |
| 5,574,784 A | 11/1996 | LaPadula et al. |
| 5,576,724 A | 11/1996 | Fukatsu et al. |
| 5,577,112 A | 11/1996 | Cambray et al. |
| 5,578,808 A | 11/1996 | Taylor |
| 5,579,377 A | 11/1996 | Rogers |
| 5,579,383 A | 11/1996 | Bales et al. |
| 5,579,393 A | 11/1996 | Conner et al. |
| 5,579,535 A | 11/1996 | Orlen et al. |
| 5,581,602 A | 12/1996 | Szlam et al. |
| 5,581,604 A | 12/1996 | Robinson et al. |
| 5,581,607 A | 12/1996 | Richardson, Jr. et al. |
| 5,583,933 A | 12/1996 | Mark |
| 5,583,950 A | 12/1996 | Prokoski |
| 5,586,171 A | 12/1996 | McAllister et al. |
| 5,586,179 A | 12/1996 | Stent et al. |
| 5,586,262 A | 12/1996 | Komatsu et al. |
| 5,588,049 A | 12/1996 | Detering et al. |
| 5,588,059 A | 12/1996 | Chandos et al. |
| 5,590,171 A | 12/1996 | Howe et al. |
| 5,590,188 A | 12/1996 | Crockett |
| 5,592,408 A | 1/1997 | Keskin et al. |
| 5,592,543 A | 1/1997 | Smith et al. |
| 5,592,549 A | 1/1997 | Nagel et al. |
| 5,592,945 A | 1/1997 | Fiedler |
| 5,594,779 A | 1/1997 | Goodman |
| 5,594,790 A | 1/1997 | Curreri et al. |
| 5,594,791 A | 1/1997 | Szlam et al. |
| 5,594,806 A | 1/1997 | Colbert |
| 5,600,561 A | 2/1997 | Okamura |
| 5,600,710 A | 2/1997 | Weisser, Jr. et al. |
| 5,602,739 A | 2/1997 | Haagenstad et al. |
| 5,604,804 A | 2/1997 | Micali |
| 5,606,609 A | 2/1997 | Houser et al. |
| 5,608,387 A | 3/1997 | Davies |
| 5,610,774 A | 3/1997 | Hayashi et al. |
| 5,610,815 A | 3/1997 | Gudat et al. |
| 5,610,978 A | 3/1997 | Purits |
| 5,613,004 A | 3/1997 | Cooperman et al. |
| 5,613,012 A | 3/1997 | Hoffman et al. |
| 5,615,109 A | 3/1997 | Eder |
| 5,615,277 A | 3/1997 | Hoffman |
| 5,616,904 A | 4/1997 | Fernadez |
| 5,619,557 A | 4/1997 | Van Berkum |
| 5,619,991 A | 4/1997 | Sloane |
| 5,621,201 A | 4/1997 | Langhans et al. |
| 5,621,793 A | 4/1997 | Bednarek et al. |
| 5,621,889 A | 4/1997 | Lermuzeaux et al. |
| 5,623,547 A | 4/1997 | Jones et al. |
| 5,623,601 A | 4/1997 | Vu |
| 5,625,668 A | 4/1997 | Loomis et al. |
| 5,625,676 A | 4/1997 | Greco et al. |
| 5,625,682 A | 4/1997 | Gray et al. |
| 5,627,547 A | 5/1997 | Ramaswamy et al. |
| 5,629,980 A | 5/1997 | Stefik et al. |
| 5,629,982 A | 5/1997 | Micali |
| 5,630,206 A | 5/1997 | Urban et al. |
| 5,631,961 A | 5/1997 | Mills et al. |
| 5,632,011 A | 5/1997 | Landfield et al. |
| 5,633,872 A | 5/1997 | Dinkins |
| 5,633,917 A | 5/1997 | Rogers |
| 5,633,922 A | 5/1997 | August et al. |
| 5,633,924 A | 5/1997 | Kaish et al. |
| 5,633,932 A | 5/1997 | Davis et al. |
| 5,634,012 A | 5/1997 | Stefik et al. |
| 5,634,055 A | 5/1997 | Barnewall et al. |
| 5,636,125 A | 6/1997 | Rostoker et al. |
| 5,636,267 A | 6/1997 | Utsumi et al. |
| 5,636,268 A | 6/1997 | Dijkstra et al. |
| 5,636,282 A | 6/1997 | Holmquist et al. |
| 5,636,292 A | 6/1997 | Rhoads |
| 5,638,078 A | 6/1997 | Wichtel |
| 5,638,305 A | 6/1997 | Kobayashi et al. |
| 5,638,436 A | 6/1997 | Hamilton et al. |
| 5,638,443 A | 6/1997 | Stefik et al. |
| 5,638,445 A | 6/1997 | Spelman et al. |
| 5,638,498 A | 6/1997 | Tyler et al. |
| 5,640,468 A | 6/1997 | Hsu |
| 5,640,546 A | 6/1997 | Gopinath et al. |
| 5,640,569 A | 6/1997 | Miller et al. |
| 5,644,778 A | 7/1997 | Burks et al. |
| 5,646,612 A | 7/1997 | Byon |
| 5,646,839 A | 7/1997 | Katz |
| 5,646,986 A | 7/1997 | Sahni et al. |
| 5,646,988 A | 7/1997 | Hikawa |
| 5,646,997 A | 7/1997 | Barton |
| 5,647,017 A | 7/1997 | Smithies et al. |
| 5,647,364 A | 7/1997 | Schneider et al. |
| 5,648,769 A | 7/1997 | Sato et al. |
| 5,649,068 A | 7/1997 | Boser et al. |
| 5,650,770 A | 7/1997 | Schlager et al. |
| 5,650,929 A | 7/1997 | Potter et al. |
| 5,652,788 A | 7/1997 | Hara |
| 5,653,386 A | 8/1997 | Hennessee et al. |
| 5,654,715 A | 8/1997 | Hayashikura et al. |
| 5,655,013 A | 8/1997 | Gainsboro |
| 5,655,014 A | 8/1997 | Walsh et al. |
| 5,657,074 A | 8/1997 | Ishibe et al. |
| 5,659,616 A | 8/1997 | Sudia |
| 5,659,726 A | 8/1997 | Sandford, II et al. |
| 5,661,283 A | 8/1997 | Gallacher et al. |
| 5,664,018 A | 9/1997 | Leighton |
| 5,664,109 A | 9/1997 | Johnson et al. |
| 5,664,115 A | 9/1997 | Fraser |
| 5,666,102 A | 9/1997 | Lahiff |
| 5,666,400 A | 9/1997 | McAllister et al. |
| 5,666,414 A | 9/1997 | Micali |
| 5,666,416 A | 9/1997 | Micali |
| 5,666,420 A | 9/1997 | Micali |
| 5,666,523 A | 9/1997 | D'Souza |
| 5,668,878 A | 9/1997 | Brands |
| 5,668,880 A | 9/1997 | Alajajian |

(56) References Cited

U.S. PATENT DOCUMENTS

| | | |
|---|---|---|
| 5,670,953 A | 9/1997 | Satoh et al. |
| 5,671,086 A | 9/1997 | Parvin et al. |
| 5,672,106 A | 9/1997 | Orford et al. |
| 5,673,305 A | 9/1997 | Ross |
| 5,675,637 A | 10/1997 | Szlam et al. |
| 5,677,955 A | 10/1997 | Doggett et al. |
| 5,678,182 A | 10/1997 | Miller et al. |
| 5,679,940 A | 10/1997 | Templeton et al. |
| 5,680,460 A | 10/1997 | Tomko et al. |
| 5,682,032 A | 10/1997 | Philipp |
| 5,682,142 A | 10/1997 | Loosmore et al. |
| 5,682,322 A | 10/1997 | Boyle et al. |
| 5,684,860 A | 11/1997 | Milani et al. |
| 5,684,863 A | 11/1997 | Katz |
| 5,687,215 A | 11/1997 | Timm et al. |
| 5,687,225 A | 11/1997 | Jorgensen |
| 5,687,236 A | 11/1997 | Moskowitz et al. |
| 5,689,252 A | 11/1997 | Ayanoglu et al. |
| 5,689,269 A | 11/1997 | Norris |
| 5,689,652 A | 11/1997 | Lupien et al. |
| 5,691,695 A | 11/1997 | Lahiff |
| 5,692,033 A | 11/1997 | Farris |
| 5,692,034 A | 11/1997 | Richardson, Jr. et al. |
| 5,692,047 A | 11/1997 | McManis |
| 5,696,809 A | 12/1997 | Voit |
| 5,696,818 A | 12/1997 | Doremus et al. |
| 5,696,827 A | 12/1997 | Brands |
| 5,696,908 A | 12/1997 | Muehlberger et al. |
| 5,699,056 A | 12/1997 | Yoshida |
| 5,699,418 A | 12/1997 | Jones |
| 5,699,427 A | 12/1997 | Chow et al. |
| 5,701,295 A | 12/1997 | Bales et al. |
| 5,701,328 A | 12/1997 | Schuchman et al. |
| 5,702,165 A | 12/1997 | Koibuchi |
| 5,703,562 A | 12/1997 | Nilsen |
| 5,703,935 A | 12/1997 | Raissyan et al. |
| 5,706,427 A | 1/1998 | Tabuki |
| 5,710,834 A | 1/1998 | Rhoads |
| 5,712,625 A | 1/1998 | Murphy |
| 5,712,632 A | 1/1998 | Nishimura et al. |
| 5,712,640 A | 1/1998 | Andou et al. |
| 5,712,912 A | 1/1998 | Tomko et al. |
| 5,712,914 A | 1/1998 | Aucsmith et al. |
| 5,714,852 A | 2/1998 | Enderich |
| 5,715,307 A | 2/1998 | Zazzera |
| 5,715,403 A | 2/1998 | Stefik |
| 5,717,387 A | 2/1998 | Suman et al. |
| 5,717,741 A | 2/1998 | Yue et al. |
| 5,717,757 A | 2/1998 | Micali |
| 5,719,794 A | 2/1998 | Altshuler et al. |
| 5,719,950 A | 2/1998 | Osten et al. |
| 5,720,770 A | 2/1998 | Nappholz et al. |
| RE35,758 E | 3/1998 | Winter et al. |
| 5,724,418 A | 3/1998 | Brady |
| 5,724,488 A | 3/1998 | Prezioso |
| 5,727,092 A | 3/1998 | Sandford, II et al. |
| 5,727,154 A | 3/1998 | Fry et al. |
| 5,727,165 A | 3/1998 | Ordish et al. |
| 5,729,600 A | 3/1998 | Blaha et al. |
| 5,732,368 A | 3/1998 | Knoll et al. |
| 5,734,154 A | 3/1998 | Jachimowicz et al. |
| 5,734,752 A | 3/1998 | Knox |
| 5,734,973 A | 3/1998 | Honda |
| 5,737,419 A | 4/1998 | Ganesan |
| 5,737,420 A | 4/1998 | Tomko et al. |
| 5,740,233 A | 4/1998 | Cave et al. |
| 5,740,240 A | 4/1998 | Jolissaint |
| 5,740,244 A | 4/1998 | Indeck et al. |
| 5,742,226 A | 4/1998 | Szabo et al. |
| 5,742,510 A | 4/1998 | Rostoker et al. |
| 5,742,675 A | 4/1998 | Kilander et al. |
| 5,742,683 A | 4/1998 | Lee et al. |
| 5,742,685 A | 4/1998 | Berson et al. |
| 5,745,363 A | 4/1998 | Rostoker et al. |
| 5,745,555 A | 4/1998 | Mark |
| 5,745,569 A | 4/1998 | Moskowitz et al. |
| 5,745,573 A | 4/1998 | Lipner et al. |
| 5,745,604 A | 4/1998 | Rhoads |
| 5,745,678 A | 4/1998 | Herzberg et al. |
| 5,748,103 A | 5/1998 | Flach et al. |
| 5,748,711 A | 5/1998 | Scherer |
| 5,748,738 A | 5/1998 | Bisbee et al. |
| 5,748,763 A | 5/1998 | Rhoads |
| 5,748,783 A | 5/1998 | Rhoads |
| 5,748,890 A | 5/1998 | Goldberg et al. |
| 5,748,960 A | 5/1998 | Fischer |
| 5,749,785 A | 5/1998 | Rossides |
| 5,751,809 A | 5/1998 | Davis et al. |
| 5,751,836 A | 5/1998 | Wildes et al. |
| 5,751,909 A | 5/1998 | Gower |
| 5,752,754 A | 5/1998 | Amitani et al. |
| 5,752,976 A | 5/1998 | Duffin et al. |
| 5,754,939 A | 5/1998 | Herz et al. |
| 5,757,431 A | 5/1998 | Bradley et al. |
| 5,757,914 A | 5/1998 | McManis |
| 5,757,916 A | 5/1998 | MacDoran et al. |
| 5,758,311 A | 5/1998 | Tsuji et al. |
| 5,758,328 A | 5/1998 | Giovannoli |
| 5,761,285 A | 6/1998 | Stent |
| 5,761,288 A | 6/1998 | Pinard et al. |
| 5,761,298 A | 6/1998 | Davis et al. |
| 5,761,686 A | 6/1998 | Bloomberg |
| 5,763,862 A | 6/1998 | Jachimowicz et al. |
| 5,764,789 A | 6/1998 | Pare, Jr. et al. |
| 5,765,152 A | 6/1998 | Erickson |
| 5,767,496 A | 6/1998 | Swartz et al. |
| 5,768,355 A | 6/1998 | Salibrici et al. |
| 5,768,360 A | 6/1998 | Reynolds et al. |
| 5,768,382 A | 6/1998 | Schneier et al. |
| 5,768,385 A | 6/1998 | Simon |
| 5,768,388 A | 6/1998 | Goldwasser et al. |
| 5,768,426 A | 6/1998 | Rhoads |
| 5,770,849 A | 6/1998 | Novis et al. |
| 5,771,071 A | 6/1998 | Bradley et al. |
| 5,772,585 A | 6/1998 | Lavin et al. |
| 5,774,073 A | 6/1998 | Maekawa et al. |
| 5,774,357 A | 6/1998 | Hoffberg et al. |
| 5,774,537 A | 6/1998 | Kim |
| 5,774,551 A | 6/1998 | Wu et al. |
| 5,774,730 A | 6/1998 | Aizikowitz et al. |
| 5,777,394 A | 7/1998 | Arold |
| 5,778,102 A | 7/1998 | Sandford, II et al. |
| 5,778,367 A | 7/1998 | Wesinger, Jr. et al. |
| 5,778,882 A | 7/1998 | Raymond et al. |
| 5,779,634 A | 7/1998 | Ema et al. |
| 5,781,439 A | 7/1998 | Rostoker et al. |
| 5,781,872 A | 7/1998 | Konishi et al. |
| 5,781,890 A | 7/1998 | Nematbakhsh et al. |
| 5,784,066 A | 7/1998 | Aizikowitz et al. |
| 5,784,461 A | 7/1998 | Shaffer et al. |
| 5,784,463 A | 7/1998 | Chen et al. |
| 5,784,566 A | 7/1998 | Viavant et al. |
| 5,784,616 A | 7/1998 | Horvitz |
| 5,787,156 A | 7/1998 | Katz |
| 5,787,159 A | 7/1998 | Hamilton et al. |
| 5,787,187 A | 7/1998 | Bouchard et al. |
| 5,789,733 A | 8/1998 | Jachimowicz et al. |
| 5,790,665 A | 8/1998 | Micali |
| 5,790,668 A | 8/1998 | Tomko |
| 5,790,674 A | 8/1998 | Houvener et al. |
| 5,790,703 A | 8/1998 | Wang |
| 5,790,935 A | 8/1998 | Payton |
| 5,793,644 A | 8/1998 | Koford et al. |
| 5,793,846 A | 8/1998 | Katz |
| 5,793,868 A | 8/1998 | Micali |
| 5,794,207 A | 8/1998 | Walker et al. |
| 5,796,791 A | 8/1998 | Polcyn |
| 5,796,816 A | 8/1998 | Utsumi |
| 5,796,841 A | 8/1998 | Cordery et al. |
| 5,797,127 A | 8/1998 | Walker et al. |
| 5,797,128 A | 8/1998 | Birnbaum |
| 5,799,077 A | 8/1998 | Yoshii |
| 5,799,083 A | 8/1998 | Brothers et al. |
| 5,799,086 A | 8/1998 | Sudia |

(56) References Cited

U.S. PATENT DOCUMENTS

| | | |
|---|---|---|
| 5,799,087 A | 8/1998 | Rosen |
| 5,799,088 A | 8/1998 | Raike |
| 5,802,199 A | 9/1998 | Pare, Jr. et al. |
| 5,802,502 A | 9/1998 | Gell et al. |
| 5,805,055 A | 9/1998 | Colizza |
| 5,805,719 A | 9/1998 | Pare, Jr. et al. |
| 5,805,803 A | 9/1998 | Birrell et al. |
| 5,806,048 A | 9/1998 | Kiron et al. |
| 5,806,061 A | 9/1998 | Chaudhuri et al. |
| 5,806,071 A | 9/1998 | Balderrama et al. |
| 5,809,144 A | 9/1998 | Sirbu et al. |
| 5,809,437 A | 9/1998 | Breed |
| 5,812,398 A | 9/1998 | Nielsen |
| 5,812,642 A | 9/1998 | Leroy |
| 5,812,668 A | 9/1998 | Weber |
| 5,815,252 A | 9/1998 | Price-Francis |
| 5,815,403 A | 9/1998 | Jones et al. |
| 5,815,551 A | 9/1998 | Katz |
| 5,815,554 A | 9/1998 | Burgess et al. |
| 5,815,566 A | 9/1998 | Ramot et al. |
| 5,815,577 A | 9/1998 | Clark |
| 5,815,657 A | 9/1998 | Williams et al. |
| 5,819,237 A | 10/1998 | Garman |
| 5,819,289 A | 10/1998 | Sanford, II et al. |
| 5,822,400 A | 10/1998 | Smith |
| 5,822,401 A | 10/1998 | Cave et al. |
| 5,822,410 A | 10/1998 | McCausland et al. |
| 5,822,432 A | 10/1998 | Moskowitz et al. |
| 5,822,436 A | 10/1998 | Rhoads |
| 5,825,869 A | 10/1998 | Brooks et al. |
| 5,825,871 A | 10/1998 | Mark |
| 5,825,880 A | 10/1998 | Sudia et al. |
| 5,826,014 A | 10/1998 | Coley et al. |
| 5,826,029 A | 10/1998 | Gore, Jr. et al. |
| 5,826,244 A | 10/1998 | Huberman |
| 5,828,731 A | 10/1998 | Szlam et al. |
| 5,828,734 A | 10/1998 | Katz |
| 5,828,751 A | 10/1998 | Walker et al. |
| 5,828,840 A | 10/1998 | Cowan et al. |
| 5,831,545 A | 11/1998 | Murray et al. |
| 5,832,089 A | 11/1998 | Kravitz et al. |
| 5,832,119 A | 11/1998 | Rhoads |
| 5,832,450 A | 11/1998 | Myers et al. |
| 5,832,464 A | 11/1998 | Houvener et al. |
| 5,832,488 A | 11/1998 | Eberhardt |
| 5,835,572 A | 11/1998 | Richardson, Jr. et al. |
| 5,835,726 A | 11/1998 | Shwed et al. |
| 5,835,881 A | 11/1998 | Trovato et al. |
| 5,835,896 A | 11/1998 | Fisher et al. |
| 5,838,237 A | 11/1998 | Revell et al. |
| 5,838,583 A | 11/1998 | Varadarajan et al. |
| 5,838,772 A | 11/1998 | Wilson et al. |
| 5,838,779 A | 11/1998 | Fuller et al. |
| 5,838,792 A | 11/1998 | Ganesan |
| 5,838,812 A | 11/1998 | Pare, Jr. et al. |
| 5,839,114 A | 11/1998 | Lynch et al. |
| 5,839,119 A | 11/1998 | Krsul et al. |
| 5,841,122 A | 11/1998 | Kirchhoff |
| 5,841,852 A | 11/1998 | He |
| 5,841,865 A | 11/1998 | Sudia |
| 5,841,886 A | 11/1998 | Rhoads |
| 5,841,907 A | 11/1998 | Javidi et al. |
| 5,841,978 A | 11/1998 | Rhoads |
| 5,844,244 A | 12/1998 | Graf et al. |
| 5,845,211 A | 12/1998 | Roach, Jr. |
| 5,845,253 A | 12/1998 | Rensimer et al. |
| 5,845,266 A | 12/1998 | Lupien et al. |
| 5,845,267 A | 12/1998 | Ronen |
| 5,848,143 A | 12/1998 | Andrews et al. |
| 5,848,155 A | 12/1998 | Cox |
| 5,848,231 A | 12/1998 | Teitelbaum et al. |
| 5,850,385 A | 12/1998 | Esaki |
| 5,850,428 A | 12/1998 | Day |
| 5,850,442 A | 12/1998 | Muftic |
| 5,850,446 A | 12/1998 | Berger et al. |
| 5,850,451 A | 12/1998 | Sudia |
| 5,850,481 A | 12/1998 | Rhoads |
| 5,850,617 A | 12/1998 | Libby |
| 5,854,832 A | 12/1998 | Dezonno |
| 5,857,013 A | 1/1999 | Yue et al. |
| 5,857,022 A | 1/1999 | Sudia |
| 5,857,023 A | 1/1999 | Demers et al. |
| 5,862,223 A | 1/1999 | Walker et al. |
| 5,862,246 A | 1/1999 | Colbert |
| 5,862,260 A | 1/1999 | Rhoads |
| 5,864,305 A | 1/1999 | Rosenquist |
| 5,867,386 A | 2/1999 | Hoffberg et al. |
| 5,867,559 A | 2/1999 | Jorgensen et al. |
| 5,867,564 A | 2/1999 | Bhusri |
| 5,867,572 A | 2/1999 | MacDonald et al. |
| 5,867,578 A | 2/1999 | Brickell et al. |
| 5,867,795 A | 2/1999 | Novis et al. |
| 5,867,799 A | 2/1999 | Lang et al. |
| 5,867,802 A | 2/1999 | Borza |
| 5,867,821 A | 2/1999 | Ballantyne et al. |
| 5,869,822 A | 2/1999 | Meadows, II et al. |
| 5,870,313 A | 2/1999 | Boyle et al. |
| 5,870,464 A | 2/1999 | Brewster et al. |
| 5,870,564 A | 2/1999 | Jensen et al. |
| 5,870,723 A | 2/1999 | Pare, Jr. et al. |
| 5,870,744 A | 2/1999 | Sprague |
| 5,872,833 A | 2/1999 | Scherer |
| 5,872,834 A | 2/1999 | Teitelbaum |
| 5,872,848 A | 2/1999 | Romney et al. |
| 5,872,849 A | 2/1999 | Sudia |
| 5,873,068 A | 2/1999 | Beaumont et al. |
| 5,873,071 A | 2/1999 | Ferstenberg et al. |
| 5,873,782 A | 2/1999 | Hall |
| 5,875,108 A | 2/1999 | Hoffberg et al. |
| 5,875,117 A | 2/1999 | Jones et al. |
| 5,876,926 A | 3/1999 | Beecham |
| 5,878,126 A | 3/1999 | Velamuri et al. |
| 5,878,130 A | 3/1999 | Andrews et al. |
| 5,878,137 A | 3/1999 | Ippolito et al. |
| 5,878,144 A | 3/1999 | Aucsmith et al. |
| 5,881,225 A | 3/1999 | Worth |
| 5,881,226 A | 3/1999 | Veneklase |
| 5,884,272 A | 3/1999 | Walker et al. |
| 5,884,277 A | 3/1999 | Khosla |
| 5,889,473 A | 3/1999 | Wicks |
| 5,889,474 A | 3/1999 | LaDue |
| 5,889,799 A | 3/1999 | Grossman et al. |
| 5,889,862 A | 3/1999 | Ohta et al. |
| 5,889,863 A | 3/1999 | Weber |
| 5,889,868 A | 3/1999 | Moskowitz et al. |
| 5,890,129 A | 3/1999 | Spurgeon |
| 5,890,138 A | 3/1999 | Godin et al. |
| 5,890,152 A | 3/1999 | Rapaport et al. |
| 5,892,824 A | 4/1999 | Beatson et al. |
| 5,892,838 A | 4/1999 | Brady |
| 5,892,900 A | 4/1999 | Ginter et al. |
| 5,892,902 A | 4/1999 | Clark |
| 5,893,902 A | 4/1999 | Transue et al. |
| 5,894,505 A | 4/1999 | Koyama |
| 5,896,446 A | 4/1999 | Sagady et al. |
| 5,897,616 A | 4/1999 | Kanevsky et al. |
| 5,897,620 A | 4/1999 | Walker et al. |
| 5,898,154 A | 4/1999 | Rosen |
| 5,898,759 A | 4/1999 | Huang |
| 5,898,762 A | 4/1999 | Katz |
| 5,898,830 A | 4/1999 | Wesinger, Jr. et al. |
| 5,899,998 A | 5/1999 | McGauley et al. |
| 5,901,209 A | 5/1999 | Tannenbaum et al. |
| 5,901,214 A | 5/1999 | Shaffer et al. |
| 5,901,229 A | 5/1999 | Fujisaki et al. |
| 5,901,246 A | 5/1999 | Hoffberg et al. |
| 5,903,454 A | 5/1999 | Hoffberg et al. |
| 5,903,461 A | 5/1999 | Rostoker et al. |
| 5,903,641 A | 5/1999 | Tonisson |
| 5,903,651 A | 5/1999 | Kocher |
| 5,903,880 A | 5/1999 | Biffar |
| 5,903,889 A | 5/1999 | de la Huerga et al. |
| 5,905,505 A | 5/1999 | Lesk |
| 5,905,792 A | 5/1999 | Miloslavsky |

(56) References Cited

U.S. PATENT DOCUMENTS

| | | |
|---|---|---|
| 5,905,800 A | 5/1999 | Moskowitz et al. |
| 5,905,975 A | 5/1999 | Ausubel |
| 5,905,979 A | 5/1999 | Barrows |
| 5,907,149 A | 5/1999 | Marckini |
| 5,907,601 A | 5/1999 | David et al. |
| 5,907,608 A | 5/1999 | Shaffer et al. |
| 5,909,493 A | 6/1999 | Motoyama |
| 5,910,982 A | 6/1999 | Shaffer et al. |
| 5,910,987 A | 6/1999 | Ginter et al. |
| 5,910,988 A | 6/1999 | Ballard |
| 5,911,132 A | 6/1999 | Sloane |
| 5,911,136 A | 6/1999 | Atkins |
| 5,911,143 A | 6/1999 | Deinhart et al. |
| 5,911,687 A | 6/1999 | Sato et al. |
| 5,912,818 A | 6/1999 | McGrady et al. |
| 5,912,947 A | 6/1999 | Langsenkamp et al. |
| 5,912,974 A | 6/1999 | Holloway et al. |
| 5,913,025 A | 6/1999 | Higley et al. |
| 5,913,195 A | 6/1999 | Weeren et al. |
| 5,913,196 A | 6/1999 | Talmor et al. |
| 5,914,887 A | 6/1999 | Scepanovic et al. |
| 5,914,951 A | 6/1999 | Bentley et al. |
| 5,915,008 A | 6/1999 | Dulman |
| 5,915,011 A | 6/1999 | Miloslavsky |
| 5,915,018 A | 6/1999 | Aucsmith |
| 5,915,019 A | 6/1999 | Ginter et al. |
| 5,915,027 A | 6/1999 | Cox et al. |
| 5,915,087 A | 6/1999 | Hammond et al. |
| 5,915,093 A | 6/1999 | Berlin et al. |
| 5,915,209 A | 6/1999 | Lawrence |
| 5,915,240 A | 6/1999 | Karpf |
| 5,915,973 A | 6/1999 | Hoehn-Saric et al. |
| 5,917,893 A | 6/1999 | Katz |
| 5,917,903 A | 6/1999 | Jolissaint |
| 5,918,213 A | 6/1999 | Bernard et al. |
| 5,918,227 A | 6/1999 | Polnerow et al. |
| 5,919,239 A | 7/1999 | Fraker et al. |
| 5,919,246 A | 7/1999 | Waizmann et al. |
| 5,920,058 A | 7/1999 | Weber et al. |
| 5,920,384 A | 7/1999 | Borza |
| 5,920,477 A | 7/1999 | Hoffberg et al. |
| 5,920,628 A | 7/1999 | Indeck et al. |
| 5,920,629 A | 7/1999 | Rosen |
| 5,920,630 A | 7/1999 | Wertheimer et al. |
| 5,920,861 A | 7/1999 | Hall et al. |
| 5,923,745 A | 7/1999 | Hurd |
| 5,923,746 A | 7/1999 | Baker et al. |
| 5,923,763 A | 7/1999 | Walker et al. |
| 5,924,016 A | 7/1999 | Fuller et al. |
| 5,924,074 A | 7/1999 | Evans |
| 5,924,082 A | 7/1999 | Silverman et al. |
| 5,924,083 A | 7/1999 | Silverman et al. |
| 5,924,406 A | 7/1999 | Kinugasa et al. |
| 5,925,126 A | 7/1999 | Hsieh |
| 5,926,528 A | 7/1999 | David |
| 5,926,539 A | 7/1999 | Shtivelman |
| 5,926,548 A | 7/1999 | Okamoto |
| 5,926,796 A | 7/1999 | Walker et al. |
| 5,928,333 A | 7/1999 | Landfield et al. |
| 5,929,753 A | 7/1999 | Montague |
| 5,930,339 A | 7/1999 | Nepustil |
| 5,930,369 A | 7/1999 | Cox et al. |
| 5,930,759 A | 7/1999 | Moore et al. |
| 5,930,777 A | 7/1999 | Barber |
| 5,930,804 A | 7/1999 | Yu et al. |
| 5,931,890 A | 8/1999 | Suwa et al. |
| 5,933,480 A | 8/1999 | Felger |
| 5,933,492 A | 8/1999 | Turovski |
| 5,933,498 A | 8/1999 | Schneck et al. |
| 5,933,515 A | 8/1999 | Pu et al. |
| 5,933,809 A | 8/1999 | Hunt et al. |
| 5,935,071 A | 8/1999 | Schneider et al. |
| 5,937,055 A | 8/1999 | Kaplan |
| 5,937,068 A | 8/1999 | Audebert |
| 5,937,390 A | 8/1999 | Hyodo |
| 5,937,394 A | 8/1999 | Wong et al. |
| 5,938,707 A | 8/1999 | Uehara |
| 5,940,493 A | 8/1999 | Desai et al. |
| 5,940,496 A | 8/1999 | Gisby et al. |
| 5,940,497 A | 8/1999 | Miloslavsky |
| 5,940,504 A | 8/1999 | Griswold |
| 5,940,508 A | 8/1999 | Long et al. |
| 5,940,813 A | 8/1999 | Hutchings |
| 5,940,947 A | 8/1999 | Takeuchi et al. |
| 5,941,813 A | 8/1999 | Sievers et al. |
| 5,941,947 A | 8/1999 | Brown et al. |
| 5,943,403 A | 8/1999 | Richardson, Jr. et al. |
| 5,943,422 A | 8/1999 | Van Wie et al. |
| 5,943,423 A | 8/1999 | Muftic |
| 5,943,424 A | 8/1999 | Berger et al. |
| 5,944,823 A | 8/1999 | Jade et al. |
| 5,945,877 A | 8/1999 | Elango et al. |
| 5,946,387 A | 8/1999 | Miloslavsky |
| 5,946,388 A | 8/1999 | Walker et al. |
| 5,946,394 A | 8/1999 | Gambuzza |
| 5,946,414 A | 8/1999 | Cass et al. |
| 5,946,669 A | 8/1999 | Polk |
| 5,948,040 A | 9/1999 | DeLorme et al. |
| 5,948,136 A | 9/1999 | Smyers |
| 5,949,045 A | 9/1999 | Ezawa et al. |
| 5,949,046 A | 9/1999 | Kenneth et al. |
| 5,949,852 A | 9/1999 | Duncan |
| 5,949,854 A | 9/1999 | Sato |
| 5,949,863 A | 9/1999 | Tansky |
| 5,949,866 A | 9/1999 | Coiera et al. |
| 5,949,876 A | 9/1999 | Ginter et al. |
| 5,949,879 A | 9/1999 | Berson et al. |
| 5,949,881 A | 9/1999 | Davis |
| 5,949,882 A | 9/1999 | Angelo |
| 5,949,885 A | 9/1999 | Leighton |
| 5,950,195 A | 9/1999 | Stockwell et al. |
| 5,951,055 A | 9/1999 | Mowry, Jr. |
| 5,952,638 A | 9/1999 | Demers et al. |
| 5,952,641 A | 9/1999 | Korshun |
| 5,953,319 A | 9/1999 | Dutta et al. |
| 5,953,332 A | 9/1999 | Miloslavsky |
| 5,953,405 A | 9/1999 | Miloslavsky |
| 5,953,419 A | 9/1999 | Lohstroh et al. |
| 5,954,583 A | 9/1999 | Green |
| 5,956,392 A | 9/1999 | Tanigawa et al. |
| 5,956,397 A | 9/1999 | Shaffer et al. |
| 5,956,400 A | 9/1999 | Chaum et al. |
| 5,956,408 A | 9/1999 | Arnold |
| 5,958,016 A | 9/1999 | Chang et al. |
| 5,958,050 A | 9/1999 | Griffin et al. |
| 5,959,529 A | 9/1999 | Kail, IV |
| 5,960,073 A | 9/1999 | Kikinis et al. |
| 5,960,083 A | 9/1999 | Micali |
| 5,960,177 A | 9/1999 | Tanno |
| 5,963,632 A | 10/1999 | Miloslavsky |
| 5,963,635 A | 10/1999 | Szlam et al. |
| 5,963,648 A | 10/1999 | Rosen |
| 5,963,657 A | 10/1999 | Bowker et al. |
| 5,963,908 A | 10/1999 | Chadha |
| 5,963,911 A | 10/1999 | Walker et al. |
| 5,963,924 A | 10/1999 | Williams et al. |
| 5,963,957 A | 10/1999 | Hoffberg |
| 5,963,975 A | 10/1999 | Boyle et al. |
| 5,966,429 A | 10/1999 | Scherer |
| 5,966,446 A | 10/1999 | Davis |
| 5,966,448 A | 10/1999 | Namba et al. |
| 5,966,531 A | 10/1999 | Skeen et al. |
| 5,968,176 A | 10/1999 | Nessett et al. |
| 5,970,132 A | 10/1999 | Brady |
| 5,970,134 A | 10/1999 | Highland et al. |
| 5,970,143 A | 10/1999 | Schneier et al. |
| 5,970,479 A | 10/1999 | Shepherd |
| 5,973,616 A | 10/1999 | Grebe et al. |
| 5,974,120 A | 10/1999 | Katz |
| 5,974,135 A | 10/1999 | Breneman et al. |
| 5,974,146 A | 10/1999 | Randle et al. |
| 5,974,389 A | 10/1999 | Clark et al. |
| 5,974,548 A | 10/1999 | Adams |
| RE36,416 E | 11/1999 | Szlam et al. |

(56) References Cited

U.S. PATENT DOCUMENTS

| | | |
|---|---|---|
| 5,977,884 A | 11/1999 | Ross |
| 5,978,465 A | 11/1999 | Corduroy et al. |
| 5,978,467 A | 11/1999 | Walker et al. |
| 5,978,471 A | 11/1999 | Bokinge |
| 5,978,475 A | 11/1999 | Schneier et al. |
| 5,978,494 A | 11/1999 | Zhang |
| 5,978,840 A | 11/1999 | Nguyen et al. |
| 5,978,918 A | 11/1999 | Scholnick et al. |
| 5,979,773 A | 11/1999 | Findley, Jr. et al. |
| 5,982,298 A | 11/1999 | Lappenbusch et al. |
| 5,982,325 A | 11/1999 | Thornton et al. |
| 5,982,520 A | 11/1999 | Weiser et al. |
| 5,982,857 A | 11/1999 | Brady |
| 5,982,868 A | 11/1999 | Shaffer et al. |
| 5,982,891 A | 11/1999 | Ginter et al. |
| 5,982,894 A | 11/1999 | McCalley et al. |
| 5,983,154 A | 11/1999 | Morisawa |
| 5,983,161 A | 11/1999 | Lemelson et al. |
| 5,983,205 A | 11/1999 | Brams et al. |
| 5,983,208 A | 11/1999 | Haller et al. |
| 5,983,214 A | 11/1999 | Lang et al. |
| 5,983,350 A | 11/1999 | Minear et al. |
| 5,984,366 A | 11/1999 | Priddy |
| 5,986,746 A | 11/1999 | Metz et al. |
| 5,987,115 A | 11/1999 | Petrunka et al. |
| 5,987,116 A | 11/1999 | Petrunka et al. |
| 5,987,118 A | 11/1999 | Dickerman et al. |
| 5,987,132 A | 11/1999 | Rowney |
| 5,987,140 A | 11/1999 | Rowney et al. |
| 5,987,153 A | 11/1999 | Chan et al. |
| 5,987,155 A | 11/1999 | Dunn et al. |
| 5,987,440 A | 11/1999 | O'Neil et al. |
| 5,987,459 A | 11/1999 | Swanson et al. |
| 5,990,825 A | 11/1999 | Ito |
| 5,991,391 A | 11/1999 | Miloslavsky |
| 5,991,392 A | 11/1999 | Miloslavsky |
| 5,991,393 A | 11/1999 | Kamen |
| 5,991,395 A | 11/1999 | Miloslavsky |
| 5,991,399 A | 11/1999 | Graunke et al. |
| 5,991,406 A | 11/1999 | Lipner et al. |
| 5,991,408 A | 11/1999 | Pearson et al. |
| 5,991,429 A | 11/1999 | Coffin et al. |
| 5,991,431 A | 11/1999 | Borza et al. |
| 5,991,519 A | 11/1999 | Benhammou et al. |
| 5,991,604 A | 11/1999 | Yi |
| 5,991,731 A | 11/1999 | Colon et al. |
| 5,991,758 A | 11/1999 | Ellard |
| 5,991,761 A | 11/1999 | Mahoney et al. |
| 5,991,877 A | 11/1999 | Luckenbaugh |
| 5,991,878 A | 11/1999 | McDonough et al. |
| 5,995,614 A | 11/1999 | Miloslavsky |
| 5,995,615 A | 11/1999 | Miloslavsky |
| 5,995,625 A | 11/1999 | Sudia et al. |
| 5,995,630 A | 11/1999 | Borza |
| 5,995,943 A | 11/1999 | Bull et al. |
| 5,995,948 A | 11/1999 | Whitford et al. |
| 5,995,997 A | 11/1999 | Horvitz |
| 5,996,076 A | 11/1999 | Rowney et al. |
| 5,999,095 A | 12/1999 | Earl et al. |
| 5,999,629 A | 12/1999 | Heer et al. |
| 5,999,637 A | 12/1999 | Toyoda et al. |
| 5,999,908 A | 12/1999 | Abelow |
| 5,999,919 A | 12/1999 | Jarecki et al. |
| 5,999,965 A | 12/1999 | Kelly |
| 5,999,973 A | 12/1999 | Glitho et al. |
| 6,002,326 A | 12/1999 | Turner |
| 6,002,756 A | 12/1999 | Lo et al. |
| 6,002,760 A | 12/1999 | Gisby |
| 6,002,767 A | 12/1999 | Kramer |
| 6,002,770 A | 12/1999 | Tomko et al. |
| 6,002,772 A | 12/1999 | Saito |
| 6,003,084 A | 12/1999 | Green et al. |
| 6,003,135 A | 12/1999 | Bialick et al. |
| 6,003,765 A | 12/1999 | Okamoto |
| 6,004,276 A | 12/1999 | Wright et al. |
| 6,005,517 A | 12/1999 | Friedrichs |
| 6,005,534 A | 12/1999 | Hylin et al. |
| 6,005,859 A | 12/1999 | Harvell et al. |
| 6,005,928 A | 12/1999 | Johnson |
| 6,005,931 A | 12/1999 | Neyman et al. |
| 6,005,939 A | 12/1999 | Fortenberry et al. |
| 6,005,943 A | 12/1999 | Cohen et al. |
| 6,006,218 A | 12/1999 | Breese et al. |
| 6,006,328 A | 12/1999 | Drake |
| 6,006,332 A | 12/1999 | Rabne et al. |
| 6,006,604 A | 12/1999 | Rabelo et al. |
| 6,008,741 A | 12/1999 | Shinagawa et al. |
| 6,009,149 A | 12/1999 | Langsenkamp |
| 6,009,177 A | 12/1999 | Sudia |
| 6,009,430 A | 12/1999 | Joseph et al. |
| 6,009,452 A | 12/1999 | Horvitz |
| 6,009,475 A | 12/1999 | Shrader |
| 6,009,526 A | 12/1999 | Choi |
| 6,011,845 A | 1/2000 | Nabkel et al. |
| 6,011,858 A | 1/2000 | Stock et al. |
| 6,012,035 A | 1/2000 | Freeman, Jr. et al. |
| 6,012,039 A | 1/2000 | Hoffman et al. |
| 6,012,045 A | 1/2000 | Barzilai et al. |
| 6,012,049 A | 1/2000 | Kawan |
| 6,012,088 A | 1/2000 | Li et al. |
| 6,013,956 A | 1/2000 | Anderson, Jr. |
| 6,014,439 A | 1/2000 | Walker et al. |
| 6,014,605 A | 1/2000 | Morisawa et al. |
| 6,014,627 A | 1/2000 | Togher et al. |
| 6,014,643 A | 1/2000 | Minton |
| 6,014,666 A | 1/2000 | Helland et al. |
| 6,016,318 A | 1/2000 | Tomoike |
| 6,016,344 A | 1/2000 | Katz |
| 6,016,475 A | 1/2000 | Miller et al. |
| 6,016,476 A | 1/2000 | Maes et al. |
| 6,016,484 A | 1/2000 | Williams et al. |
| 6,018,579 A | 1/2000 | Petrunka |
| 6,018,724 A | 1/2000 | Arent |
| 6,018,738 A | 1/2000 | Breese et al. |
| 6,018,739 A | 1/2000 | McCoy et al. |
| 6,018,801 A | 1/2000 | Palage et al. |
| 6,021,114 A | 2/2000 | Shaffer et al. |
| 6,021,190 A | 2/2000 | Fuller et al. |
| 6,021,202 A | 2/2000 | Anderson et al. |
| 6,021,393 A | 2/2000 | Honda et al. |
| 6,021,397 A | 2/2000 | Jones et al. |
| 6,021,398 A | 2/2000 | Ausubel |
| 6,021,399 A | 2/2000 | Demers et al. |
| 6,021,428 A | 2/2000 | Miloslavsky |
| 6,021,491 A | 2/2000 | Renaud |
| 6,021,497 A | 2/2000 | Bouthillier et al. |
| 6,023,685 A | 2/2000 | Brett et al. |
| 6,023,686 A | 2/2000 | Brown |
| 6,023,762 A | 2/2000 | Dean et al. |
| 6,023,765 A | 2/2000 | Kuhn |
| 6,026,149 A | 2/2000 | Fuller et al. |
| 6,026,156 A | 2/2000 | Epler et al. |
| 6,026,163 A | 2/2000 | Micali |
| 6,026,166 A | 2/2000 | LeBourgeois |
| 6,026,167 A | 2/2000 | Aziz |
| 6,026,193 A | 2/2000 | Rhoads |
| 6,026,379 A | 2/2000 | Haller et al. |
| 6,026,383 A | 2/2000 | Ausubel |
| 6,026,490 A | 2/2000 | Johns-Vano et al. |
| 6,028,932 A | 2/2000 | Park |
| 6,028,933 A | 2/2000 | Heer et al. |
| 6,028,936 A | 2/2000 | Hillis |
| 6,028,937 A | 2/2000 | Tatebayashi et al. |
| 6,028,939 A | 2/2000 | Yin |
| 6,029,067 A | 2/2000 | Pfundstein |
| 6,029,150 A | 2/2000 | Kravitz |
| 6,029,151 A | 2/2000 | Nikander |
| 6,029,160 A | 2/2000 | Cabrera et al. |
| 6,029,161 A | 2/2000 | Lang et al. |
| 6,029,195 A | 2/2000 | Herz |
| 6,029,245 A | 2/2000 | Scanlan |
| 6,029,247 A | 2/2000 | Ferguson |
| 6,031,899 A | 2/2000 | Wu |
| 6,031,910 A | 2/2000 | Deindl et al. |

(56) References Cited

U.S. PATENT DOCUMENTS

| | | |
|---|---|---|
| 6,031,913 A | 2/2000 | Hassan et al. |
| 6,031,914 A | 2/2000 | Tewfik et al. |
| 6,032,118 A | 2/2000 | Tello et al. |
| 6,034,605 A | 3/2000 | March |
| 6,034,618 A | 3/2000 | Tatebayashi et al. |
| 6,034,626 A | 3/2000 | Maekawa et al. |
| 6,035,021 A | 3/2000 | Katz |
| 6,035,041 A | 3/2000 | Frankel et al. |
| 6,035,276 A | 3/2000 | Newman et al. |
| 6,035,280 A | 3/2000 | Christensen |
| 6,035,398 A | 3/2000 | Bjorn |
| 6,035,402 A | 3/2000 | Vaeth et al. |
| 6,035,406 A | 3/2000 | Moussa et al. |
| 6,037,870 A | 3/2000 | Alessandro |
| 6,038,315 A | 3/2000 | Strait et al. |
| 6,038,316 A | 3/2000 | Dwork et al. |
| 6,038,322 A | 3/2000 | Harkins |
| 6,038,337 A | 3/2000 | Lawrence et al. |
| 6,038,560 A | 3/2000 | Wical |
| 6,038,563 A | 3/2000 | Bapat et al. |
| 6,038,581 A | 3/2000 | Aoki et al. |
| 6,038,665 A | 3/2000 | Bolt et al. |
| 6,038,666 A | 3/2000 | Hsu et al. |
| 6,040,783 A | 3/2000 | Houvener et al. |
| 6,041,116 A | 3/2000 | Meyers |
| 6,041,118 A | 3/2000 | Michel et al. |
| 6,041,122 A | 3/2000 | Graunke et al. |
| 6,041,123 A | 3/2000 | Colvin, Sr. |
| 6,041,349 A | 3/2000 | Sugauchi et al. |
| 6,041,355 A | 3/2000 | Toga |
| 6,041,357 A | 3/2000 | Kunzelman et al. |
| 6,041,408 A | 3/2000 | Nishioka et al. |
| 6,041,410 A | 3/2000 | Hsu et al. |
| 6,041,411 A | 3/2000 | Wyatt |
| 6,041,412 A | 3/2000 | Timson et al. |
| 6,042,005 A | 3/2000 | Basile et al. |
| 6,044,075 A | 3/2000 | Le Boudec et al. |
| 6,044,131 A | 3/2000 | McEvoy et al. |
| 6,044,135 A | 3/2000 | Katz |
| 6,044,146 A | 3/2000 | Gisby et al. |
| 6,044,149 A | 3/2000 | Shaham et al. |
| 6,044,155 A | 3/2000 | Thomlinson et al. |
| 6,044,157 A | 3/2000 | Uesaka et al. |
| 6,044,205 A | 3/2000 | Reed et al. |
| 6,044,257 A | 3/2000 | Boling et al. |
| 6,044,349 A | 3/2000 | Tolopka et al. |
| 6,044,350 A | 3/2000 | Weiant, Jr. et al. |
| 6,044,355 A | 3/2000 | Crockett et al. |
| 6,044,363 A | 3/2000 | Mori et al. |
| 6,044,368 A | 3/2000 | Powers |
| 6,044,388 A | 3/2000 | DeBellis et al. |
| 6,044,401 A | 3/2000 | Harvey |
| 6,044,462 A | 3/2000 | Zubeldia et al. |
| 6,044,463 A | 3/2000 | Kanda et al. |
| 6,044,464 A | 3/2000 | Shamir |
| 6,044,466 A | 3/2000 | Anand et al. |
| 6,044,468 A | 3/2000 | Osmond |
| 6,045,039 A | 4/2000 | Stinson et al. |
| 6,047,051 A | 4/2000 | Ginzboorg et al. |
| 6,047,066 A | 4/2000 | Brown et al. |
| 6,047,067 A | 4/2000 | Rosen |
| 6,047,072 A | 4/2000 | Field et al. |
| 6,047,221 A | 4/2000 | Piche et al. |
| 6,047,242 A | 4/2000 | Benson |
| 6,047,264 A | 4/2000 | Fisher et al. |
| 6,047,268 A | 4/2000 | Bartoli et al. |
| 6,047,269 A | 4/2000 | Biffar |
| 6,047,274 A | 4/2000 | Johnson et al. |
| 6,047,322 A | 4/2000 | Vaid et al. |
| 6,047,325 A | 4/2000 | Jain et al. |
| 6,047,374 A | 4/2000 | Barton |
| 6,047,887 A | 4/2000 | Rosen |
| 6,049,599 A | 4/2000 | McCausland et al. |
| 6,049,610 A | 4/2000 | Crandall |
| 6,049,612 A | 4/2000 | Fielder et al. |
| 6,049,613 A | 4/2000 | Jakobsson |
| 6,049,627 A | 4/2000 | Becker et al. |
| 6,049,671 A | 4/2000 | Slivka et al. |
| 6,049,785 A | 4/2000 | Gifford |
| 6,049,786 A | 4/2000 | Smorodinsky |
| 6,049,787 A | 4/2000 | Takahashi et al. |
| 6,049,838 A | 4/2000 | Miller et al. |
| 6,049,872 A | 4/2000 | Reiter et al. |
| 6,049,874 A | 4/2000 | McClain et al. |
| 6,049,875 A | 4/2000 | Suzuki et al. |
| 6,052,453 A | 4/2000 | Sagady et al. |
| 6,052,466 A | 4/2000 | Wright |
| 6,052,467 A | 4/2000 | Brands |
| 6,052,468 A | 4/2000 | Hillhouse |
| 6,052,469 A | 4/2000 | Johnson et al. |
| 6,052,645 A | 4/2000 | Harada |
| 6,052,688 A | 4/2000 | Thorsen |
| 6,052,780 A | 4/2000 | Glover |
| 6,052,788 A | 4/2000 | Wesinger, Jr. et al. |
| 6,055,307 A | 4/2000 | Behnke et al. |
| 6,055,314 A | 4/2000 | Spies et al. |
| 6,055,321 A | 4/2000 | Numao et al. |
| 6,055,494 A | 4/2000 | Friedman |
| 6,055,506 A | 4/2000 | Frasca, Jr. |
| 6,055,508 A | 4/2000 | Naor et al. |
| 6,055,512 A | 4/2000 | Dean et al. |
| 6,055,518 A | 4/2000 | Franklin et al. |
| 6,055,575 A | 4/2000 | Paulsen et al. |
| 6,055,636 A | 4/2000 | Hillier et al. |
| 6,055,637 A | 4/2000 | Hudson et al. |
| 6,055,639 A | 4/2000 | Schanze |
| 6,056,197 A | 5/2000 | Hara et al. |
| 6,056,199 A | 5/2000 | Wiklof et al. |
| 6,057,872 A | 5/2000 | Candelore |
| 6,058,187 A | 5/2000 | Chen |
| 6,058,188 A | 5/2000 | Chandersekaran et al. |
| 6,058,189 A | 5/2000 | McGough |
| 6,058,193 A | 5/2000 | Cordery et al. |
| 6,058,303 A | 5/2000 | Åstrom et al. |
| 6,058,379 A | 5/2000 | Odom et al. |
| 6,058,381 A | 5/2000 | Nelson |
| 6,058,383 A | 5/2000 | Narasimhalu et al. |
| 6,058,435 A | 5/2000 | Sassin et al. |
| 6,061,003 A | 5/2000 | Harada |
| 6,061,347 A | 5/2000 | Hollatz et al. |
| 6,061,448 A | 5/2000 | Smith et al. |
| 6,061,451 A | 5/2000 | Muratani et al. |
| 6,061,454 A | 5/2000 | malik et al. |
| 6,061,665 A | 5/2000 | Bahreman |
| 6,061,692 A | 5/2000 | Thomas et al. |
| 6,061,729 A | 5/2000 | Nightingale |
| 6,061,789 A | 5/2000 | Hauser et al. |
| 6,061,790 A | 5/2000 | Bodnar |
| 6,061,791 A | 5/2000 | Moreau |
| 6,061,792 A | 5/2000 | Simon |
| 6,061,794 A | 5/2000 | Angelo et al. |
| 6,061,796 A | 5/2000 | Chen et al. |
| 6,061,797 A | 5/2000 | Jade et al. |
| 6,061,798 A | 5/2000 | Coley et al. |
| 6,061,799 A | 5/2000 | Eldridge et al. |
| 6,063,028 A | 5/2000 | Luciano |
| 6,064,667 A | 5/2000 | Gisby et al. |
| 6,064,723 A | 5/2000 | Cohn et al. |
| 6,064,730 A | 5/2000 | Ginsberg |
| 6,064,731 A | 5/2000 | Flockhart et al. |
| 6,064,737 A | 5/2000 | Rhoads |
| 6,064,738 A | 5/2000 | Fridrich |
| 6,064,740 A | 5/2000 | Curiger et al. |
| 6,064,741 A | 5/2000 | Horn et al. |
| 6,064,751 A | 5/2000 | Smithies et al. |
| 6,064,764 A | 5/2000 | Bhaskaran et al. |
| 6,064,878 A | 5/2000 | Denker et al. |
| 6,064,968 A | 5/2000 | Schanz |
| 6,064,973 A | 5/2000 | Smith et al. |
| 6,064,977 A | 5/2000 | Haverstock et al. |
| 6,065,008 A | 5/2000 | Simon et al. |
| 6,065,119 A | 5/2000 | Sandford, II et al. |
| 6,065,675 A | 5/2000 | Teicher |
| 6,067,348 A | 5/2000 | Hibbeler |

(56) References Cited

U.S. PATENT DOCUMENTS

| | | |
|---|---|---|
| 6,067,466 A | 5/2000 | Selker et al. |
| 6,067,565 A | 5/2000 | Horvitz |
| 6,067,572 A | 5/2000 | Jensen et al. |
| 6,067,620 A | 5/2000 | Holden et al. |
| 6,068,184 A | 5/2000 | Barnett |
| 6,069,647 A | 5/2000 | Sullivan et al. |
| 6,069,914 A | 5/2000 | Cox |
| 6,069,952 A | 5/2000 | Saito et al. |
| 6,069,954 A | 5/2000 | Moreau |
| 6,069,955 A | 5/2000 | Coppersmith et al. |
| 6,069,969 A | 5/2000 | Keagy et al. |
| 6,069,970 A | 5/2000 | Salatino et al. |
| 6,070,118 A | 5/2000 | Ohta et al. |
| 6,070,141 A | 5/2000 | Houvener et al. |
| 6,070,142 A | 5/2000 | McDonough et al. |
| 6,070,239 A | 5/2000 | McManis |
| 6,072,864 A | 6/2000 | Shtivelman et al. |
| 6,072,870 A | 6/2000 | Nguyen et al. |
| 6,072,874 A | 6/2000 | Shin et al. |
| 6,072,876 A | 6/2000 | Obata et al. |
| 6,072,894 A | 6/2000 | Payne |
| 6,073,106 A | 6/2000 | Rozen et al. |
| 6,073,125 A | 6/2000 | Cordery et al. |
| 6,073,160 A | 6/2000 | Grantham et al. |
| 6,073,172 A | 6/2000 | Frailong et al. |
| 6,073,234 A | 6/2000 | Kigo et al. |
| 6,073,236 A | 6/2000 | Kusakabe et al. |
| 6,073,237 A | 6/2000 | Ellison |
| 6,073,238 A | 6/2000 | Drupsteen |
| 6,073,240 A | 6/2000 | Kurtzberg et al. |
| 6,073,242 A | 6/2000 | Hardy et al. |
| 6,075,455 A | 6/2000 | DiMaria et al. |
| 6,075,852 A | 6/2000 | Ashworth et al. |
| 6,075,854 A | 6/2000 | Copley et al. |
| 6,075,860 A | 6/2000 | Ketcham |
| 6,075,861 A | 6/2000 | Miller, II |
| 6,075,864 A | 6/2000 | Batten |
| 6,075,865 A | 6/2000 | Scheldt et al. |
| 6,076,066 A | 6/2000 | DiRienzo et al. |
| 6,076,077 A | 6/2000 | Saito |
| 6,076,078 A | 6/2000 | Camp et al. |
| 6,076,162 A | 6/2000 | Deindl et al. |
| 6,076,163 A | 6/2000 | Hoffstein et al. |
| 6,076,164 A | 6/2000 | Tanaka et al. |
| 6,076,166 A | 6/2000 | Moshfeghi et al. |
| 6,076,167 A | 6/2000 | Borza |
| 6,078,265 A | 6/2000 | Bonder et al. |
| 6,078,586 A | 6/2000 | Dugan et al. |
| 6,078,663 A | 6/2000 | Yamamoto |
| 6,078,665 A | 6/2000 | Anderson et al. |
| 6,078,667 A | 6/2000 | Johnson |
| 6,078,853 A | 6/2000 | Ebner et al. |
| 6,078,909 A | 6/2000 | Knutson |
| 6,078,928 A | 6/2000 | Schnase et al. |
| 6,078,946 A | 6/2000 | Johnson |
| 6,079,018 A | 6/2000 | Hardy et al. |
| 6,079,020 A | 6/2000 | Liu |
| 6,079,021 A | 6/2000 | Abadi et al. |
| 6,079,047 A | 6/2000 | Cotugno et al. |
| 6,079,621 A | 6/2000 | Vardanyan et al. |
| 6,081,199 A | 6/2000 | Hogl |
| 6,081,533 A | 6/2000 | Laubach et al. |
| 6,081,597 A | 6/2000 | Hoffstein et al. |
| 6,081,598 A | 6/2000 | Dai |
| 6,081,610 A | 6/2000 | Dwork et al. |
| 6,081,750 A | 6/2000 | Hoffberg et al. |
| 6,081,790 A | 6/2000 | Rosen |
| 6,081,793 A | 6/2000 | Challener et al. |
| 6,081,893 A | 6/2000 | Grawrock et al. |
| 6,081,900 A | 6/2000 | Subramaniam et al. |
| 6,082,776 A | 7/2000 | Feinberg |
| 6,084,510 A | 7/2000 | Lemelson et al. |
| 6,084,943 A | 7/2000 | Sunderman et al. |
| 6,084,969 A | 7/2000 | Wright et al. |
| 6,085,175 A | 7/2000 | Gugel et al. |
| 6,085,226 A | 7/2000 | Horvitz |
| 6,086,626 A | 7/2000 | Jain et al. |
| 6,091,956 A | 7/2000 | Hollenberg |
| 6,092,005 A | 7/2000 | Okada |
| 6,092,014 A | 7/2000 | Okada |
| 6,092,724 A | 7/2000 | Bouthillier et al. |
| 6,097,806 A | 8/2000 | Baker et al. |
| 6,098,016 A | 8/2000 | Ishihara |
| 6,098,051 A | 8/2000 | Lupien et al. |
| 6,098,069 A | 8/2000 | Yamaguchi |
| 6,102,002 A | 8/2000 | Gimmler et al. |
| 6,102,958 A | 8/2000 | Meystel et al. |
| 6,102,970 A | 8/2000 | Kneipp |
| 6,104,101 A | 8/2000 | Miller et al. |
| 6,104,801 A | 8/2000 | Miloslavsky |
| 6,108,644 A | 8/2000 | Goldschlag et al. |
| 6,108,787 A | 8/2000 | Anderson et al. |
| 6,110,214 A | 8/2000 | Klimasauskas |
| 6,112,181 A | 8/2000 | Shear et al. |
| 6,112,186 A | 8/2000 | Bergh et al. |
| 6,115,462 A | 9/2000 | Servi et al. |
| 6,115,654 A | 9/2000 | Eid et al. |
| 6,115,693 A | 9/2000 | McDonough et al. |
| 6,118,403 A | 9/2000 | Lang |
| 6,118,865 A | 9/2000 | Gisby |
| 6,118,874 A | 9/2000 | Okamoto et al. |
| 6,119,229 A | 9/2000 | Martinez et al. |
| 6,120,298 A | 9/2000 | Jenkins et al. |
| 6,122,358 A | 9/2000 | Shoji et al. |
| 6,122,360 A | 9/2000 | Neyman et al. |
| 6,122,364 A | 9/2000 | Petrunka et al. |
| 6,122,484 A | 9/2000 | Fuller et al. |
| 6,125,178 A | 9/2000 | Walker et al. |
| 6,125,186 A | 9/2000 | Saito et al. |
| 6,125,398 A | 9/2000 | Mirashrafi et al. |
| 6,128,280 A | 10/2000 | Jamoussi et al. |
| 6,128,376 A | 10/2000 | Smith |
| 6,128,380 A | 10/2000 | Shaffer et al. |
| 6,128,391 A | 10/2000 | Denno et al. |
| 6,130,937 A | 10/2000 | Fotta |
| 6,131,087 A | 10/2000 | Luke et al. |
| 6,131,090 A | 10/2000 | Basso, Jr. et al. |
| 6,132,969 A | 10/2000 | Stoughton et al. |
| 6,134,326 A | 10/2000 | Micali |
| 6,134,328 A | 10/2000 | Cordery et al. |
| 6,134,530 A | 10/2000 | Bunting et al. |
| 6,134,536 A | 10/2000 | Shepherd |
| 6,135,396 A | 10/2000 | Whitfield et al. |
| 6,137,862 A | 10/2000 | Atkinson et al. |
| 6,137,870 A | 10/2000 | Scherer |
| 6,137,884 A | 10/2000 | Micali |
| 6,138,107 A | 10/2000 | Elgamal |
| 6,138,119 A | 10/2000 | Hall et al. |
| 6,141,423 A | 10/2000 | Fischer |
| 6,141,750 A | 10/2000 | Micali |
| 6,141,755 A | 10/2000 | Dowd et al. |
| 6,141,758 A | 10/2000 | Benantar et al. |
| 6,144,336 A | 11/2000 | Preston et al. |
| 6,144,737 A | 11/2000 | Maruyama et al. |
| 6,144,964 A | 11/2000 | Breese et al. |
| 6,145,079 A | 11/2000 | Mitty et al. |
| 6,146,026 A | 11/2000 | Ushiku |
| 6,147,598 A | 11/2000 | Murphy et al. |
| 6,147,975 A | 11/2000 | Bowman-Amuah |
| 6,148,065 A | 11/2000 | Katz |
| 6,148,338 A | 11/2000 | Lachelt et al. |
| 6,148,342 A | 11/2000 | Ho |
| 6,149,440 A | 11/2000 | Clark et al. |
| 6,151,309 A | 11/2000 | Busuioc et al. |
| 6,151,387 A | 11/2000 | Katz |
| 6,151,395 A | 11/2000 | Harkins |
| 6,151,424 A | 11/2000 | Hsu |
| 6,151,589 A | 11/2000 | Aggarwal et al. |
| 6,154,528 A | 11/2000 | Bennett, III et al. |
| 6,154,535 A | 11/2000 | Velamuri et al. |
| RE37,001 E | 12/2000 | Morganstein et al. |
| 6,155,725 A | 12/2000 | Scepanovic et al. |
| 6,157,655 A | 12/2000 | Shtivelman |
| 6,157,711 A | 12/2000 | Katz |

(56) References Cited

U.S. PATENT DOCUMENTS

| | | |
|---|---|---|
| 6,157,721 A | 12/2000 | Shear et al. |
| 6,157,914 A | 12/2000 | Seto et al. |
| 6,158,010 A | 12/2000 | Moriconi et al. |
| 6,161,099 A | 12/2000 | Harrington et al. |
| 6,161,139 A | 12/2000 | Win et al. |
| 6,161,181 A | 12/2000 | Haynes, III et al. |
| 6,163,607 A | 12/2000 | Bogart et al. |
| 6,163,701 A | 12/2000 | Saleh et al. |
| 6,167,386 A | 12/2000 | Brown |
| 6,169,476 B1 | 1/2001 | Flanagan |
| 6,169,789 B1 | 1/2001 | Rao et al. |
| 6,169,802 B1 | 1/2001 | Lerner et al. |
| 6,170,011 B1 | 1/2001 | Macleod Beck et al. |
| 6,170,742 B1 | 1/2001 | Yacoob |
| 6,173,052 B1 | 1/2001 | Brady |
| 6,173,053 B1 | 1/2001 | Bogart et al. |
| 6,173,159 B1 | 1/2001 | Wright et al. |
| 6,174,262 B1 | 1/2001 | Ohta et al. |
| 6,174,671 B1 | 1/2001 | Anantharaman et al. |
| 6,175,563 B1 | 1/2001 | Miloslavsky |
| 6,175,564 B1 | 1/2001 | Miloslavsky et al. |
| 6,175,626 B1 | 1/2001 | Aucsmith et al. |
| 6,175,803 B1 | 1/2001 | Chowanic et al. |
| 6,175,831 B1 | 1/2001 | Weinreich et al. |
| 6,177,932 B1 | 1/2001 | Galdes et al. |
| 6,178,141 B1 | 1/2001 | Duckworth et al. |
| 6,178,240 B1 | 1/2001 | Walker et al. |
| 6,178,377 B1 | 1/2001 | Ishihara et al. |
| 6,182,000 B1 | 1/2001 | Ohta et al. |
| 6,182,076 B1 | 1/2001 | Yu et al. |
| 6,182,133 B1 | 1/2001 | Horvitz |
| 6,185,283 B1 | 2/2001 | Fuller et al. |
| 6,185,292 B1 | 2/2001 | Miloslavsky |
| 6,185,320 B1 | 2/2001 | Bick et al. |
| 6,185,683 B1 | 2/2001 | Ginter et al. |
| 6,188,965 B1 | 2/2001 | Mayo et al. |
| 6,192,121 B1 | 2/2001 | Atkinson et al. |
| 6,192,314 B1 | 2/2001 | Khavakh et al. |
| 6,192,413 B1 | 2/2001 | Lee et al. |
| 6,192,472 B1 | 2/2001 | Garay et al. |
| 6,192,473 B1 | 2/2001 | Ryan, Jr. et al. |
| 6,192,476 B1 | 2/2001 | Gong |
| 6,199,001 B1 | 3/2001 | Ohta et al. |
| 6,199,050 B1 | 3/2001 | Alaia et al. |
| 6,200,255 B1 | 3/2001 | Yu |
| 6,201,493 B1 | 3/2001 | Silverman |
| 6,201,950 B1 | 3/2001 | Fuller et al. |
| 6,202,022 B1 | 3/2001 | Ando |
| 6,202,058 B1 | 3/2001 | Rose et al. |
| 6,205,207 B1 | 3/2001 | Scherer |
| 6,208,970 B1 | 3/2001 | Ramanan |
| 6,212,178 B1 | 4/2001 | Beck et al. |
| 6,212,669 B1 | 4/2001 | Jain |
| 6,220,986 B1 | 4/2001 | Aruga et al. |
| 6,221,592 B1 | 4/2001 | Schwartz et al. |
| 6,223,165 B1 | 4/2001 | Lauffer |
| 6,225,901 B1 | 5/2001 | Kail, IV |
| 6,226,287 B1 | 5/2001 | Brady |
| 6,226,289 B1 | 5/2001 | Williams et al. |
| 6,226,360 B1 | 5/2001 | Goldberg et al. |
| 6,226,618 B1 | 5/2001 | Downs et al. |
| 6,229,888 B1 | 5/2001 | Miloslavsky |
| 6,230,098 B1 | 5/2001 | Ando et al. |
| 6,230,146 B1 | 5/2001 | Alaia et al. |
| 6,230,197 B1 | 5/2001 | Beck et al. |
| 6,230,501 B1 | 5/2001 | Bailey, Sr. et al. |
| 6,233,332 B1 | 5/2001 | Anderson et al. |
| 6,233,520 B1 | 5/2001 | Ito et al. |
| 6,236,977 B1 | 5/2001 | Verba et al. |
| 6,236,978 B1 | 5/2001 | Tuzhilin |
| 6,236,980 B1 | 5/2001 | Reese |
| 6,240,411 B1 | 5/2001 | Thearling |
| 6,243,684 B1 | 6/2001 | Stuart et al. |
| 6,243,691 B1 | 6/2001 | Fisher et al. |
| 6,246,972 B1 | 6/2001 | Klimasauskas |
| 6,249,873 B1 | 6/2001 | Richard et al. |
| 6,252,544 B1 | 6/2001 | Hoffberg |
| 6,253,193 B1 | 6/2001 | Ginter et al. |
| 6,255,942 B1 | 7/2001 | Knudsen |
| 6,256,648 B1 | 7/2001 | Hill et al. |
| 6,260,024 B1 | 7/2001 | Shkedy |
| 6,263,334 B1 | 7/2001 | Fayyad et al. |
| 6,266,649 B1 | 7/2001 | Linden et al. |
| 6,266,652 B1 | 7/2001 | Godin et al. |
| 6,269,312 B1 | 7/2001 | Mayo et al. |
| 6,272,473 B1 | 8/2001 | Sandholm |
| 6,272,474 B1 | 8/2001 | Garcia |
| 6,272,483 B1 | 8/2001 | Joslin et al. |
| 6,272,544 B1 | 8/2001 | Mullen |
| 6,273,771 B1 | 8/2001 | Buckley et al. |
| 6,278,899 B1 | 8/2001 | Piche et al. |
| 6,285,867 B1 | 9/2001 | Boling et al. |
| 6,289,096 B1 | 9/2001 | Suzuki |
| 6,292,736 B1 | 9/2001 | Aruga et al. |
| 6,292,743 B1 | 9/2001 | Pu et al. |
| 6,292,787 B1 | 9/2001 | Scott et al. |
| 6,298,303 B1 | 10/2001 | Khavakh et al. |
| 6,298,304 B1 | 10/2001 | Theimer |
| 6,301,687 B1 | 10/2001 | Jain et al. |
| 6,304,758 B1 | 10/2001 | Iierbig et al. |
| 6,308,072 B1 | 10/2001 | Labedz et al. |
| 6,308,175 B1 | 10/2001 | Lang et al. |
| 6,314,420 B1 | 11/2001 | Lang et al. |
| 6,317,718 B1 | 11/2001 | Fano |
| 6,317,722 B1 | 11/2001 | Jacobi et al. |
| 6,317,731 B1 | 11/2001 | Luciano |
| 6,321,179 B1 | 11/2001 | Glance et al. |
| 6,321,212 B1 | 11/2001 | Lange |
| 6,321,221 B1 | 11/2001 | Bieganski |
| 6,324,519 B1 | 11/2001 | Eldering |
| 6,327,590 B1 | 12/2001 | Chidlovskii et al. |
| 6,330,483 B1 | 12/2001 | Dailey |
| 6,330,551 B1 | 12/2001 | Burchetta et al. |
| 6,331,986 B1 | 12/2001 | Mitra et al. |
| 6,333,979 B1 | 12/2001 | Bondi et al. |
| 6,333,980 B1 | 12/2001 | Hollatz et al. |
| 6,334,127 B1 | 12/2001 | Bieganski et al. |
| 6,334,131 B2 | 12/2001 | Chakrabarti et al. |
| 6,338,011 B1 | 1/2002 | Furst et al. |
| 6,340,567 B1 | 1/2002 | Schwartz et al. |
| 6,340,928 B1 | 1/2002 | McCurdy |
| 6,345,264 B1 | 2/2002 | Breese et al. |
| 6,347,139 B1 | 2/2002 | Fisher et al. |
| 6,347,366 B1 | 2/2002 | Cousins |
| 6,350,985 B1 | 2/2002 | Rodricks et al. |
| 6,353,679 B1 | 3/2002 | Cham et al. |
| 6,353,813 B1 | 3/2002 | Breese et al. |
| 6,356,632 B1 | 3/2002 | Foster et al. |
| 6,356,822 B1 | 3/2002 | Diaz et al. |
| 6,356,890 B1 | 3/2002 | Agrawal et al. |
| 6,356,891 B1 | 3/2002 | Agrawal et al. |
| 6,356,899 B1 | 3/2002 | Chakrabarti et al. |
| 6,359,571 B1 | 3/2002 | Endo et al. |
| 6,360,222 B1 | 3/2002 | Quinn |
| 6,366,666 B2 | 4/2002 | Bengtson et al. |
| 6,366,903 B1 | 4/2002 | Agrawal et al. |
| 6,366,907 B1 | 4/2002 | Fanning et al. |
| 6,374,227 B1 | 4/2002 | Ye |
| 6,377,809 B1 | 4/2002 | Rezaiifar et al. |
| 6,381,504 B1 | 4/2002 | Havener et al. |
| 6,384,739 B1 | 5/2002 | Roberts, Jr. |
| 6,385,245 B1 | 5/2002 | De Haan et al. |
| 6,389,372 B1 | 5/2002 | Glance et al. |
| 6,393,276 B1 | 5/2002 | Vanghi |
| 6,397,141 B1 | 5/2002 | Binnig |
| 6,398,245 B1 | 6/2002 | Gruse et al. |
| 6,400,996 B1 | 6/2002 | Hoffberg et al. |
| 6,401,027 B1 | 6/2002 | Xu et al. |
| 6,404,920 B1 | 6/2002 | Hsu |
| 6,405,922 B1 | 6/2002 | Kroll |
| 6,408,064 B1 | 6/2002 | Fedorov et al. |
| 6,408,066 B1 | 6/2002 | Andruska et al. |
| 6,411,221 B2 | 6/2002 | Horber |
| 6,411,675 B1 | 6/2002 | Llacer |

(56) References Cited

U.S. PATENT DOCUMENTS

| | | |
|---|---|---|
| 6,411,708 B1 | 6/2002 | Khan |
| 6,411,889 B1 | 6/2002 | Mizunuma et al. |
| 6,412,012 B1 | 6/2002 | Bieganski et al. |
| 6,415,151 B1 | 7/2002 | Kreppel |
| 6,415,248 B1 | 7/2002 | Bangalore et al. |
| 6,418,367 B1 | 7/2002 | Toukura et al. |
| 6,418,424 B1 | 7/2002 | Hoffberg et al. |
| 6,421,709 B1 | 7/2002 | McCormick et al. |
| 6,429,812 B1 | 8/2002 | Hoffberg |
| 6,430,537 B1 | 8/2002 | Tedesco et al. |
| 6,430,558 B1 | 8/2002 | Delano |
| 6,436,005 B1 | 8/2002 | Bellinger |
| 6,438,694 B2 | 8/2002 | Saito |
| 6,442,473 B1 | 8/2002 | Berstis et al. |
| 6,443,841 B1 | 9/2002 | Rossides |
| 6,445,308 B1 | 9/2002 | Koike |
| 6,446,035 B1 | 9/2002 | Grefenstette et al. |
| 6,449,367 B2 | 9/2002 | Van Wie et al. |
| 6,449,535 B1 | 9/2002 | Obradovich et al. |
| 6,449,612 B1 | 9/2002 | Bradley et al. |
| 6,452,565 B1 | 9/2002 | Kingsley et al. |
| 6,453,038 B1 | 9/2002 | McFarlane et al. |
| 6,459,784 B1 | 10/2002 | Humphrey et al. |
| 6,459,788 B1 | 10/2002 | Khuc et al. |
| 6,459,881 B1 | 10/2002 | Hoder et al. |
| 6,463,299 B1 | 10/2002 | Macor |
| 6,466,654 B1 | 10/2002 | Cooper et al. |
| 6,466,909 B1 | 10/2002 | Didcock |
| 6,466,970 B1 | 10/2002 | Lee et al. |
| 6,466,977 B1 | 10/2002 | Sitaraman et al. |
| 6,470,077 B1 | 10/2002 | Chan |
| 6,470,261 B1 | 10/2002 | Ng et al. |
| 6,470,265 B1 | 10/2002 | Tanaka |
| 6,473,688 B2 | 10/2002 | Kohno et al. |
| 6,477,245 B1 | 11/2002 | Vet et al. |
| 6,477,246 B1 | 11/2002 | Dolan et al. |
| 6,477,494 B2 | 11/2002 | Hyde-Thomson et al. |
| 6,480,587 B1 | 11/2002 | Rao et al. |
| 6,480,844 B1 | 11/2002 | Cortes et al. |
| 6,484,088 B1 | 11/2002 | Reimer |
| 6,484,123 B2 | 11/2002 | Srivastava |
| 6,487,289 B1 | 11/2002 | Phan et al. |
| 6,487,497 B2 | 11/2002 | Khavakh et al. |
| 6,487,533 B2 | 11/2002 | Hyde-Thomson et al. |
| 6,487,541 B1 | 11/2002 | Aggarwal et al. |
| 6,493,432 B1 | 12/2002 | Blum et al. |
| 6,493,658 B1 | 12/2002 | Koford et al. |
| 6,493,682 B1 | 12/2002 | Horrigan et al. |
| 6,493,696 B1 | 12/2002 | Chazin |
| 6,496,568 B1 | 12/2002 | Nelson |
| 6,497,169 B1 | 12/2002 | Khosla |
| 6,499,018 B1 | 12/2002 | Alaia et al. |
| 6,501,765 B1 | 12/2002 | Lu et al. |
| 6,503,170 B1 | 1/2003 | Tabata |
| 6,507,739 B1 | 1/2003 | Gross et al. |
| 6,510,220 B1 | 1/2003 | Beckett, II et al. |
| 6,510,221 B1 | 1/2003 | Fisher et al. |
| 6,513,029 B1 | 1/2003 | Agrawal et al. |
| 6,516,310 B2 | 2/2003 | Paulley |
| 6,519,259 B1 | 2/2003 | Baker et al. |
| 6,519,459 B1 | 2/2003 | Chavez, Jr. et al. |
| 6,519,564 B1 | 2/2003 | Hoffberg et al. |
| 6,522,726 B1 | 2/2003 | Hunt et al. |
| 6,522,946 B1 | 2/2003 | Weis |
| 6,529,870 B1 | 3/2003 | Mikkilineni |
| 6,529,891 B1 | 3/2003 | Heckerman |
| 6,530,537 B2 | 3/2003 | Hanlon |
| 6,536,935 B1 | 3/2003 | Parunak et al. |
| 6,542,742 B2 | 4/2003 | Schramm et al. |
| 6,546,378 B1 | 4/2003 | Cook |
| 6,549,782 B2 | 4/2003 | Roy |
| 6,553,113 B1 | 4/2003 | Dhir et al. |
| 6,553,114 B1 | 4/2003 | Fisher et al. |
| 6,556,951 B1 | 4/2003 | Deleo et al. |
| 6,560,360 B1 | 5/2003 | Neskovic et al. |
| 6,560,580 B1 | 5/2003 | Fraser et al. |
| 6,560,649 B1 | 5/2003 | Mullen et al. |
| 6,560,758 B1 | 5/2003 | Jain |
| 6,564,192 B1 | 5/2003 | Kinney, Jr. et al. |
| 6,571,277 B1 | 5/2003 | Daniels-Barnes et al. |
| 6,581,008 B2 | 6/2003 | Intriligator et al. |
| 6,587,837 B1 | 7/2003 | Spagna et al. |
| 6,587,946 B1 | 7/2003 | Jakobsson |
| 6,591,232 B1 | 7/2003 | Kassapoglou |
| 6,597,801 B1 | 7/2003 | Cham et al. |
| 6,601,036 B1 | 7/2003 | Walker et al. |
| 6,606,607 B1 | 8/2003 | Martin et al. |
| 6,607,888 B2 | 8/2003 | Schwartz et al. |
| 6,609,112 B1 | 8/2003 | Boarman et al. |
| 6,611,812 B2 | 8/2003 | Hurtado et al. |
| 6,618,490 B1 | 9/2003 | Cham et al. |
| 6,618,716 B1 | 9/2003 | Horvitz |
| 6,621,424 B1 | 9/2003 | Brand |
| 6,622,160 B1 | 9/2003 | Horvitz |
| 6,625,734 B1 | 9/2003 | Marvit et al. |
| 6,629,082 B1 | 9/2003 | Hambrecht et al. |
| 6,633,544 B1 | 10/2003 | Rexford et al. |
| 6,636,840 B1 | 10/2003 | Goray et al. |
| 6,639,898 B1 | 10/2003 | Dutta et al. |
| 6,639,982 B1 | 10/2003 | Stuart et al. |
| 6,640,145 B2 | 10/2003 | Hoffberg et al. |
| 6,641,050 B2 | 11/2003 | Kelley et al. |
| 6,646,572 B1 | 11/2003 | Brand |
| 6,647,373 B1 | 11/2003 | Carlton-Foss |
| 6,658,467 B1 | 12/2003 | Rice et al. |
| 6,661,379 B2 | 12/2003 | Ship et al. |
| 6,662,141 B2 | 12/2003 | Kaub |
| 6,665,705 B1 | 12/2003 | Daniels-Barnes et al. |
| 6,671,759 B1 | 12/2003 | Noda et al. |
| 6,678,245 B1 | 1/2004 | Cooper et al. |
| 6,678,611 B2 | 1/2004 | Khavakh et al. |
| 6,683,945 B1 | 1/2004 | Enzmann et al. |
| 6,684,250 B2 | 1/2004 | Anderson et al. |
| 6,687,822 B1 | 2/2004 | Jakobsson |
| 6,697,818 B2 | 2/2004 | Li et al. |
| 6,697,858 B1 | 2/2004 | Ezerzer et al. |
| 6,704,410 B1 | 3/2004 | McFarlane et al. |
| 6,704,713 B1 | 3/2004 | Brett |
| 6,708,120 B1 | 3/2004 | Mayo et al. |
| 6,712,701 B1 | 3/2004 | Boylan, III et al. |
| 6,714,967 B1 | 3/2004 | Horvitz |
| 6,718,312 B1 | 4/2004 | McAfee et al. |
| 6,721,337 B1 | 4/2004 | Kroeger et al. |
| 6,731,605 B1 | 5/2004 | Deshpande |
| 6,733,929 B2 | 5/2004 | Pierrat |
| 6,744,879 B1 | 6/2004 | Dezonno |
| 6,745,172 B1 | 6/2004 | Mancisidor et al. |
| 6,751,536 B1 | 6/2004 | Kipersztok et al. |
| 6,754,169 B2 | 6/2004 | Baum et al. |
| 6,766,307 B1 | 7/2004 | Israel et al. |
| 6,771,765 B1 | 8/2004 | Crowther et al. |
| 6,772,124 B2 | 8/2004 | Hoffberg et al. |
| 6,779,111 B1 | 8/2004 | Gehrmann et al. |
| 6,782,391 B1 | 8/2004 | Scher |
| 6,782,515 B2 | 8/2004 | Scott et al. |
| 6,785,606 B2 | 8/2004 | DeKock et al. |
| 6,785,671 B1 | 8/2004 | Bailey et al. |
| 6,791,091 B2 | 9/2004 | Rodricks et al. |
| 6,791,472 B1 | 9/2004 | Hoffberg |
| 6,792,356 B2 | 9/2004 | Mayo et al. |
| 6,792,399 B1 | 9/2004 | Phillips et al. |
| 6,795,567 B1 | 9/2004 | Cham et al. |
| 6,798,876 B1 | 9/2004 | Bala |
| 6,799,165 B1 | 9/2004 | Boesjes |
| 6,801,819 B1 | 10/2004 | Barto et al. |
| 6,801,861 B2 | 10/2004 | Mayo et al. |
| 6,804,611 B1 | 10/2004 | Mayo et al. |
| 6,807,155 B1 | 10/2004 | Subramanian |
| 6,816,585 B1 | 11/2004 | Blatt et al. |
| 6,822,945 B2 | 11/2004 | Petrovykh |
| 6,823,315 B1 | 11/2004 | Bucci et al. |
| 6,826,549 B1 | 11/2004 | Marks et al. |
| 6,834,109 B1 | 12/2004 | Pare, Jr. et al. |
| 6,834,110 B1 | 12/2004 | Marconcini et al. |

(56) References Cited

U.S. PATENT DOCUMENTS

| | | |
|---|---|---|
| 6,834,272 B1 | 12/2004 | Naor et al. |
| 6,834,811 B1 | 12/2004 | Huberman et al. |
| 6,842,463 B1 | 1/2005 | Drwiega et al. |
| 6,842,515 B2 | 1/2005 | Mengshoel et al. |
| 6,847,939 B1 | 1/2005 | Shemesh |
| 6,850,252 B1 | 2/2005 | Hoffberg |
| 6,850,502 B1 | 2/2005 | Kagan et al. |
| 6,850,965 B2 | 2/2005 | Allen |
| 6,859,207 B2 | 2/2005 | Nougaret et al. |
| 6,859,533 B1 | 2/2005 | Wang et al. |
| 6,865,559 B2 | 3/2005 | Dutta |
| 6,865,825 B2 | 3/2005 | Bailey, Sr. et al. |
| 6,873,610 B1 | 3/2005 | Noever |
| 6,876,309 B1 | 4/2005 | Lawrence |
| 6,879,926 B2 | 4/2005 | Schmit et al. |
| 6,898,205 B1 | 5/2005 | Chaskar et al. |
| 6,898,531 B1 | 5/2005 | Sheehan et al. |
| 6,904,328 B2 | 6/2005 | Rietman et al. |
| 6,904,329 B1 | 6/2005 | Barto et al. |
| 6,904,421 B2 | 6/2005 | Shetty |
| 6,917,932 B2 | 7/2005 | Chang et al. |
| 6,926,796 B1 | 8/2005 | Nishida et al. |
| 6,934,249 B1 | 8/2005 | Bertin et al. |
| 6,937,726 B1 | 8/2005 | Wang |
| 6,938,024 B1 | 8/2005 | Horvitz |
| 6,944,606 B2 | 9/2005 | Schmit et al. |
| 6,950,711 B2 | 9/2005 | Havener et al. |
| 6,950,754 B2 | 9/2005 | Mayo et al. |
| 6,953,024 B2 | 10/2005 | Linna et al. |
| 6,954,731 B1 | 10/2005 | Montague |
| 6,954,931 B2 | 10/2005 | Shetty et al. |
| 6,956,835 B2 | 10/2005 | Tong et al. |
| 6,959,288 B1 | 10/2005 | Medina et al. |
| 6,959,388 B1 | 10/2005 | Bleumer |
| 6,965,800 B2 | 11/2005 | Schmit et al. |
| 6,968,318 B1 | 11/2005 | Ferstenberg et al. |
| 6,968,323 B1 | 11/2005 | Bansal et al. |
| 6,974,412 B2 | 12/2005 | Dobrovolny |
| 6,978,126 B1 | 12/2005 | Blaker et al. |
| 6,985,881 B2 | 1/2006 | Johnson et al. |
| 6,987,442 B1 | 1/2006 | Pisarsky et al. |
| 6,993,075 B2 | 1/2006 | Kim et al. |
| 7,003,484 B2 | 2/2006 | Keyes et al. |
| 7,003,485 B1 | 2/2006 | Young |
| 7,006,881 B2 | 2/2006 | Hoffberg et al. |
| 7,016,870 B1 | 3/2006 | Jones et al. |
| 7,023,979 B1 | 4/2006 | Wu et al. |
| 7,028,005 B2 | 4/2006 | Messmer et al. |
| 7,031,936 B2 | 4/2006 | Johnson et al. |
| 7,035,937 B2 | 4/2006 | Haas et al. |
| 7,039,598 B2 | 5/2006 | Tobin et al. |
| 7,039,608 B2 | 5/2006 | Johnson et al. |
| 7,043,245 B2 | 5/2006 | Dokko |
| 7,047,242 B1 | 5/2006 | Ponte |
| 7,058,587 B1 | 6/2006 | Horne |
| 7,058,617 B1 | 6/2006 | Hartman et al. |
| 7,058,638 B2 | 6/2006 | Singh |
| 7,062,458 B2 | 6/2006 | Maggioncalda et al. |
| 7,062,461 B1 | 6/2006 | Ausubel |
| 7,069,308 B2 | 6/2006 | Abrams |
| 7,069,446 B2 | 6/2006 | Wiederin et al. |
| 7,072,815 B1 | 7/2006 | Chaudhary et al. |
| 7,075,892 B2 | 7/2006 | Grover et al. |
| 7,076,553 B2 | 7/2006 | Chan et al. |
| 7,079,529 B1 | 7/2006 | Khuc |
| 7,080,321 B2 | 7/2006 | Aleksander et al. |
| 7,082,411 B2 | 7/2006 | Johnson et al. |
| 7,083,879 B2 | 8/2006 | Pierrat et al. |
| 7,085,682 B1 | 8/2006 | Heller et al. |
| 7,092,821 B2 | 8/2006 | Mizrahi et al. |
| 7,096,197 B2 | 8/2006 | Messmer et al. |
| 7,099,839 B2 | 8/2006 | Madoff et al. |
| 7,103,562 B2 | 9/2006 | Kosiba et al. |
| 7,103,565 B1 | 9/2006 | Vaid |
| 7,103,580 B1 | 9/2006 | Batachia et al. |
| 7,103,806 B1 | 9/2006 | Horvitz |
| 7,107,706 B1 | 9/2006 | Bailey, Sr. et al. |
| 7,110,431 B2 | 9/2006 | Oates |
| 7,110,437 B2 | 9/2006 | Oates et al. |
| 7,110,440 B2 | 9/2006 | Oates et al. |
| 7,110,452 B2 | 9/2006 | Katsavounidis et al. |
| 7,110,525 B1 | 9/2006 | Heller et al. |
| 7,110,970 B2 | 9/2006 | Dingman et al. |
| 7,117,188 B2 | 10/2006 | Guyon et al. |
| 7,120,599 B2 | 10/2006 | Keyes |
| 7,120,865 B1 | 10/2006 | Horvitz et al. |
| 7,127,617 B2 | 10/2006 | Wiederin et al. |
| 7,130,579 B1 | 10/2006 | Rael et al. |
| 7,133,451 B2 | 11/2006 | Kim et al. |
| 7,133,841 B1 | 11/2006 | Wurman et al. |
| 7,136,448 B1 | 11/2006 | Venkataperumal et al. |
| 7,136,710 B1 | 11/2006 | Hoffberg et al. |
| 7,136,833 B1 | 11/2006 | Podsiadlo |
| 7,142,523 B1 | 11/2006 | Chekuri et al. |
| 7,162,035 B1 | 1/2007 | Durst et al. |
| 7,162,445 B2 | 1/2007 | Johnson et al. |
| 7,162,639 B1 | 1/2007 | Bleumer |
| 7,164,706 B2 | 1/2007 | Oates |
| 7,165,043 B2 | 1/2007 | Keyes et al. |
| 7,165,046 B2 | 1/2007 | Ausubel |
| 7,171,383 B2 | 1/2007 | Johnson et al. |
| 7,171,385 B1 | 1/2007 | Dembo et al. |
| 7,177,799 B2 | 2/2007 | Calcagno et al. |
| 7,177,832 B1 | 2/2007 | Semret et al. |
| 7,177,859 B2 | 2/2007 | Pather et al. |
| 7,181,017 B1 | 2/2007 | Nagel et al. |
| 7,184,777 B2 | 2/2007 | Diener et al. |
| 7,187,790 B2 | 3/2007 | Sabol et al. |
| 7,194,681 B1 | 3/2007 | Horvitz |
| 7,200,219 B1 | 4/2007 | Edwards et al. |
| 7,200,571 B1 | 4/2007 | Jenniges et al. |
| 7,203,221 B2 | 4/2007 | Oates |
| 7,204,041 B1 | 4/2007 | Bailey, Sr. et al. |
| 7,210,062 B2 | 4/2007 | Oates et al. |
| 7,210,624 B1 | 5/2007 | Birjandi et al. |
| 7,218,668 B2 | 5/2007 | Oates et al. |
| 7,219,449 B1 | 5/2007 | Hoffberg et al. |
| 7,234,126 B2 | 6/2007 | Catthoor et al. |
| 7,242,988 B1 | 7/2007 | Hoffberg et al. |
| 7,246,164 B2 | 7/2007 | Lehmann et al. |
| 7,248,623 B2 | 7/2007 | Oates |
| 7,249,027 B1 | 7/2007 | Ausubel |
| 7,249,069 B2 | 7/2007 | Alie et al. |
| 7,249,081 B2 | 7/2007 | Shearer et al. |
| 7,249,085 B1 | 7/2007 | Kinney, Jr. et al. |
| 7,251,589 B1 | 7/2007 | Crowe et al. |
| 7,263,538 B2 | 8/2007 | Hong |
| 7,268,700 B1 | 9/2007 | Hoffberg |
| 7,269,253 B1 | 9/2007 | Wu et al. |
| 7,271,737 B2 | 9/2007 | Hoffberg |
| 7,272,613 B2 | 9/2007 | Sim et al. |
| 7,274,787 B1 | 9/2007 | Schoeneberger |
| 7,275,162 B2 | 9/2007 | Wiederin et al. |
| 7,286,665 B1 | 10/2007 | Wang |
| 7,287,007 B1 | 10/2007 | Detering |
| 7,290,132 B2 | 10/2007 | Aboba et al. |
| 7,295,966 B2 | 11/2007 | Barklund et al. |
| 7,298,289 B1 | 11/2007 | Hoffberg |
| 7,313,550 B2 | 12/2007 | Kulkarni et al. |
| 7,318,051 B2 | 1/2008 | Weston et al. |
| 7,319,973 B1 | 1/2008 | Tobin et al. |
| 7,321,871 B2 | 1/2008 | Scott et al. |
| 7,327,780 B2 | 2/2008 | Oates et al. |
| 7,328,166 B1 | 2/2008 | Geoghegan et al. |
| 7,330,826 B1 | 2/2008 | Porat et al. |
| 7,334,044 B1 | 2/2008 | Allen |
| 7,337,031 B1 | 2/2008 | Birjandi et al. |
| 7,337,139 B1 | 2/2008 | Ausubel |
| 7,343,311 B2 | 3/2008 | Ganesan et al. |
| 7,343,342 B2 | 3/2008 | Ausubel |
| 7,343,360 B1 | 3/2008 | Ristanovic et al. |
| 7,349,827 B1 | 3/2008 | Heller et al. |
| 7,356,688 B1 | 4/2008 | Wang |
| 7,372,952 B1 | 5/2008 | Wu et al. |

(56) References Cited

U.S. PATENT DOCUMENTS

| | | |
|---|---|---|
| 7,373,310 B1 | 5/2008 | Homsi |
| 7,376,175 B2 | 5/2008 | Oates et al. |
| 7,395,614 B1 | 7/2008 | Bailey, Sr. et al. |
| 7,412,519 B2 | 8/2008 | Wang |
| 7,412,605 B2 | 8/2008 | Raley et al. |
| 7,415,432 B1 | 8/2008 | Gianakouros et al. |
| 7,415,436 B1 | 8/2008 | Evelyn et al. |
| 7,421,741 B2 | 9/2008 | Phillips, II et al. |
| 7,424,617 B2 | 9/2008 | Boyd et al. |
| 7,444,269 B2 | 10/2008 | Drumheller |
| 7,451,005 B2 | 11/2008 | Hoffberg et al. |
| 7,453,922 B2 | 11/2008 | Oates et al. |
| 7,457,823 B2 | 11/2008 | Shraim et al. |
| 7,460,065 B2 | 12/2008 | Ogawa et al. |
| 7,464,057 B2 | 12/2008 | Cole et al. |
| 7,472,080 B2 | 12/2008 | Goel |
| 7,475,048 B2 | 1/2009 | Weston et al. |
| 7,475,054 B2 | 1/2009 | Hearing et al. |
| 7,487,123 B1 | 2/2009 | Keiser et al. |
| 7,490,085 B2 | 2/2009 | Walker et al. |
| 7,493,280 B2 | 2/2009 | Guler et al. |
| 7,500,104 B2 | 3/2009 | Goland |
| 7,509,671 B1 | 3/2009 | Bedell et al. |
| 7,516,089 B1 | 4/2009 | Walker et al. |
| 7,523,072 B2 | 4/2009 | Stefik et al. |
| 7,523,085 B2 | 4/2009 | Nigam et al. |
| 7,526,442 B2 | 4/2009 | Edgar et al. |
| 7,555,542 B1 | 6/2009 | Ayers et al. |
| 7,558,759 B2 | 7/2009 | Valenzuela et al. |
| 7,559,070 B2 | 7/2009 | Nakamura et al. |
| 7,590,589 B2 | 9/2009 | Hoffberg |
| 7,596,552 B2 | 9/2009 | Levy et al. |
| 7,600,017 B2 | 10/2009 | Holtzman et al. |
| 7,603,304 B2 | 10/2009 | Asthana et al. |
| 7,603,319 B2 | 10/2009 | Raley et al. |
| 7,607,440 B2 | 10/2009 | Coste-Maniere et al. |
| 7,609,848 B2 | 10/2009 | Wang et al. |
| 7,617,163 B2 | 11/2009 | Ben-Hur et al. |
| 7,627,510 B2 | 12/2009 | Jain et al. |
| 7,640,166 B2 | 12/2009 | Wiederin et al. |
| 7,644,144 B1 | 1/2010 | Horvitz et al. |
| 7,650,319 B2 | 1/2010 | Hoffberg et al. |
| 7,660,783 B2 | 2/2010 | Reed |
| 7,664,708 B2 | 2/2010 | Stefik et al. |
| 7,676,034 B1 | 3/2010 | Wu et al. |
| 7,676,423 B2 | 3/2010 | Avery |
| 7,676,594 B2 | 3/2010 | Fukasawa et al. |
| 7,685,642 B2 | 3/2010 | Gilliam et al. |
| 7,693,939 B2 | 4/2010 | Wu et al. |
| 7,698,248 B2 | 4/2010 | Olson |
| 7,698,335 B1 | 4/2010 | Vronay |
| 7,707,118 B2 | 4/2010 | James |
| 7,711,808 B2 | 5/2010 | Parry |
| 7,716,532 B2 | 5/2010 | Horvitz |
| 7,720,767 B2 | 5/2010 | Ta et al. |
| 7,724,896 B2 | 5/2010 | Nimour et al. |
| 7,725,401 B2 | 5/2010 | Raley et al. |
| 7,725,414 B2 | 5/2010 | Nigam et al. |
| 7,729,975 B2 | 6/2010 | Ausubel et al. |
| 7,730,120 B2 | 6/2010 | Singh et al. |
| 7,739,335 B2 | 6/2010 | Siegel et al. |
| 7,742,972 B2 | 6/2010 | Lange et al. |
| 7,743,163 B2 | 6/2010 | Ruppert |
| 7,751,423 B2 | 7/2010 | Hottinen et al. |
| 7,752,064 B2 | 7/2010 | Kauffman |
| 7,773,749 B1 | 8/2010 | Durst et al. |
| 7,774,257 B2 | 8/2010 | Maggioncalda et al. |
| 7,774,264 B1 | 8/2010 | Ausubel |
| 7,778,856 B2 | 8/2010 | Reynolds et al. |
| 7,788,155 B2 | 8/2010 | Jones et al. |
| 7,788,205 B2 | 8/2010 | Chalasani et al. |
| 7,797,732 B2 | 9/2010 | Tam et al. |
| 7,801,802 B2 | 9/2010 | Walker et al. |
| 7,808,922 B2 | 10/2010 | Dekorsy |
| 7,813,527 B2 | 10/2010 | Wang |
| 7,813,822 B1 | 10/2010 | Hoffberg |
| 7,813,989 B2 | 10/2010 | Jones et al. |
| 7,817,796 B1 | 10/2010 | Clippinger et al. |
| 7,822,658 B2 | 10/2010 | Casati et al. |
| 7,822,742 B2 | 10/2010 | Majumder et al. |
| 7,827,128 B1 | 11/2010 | Karlsson et al. |
| 7,831,392 B2 | 11/2010 | Antoniotti et al. |
| 7,840,341 B1 | 11/2010 | Sato et al. |
| 7,843,822 B1 | 11/2010 | Paul et al. |
| 7,844,535 B2 | 11/2010 | Guler et al. |
| 7,844,666 B2 | 11/2010 | Horvitz et al. |
| 7,869,591 B1 | 1/2011 | Nagel et al. |
| 7,870,240 B1 | 1/2011 | Horvitz |
| 7,877,304 B1 | 1/2011 | Coulter |
| 7,890,581 B2 | 2/2011 | Rao et al. |
| 7,894,595 B1 | 2/2011 | Wu et al. |
| 7,904,187 B2 | 3/2011 | Hoffberg et al. |
| 7,916,858 B1 | 3/2011 | Heller et al. |
| 7,933,829 B2 | 4/2011 | Goldberg et al. |
| 7,945,464 B2 | 5/2011 | El Homsi |
| 7,947,936 B1 | 5/2011 | Bobinchak et al. |
| 7,949,121 B1 | 5/2011 | Flockhart et al. |
| 7,962,346 B2 | 6/2011 | Tings |
| 7,966,078 B2 | 6/2011 | Hoffberg et al. |
| 7,974,714 B2 | 7/2011 | Hoffberg |
| 7,987,003 B2 | 7/2011 | Hoffberg et al. |
| 8,000,679 B2 | 8/2011 | Hutcheson et al. |
| 8,015,073 B2 | 9/2011 | Ilechko et al. |
| 8,024,415 B2 | 9/2011 | Horvitz et al. |
| 8,031,060 B2 | 10/2011 | Hoffberg et al. |
| 8,032,477 B1 | 10/2011 | Hoffberg et al. |
| 8,046,313 B2 | 10/2011 | Hoffberg et al. |
| 8,054,965 B1 | 11/2011 | Wu et al. |
| 8,073,731 B1 | 12/2011 | Rajasenan |
| 8,144,619 B2 | 3/2012 | Hoffberg |
| 8,165,916 B2 | 4/2012 | Hoffberg et al. |
| 8,225,458 B1 | 7/2012 | Hoffberg |
| 8,233,918 B2 | 7/2012 | Roin et al. |
| 8,270,603 B1 | 9/2012 | Durst et al. |
| 8,300,798 B1 | 10/2012 | Wu et al. |
| 8,316,237 B1 | 11/2012 | Felsher et al. |
| 8,352,400 B2 | 1/2013 | Hoffberg et al. |
| 8,364,136 B2 | 1/2013 | Hoffberg et al. |
| 8,369,967 B2 | 2/2013 | Hoffberg et al. |
| 8,373,582 B2 | 2/2013 | Hoffberg |
| 8,402,490 B2 | 3/2013 | Hoffberg-Borghesani et al. |
| 8,411,842 B1 | 4/2013 | Wu et al. |
| 8,516,266 B2 | 8/2013 | Hoffberg et al. |
| 8,522,192 B1 | 8/2013 | Avalos et al. |
| 8,566,247 B1 | 10/2013 | Nagel et al. |
| 8,582,753 B1 | 11/2013 | Heller et al. |
| 8,583,263 B2 | 11/2013 | Hoffberg et al. |
| 8,600,830 B2 | 12/2013 | Hoffberg |
| 8,629,789 B2 | 1/2014 | Hoffberg |
| 8,682,726 B2 | 3/2014 | Hoffberg |
| 8,831,205 B1 | 9/2014 | Wu et al. |
| 8,874,477 B2 | 10/2014 | Hoffberg |
| 8,892,495 B2 | 11/2014 | Hoffberg et al. |
| 8,904,181 B1 | 12/2014 | Felsher et al. |
| 8,971,519 B1 | 3/2015 | Hoffberg |
| 9,002,857 B2 | 4/2015 | Robinson et al. |
| 9,045,927 B1 | 6/2015 | Hoffberg |
| 9,053,562 B1 | 6/2015 | Rabin et al. |
| 9,121,217 B1 | 9/2015 | Hoffberg |
| 9,132,352 B1 | 9/2015 | Rabin et al. |
| RE45,775 E | 10/2015 | Agee et al. |
| 9,151,633 B2 | 10/2015 | Hoffberg |
| 9,215,322 B1 | 12/2015 | Wu et al. |
| 9,239,951 B2 | 1/2016 | Hoffberg et al. |
| 9,311,670 B2 | 4/2016 | Hoffberg |
| 9,419,951 B1 | 8/2016 | Felsher et al. |
| 9,456,086 B1 | 9/2016 | Wu et al. |
| 9,535,563 B2 | 1/2017 | Hoffberg et al. |
| 9,551,582 B2 | 1/2017 | Hoffberg |
| RE46,310 E | 2/2017 | Hoffberg et al. |
| 9,615,264 B2 | 4/2017 | Hoffberg |
| 9,635,177 B1 | 4/2017 | Hoffberg |
| 9,727,042 B2 | 8/2017 | Hoffberg-Borghesani et al. |
| 9,736,308 B1 | 8/2017 | Wu et al. |

(56) References Cited

U.S. PATENT DOCUMENTS

| | | |
|---|---|---|
| 9,794,797 B2 | 10/2017 | Hoffberg |
| 9,795,882 B1 | 10/2017 | Rabin et al. |
| 9,807,239 B1 | 10/2017 | Wu et al. |
| 9,818,136 B1 | 11/2017 | Hoffberg |
| 9,860,391 B1 | 1/2018 | Wu et al. |
| 9,995,076 B1 | 6/2018 | Hoffberg |
| 2001/0000458 A1 | 4/2001 | Shtivelman et al. |
| 2001/0008013 A1 | 7/2001 | Johnson et al. |
| 2001/0011228 A1 | 8/2001 | Shenkman |
| 2001/0013021 A1 | 8/2001 | Saito |
| 2001/0014143 A1 | 8/2001 | Kuhn |
| 2001/0024497 A1 | 9/2001 | Campbell et al. |
| 2001/0027431 A1 | 10/2001 | Rupp et al. |
| 2001/0032164 A1 | 10/2001 | Kim |
| 2001/0034578 A1 | 10/2001 | Ugajin |
| 2001/0036169 A1* | 11/2001 | Ratzel ............... H04L 1/18 370/349 |
| 2001/0039528 A1 | 11/2001 | Atkinson et al. |
| 2001/0042785 A1 | 11/2001 | Walker et al. |
| 2001/0043586 A1 | 11/2001 | Miloslavsky |
| 2001/0047291 A1 | 11/2001 | Garahi et al. |
| 2001/0049650 A1 | 12/2001 | Moshal et al. |
| 2001/0051540 A1 | 12/2001 | Hindman et al. |
| 2001/0056367 A1 | 12/2001 | Herbert et al. |
| 2002/0002521 A1 | 1/2002 | Shearer et al. |
| 2002/0006191 A1 | 1/2002 | Weiss |
| 2002/0009190 A1 | 1/2002 | McIllwaine et al. |
| 2002/0010663 A1 | 1/2002 | Muller |
| 2002/0010669 A1 | 1/2002 | Street |
| 2002/0010673 A1 | 1/2002 | Muller et al. |
| 2002/0013631 A1 | 1/2002 | Van Dyke et al. |
| 2002/0013757 A1 | 1/2002 | Bykowsky et al. |
| 2002/0019846 A1 | 2/2002 | Miloslavsky et al. |
| 2002/0021693 A1 | 2/2002 | Bruno et al. |
| 2002/0023215 A1 | 2/2002 | Wang et al. |
| 2002/0035534 A1 | 3/2002 | Buist et al. |
| 2002/0040310 A1 | 4/2002 | Lieben et al. |
| 2002/0042274 A1 | 4/2002 | Ades |
| 2002/0042769 A1 | 4/2002 | Gujral et al. |
| 2002/0046030 A1 | 4/2002 | Haritsa et al. |
| 2002/0046200 A1 | 4/2002 | Floven et al. |
| 2002/0046202 A1 | 4/2002 | Honda |
| 2002/0047859 A1 | 4/2002 | Szlam et al. |
| 2002/0052816 A1 | 5/2002 | Clenaghan et al. |
| 2002/0052819 A1 | 5/2002 | Burton |
| 2002/0052873 A1 | 5/2002 | Delgado et al. |
| 2002/0055899 A1 | 5/2002 | Williams |
| 2002/0059379 A1 | 5/2002 | Harvey et al. |
| 2002/0073018 A1 | 6/2002 | Mulinder et al. |
| 2002/0073049 A1 | 6/2002 | Dutta |
| 2002/0077954 A1 | 6/2002 | Slaight et al. |
| 2002/0094081 A1 | 7/2002 | Medvinsky |
| 2002/0095327 A1 | 7/2002 | Zumel et al. |
| 2002/0111811 A1 | 8/2002 | Bares et al. |
| 2002/0114278 A1 | 8/2002 | Coussement |
| 2002/0116239 A1 | 8/2002 | Reinsma et al. |
| 2002/0123954 A1 | 9/2002 | Hito |
| 2002/0131399 A1 | 9/2002 | Philonenko |
| 2002/0138386 A1 | 9/2002 | Maggioncalda et al. |
| 2002/0161671 A1 | 10/2002 | Matsui et al. |
| 2002/0165756 A1 | 11/2002 | Tobin et al. |
| 2002/0165814 A1 | 11/2002 | Lee et al. |
| 2002/0165817 A1 | 11/2002 | Rackson et al. |
| 2002/0174052 A1 | 11/2002 | Guler et al. |
| 2002/0183066 A1 | 12/2002 | Pankaj |
| 2002/0194256 A1 | 12/2002 | Needham et al. |
| 2002/0194334 A1 | 12/2002 | Focant et al. |
| 2003/0002646 A1 | 1/2003 | Gutta et al. |
| 2003/0014293 A1 | 1/2003 | Shetty et al. |
| 2003/0014373 A1 | 1/2003 | Perge et al. |
| 2003/0018561 A1 | 1/2003 | Kitchen et al. |
| 2003/0023538 A1 | 1/2003 | Das et al. |
| 2003/0035468 A1 | 2/2003 | Corbaton et al. |
| 2003/0041002 A1 | 2/2003 | Hao et al. |
| 2003/0055787 A1 | 3/2003 | Fujii |
| 2003/0055898 A1 | 3/2003 | Yeager et al. |
| 2003/0065608 A1 | 4/2003 | Cutler |
| 2003/0078867 A1 | 4/2003 | Scott et al. |
| 2003/0087652 A1 | 5/2003 | Simon et al. |
| 2003/0088488 A1 | 5/2003 | Solomon et al. |
| 2003/0097325 A1 | 5/2003 | Frtesen et al. |
| 2003/0101124 A1 | 5/2003 | Semret et al. |
| 2003/0101274 A1 | 5/2003 | Yi et al. |
| 2003/0115088 A1 | 6/2003 | Thompson |
| 2003/0115114 A1 | 6/2003 | Tateishi et al. |
| 2003/0115251 A1 | 6/2003 | Fredrickson et al. |
| 2003/0119558 A1 | 6/2003 | Steadman et al. |
| 2003/0120809 A1 | 6/2003 | Bellur et al. |
| 2003/0135437 A1 | 7/2003 | Jacobsen |
| 2003/0139995 A1 | 7/2003 | Farley |
| 2003/0152086 A1 | 8/2003 | El Batt |
| 2003/0172018 A1 | 9/2003 | Chen et al. |
| 2003/0182224 A1 | 9/2003 | Horrigan et al. |
| 2003/0191632 A1 | 10/2003 | Sumner et al. |
| 2003/0195780 A1 | 10/2003 | Arora et al. |
| 2003/0217106 A1 | 11/2003 | Adar et al. |
| 2003/0233307 A1 | 12/2003 | Salvador et al. |
| 2004/0006528 A1 | 1/2004 | Kevin Fung |
| 2004/0006529 A1 | 1/2004 | Fung |
| 2004/0006534 A1 | 1/2004 | Fung |
| 2004/0024684 A1 | 2/2004 | Montepeque |
| 2004/0024687 A1 | 2/2004 | Delenda |
| 2004/0028018 A1 | 2/2004 | Cain |
| 2004/0039670 A1 | 2/2004 | Fung |
| 2004/0039685 A1 | 2/2004 | Hambrecht et al. |
| 2004/0049479 A1 | 3/2004 | Dome et al. |
| 2004/0054551 A1 | 3/2004 | Ausubel et al. |
| 2004/0054610 A1 | 3/2004 | Amstutz et al. |
| 2004/0054617 A1 | 3/2004 | Fung |
| 2004/0059665 A1 | 3/2004 | Suri et al. |
| 2004/0068416 A1 | 4/2004 | Solomon |
| 2004/0068447 A1 | 4/2004 | Mao et al. |
| 2004/0073642 A1 | 4/2004 | Iyer |
| 2004/0077320 A1 | 4/2004 | Jackson et al. |
| 2004/0081183 A1 | 4/2004 | Monza et al. |
| 2004/0083195 A1 | 4/2004 | McCord et al. |
| 2004/0093278 A1 | 5/2004 | Burchetta et al. |
| 2004/0095907 A1 | 5/2004 | Agee et al. |
| 2004/0101127 A1 | 5/2004 | Dezonno et al. |
| 2004/0103013 A1 | 5/2004 | Jameson |
| 2004/0111308 A1 | 6/2004 | Yakov |
| 2004/0111310 A1 | 6/2004 | Szlam et al. |
| 2004/0117302 A1 | 6/2004 | Weichert et al. |
| 2004/0132405 A1 | 7/2004 | Kitazawa et al. |
| 2004/0138958 A1 | 7/2004 | Watarai et al. |
| 2004/0141508 A1 | 7/2004 | Schoeneberger et al. |
| 2004/0153375 A1 | 8/2004 | Mukunya et al. |
| 2004/0165717 A1 | 8/2004 | McIlwaine et al. |
| 2004/0184478 A1 | 9/2004 | Donescu et al. |
| 2004/0213400 A1 | 10/2004 | Golitsin et al. |
| 2004/0215793 A1 | 10/2004 | Ryan et al. |
| 2004/0242275 A1 | 12/2004 | Corbett et al. |
| 2004/0249650 A1 | 12/2004 | Freedman et al. |
| 2004/0259558 A1 | 12/2004 | Skafidas et al. |
| 2004/0260645 A1 | 12/2004 | Yakos |
| 2004/0264677 A1 | 12/2004 | Horvitz et al. |
| 2004/0266505 A1 | 12/2004 | Keam et al. |
| 2005/0044032 A1 | 2/2005 | Lee et al. |
| 2005/0065808 A1 | 3/2005 | Faltings |
| 2005/0065837 A1 | 3/2005 | Kosiba et al. |
| 2005/0080710 A1 | 4/2005 | Malato et al. |
| 2005/0102221 A1 | 5/2005 | Sulkowski et al. |
| 2005/0129217 A1 | 6/2005 | McPartlan et al. |
| 2005/0137939 A1 | 6/2005 | Calabria et al. |
| 2005/0144064 A1 | 6/2005 | Calabria et al. |
| 2005/0144065 A1 | 6/2005 | Calabria et al. |
| 2005/0164664 A1* | 7/2005 | DiFonzo ............... H04W 16/28 455/12.1 |
| 2005/0195960 A1 | 9/2005 | Shaffer et al. |
| 2005/0197857 A1 | 9/2005 | Avery |
| 2005/0198031 A1 | 9/2005 | Pezaris et al. |
| 2005/0246420 A1 | 11/2005 | Little |
| 2005/0251434 A1 | 11/2005 | Ouimet |
| 2005/0286426 A1 | 12/2005 | Padhye et al. |

(56) References Cited

U.S. PATENT DOCUMENTS

| | | |
|---|---|---|
| 2005/0289043 A1 | 12/2005 | Maudlin |
| 2006/0046658 A1 | 3/2006 | Cruz et al. |
| 2006/0062376 A1 | 3/2006 | Pickford |
| 2006/0148414 A1 | 7/2006 | Tee et al. |
| 2006/0153356 A1 | 7/2006 | Sisselman et al. |
| 2006/0167787 A1 | 7/2006 | Ausubel |
| 2006/0168119 A1 | 7/2006 | Inoue et al. |
| 2006/0168140 A1 | 7/2006 | Inoue et al. |
| 2006/0168147 A1 | 7/2006 | Inoue et al. |
| 2006/0222101 A1 | 10/2006 | Cetiner et al. |
| 2006/0259957 A1 | 11/2006 | Tam et al. |
| 2007/0038498 A1 | 2/2007 | Powell et al. |
| 2007/0054617 A1* | 3/2007 | Nikolajevic ........... H04B 7/086 455/63.4 |
| 2007/0064912 A1 | 3/2007 | Kagan et al. |
| 2007/0071222 A1 | 3/2007 | Flockhart et al. |
| 2007/0115995 A1 | 5/2007 | Kim et al. |
| 2007/0118463 A1 | 5/2007 | Avery |
| 2007/0118464 A1 | 5/2007 | Avery |
| 2007/0118465 A1 | 5/2007 | Avery |
| 2007/0174179 A1 | 7/2007 | Avery |
| 2007/0195048 A1 | 8/2007 | Nam et al. |
| 2007/0297328 A1 | 12/2007 | Semret et al. |
| 2008/0095121 A1 | 4/2008 | Shattil |
| 2008/0109343 A1 | 5/2008 | Robinson et al. |
| 2008/0139136 A1 | 6/2008 | Shtrom et al. |
| 2008/0162331 A1 | 7/2008 | Ephrati et al. |
| 2008/0162666 A1 | 7/2008 | Ebihara et al. |
| 2008/0205501 A1 | 8/2008 | Cioffi et al. |
| 2008/0207149 A1 | 8/2008 | Unkefer et al. |
| 2008/0227404 A1 | 9/2008 | Harel et al. |
| 2008/0232238 A1 | 9/2008 | Agee |
| 2008/0262893 A1 | 10/2008 | Hoffberg |
| 2008/0299923 A1 | 12/2008 | O'Brien et al. |
| 2009/0054018 A1 | 2/2009 | Waheed et al. |
| 2009/0170607 A1 | 7/2009 | Chiao et al. |
| 2009/0180392 A1 | 7/2009 | Greiner et al. |
| 2015/0081444 A1 | 3/2015 | Hoffberg |

FOREIGN PATENT DOCUMENTS

| | | |
|---|---|---|
| WO | WO9222870 | 12/1992 |
| WO | WO9301550 | 1/1993 |
| WO | WO9403859 | 2/1994 |
| WO | WO9406103 | 3/1994 |
| WO | WO9627155 | 9/1996 |
| WO | WO9634356 | 10/1996 |
| WO | WO9737315 | 10/1997 |
| WO | WO9743761 | 11/1997 |
| WO | WO9809144 | 3/1998 |
| WO | WO9809209 | 3/1998 |
| WO | WO9810381 | 3/1998 |
| WO | WO9837481 | 8/1998 |
| WO | WO9845768 | 10/1998 |
| WO | WO9901815 | 1/1999 |
| WO | WO9924928 | 5/1999 |
| WO | WO9927476 | 6/1999 |
| WO | WO9948296 | 9/1999 |
| WO | WO0077539 | 12/2000 |
| WO | WO2000077539 | 12/2000 |
| WO | WO0108063 | 2/2001 |
| WO | WO0108072 | 2/2001 |
| WO | WO0110076 | 2/2001 |
| WO | WO0154335 | 7/2001 |
| WO | WO0207031 | 1/2002 |
| WO | WO0291100 | 11/2002 |
| WO | WO02091100 | 11/2002 |
| WO | WO199419912 | 11/2002 |
| WO | WO2004018158 | 3/2004 |
| WO | WO2006039803 | 4/2006 |
| WO | WO2006047879 | 5/2006 |

OTHER PUBLICATIONS

Vuduc, Richard, James W. Demmel, and Jeff A. Bilmes. "Statistical models for empirical search-based performance tuning." The International Journal of High Performance Computing Applications 18, No. 1 (2004): 65-94.

Pearson, William R. "Empirical statistical estimates for sequence similarity searches." Journal of molecular biology 276, No. 1 (1998): 71-84.

Ma, Baojun, Nan Zhang, Guannan Liu, Liangqiang Li, and Hua Yuan. "Semantic search for public opinions on urban affairs: A probabilistic topic modeling-based approach." Information Processing & Management 52, No. 3 (2016): 430-445.

Steyvers, Mark, and Joshua B. Tenenbaum. "The large-scale structure of semantic networks: Statistical analyses and a model of semantic growth." Cognitive science 29, No. 1 (2005): 41-78.

Liu, Jing, Bin Wang, Mingjing Li, Zhiwei Li, Weiying Ma, Hanqing Lu, and Songde Ma. "Dual cross-media relevance model for image annotation." In Proceedings of the 15th ACM international conference on Multimedia, pp. 605-614. ACM, 2007.

Freitas, André, Joao Carlos Pereira da Silva, Edward Curry, and Paul Buitelaar. "A distributional semantics approach for selective reasoning on commonsense graph knowledge bases." In International Conference on Applications of Natural Language to Data Bases/Information Systems, pp. 21-32. Springer, Cham, 2014.

Freitas, Andre, and Edward Curry. "Natural language queries over heterogeneous linked data graphs: A distributional-compositional semantics approach." In Proceedings of the 19th international conference on Intelligent User Interfaces, pp. 279-288. ACM, 2014.

Kuhn, Adrian, Stéphane Ducasse, and Tudor Gîrba. "Semantic clustering: Identifying topics in source code." Information and Software Technology 49, No. 3 (2007): 230-243.

Magalhães, João Miguel Costa. "Statistical models for semantic-multimedia information retrieval." PhD diss., Department of Computing, Imperial College London, 2008.

Freitas, André, Joao Gabriel Oliveira, and Edward Curry. "A multidimensional semantic space for data model independent queries over RDF data." In 2011 IEEE Fifth International Conference on Semantic Computing, pp. 344-351. IEEE, 2011.

Frakes, W. "Introduction to information storage and retrieval systems." Space 14, No. 10 (1992).

Holzinger, Andreas, Regina Geierhofer, Felix Mödritscher, and Roland Tatzl. "Semantic Information in Medical Information Systems: Utilization of Text Mining Techniques to Analyze Medical Diagnoses." J. UCS 14, No. 22 (2008): 3781-3795.

Pilato, Giovanni, and Giorgio Vassallo. "TSVD as a statistical estimator in the latent semantic analysis paradigm." IEEE Transactions on Emerging Topics in Computing 3, No. 2 (2014): 185-192.

Saracevic, Tefko. "Relevance: A review of and a framework for the thinking on the notion in information science." Journal of the American Society for information science 26, No. 6 (1975): 321-343.

Wang, Haofen, Qiaoling Liu, Thomas Penin, Linyun Fu, Lei Zhang, Thanh Tran, Yong Yu, and Yue Pan. "Semplore: A scalable IR approach to search the Web of Data." Web Semantics: Science, Services and Agents on the World Wide Web 7, No. 3 (2009): 177-188.

Sidiropoulos, Antonis, and Yannis Manolopoulos. "A new perspective to automatically rank scientific conferences using digital libraries." Information processing & management 41, No. 2 (2005): 289-312.

A$_1$t-Sahalia, Yacine, and Andrew W. Lo. "Nonparametric risk management and implied risk aversion." Journal of econometrics 94, No. 1-2 (2000): 9-51.

Jacobs, Michael, and Nicholas M. Kiefer. The Bayesian approach to default risk: a guide. No. 10-01. CAE Working Paper, 2010.

Henriksen, Anne D., and Ann Jensen Traynor. "A practical R&D project-selection scoring tool." IEEE Transactions on Engineering Management 46, No. 2 (1999): 158-170.

Binkowitz, Bruce S., and Daniel Wartenberg. "Disparity in quantitative risk assessment: A review of input distributions." Risk Analysis 21, No. 1 (2001): 75-90.

(56) References Cited

OTHER PUBLICATIONS

Bogen, Kenneth T., Alison C. Cullen, H. Christopher Frey, and Paul S. Price. "Probabilistic exposure analysis for chemical risk characterization." Toxicological Sciences 109, No. 1 (2009): 4-17.

Solomon, Kenneth A., William E. Kastenberg, and Pamela F. Nelson. Dealing with uncertainty arising out of probabilistic risk assessment. No. RAND/R-3045-ORNL. RAND Corp Santa Monica CA, 1983.

Kienzler, Aude, Stephanie Bopp, Marlies Halder, Michelle Embry, and Andrew Worth. "Application of new statistical distribution approaches for environmental mixture risk assessment: A case study." Science of The Total Environment 693 (2019): 133510.

Bervas, Arnaud. "Market liquidity and its incorporation into risk management." Financial Stability Review 8, No. May (2006): 63-79.

Bhattacharjee, J. P. "Rapporteur's Report on Nature and Role of Risk and Uncertainty in Agriculture." Indian Journal of Agricultural Economics 19, No. 902-2016-68165 (1964): 158-167.

Eeckhoudt, Louis, and Harris Schlesinger. "Higher-order risk attitudes." In Handbook of Insurance, pp. 41-57. Springer, New York, NY, 2013.

Rodrigues, Matilde A., Pedro M. Arezes, and Celina P. Leão. "Defining risk acceptance criteria in occupational settings: A case study in the furniture industrial sector." Safety science 80 (2015): 288-295.

Mokhtar, Ainul Akmar, Mokhtar Che Ismail, and Masdi Muhammad. "Comparative study between degradation analysis and first order reliability method for assessing piping reliability for risk-based inspection." studies 4 (2009): 20.

Opdyke, J. D., and Alexander Cavallo. "Operational Risk Capital Estimation and Planning: Exact Sensitivity Analysis and Business Decision Making Using the Influence Function." Operational Risk: New Frontiers Explored, Risk Books, ed. E. Davis, London, Forthcoming (2012).

Rhomberg, Lorenz R. "Hypothesis-Based Weight of Evidence: An Approach to Hazard Identification and to Uncertainty Analysis for Quantitative Risk Assessment." (2007).

Aït-Sahalia, Yacine, and Andrew W. Lo. "Nonparametric risk management and implied." (2000).

Ferson, Scott, and Lev R. Ginzburg. "Different methods are needed to propagate ignorance and variability." Reliability Engineering & System Safety 54, No. 2-3 (1996): 133-144.

Goodwin, Barry K., and Olivier Mahul. Risk modeling concepts relating to the design and rating of agricultural insurance contracts. The World Bank, 2004.

* cited by examiner

HMM with mixture of Gaussians output

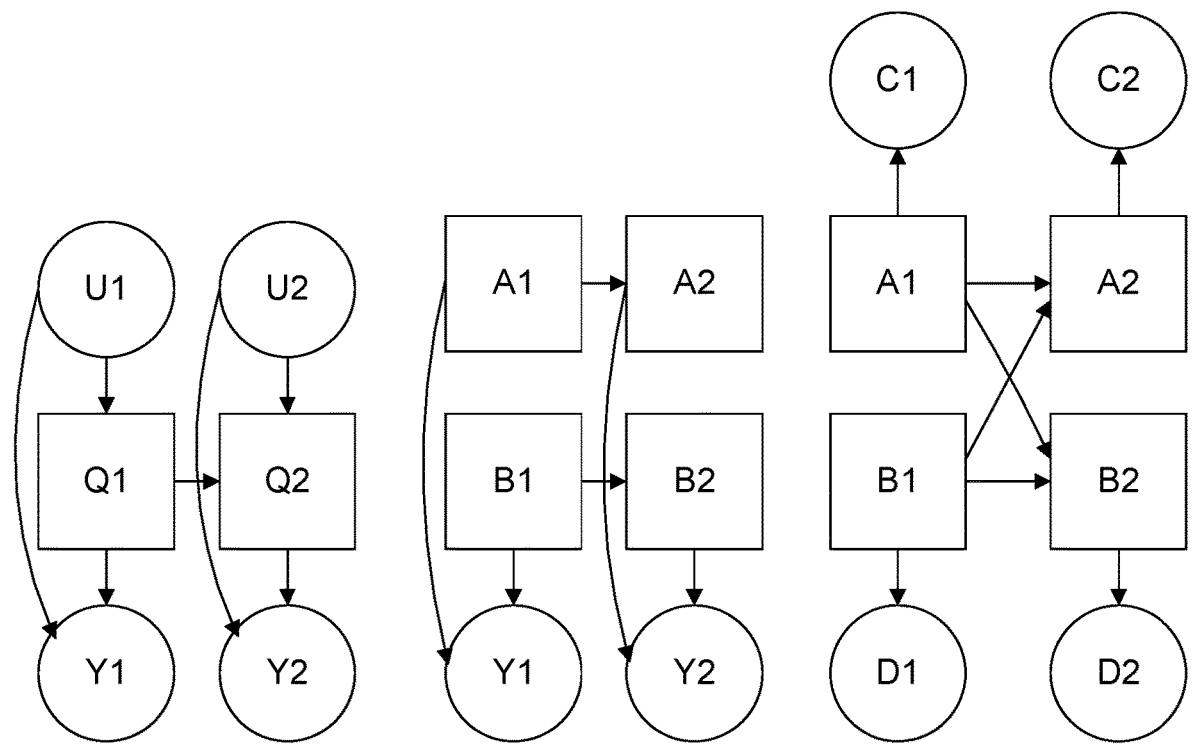
Input-output HMM
Fig. 4A
Factorial HMM
Fig. 4B
Coupled HMM
Fig. 4C
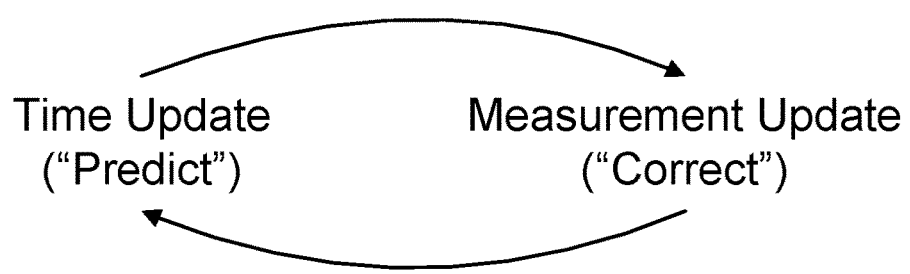
Fig. 5

SYSTEM AND METHOD FOR COMMUNICATION

CROSS REFERENCE TO RELATED APPLICATIONS

The present application is a Continuation of U.S. patent application Ser. No. 15/811,488, filed Nov. 13, 2017, now U.S. Pat. No. 10,943,273, issued Mar. 9, 2021, which is a Continuation of U.S. patent application Ser. No. 10/771,182, filed on Feb. 3, 2004, now U.S. Pat. No. 9,818,136, issued Nov. 14, 2017, which claims benefit of U.S. Provisional Patent Application No. 60/445,346, filed Feb. 5, 2003. U.S. patent application Ser. No. 15/811,488 is a Continuation of U.S. patent application Ser. No. 14/089,022 filed on Nov. 25, 2013, now U.S. Pat. No. 10,163,137, issued Dec. 25, 2018, which is a Division of Continuation of U.S. patent application Ser. No. 12/837,502 filed on Jul. 16, 2010, now U.S. Pat. No. 8,600,830, issued Dec. 3, 2013, which claims benefit of U.S. Provisional Patent Application No. 60/445,346. U.S. patent application Ser. No. 14/089,022 is a Division of U.S. patent application Ser. No. 12/837,504 filed on Jul. 16, 2010, now Pending, which also claims benefit of U.S. Provisional Patent Application No. 60/445,346. Each of the foregoing are expressly incorporated herein by reference in their entirety.

BACKGROUND OF THE INVENTION

A number of fields of endeavor are relevant to the present invention, and exemplary prior art, incorporated herein by reference, are disclosed below. The references disclosed provide a skilled artisan with embodiments of elements of the present invention, and the teachings therein may be combined and subcombined in various manners in accordance with the present teachings. The topical headings are advisory only, and are not intended to limit the applicability of any reference. While some embodiments are discussed as being preferred, it should be understood that all embodiments discussed, in any portion of this documents, whether stated as having advantages or not, form a part of the invention and may be combined and/or subcombined in a consistent manner in accordance with the teachings hereof.

INTERNET: The Internet is structured such various networks are interconnected, with communications effected by addressed packets conforming to a common protocol. Based on the packet addressing, information is routed from source to destination, often through a set of networks having multiple potential pathways. The communications medium is shared between all users. Statistically, some proportion of the packets are extraordinarily delayed, or simply lost. Therefore, protocols involving communications using these packets include error detection schemes that request a retransmit of required data not received within a time window. In the event that the network nears capacity or is otherwise subject to limiting constraint, the incidence of delayed or lost packets increases, thereby increasing requests for retransmission and retransmission. Therefore, as the network approaches available bandwidth, the load increases, ultimately leading to failure. In instances where a minimum quality of service must be guaranteed, special Internet technologies are required, to reserve bandwidth or to specify network pathways. End-to-end quality of service guarantees, however, may exceed the cost of circuit switched technologies, such as dialup modems, especially where the high-quality needs are intermittent.

Internet usage typically involves an Internet server, an automated system capable of responding to communications received through the Internet, and often communicating with other systems not directly connected to the Internet. The server typically has relatively large bandwidth to the Internet, allowing multiple simultaneous communications sessions, and usually supports the hypertext transport protocol (HTTP), which provides, in conjunction with a so-called web browser on a remote client system, a human readable interface which facilitates navigation of various resources available on the Internet. The client systems are typically human user interfaces, which employ a browser to display HTTP "web pages". The browser typically does not provide intelligence. Bandwidth between the client and Internet is typically relatively small, and various communications and display rendering considered normal. Typically, both client and server are connected to the Internet through Internet service providers, each having its own router.

It is also known to provide so-called proxy servers and firewalls, which are automated systems that insulate the client system from the Internet. Further, so-called Internet applications and applets are known which provide local intelligence at the client system. Further, it is known to provide a local server within the client system for locally processing a portion of the information. These local servers, applications and applets are non-standard, and thus require special software to be available locally for execution.

Thus, the Internet poses a number of advantages for commercial use, including low cost and ubiquitous connectivity. Therefore, it is desirable to employ standard Internet technologies while achieving sufficient quality communications to affect an efficient transaction.

MARKET ECONOMY SYSTEMS: In modern retail transactions, predetermined price transactions are common, with market transactions, i.e., commerce conducted in a setting which allows the transaction price to float based on the respective valuation allocated by the buyer(s) and seller(s), often left to specialized fields. While interpersonal negotiation is often used to set a transfer price, this price is often different from a transfer price that might result from a best-efforts attempt at establishing a market price. Assuming that the market price is optimal, it is therefore assumed that alternatives are sub optimal. Therefore, the establishment of a market price is desirable over simple negotiations.

One particular problem with market-based commerce is that both seller optimization and market efficiency depend on the fact that representative participants of a preselected class are invited to participate, and are able to promptly communicate, on a relevant timescale, in order to accurately value the goods or services and make an offer. Thus, in traditional market-based system, all participants are in the same room, or connected by a high-quality telecommunications link. Alternately, the market valuation process is prolonged over an extended period, allowing non-real time communications of market information and bids. Thus, attempts at ascertaining a market price for non-commodity goods can be subject to substantial inefficiencies, which reduce any potential gains by market pricing. Further, while market pricing might be considered "fair", it also imposes an element of risk, reducing the ability of parties to predict future pricing and revenues. Addressing this risk may also reduce efficiency of a market-based system.

AUCTION SYSTEMS: When a single party seeks to sell goods to the highest valued purchaser(s), to establish a market price, the rules of conduct typically define an auction. Typically, known auctions provide an ascending price or descending price over time, with bidders making offers or ceasing to make offers, in the descending price or ascending price models, respectively, to define the market price. After determining the winner of the auction, the pricing rules define uniform price auctions, wherein all successful bidders pay the lowest successful bid, second price auctions wherein the winning bidder pays the amount bid by the next highest bidder, and pay-what-you-bid auctions. The pay-what-you-bid auction is also known as a discriminative auction while the uniform price auction is known as a non-discriminative auction. In a second-price auction, also known as a Vickrey auction, the policy seeks to create a disincentive for speculation and to encourage bidders to submit bids reflecting their true value for the good. In the uniform price and second price schemes, the bidder is encouraged to disclose the actual private value to the bidder of the good or service, since at any price below this amount, there is an excess gain to the buyer, whereas by withholding this amount the bid may be unsuccessful, resulting in a loss of the presumably desirable opportunity. In the pay-what-you-bid auction, on the other hand, the buyer need not disclose the maximum private valuation, and those bidders with lower risk tolerance will bid higher prices. See, www.isoc.org/inet98/proceedings/3b/3b_3.html; www.ibm.comnac/reports-technical/reports-bus-neg-internet.html.

Two common types of auction are the English auction, which sells a single good to the highest bidder in an ascending price auction, and the Dutch auction, in which multiple units are available for sale, and in which a starting price is selected by the auctioneer, which is successively reduced, until the supply is exhausted by bidders (or the minimum price/final time is reached), with the buyer(s) paying the lowest successful bid. The term Dutch auction is also applied to a type of sealed bid auction. In a multi-unit live Dutch auction, each participant is provided with the current price, the quantity on hand and the time remaining in the auction. This type of auction, typically takes place over a very short period of time and there is a flurry of activity in the last portion of the auction process. The actual auction terminates when there is no more product to be sold or the time period expires.

In selecting the optimal type of auction, a number of factors are considered. In order to sell large quantities of a perishable commodity in a short period of time, the descending price auctions are often preferred. For example, the produce and flower markets in Holland routinely use the Dutch auction (hence the derivation of the name), while the U.S. Government uses this form to sell its financial instruments. The format of a traditional Dutch auction encourages early bidders to bid up to their "private value", hoping to pay some price below the "private value". In making a bid, the "private value" becomes known, helping to establish a published market value and demand curve for the goods, thus allowing both buyers and sellers to define strategies for future auctions.

In an auction, typically a seller retains an auctioneer to conduct an auction with multiple buyers. (In a reverse auction, a buyer solicits the lowest price from multiple competing vendors for a desired purchase). Since the seller retains the auctioneer, the seller essentially defines the rules of the auction. These rules are typically defined to maximize the revenues or profit to the seller, while providing an inviting forum to encourage a maximum number of high valued buyers. If the rules discourage high valuations of the goods or services, or discourage participation by an important set of potential bidders, then the rules are not optimum. A rule may also be imposed to account for the valuation of the good or service applied by the seller, in the form of a reserve price. It is noted that these rules typically seek to allocate to the seller a portion of the economic benefit that would normally inure to the buyer, creating an economic inefficiency. However, since the auction is to benefit the seller, not society as a whole, this potential inefficiency is tolerated. An optimum auction thus seeks to produce a maximum profit (or net revenues) for the seller. An efficient auction, on the other hand, maximizes the sum of the utilities for the buyer and seller. It remains a subject of academic debate as to which auction rules are most optimum in given circumstances; however, in practice, simplicity of implementation may be a paramount concern, and simple auctions may result in highest revenues; complex auctions, while theoretically more optimal, may discourage bidders from participating or from applying their true and full private valuation in the auction process.

Typically, the rules of the auction are predefined and invariant. Further, for a number of reasons, auctions typically apply the same rules to all bidders, even though, with a priori knowledge of the private values assigned by each bidder to the goods, or a prediction of the private value, an optimization rule may be applied to extract the full value assigned by each bidder, while selling above the seller's reserve.

In a known ascending price auction, each participant must be made aware of the status of the auction, e.g., open, closed, and the contemporaneous price. A bid is indicated by the identification of the bidder at the contemporaneous price, or occasionally at any price above the minimum bid increment plus the previous price. The bids are asynchronous, and therefore each bidder must be immediately informed of the particulars of each bid by other bidders.

In a known descending price auction, the process traditionally entails a common clock, which corresponds to a decrementing price at each decrement interval, with an ending time (and price). Therefore, once each participant is made aware of the auction parameters, e.g., starting price, price decrement, ending price/time, before the start of the auction, the only information that must be transmitted is auction status (e.g., inventory remaining).

As stated above, an auction is traditionally considered an efficient manner of liquidating goods at a market price. The theory of an auction is that either the buyer will not resell, and thus has an internal or private valuation of the goods regardless of other's perceived values, or that the winner will resell, either to gain economic efficiency or as a part of the buyer's regular business. In the latter case, it is a general presumption that the resale buyers are not in attendance at the auction or are otherwise precluded from bidding, and therefore that, after the auction, there will remain demand for the goods at a price in excess of the price paid during the auction. Extinction of this residual demand results in the so-called "winner's curse", in which the buyer can make no profit from the transaction during the auction. Since this detracts from the value of the auction as a means of conducting profitable commerce, it is of concern to both buyer and seller. In fact, experience with initial public offerings (IPOs) of stock through various means has demonstrated that by making stock available directly to all classes of potential purchasers, latent demand for a new issue is extinguished, and the stock price is likely to decline after issuance, resulting in an IPO which is characterized as "unsuccessful". This potential for post IPO decline tempers even initial interest in the issue, resulting in a paradoxical decline in revenues from the vehicle. In other words, the "money on the table" resulting from immediate retrading of IPO shares is deemed a required aspect of the IPO process.

Thus, methods that retain latent demand after IPO shares result in post IPO increases, and therefore a "successful" IPO. Therefore, where the transaction scheme anticipates demand for resale after the initial distribution, it is often important to assure a reasonable margin for resellers and limitations on direct sale to ultimate consumers.

Research into auction theory (game theory) shows that in an auction, the goal of the seller is to optimize the auction by allocating the goods inefficiently, and thus to appropriate to himself an excess gain. This inefficiency manifests itself by either withholding goods from the market or placing the goods in the wrong hands. In order to assure for the seller a maximum gain from a misallocation of the goods, restrictions on resale are imposed; otherwise, post auction trading will tend to undue the misallocation, and the anticipation of this trading will tend to control the auction pricing. The misallocation of goods imposed by the seller through restrictions allow the seller to achieve greater revenues than if free resale were permitted. It is believed that in an auction followed by perfect resale, that any mis-assignment of the goods lowers the seller's revenues below the optimum and likewise, in an auction market followed by perfect resale, it is optimal for the seller to allocate the goods to those with the highest value. Therefore, if post-auction trading is permitted, the seller will not benefit from these later gains, and the seller will obtain sub optimal revenues.

These studies, however, typically do not consider transaction costs and internal inefficiencies of the resellers, as well as the possibility of multiple classes of purchasers, or even multiple channels of distribution, which may be subject to varying controls or restrictions, and thus in a real market, such theoretical optimal allocation is unlikely. In fact, in real markets the transaction costs involved in transfer of ownership are often critical in determining a method of sale and distribution of goods. For example, it is the efficiency of sale that motivates the auction in the first place. Yet, the auction process itself may consume a substantial margin, for example 1-15% of the transaction value. To presume, even without externally imposed restrictions on resale, that all of the efficiencies of the market may be extracted by free reallocation, ignores that the motivation of the buyer is a profitable transaction, and the buyer may have fixed and variable costs on the order of magnitude of the margin. Thus, there are substantial opportunities for the seller to gain enhanced revenues by defining rules of the auction, strategically allocating inventory amount and setting reserve pricing.

Therefore, perfect resale is but a fiction created in auction (game) theory. Given this deviation from the ideal presumptions, auction theory may be interpreted to provide the seller with a motivation to misallocate or withhold based on the deviation of practice from theory, likely based on the respective transaction costs, seller's utility of the goods, and other factors not considered by the simple analyses.

A number of proposals have been made for effecting auction systems using the Internet. These systems include consumer-to-consumer, business-to-consumer, and business-to-business types. Generally, these auctions, of various types and implementations discussed further below, are conducted through Internet browsers using hypertext markup language (HTML) "web pages", using HTTP. In some instances, such as BIDWATCH, discussed further below, an application with associated applets is provided to define a user interface instead of HTML.

As stated above, the information packets from the transaction server to client systems associated with respective bidders communicate various information regarding the status of an interactive auction during the progress thereof. The network traffic from the client systems to the transaction server is often limited to the placement of bids; however, the amount of information required to be transmitted can vary greatly, and may involve a complex dialogue of communications to complete the auction offer. Typically, Internet based auction systems have scalability issues, wherein economies of scale are not completely apparent, leading to implementation of relatively large transaction server systems to handle peak loads. When the processing power of the transaction server system is exceeded, entire system outages may occur, resulting in lost sales or diminished profits, and diminished goodwill.

In most Internet auction system implementations, there are a large quantity of simultaneous auctions, with each auction accepting tens or hundreds of bids over a timescale of hours to days. In systems where the transaction volume exceeds these scales, for example in stock and commodity exchanges, which can accommodate large numbers of transactions per second involving the same issue, a private network, or even a local area network, is employed, and the public Internet is not used as a direct communications system with the transaction server. Thus, while infrastructures are available to allow successful handling of massive transaction per second volumes, these systems typically avoid direct public Internet communications or use of some of its limiting technologies. The transaction processing limitations are often due to the finite time required to handle, e.g., open, update, and close, database records.

In business-to-business auctions, buyers seek to ensure that the population of ultimate consumers for the good or services are not present at the auction, in order to avoid the "winner's curse", where the highest bidder in the auction cannot liquidate or work the asset at a profit. Thus, business-to-business auctions are distinct from business-to-consumer auctions. In the former, the optimization by the seller must account for the desire or directive of the seller to avoid direct retail distribution, and instead to rely on a distribution tier represented in the auction. In the latter, the seller seeks maximum revenues and to exhaust the possibilities for downstream trade in the goods or services. In fact, these types of auctions may be distinguished by various implementing rules, such as requiring sales tax resale certificates, minimum lot size quantities, preregistration or qualification, support or associated services, or limitations on the title to the goods themselves. The conduct of these auctions may also differ, in that consumer involvement typically is permissive of mistake or indecision, while in a pure business environment professionalism and decisiveness are mandated.

In many instances, psychology plays an important role in the conduct of the auction. In a live auction, bidders can see each other, and judge the tempo of the auction. In addition, multiple auctions are often conducted sequentially, so that each bidder can begin to understand the other bidder's patterns, including hesitation, bluffing, facial gestures or mannerisms. Thus, bidders often prefer live auctions to remote or automated auctions if the bidding is to be conducted strategically.

INTERNET AUCTIONS: On-line electronic auction systems which allow efficient sales of products and services are well known, for example, EBAY.COM, ONSALE.COM, UBID.COM, and the like. Inverse auctions that allow efficient purchases of product are also known, establishing a market price by competition between sellers. The Internet holds the promise of further improving efficiency of auctions by reducing transaction costs and freeing the "same time-same place" limitations of traditional auctions. This is especially appropriate where the goods may be adequately described by text or images, and thus a physical examination of the goods is not required prior to bidding.

In existing Internet systems, the technological focus has been in providing an auction system that, over the course of hours to days, allow a large number of simultaneous auctions, between a large number of bidders to occur. These systems must be scalable and have high transaction throughput, while assuring database consistency and overall system reliability. Even so, certain users may selectively exploit known technological limitations and artifacts of the auction system, including non-real time updating of bidding information, especially in the final stages of an auction. Because of existing bandwidth and technological hurdles, Internet auctions are quite different from live auctions with respect to psychological factors. Live auctions are often monitored closely by bidders, who strategically make bids, based not only on the "value" of the goods, but also on an assessment of the competition, timing, psychology, and progress of the auction. It is for this reason that so-called proxy bidding, wherein the bidder creates a preprogrammed "strategy", usually limited to a maximum price, are disfavored. A maximum price proxy bidding system is somewhat inefficient, in that other bidders may test the proxy, seeking to increase the bid price, without actually intending to purchase, or contrarily, after testing the proxy, a bidder might give up, even below a price he might have been willing to pay. Thus, the proxy imposes inefficiency in the system that effectively increases the transaction cost.

In order to address a flurry of activity that often occurs at the end of an auction, an auction may be held open until no further bids are cleared for a period of time, even if advertised to end at a certain time. This is common to both live and automated auctions. However, this lack of determinism may upset coordinated schedules, thus impairing efficient business use of the auction system.

In order to facilitate management of bids and bidding, some of the Internet auction sites have provided non-Hypertext Markup Language (HTML) browser-based software "applet" to track auctions. For example, ONSALE.COM has made available a Marimba Castanet® applet called Bidwatch to track auction progress for particular items or classes of items, and to facilitate bidding thereon. This system, however, lacks real-time performance under many circumstances, having a stated refresh period of 10 seconds, with a long latency for confirmation of a bid, due to constraints on software execution, quality of service in communications streams, and bid confirmation dialogue. Thus, it is possible to lose a bid even if an attempt was made prior to another bidder. The need to quickly enter the bid, at risk of being too late, makes the process potentially error prone.

Proxy bidding, as discussed above, is a known technique for overcoming the constraints of Internet communications and client processing limitations, since it bypasses the client and telecommunications links and may execute solely on the host system or local thereto. However, proxy bidding undermines some of the efficiencies gained by a live market.

U.S. Pat. No. 5,890,138, expressly incorporated herein by reference in its entirety, relates to an Internet auction system. The system implements a declining price auction process, removing a user from the auction process once an indication to purchase has been received. See, Rockoff, T. E., Groves, M.; "Design of an Internet-based System for Remote Dutch Auctions", Internet Research, v 5, n 4, pp. 10-16, MCB University Press, Jan. 1, 1995.

A known computer site for auctioning a product on-line comprises at least one web server computer designed for serving a host of computer browsers and providing the browsers with the capability to participate in various auctions, where each auction is of a single product, at a specified time, with a specified number of the product available for sale. The web server cooperates with a separate database computer, separated from the web server computer by a firewall. The database computer is accessible to the web computer server computer to allow selective retrieval of product information, which includes a product description, the quantity of the product to be auctioned, a start price of the product, and an image of the product. The web server computer displays, updated during an auction, the current price of the product, the quantity of the product remaining available for purchase and the measure of the time remaining in the auction. The current price is decreased in a predetermined manner during the auction. Each user is provided with an input instructing the system to purchase the product at a displayed current price, transmitting an identification and required financial authorization for the purchase of the product, which must be confirmed within a predetermined time. In the known system, a certain fall-out rate in the actual purchase confirmation may be assumed, and therefore some overselling allowed. Further, after a purchase is indicate, the user's screen is not updated, obscuring the ultimate lowest selling price from the user. However, if the user maintains a second browser, he can continue to monitor the auction to determine whether the product could have been purchased at a lower price, and if so, fail to confirm the committed purchase and purchase the same goods at a lower price while reserving the goods to avoid risk of loss. Thus, the system is flawed, and may fail to produce an efficient transaction or optimal price.

An Internet declining price auction system may provide the ability to track the price demand curve, providing valuable marketing information. For example, in trying to determine the response at different prices, companies normally have to conduct market surveys. In contrast, with a declining price auction, substantial information regarding price and demand is immediately known. The relationship between participating bidders and average purchasers can then be applied to provide a conventional price demand curve for the particular product.

U.S. Pat. No. 5,835,896, expressly incorporated herein by reference in its entirety, provides method and system for processing and transmitting electronic auction information over the Internet, between a central transaction server system and remote bidder terminals. Those bids are recorded by the system and the bidders are updated with the current auction status information. When appropriate, the system closes the auction from further bidding and notifies the winning bidders and losers as to the auction outcome. The transaction server posts information from a database describing a lot available for purchase, receives a plurality of bids, stored in a bid database, in response to the information, and automatically categorizes the bids as successful or unsuccessful. Each bid is validated, and an electronic mail message is sent informing the bidder of the bid status. This system employs HTTP, and thus does not automatically update remote terminal screens, requiring the e-mail notification feature.

The auction rules may be flexible, for example including Dutch-type auctions, for example by implementing a price markdown feature with scheduled price adjustments, and English-type (progressive) auctions, with price increases corresponding to successively higher bids. In the Dutch type auction, the price markdown feature may be responsive to bidding activity over time, amount of bids received, and number of items bid for. Likewise, in the progressive auction, the award price may be dependent on the quantity desired, and typically implements a lowest successful bid price rule. Bids that are below a preset maximum posted selling price are maintained in reserve by the system. If a certain sales volume is not achieved in a specified period of time, the price is reduced to liquidate demand above the price point, with the new price becoming the posted price. On the other hand, if a certain sales volume is exceeded in a specified period of time, the system may automatically increase the price. These automatic price changes allow the seller to respond quickly to market conditions while keeping the price of the merchandise as high as possible, to the seller's benefit. A "Proxy Bidding" feature allows a bidder to place a bid for the maximum amount they are willing to pay, keeping this value a secret, displaying only the amount necessary to win the item up to the amount of the currently high bids or proxy bids of other bidders. This feature allows bidders to participate in the electronic auction without revealing to the other bidders the extent to which they are willing to increase their bids, while maintaining control of their maximum bid without closely monitoring the bidding. The feature assures proxy bidders the lowest possible price up to a specified maximum without requiring frequent inquiries as to the state of the bidding.

A "Floating Closing Time" feature may also be implemented whereby the auction for a particular item is automatically closed if no new bids are received within a predetermined time interval, assuming an increasing price auction. Bidders thus have an incentive to place bids expeditiously, rather than waiting until near the anticipated close of the auction.

U.S. Pat. No. 5,905,975, expressly incorporated herein by reference in its entirety, relates to computer implemented methods and apparatus for auctions. The system provides intelligent systems for the auctioneer and for the user. The auctioneer's system contains information from a user system based on bid information entered by the user. With this information, the auctioneer's system determines whether the auction can be concluded or not and appropriate messages are transmitted. At any point in the auction, bidders are provided the opportunity to submit not only their current bids, but also to enter future bids, or bidding rules which may have the opportunity to become relevant at future times or prices, into the auction system's database. Participants may revise their executory bids, by entering updated bids. Thus, at one extreme, a bidder who wishes to economize on his time may choose to enter his entire set of bidding rules into the computerized system at the start of the auction, effectively treating this as a sealed-bid auction. At the opposite extreme, a bidder who wishes to closely participate in the auction may choose to constantly monitor the auction's progress and to submit all of his bids in real time. See also, U.S. patent application Ser. No. 08/582,901 filed Jan. 4, 1996, which provides a method for auctioning multiple, identical objects and close substitutes.

SECURE NETWORKS: A number of references relate to secure networks, which are an aspect of various embodiments of the present invention. These references are incorporated herein by reference in their entirety, including U.S. Pat. Nos. 5,933,498; 5,978,918; 6,005,943; 6,009,526; 6,021,202; 6,021,491; 6,021,497; 6,023,762; 6,029,245; 6,049,875; 6,055,508; 6,065,119; 6,073,240; 6,075,860; and 6,075,861.

CRYPTOGRAPHIC TECHNOLOGY: U.S. Pat. No. 5,956,408, expressly incorporated herein by reference, relates to an apparatus and method for secure distribution of data. Data, including program and software updates, is encrypted by a public key encryption system using the private key of the data sender. The sender also digitally signs the data. The receiver decrypts the encrypted data, using the public key of the sender, and verifies the digital signature on the transmitted data. The program interacts with basic information stored within the confines of the receiver. As result of the interaction, the software updates are installed within the confines of the user, and the basic information stored within the confines of the user is changed.

U.S. Pat. Nos. 5,982,891; 5,949,876; and 5,892,900, expressly incorporated herein by reference, relate to systems and methods for secure transaction management and electronic rights protection. Electronic appliances, such as computers, help to ensure that information is accessed and used only in authorized ways, and maintain the integrity, availability, and/or confidentiality of the information. Such electronic appliances provide a distributed virtual distribution environment (VDE) that may enforce a secure chain of handling and control, for example, to control and/or meter or otherwise monitor use of electronically stored or disseminated information. Such a virtual distribution environment may be used to protect rights of various participants in electronic commerce and other electronic or electronic-facilitated transactions. Distributed and other operating systems, environments and architectures, such as, for example, those using tamper-resistant hardware-based processors, may establish security at each node. These techniques may be used to support an all-electronic information distribution, for example, utilizing the "electronic highway."

U.S. Pat. No. 6,009,177, expressly incorporated herein by reference, relates to a cryptographic system and method with a key escrow feature that uses a method for verifiably splitting users' private encryption keys into components and for sending those components to trusted agents chosen by the particular users, and provides a system that uses modern public key certificate management, enforced by a chip device that also self-certifies. The methods for key escrow and receiving an escrow certificate are also applied herein to a more generalized case of registering a trusted device with a trusted third party and receiving authorization from that party enabling the device to communicate with other trusted devices. Further preferred embodiments provide for rekeying and upgrading of device firmware using a certificate system, and encryption of stream-oriented data.

U.S. Pat. No. 6,052,467, expressly incorporated herein by reference, relates to a system for ensuring that the blinding of secret-key certificates is restricted, even if the issuing protocol is performed in parallel mode. A cryptographic method is disclosed that enables the issuer in a secret-key certificate issuing protocol to issue triples consisting of a secret key, a corresponding public key, and a secret-key certificate of the issuer on the public key, in such a way that receiving parties can blind the public key and the certificate, but cannot blind a predetermined non-trivial predicate of the secret key even when executions of the issuing protocol are performed in parallel.

U.S. Pat. No. 6,052,780, expressly incorporated herein by reference, relates to a computer system and process for accessing an encrypted and self-decrypting digital information product while restricting access to decrypted digital information. Some of these problems with digital information protection systems may be overcome by providing a mechanism that allows a content provider to encrypt digital information without requiring either a hardware or platform manufacturer or a content consumer to provide support for the specific form of corresponding decryption. This mechanism can be provided in a manner that allows the digital information to be copied easily for back-up purposes and to be transferred easily for distribution, but which should not permit copying of the digital information in decrypted form. In particular, the encrypted digital information is stored as an executable computer program that includes a decryption program that decrypts the encrypted information to provide the desired digital information, upon successful completion of an authorization procedure by the user. In combination with other mechanisms that track distribution, enforce royalty payments and control access to decryption keys, an improved method is provided for identifying and detecting sources of unauthorized copies. Suitable authorization procedures also enable the digital information to be distributed for a limited number of uses and/or users, thus enabling per-use fees to be charged for the digital information.

See also, U.S. Pat. Nos. 4,200,770; 4,218,582; 4,264,782; 4,306,111; 4,309,569; 4,326,098; 4,351,982; 4,365,110; 4,386,233; 4,393,269; 4,399,323; 4,405,829; 4,438,824; 4,453,074; 4,458,109; 4,471,164; 4,514,592; 4,528,588; 4,529,870; 4,558,176; 4,567,600; 4,575,621; 4,578,531; 4,590,470; 4,595,950; 4,625,076; 4,633,036; 5,991,406; 6,026,379; 6,026,490; 6,028,932; 6,028,933; 6,028,936; 6,028,937; 6,028,939; 6,029,150; 6,029,195; 6,029,247; 6,031,913; 6,031,914; 6,034,618; 6,035,041; 6,035,398; 6,035,402; 6,038,315; 6,038,316; 6,038,322; 6,038,581; 6,038,665; 6,038,666; 6,041,122; 6,041,123; 6,041,357; 6,041,408; 6,041,410; 6,044,131; 6,044,155; 6,044,157; 6,044,205; 6,044,349; 6,044,350; 6,044,388; 6,044,462; 6,044,463; 6,044,464; 6,044,466; 6,044,468; 6,047,051; 6,047,066; 6,047,067; 6,047,072; 6,047,242; 6,047,268; 6,047,269; 6,047,374; 6,047,887; 6,049,610; 6,049,612; 6,049,613; 6,049,671; 6,049,785; 6,049,786; 6,049,787; 6,049,838; 6,049,872; 6,049,874; 6,052,466; 6,052,467; 6,052,469; 6,055,314; 6,055,321; 6,055,508; 6,055,512; 6,055,636; 6,055,639; 6,056,199; 6,057,872; 6,058,187; 6,058,188; 6,058,189; 6,058,193; 6,058,381; 6,058,383; 6,061,448; 6,061,454; 6,061,692; 6,061,789; 6,061,790; 6,061,791; 6,061,792; 6,061,794; 6,061,796; 6,061,799; 6,064,723; 6,064,738; 6,064,740; 6,064,741; 6,064,764; 6,064,878; 6,065,008; 6,067,620; 6,069,647; 6,069,952; 6,069,954; 6,069,955; 6,069,969; 6,069,970; 6,070,239; 6,072,870; 6,072,874; 6,072,876; 6,073,125; 6,073,160; 6,073,172; 6,073,234; 6,073,236; 6,073,237; 6,073,238; 6,073,242; 6,075,864; 6,075,865; 6,076,078; 6,076,162; 6,076,163; 6,076,164; 6,076,167; 6,078,663; 6,078,665; 6,078,667; 6,078,909; 6,079,018; 6,079,047; 6,081,597; 6,081,598; 6,081,790; 6,081,893, 6,192,473, each of which is expressly incorporated herein by reference. See, also, U.S. Pat. Nos. 6,028,937, 6,026,167, 6,009,171; 5,991,399, 5,948,136 (IEEE 1394-1995), and 5,915,018, expressly incorporated herein by reference, and Jim Wright and Jeff Robillard (Philsar Semiconductor), "Adding Security to Portable Designs", Portable Design, March 2000, pp. 16-20. See also, Stefik, U.S. Pat. Nos. 5,715,403; 5,638,443; 5,634,012; and 5,629,980, expressly incorporated herein by reference.

WATERMARKING: U.S. Pat. No. 5,699,427, expressly incorporated herein by reference, relates to a method to deter document and intellectual property piracy through individualization, and a system for identifying the authorized receiver of any particular copy of a document. More specifically, each particular copy of a document is fingerprinted by applying a set of variations to a document, where each variation is a change in data contents, but does not change the meaning or perusal experience of the document. A database associating a set of variants to a receiver is maintained. Thus, any variant or copy of that variant can be traced to an authorized receiver.

See also, U.S. Pat. Nos. 4,734,564; 4,812,628; 4,926,325; 5,235,166; 5,254,843; 5,341,429; 5,428,683; 5,430,279; 5,521,722; 5,546,462; 5,606,609; 5,613,004; 5,616,904; 5,636,292; 5,646,997; 5,659,726; 5,664,018; 5,687,236; 5,710,834; 5,727,092; 5,734,752; 5,740,244; 5,745,569; 5,745,604; 5,748,763; 5,748,783; 5,761,686; 5,765,152; 5,768,426; 5,778,102; 5,790,703; 5,819,289; 5,822,432; 5,822,436; 5,832,119; 5,841,886; 5,841,978; 5,848,155; 5,850,481; 5,862,260; 5,878,137; 5,889,868; 5,892,900; 5,905,505; 5,905,800; 5,915,027; 5,920,628; 5,930,369; 5,933,498; 5,943,422; 5,946,414; 5,949,885; 5,974,548; 5,995,625; 6,002,772; 6,004,276; 6,006,328; 6,006,332; 6,018,801; 6,026,193; 6,044,464; 6,047,374; 6,049,627; 6,061,451; 6,064,737; 6,064,764; 6,069,914; 6,076,077; 6,081,793, each of which is expressly incorporated herein by reference.

ROLE-BASED ACCESS: U.S. Pat. No. 6,023,765, expressly incorporated herein by reference, relates to a system and method for implementation of role-based access control in multi-level secure systems. Role-based access control (RBAC) is implemented on a multi-level secure (MLS) system by establishing a relationship between privileges within the RBAC system and pairs of levels and compartments within the MLS system. The advantages provided by RBAC, that is, reducing the overall number of connections that must be maintained, and, for example, greatly simplifying the process required in response to a change of job status of individuals within an organization, are then realized without loss of the security provided by MLS. A trusted interface function is developed to ensure that the RBAC rules permitting individual's access to objects are followed rigorously, and provides a proper mapping of the roles to corresponding pairs of levels and compartments. No other modifications are necessary. Access requests from subjects are mapped by the interface function to pairs of levels and compartments, after which access is controlled entirely by the rules of the MLS system. See also, U.S. Pat. Nos. 6,073,242; 6,073,240; 6,064,977; 6,055,637; 6,044,466; 6,041,349; 6,014,666; 5,991,877; 5,978,475; 5,949,866; 5,925,126; 5,911,143; 5,797,128; 5,761,288; 5,751,909; 5,748,890; 5,621,889; 5,535,383; 5,528,516; 5,481,613; 5,347,578; 5,265,221, each of which is expressly incorporated herein by reference.

COMPUTER SYSTEM SECURITY: A number of references relate to computer system security, which is a part of various embodiment of the invention. The following references relevant to this issue are incorporated herein by reference: U.S. Pat. Nos. 5,881,225; 5,937,068; 5,949,882; 5,953,419; 5,956,400; 5,958,050; 5,978,475; 5,991,878; 6,070,239; and 6,079,021.

COMPUTER SECURITY DEVICES: A number of references relate to computer security devices, which is a part of various embodiment of the invention. The following references relevant to this issue are incorporated herein by reference: U.S. Pat. Nos. 5,982,520; 5,991,519; 5,999,629; 6,034,618; 6,041,412; 6,061,451; and 6,069,647.

VIRTUAL PRIVATE NETWORK: A number of references relate to virtual private networks, which is a part of various embodiment of the invention. The following references relevant to this issue are incorporated herein by reference: U.S. Pat. Nos. 6,079,020; 6,081,900; 6,081,533; 6,079,020; 6,078,946; 6,078,586; 6,075,854; 6,075,852;

6,073,172; 6,061,796; 6,061,729; 6,058,303; 6,055,575; 6,052,788; 6,047,325; 6,032,118; 6,029,067; 6,016,318; 6,009,430; 6,005,859; 6,002,767; 6,002,756, each of which is expressly incorporated herein by reference. See also, U.S. Pat. Nos. 6,081,900; 6,081,750; 6,081,199; 6,079,621; 6,078,265; 6,076,167; 6,075,455; 6,072,894; 6,070,141; 6,068,184; 6,064,751; 6,056,197; 6,052,468; 6,045,039; 6,044,349; 6,044,155; 6,041,410; 6,040,783; 6,038,666; 6,038,337; 6,038,315; 6,037,870; 6,035,406; 6,035,402; 6,035,398; 6,031,910; 6,026,166; 6,018,739; 6,016,476; 6,012,049; 6,012,039; 6,011,858; 6,009,177; 6,006,328; 6,003,135; 6,002,770; 5,999,637; 5,999,095; 5,995,630; 5,991,431; 5,991,429; 5,991,408; 5,987,155; 5,987,153; 5,986,746; 5,984,366; 5,982,894; 5,979,773; 5,978,494; 5,974,146; 5,970,143; 5,966,446; 5,963,908; 5,963,657; 5,954,583; 5,952,641; 5,951,055; 5,949,881; 5,949,879; 5,949,046; 5,943,423; 5,935,071; 5,933,515; 5,933,498; 5,930,804; 5,923,763; 5,920,477; 5,920,384; 5,920,058; 5,915,973; 5,913,196; 5,913,025; 5,912,974; 5,912,818; 5,910,988; 5,907,149; 5,901,246; 5,898,154; 5,897,616; 5,892,902; 5,892,838; 5,892,824; 5,890,152; 5,889,474; 5,881,226; 5,878,144; 5,876,926; 5,875,108; 5,872,849; 5,872,848; 5,872,834; 5,870,723; 5,869,822; 5,867,802; 5,867,795; 5,867,578; 5,862,260; 5,862,246; 5,862,223; 5,857,022; 5,850,451; 5,850,442; 5,848,231; 5,844,244; 5,841,907; 5,841,886; 5,841,865; 5,841,122; 5,838,812; 5,832,464; 5,832,119; 5,828,751; 5,825,880; 5,825,871; 5,815,577; 5,815,252; 5,805,719; 5,802,199; 5,799,088; 5,799,086; 5,799,083; 5,790,674; 5,790,668; 5,789,733; 5,787,187; 5,784,566; 5,784,461; 5,774,551; 5,771,071; 5,770,849; 5,768,382; 5,767,496; 5,764,789; 5,763,862; 5,761,298; 5,757,916; 5,757,431; 5,751,836; 5,751,809; 5,748,738; 5,745,573; 5,745,555; 5,742,685; 5,742,683; 5,737,420; 5,734,154; 5,719,950; 5,712,914; 5,712,912; 5,706,427; 5,703,562; 5,696,827; 5,682,142; 5,682,032; 5,680,460; 5,668,878; 5,666,400; 5,659,616; 5,647,364; 5,647,017; 5,646,839; 5,636,282; 5,633,932; 5,615,277; 5,613,012; 5,608,387; 5,594,806; 5,592,408; 5,588,059; 5,586,171; 5,583,950; 5,583,933; 5,578,808; 5,572,596; 5,561,718; 5,559,885; 5,557,765; 5,553,155; 5,544,255; 5,534,855; 5,533,123; 5,526,428; 5,523,739; 5,497,430; 5,485,519; 5,485,312; 5,483,601; 5,478,993; 5,475,839; 5,469,506; 5,457,747; 5,455,407; 5,453,601; 5,448,045; 5,432,864; 5,414,755; 5,412,727; 5,363,453; 5,347,580; 5,345,549; 5,341,428; 5,335,288; 5,291,560; 5,283,431; 5,280,527; 5,272,754; 5,245,329; 5,229,764; 5,228,094; 5,224,173; 5,208,858; 5,204,670; 5,191,611; 5,163,094; 5,155,680; 5,131,038; 5,073,950; 5,067,162; 5,065,429; 5,056,147; 5,056,141; 5,036,461; 5,020,105; 4,993,068; 4,972,476; 4,961,142; 4,952,928; 4,941,173; 4,926,480; 4,896,363; 4,890,323; 4,868,376; 4,827,518; 4,819,267; 4,752,676; 4,736,203; 4,731,841; 4,564,018, each of which is expressly incorporated herein by reference.

CONTENT-BASED QUERY SERVERS: U.S. Pat. No. 5,987,459, expressly incorporated herein by reference, relates to an image and document management system for content-based retrieval support directly into the compressed files. The system minimizes a weighted sum of the expected size of the compressed files and the expected query response time. Object searching of documents stored by the system is possible on a scalable resolution basis. The system includes a novel object representation based on embedded prototypes that provides for high-quality browsing of retrieval images at low bit rates.

U.S. Pat. No. 6,038,560, expressly incorporated herein by reference, relates to a concept knowledge base search and retrieval system, which includes factual knowledge base queries and concept knowledge base queries, is disclosed. A knowledge base stores associations among terminology/categories that have a lexical, semantic or usage association. Document theme vectors identify the content of documents through themes as well as through classification of the documents in categories that reflects what the documents are primarily about. The factual knowledge base queries identify, in response to an input query, documents relevant to the input query through expansion of the query terms as well as through expansion of themes. The concept knowledge base query does not identify specific documents in response to a query, but specifies terminology that identifies the potential existence of documents in a particular area.

U.S. Pat. No. 6,067,466, expressly incorporated herein by reference, relates to a diagnostic tool using a predictive instrument. A method is provided for evaluating a medical condition of a patient including the steps of monitoring one or more clinical features of a patient; based on the monitored features, computing a primary probability of a medical outcome or diagnosis; computing a plurality of conditional probabilities for a selected diagnostic test, the computed conditional probabilities including a first probability of the medical outcome or diagnosis assuming the selected diagnostic test produces a first outcome and a second probability of the medical outcome or diagnosis assuming the selected diagnostic test produces a second outcome; and displaying the computed primary probability as well as the plurality of computed conditional probabilities to a user as an aid to determining whether to administer the selected diagnostic test to the patient.

E-COMMERCE SYSTEMS: U.S. Pat. No. 5,946,669, expressly incorporated herein by reference, relates to a method and apparatus for payment processing using debit-based electronic funds transfer and disbursement processing using addendum-based electronic data interchange. This disclosure describes a payment and disbursement system, wherein an initiator authorizes a payment and disbursement to a collector and the collector processes the payment and disbursement through an accumulator agency. The accumulator agency processes the payment as a debit-based transaction and processes the disbursement as an addendum-based transaction. The processing of a debit-based transaction generally occurs by electronic funds transfer (EFT) or by financial electronic data interchange (FEDI). The processing of an addendum-based transaction generally occurs by electronic data interchange (EDI).

U.S. Pat. No. 6,005,939, expressly incorporated herein by reference, relates to a method and apparatus for storing an Internet user's identity and access rights to World Wide Web resources. A method and apparatus for obtaining user information to conduct secure transactions on the Internet without having to re-enter the information multiple times is described. The method and apparatus can also provide a technique by which secured access to the data can be achieved over the Internet. A passport containing user-defined information at various security levels is stored in a secure server apparatus, or passport agent, connected to computer network. A user process instructs the passport agent to release all or portions of the passport to a recipient node and forwards a key to the recipient node to unlock the passport information.

U.S. Pat. No. 6,016,484, expressly incorporated herein by reference, relates to a system, method and apparatus for network electronic payment instrument and certification of payment and credit collection utilizing a payment. An electronic monetary system provides for transactions utilizing an electronic-monetary system that emulates a wallet or a purse that is customarily used for keeping money, credit cards and other forms of payment organized. Access to the instruments in the wallet or purse is restricted by a password to avoid unauthorized payments. A certificate form must be completed in order to obtain an instrument. The certificate form obtains the information necessary for creating a certificate granting authority to utilize an instrument, a payment holder and a complete electronic wallet. Electronic approval results in the generation of an electronic transaction to complete the order. If a user selects a particular certificate, a particular payment instrument holder will be generated based on the selected certificate. In addition, the issuing agent for the certificate defines a default bitmap for the instrument associated with a particular certificate, and the default bitmap will be displayed when the certificate definition is completed. Finally, the number associated with a particular certificate will be utilized to determine if a particular party can issue a certificate.

U.S. Pat. No. 6,029,150, expressly incorporated herein by reference, relates to a system and method of payment in an electronic payment system wherein a plurality of customers have accounts with an agent. A customer obtains an authenticated quote from a specific merchant, the quote including a specification of goods and a payment amount for those goods. The customer sends to the agent a single communication including a request for payment of the payment amount to the specific merchant and a unique identification of the customer. The agent issues to the customer an authenticated payment advice based only on the single communication and secret shared between the customer and the agent and status information, which the agent knows about the merchant, and/or the customer. The customer forwards a portion of the payment advice to the specific merchant. The specific merchant provides the goods to the customer in response to receiving the portion of the payment advice.

U.S. Pat. No. 6,047,269, expressly incorporated herein by reference, relates to a self-contained payment system with creating and facilitating transfer of circulating digital vouchers representing value. A digital voucher has an identifying element and a dynamic log. The identifying element includes information such as the transferable value, a serial number and a digital signature. The dynamic log records the movement of the voucher through the system and accordingly grows over time. This allows the system operator to not only reconcile the vouchers before redeeming them, but also to recreate the history of movement of a voucher should an irregularity like a duplicate voucher be detected. These vouchers are used within a self-contained system including a large number of remote devices that are linked to a central system. The central system can e linked to an external system. The external system, as well as the remote devices, is connected to the central system by any one or a combination of networks. The networks must be able to transport digital information, for example the Internet, cellular networks, telecommunication networks, cable networks or proprietary networks. Vouchers can also be transferred from one remote device to another remote device. These remote devices can communicate through a number of methods with each other. For example, for a non-face-to-face transaction the Internet is a choice, for a face-to-face or close proximity transactions tone signals or light signals are likely methods. In addition, at the time of a transaction a digital receipt can be created which will facilitate a fast replacement of vouchers stored in a lost remote device.

MICROPAYMENTS: U.S. Pat. No. 5,999,919, expressly incorporated herein by reference, relates to an efficient micropayment system. Existing software proposals for electronic payments can be divided into "on-line" schemes which require participation of a trusted party (the bank) in every transaction and are secure against overspending, and "off-line" schemes which do not require a third party and guarantee only that overspending is detected when vendors submit their transaction records to the bank (usually at the end of the day). A new "hybrid" scheme is proposed which combines the advantages of both "on-line" and "off-line" electronic payment schemes. It allows for control of overspending at a cost of only a modest increase in communication compared to the off-line schemes. The protocol is based on probabilistic polling. During each transaction, with some small probability, the vendor forwards information about this transaction to the bank. This enables the bank to maintain an accurate approximation of a customer's spending. The frequency of polling messages is related to the monetary value of transactions and the amount of overspending the bank is willing to risk. For transactions of high monetary value, the cost of polling approaches that of the on-line schemes, but for micropayments, the cost of polling is a small increase over the traffic incurred by the off-line schemes.

Micropayments are often preferred where the amount of the transaction does not justify the costs of complete financial security. In the micropayment scheme, typically a direct communication between creditor and debtor is not required; rather, the transaction produces a result which eventually results in an economic transfer, but which may remain outstanding subsequent to transfer of the underlying goods or services. The theory underlying this micropayment scheme is that the monetary units are small enough such that risks of failure in transaction closure is relatively insignificant for both parties, but that a user gets few chances to default before credit is withdrawn. On the other hand, the transaction costs of a non-real time transactions of small monetary units are substantially less than those of secure, unlimited or potentially high value, real time verified transactions, allowing and facilitating such types of commerce. Thus, the rights management system may employ applets local to the client system, which communicate with other applets and/or the server and/or a vendor/rights-holder to validate a transaction, at low transactional costs.

The following U.S. Patents, expressly incorporated herein by reference, define aspects of micropayment, digital certificate, and on-line payment systems: U.S. Pat. Nos. 5,930, 777; 5,857,023; 5,815,657; 5,793,868, 5,717,757; 5,666, 416; 5,677,955; 5,839,119; 5,915,093; 5,937,394; 5,933, 498; 5,903,880; 5,903,651; 5,884,277; 5,960,083; 5,963, 924; 5,996,076; 6,016,484; 6,018,724; 6,021,202; 6,035, 402; 6,049,786; 6,049,787; 6,058,381; 6,061,448; 5,987, 132; 6,057,872; and 6,061,665. See also, Rivest and Shamir, "PayWord and MicroMint: Two Simple Micropayment Schemes" (May 7, 1996); Micro PAYMENT transfer Protocol (MPTP) Version 0.1 (22 Nov. 1995) et seq., www.w3.org/pub/WWW/TR/WD-mptp; Common Markup for web Micropayment Systems, www.w3.org/TR/WD-Micropayment-Markup (9 Jun. 1999); "Distributing Intellectual Property: a Model of Microtransaction Based Upon Metadata and Digital Signatures", Olivia, Maurizio, olivia.modlang.denison.edu/~olivia/RFC/09/, all of which are expressly incorporated herein by reference. See, also: U.S. Pat. Nos. 4,977,595; 5,224,162; 5,237,159; 5,392,353; 5,511,121; 5,621,201; 5,623,547; 5,679,940; 5,696,908; 5,754,939; 5,768,385; 5,799,087; 5,812,668; 5,828,840; 5,832,089; 5,850,446; 5,889,862; 5,889,863; 5,898,154; 5,901,229; 5,920,629; 5,926,548; 5,943,424; 5,949,045;

5,952,638; 5,963,648; 5,978,840; 5,983,208; 5,987,140; 6,002,767; 6,003,765; 6,021,399; 6,026,379; 6,029,150; 6,029,151; 6,047,067; 6,047,887; 6,055,508; 6,065,675; 6,072,870, each of which is expressly incorporated herein by reference.

NEURAL NETWORKS: The resources relating to Neural Networks, listed in the Neural Networks References Appendix, each of which is expressly incorporated herein by reference, provides a sound basis for understanding the field of neural networks (and the subset called artificial neural networks, which distinguish biological systems) and how these might be used to solve problems. A review of these references will provide a state of knowledge appropriate for an understanding of aspects of the invention which rely on Neural Networks, and to avoid a prolix discussion of no benefit to those already possessing an appropriate state of knowledge.

WAVELETS: The following resources listed in the Wavelets References Appendix relate to Wavelets and wavelet-based analysis, each of which is expressly incorporated herein by reference, provides a sound basis for understanding the mathematical basis for wavelet theory and analysis using wavelet transforms and decomposition, and how these might be used to solve problems or extract useful information from a signal. A review of these references will assure a background in this field for an understanding of aspects of the invention which rely on wavelet theory.

TELEMATICS: The resources relating to telematics listed in the Telematics Appendix, each of which is expressly incorporated herein by reference, provides a background in the theory and practice of telematics, as well as some of the underlying technologies. A review of these references is therefore useful in understanding practical issues and the context of functions and technologies which may be used in conjunction with the advances set forth herein.

GAME THEORY: The following resources listed in the Game Theory References Appendix, relating to Game Theory, each of which is expressly incorporated herein by reference, provides a basis for understanding Game Theory and its implications for the design, control, and analysis of systems and networks. A review of these references will assure a background in this field for an understanding of aspects of the invention which relate to game theory.

USE OF GAME THEORY TO CONTROL AD HOC NETWORKS: The resources relating to ad hoc networks and game theory listed in the Game Theory and Ad Hoc Networks References Appendix, each of which is expressly incorporated herein by reference, provides a sound basis for understanding the implications of game theory for the design, control and analysis of communications networks, and in particular, ad hoc networks. A review of these references will assure a background in this field for an understanding of aspects of the invention which rely on these topics.

The following are expressly incorporated herein by reference: U.S. Pat. Nos. 6,640,145, 6,418,424, 6,400,996, 6,081,750,5,920,477, 5,903,454, 5,901,246, 5,875,108, 5,867,386, 5,774,357, 6,429,812, and 6,252,544.

BRIEF DESCRIPTION OF THE DRAWINGS

The drawings show:
FIGS. 4A-4C show an input-output, a factorial, and a coupled Hidden Markov Model (HMM), respectively;
FIG. 5 shows a predictor corrector algorithm of the discrete Kalman filter cycle.

DETAILED DESCRIPTION OF THE PREFERRED EMBODIMENTS

Figure 1:
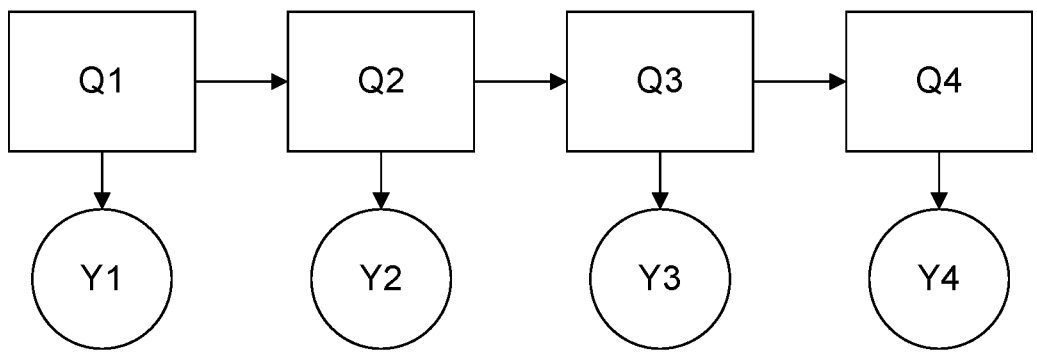
FIG. 1 shows a Bayesian Network.

This patent builds upon and extends aspects of U.S. Pat. Nos. 6,252,544, and 6,429,812, which are expressly incorporated herein by reference in its entirety. See, also, U.S. Pat. No. 6,397,141, expressly incorporated herein by reference, which relates to a method and an apparatus for signaling local traffic disturbances wherein a decentralized communication between vehicles, which is performed by exchanging their respective vehicle data. Through repeated evaluation of these individual vehicle data, each reference vehicle may determine a group of vehicles having relevance for itself from within a maximum group of vehicles and compare the group behavior of the relevant group with its own behavior. The results of this comparison are indicated in the reference vehicle, whereby a homogeneous flow of traffic may be generated, and the occurrence of accidents is reduced. See, also U.S. Pat. Nos. 4,706,086, and 5,428,544, 6,473,688, 6,304,758; 6,411,221; 6,384,739; 6,401,027; 6,411,889, 6,359,571; 6,338,011; 5,131,020; 5,164,904; 5,539,645; 5,594,779; 5,689,252; 5,699,056; 5,864,305; 5,889,473; 5,919,246; 5,982,298; 4,860,216; 5,302,955; 5,809,437; 6,115,654; 6,173,159; and Japanese Patent Document Nos. JP 9-236650 (September 1997); 10-84430 (March 1998); 5-151496 (June 1993); and 11-183184 (July 1999), each of which is expressly incorporated herein by reference. See also: Martin E. Liggins, II, et al., "Distributed Fusion Architectures and Algorithms for Target Tracking", Proceedings of the IEEE, vol. 85, No. 1, (XP-002166088) January 1997, pp. 95-106; D. M. Hosmer, "Data-Linked Associate Systems", 1994 IEEE International Conference on Systems, Man, and Cybernetics. Humans, Information and Technology (Cat. No. 94CH3571-5), Proceedings of IEEE International Conference on Systems, Man and Cybernetics, San Antonio, Tex., vol. 3, (XP-002166089) (1994), pp. 2075-2079.

One aspect of the invention provides a communications system, method and infrastructure. According to one preferred embodiment, an ad hoc, self-organizing, cellular radio system (sometimes known as a "mesh network") is provided. Advantageously, high gain antennas are employed, preferably electronically steerable antennas, to provide efficient communications and to increase communications bandwidth, both between nodes and for the system comprising a plurality of nodes communicating with each other. See, U.S. Pat. No. 6,507,739, expressly incorporated herein by reference.

In general, time-critical, e.g., voice communications require tight routing to control communications latency. On the other hand, non-time critical communications generally are afforded more leeway in terms of communications pathways, including a number of "hops", retransmission latency, and out-of-order packet communication tolerance, between the source and destination or fixed infrastructure, and quality of communication pathway. Further, it is possible to establish redundant pathways, especially where communications bandwidth is available, multiple paths possible, and no single available path meets the entire communications requirements or preferences.

Technologies for determining a position of a mobile device are also well known. Most popular are radio triangulation techniques, including artificial satellite and terrestrial transmitters or receivers, dead reckoning and inertial techniques. Advantageously, a satellite-based or augmented satellite system, although other suitable geolocation systems are applicable.

Navigation systems are also well known. These systems generally combine a position sensing technology with a geographic information system (GIS), e.g., a mapping database, to assist navigation functions. Systems which integrate GPS, GLONASS, LORAN or other positioning systems into vehicular guidance systems are well known, and indeed navigational purposes were prime motivators for the creation of these systems.

Environmental sensors are well known. For example, sensing technologies for temperature, weather, object proximity, location and identification, vehicular traffic and the like are well developed. In particular, known systems for analyzing vehicular traffic patterns include both stationary and mobile sensors, and networks thereof. Most often, such networks provide a stationary or centralized system for analyzing traffic information, which is then broadcast to vehicles.

Encryption technologies are well known and highly developed. These are generally classified as being symmetric key, for example the Data Encryption Standard (DES), and the more recent Advanced Encryption Standard (AES), in which the same key is used for encryption as decryption, and asymmetric key cryptography, in which different and complementary keys are used to encrypt and decrypt, in which the former and the latter are not derivable from each other (or one from the other) and therefore can be used for authentication and digital signatures. The use of asymmetric keys allows a so-called public key infrastructure, in which one of the keys is published, to allow communications to be directed to a possessor of a complementary key, and/or the identity of the sender of a message to be verified. Typical asymmetric encryption systems include the Rivest-Shamir-Adelman algorithm (RSA), the Diffie-Hellman algorithm (DH), elliptic curve encryption algorithms, and the so-called Pretty Good Privacy (PGP) algorithm.

One embodiment of the invention provides a system that analyzes both a risk and an associated reliability. Another embodiment of the invention communicates the risk and associated reliability in a manner for efficient human comprehension, especially in a distracting environment. See, U.S. Pat. Nos. 6,201,493; 5,977,884; 6,118,403; 5,982,325; 5,485,161; WO0077539, each of which is expressly incorporated herein by reference, and the Uniden GPSRD (see Uniden GPSRD User's Manual, expressly incorporated herein by reference). See, also U.S. Pat. Nos. 5,650,770; 5,450,329; 5,504,482; 5,504,491; 5,539,645; 5,929,753; 5,983,161; 6,084,510; 6,255,942; 6,225,901; 5,959,529; 5,752,976; 5,748,103; 5,720,770; 6,005,517; 5,805,055; 6,147,598; 5,687,215; 5,838,237; 6,044,257; 6,144,336; 6,285,867; 6,340,928; 6,356,822; 6,353,679 each of which is expressly incorporated herein by reference.

Statistical Analysis

It is understood that the below analysis and analytical tools, as well as those known in the art, may be used individually, in sub-combination, or in appropriate combination, to achieve the goals of the invention. These techniques may be implemented in dedicated or reprogrammable/general purpose hardware, and may be employed for low level processing of signals, such as in digital signal processors, within an operating system or dynamic linked libraries, or within application software. Likewise, these techniques may be applicable, for example, to low level data processing, system-level data processing, or user interface data processing.

A risk and reliability communication system may be useful, for example, to allow a user to evaluate a set of events in statistical context. Most indicators present data by means of a logical indicator or magnitude, as a single value. Scientific displays may provide a two-dimensional display of a distribution, but these typically require significant user focus to comprehend, especially where a multimodal distribution is represented. User displays of a magnitude or binary value typically do not provide any information about a likelihood of error. Thus, while a recent positive warning of the existence of an event may be a reliable indicator of the actual existence of the event, the failure to warn of an event does not necessarily mean that the event does not exist. Further, as events age, their reliability often decreases.

A Bayesian network is a representation of the probabilistic relationships among distinctions about the world. Each distinction, sometimes called a variable, can take on one of a mutually exclusive and exhaustive set of possible states. Associated with each variable in a Bayesian network is a set of probability distributions. Using conditional probability notation, the set of probability distributions for a variable can be denoted by $p(x_i|\pi_i, X)$, where "p" refers to the probability distribution, where "$\pi_i$" denotes the parents of variable $X_i$ and where "X" denotes the knowledge of the expert. The Greek letter "X" indicates that the Bayesian network reflects the knowledge of an expert in a given field. Thus, this expression reads as follows: the probability distribution for variable $X_i$ given the parents of $X_i$ and the knowledge of the expert. For example, $X_1$ is the parent of $X_2$. The probability distributions specify the strength of the relationships between variables. For instance, if $X_i$ has two states (true and false), then associated with $X_i$ is a single probability distribution $p(x_1|X)p$ and associated with $X_2$ are two probability distributions $p(x_i|X_1=t, X)$ and $p(x_i|X_2=t, X)$.

A Bayesian network is expressed as an acyclic-directed graph where the variables correspond to nodes and the relationships between the nodes correspond to arcs. The arcs in a Bayesian network convey dependence between nodes. When there is an arc between two nodes, the probability distribution of the first node depends upon the value of the second node when the direction of the arc points from the second node to the first node. Missing arcs in a Bayesian network convey conditional independencies. However, two variables indirectly connected through intermediate variables are conditionally dependent given lack of knowledge of the values ("states") of the intermediate variables. In other words, sets of variables X and Y are said to be conditionally independent, given a set of variables Z, if the probability distribution for X given Z does not depend on Y. If Z is empty, however, X and Y are said to be "independent" as opposed to conditionally independent. If X and Y are not conditionally independent, given Z, then X and Y are said to be conditionally dependent given Z.

The variables used for each node may be of different types. Specifically, variables may be of two types: discrete or continuous. A discrete variable is a variable that has a finite or countable number of states, whereas a continuous variable is a variable that has an effectively infinite number of states. An example of a discrete variable is a Boolean variable. Such a variable can assume only one of two states: "true" or "false." An example of a continuous variable is a variable that may assume any real value between −1 and 1. Discrete variables have an associated probability distribution. Continuous variables, however, have an associated probability density function ("density"). Where an event is a set of possible outcomes, the density p(x) for a variable "x" and events "a" and "b" is defined as:

$$p(x) = \lim_{a \to b} \left[ \frac{p(a \leq x \leq b)}{|(a-b)|} \right],$$

where p(a≤x≤b) is the probability that x lies between a and b. Conventional systems for generating Bayesian networks cannot use continuous variables in their nodes.

There are two conventional approaches for constructing Bayesian networks. Using the first approach ("the knowledge-based approach"), first the distinctions of the world that are important for decision making are determined. These distinctions correspond to the variables of the domain of the Bayesian network. The "domain" of a Bayesian network is the set of all variables in the Bayesian network. Next the dependencies among the variables (the arcs) and the probability distributions that quantify the strengths of the dependencies are determined.

In the second approach ("called the data-based approach"), the variables of the domain are first determined. Next, data is accumulated for those variables, and an algorithm is applied that creates a Bayesian network from this data. The accumulated data comes from real world instances of the domain. That is, real world instances of decision making in a given field. Conventionally, this second approach exists for domains containing only discrete variables.

U.S. application Ser. No. 08/240,019 filed May 9, 1994 entitled "Generating Improved Belief Networks" describes a system and method for generating Bayesian networks (also known as "belief networks") that utilize both expert data received from an expert ("expert knowledge") and data received from real world instances of decisions made ("empirical data"). By utilizing both expert knowledge and empirical data, the network generator provides an improved Bayesian network that may be more accurate than conventional Bayesian networks or provide other advantages, e.g., ease of implementation and lower reliance on "expert" estimations of probabilities. Likewise, it is known to initiate a network using estimations of the probabilities (and often the relevant variables), and subsequently use accumulated data to refine the network to increase its accuracy and precision.

Expert knowledge consists of two components: an equivalent sample size or sizes ("sample size"), and the prior probabilities of all possible Bayesian-network structures ("priors on structures"). The effective sample size is the effective number of times that the expert has rendered a specific decision. For example, a doctor with 20 years of experience diagnosing a specific illness may have an effective sample size in the hundreds. The priors on structures refers to the confidence of the expert that there is a relationship between variables (e.g., the expert is 70% sure that two variables are related). The priors on structures can be decomposed for each variable-parent pair known as the "prior probability" of the variable-parent pair. Empirical data is typically stored in a database. The database may contain a list of the observed state of some or all of the variables in the Bayesian network. Each data entry constitutes a case. When one or more variables are unobserved in a case, the case containing the unobserved variable is said to have "missing data." Thus, missing data refers to when there are cases in the empirical data database that contain no observed value for one or more of the variables in the domain. An assignment of one state to each variable in a set of variables is called an "instance" of that set of variables. Thus, a "case" is an instance of the domain. The "database" is the collection of all cases.

Therefore, it is seen that Bayesian networks can be used to probabilistically model a problem, in a mathematical form. This model may then be analyzed to produce one or more outputs representative of the probability that a given fact is true, or a probability density distribution that a variable is at a certain value.

A review of certain statistical methods is provided below for the convenience of the reader, and is not intended to limit the scope of methods, of statistical of other type, which may be employed in conjunction with the system and method according to the present invention. It is understood that these mathematical models and methods may be implemented in known manner on general purpose computing platforms, for example as a compiled application in a real-time operating system such as RT Linux, QNX, versions of Microsoft Windows, or the like. Further, these techniques may be implemented as applets operating under Matlab or other scientific computing platform. Alternately, the functions may be implemented natively in an embedded control system or on a microcontroller.

It is also understood that, while the mathematical methods are capable of producing precise and accurate results, various simplyfying presumptions and truncations may be employed to increase the tractability of the problem to be solved. Further, the outputs generally provided according to preferred embodiments of the present invention are relatively low precision, and therefore higher order approximation of the analytic solution, in the case of a rapidly convergent calculation, will often be sufficient.

A time domain process demonstrates a Markov property if the conditional probability density of the current event, given all present and past events, depends only on the jth most recent events. If the current event depends solely on the most recent past event, then the process is a first order Markov process. There are three key problems in HMM use: evaluation, estimation, and decoding. The evaluation problem is that given an observation sequence and a model, what is the probability that the observed sequence was generated by the model (Pr(O|λ)). If this can be evaluated for all competing models for an observation sequence, then the model with the highest probability can be chosen for recognition. Pr(O|λ) can be calculated several ways. The naive way is to sum the probability over all the possible state sequences in a model for the observation sequence:

$$Pr(O|\lambda) = \sum_{allS} \prod_{t=1}^{T} a_{s_{t-1}s_t} b_{s_t}(O_t).$$

However, this method is exponential in time, so the more efficient forward-backward algorithm is used in practice. The following algorithm defines the forward variable α and uses it to generate $Pr(O|\lambda)$ (π are the initial state probabilities, a are the state transition probabilities, and b are the output probabilities).

$a_1(i)=\pi_i b_i(O_i)$, for all states i (if $$i \in S_I, \pi_i = \frac{1}{a_I};$$

otherwise $\pi_i=0$)

Calculating α( ) along the time axis, for t=2, . . . , T, and all states j, compute $$\alpha_i(j) = \left[\sum_i \alpha_{i-1}(i)\alpha_{ij}\right]b_j(O_i)$$

Final probability is given by $$Pr(O|\lambda) = \sum_{i \in Sp} \alpha_T(i)$$

The $1^{st}$ step initializes the forward variable with the initial probability for all states, while the second step inductively steps the forward variable through time. The final step gives the desired result $Pr(O|\lambda)$, and it can be shown by constructing a lattice of states and transitions through time that the computation is only order $O(N^2T)$. The backward algorithm, using a process similar to the above, can also be used to compute $Pr(O|\lambda)$ and defines the convenience variable β.

The estimation problem concerns how to adjust λ to maximize $Pr(O|\lambda)$ given an observation sequence O. Given an initial model, which can have flat probabilities, the forward-backward algorithm allows us to evaluate this probability. All that remains is to find a method to improve the initial model. Unfortunately, an analytical solution is not known, but an iterative technique can be employed.

Using the actual evidence from the training data, a new estimate for the respective output probability can be assigned:

$$\bar{b}_j(k) = \frac{\sum t \in O_t = v_k \gamma_t(j)}{\sum_{t=1}^T \gamma_t(j)}$$

where $\gamma_t(i)$ is defined as the posterior probability of being in state i at time t given the observation sequence and the model. Similarly, the evidence can be used to develop a new estimate of the probability of a state transition ($\bar{\alpha}_{ij}$) and initial state probabilities ($\bar{\pi}_i$).

Thus all the components of model (λ) can be re-estimated. Since either the forward or backward algorithm can be used to evaluate $Pr(O|\lambda)$ versus the previous estimation, the above technique can be used iteratively to converge the model to some limit. While the technique described only handles a single observation sequence, it is easy to extend to a set of observation sequences.

The Hidden Markov Model is a finite set of states, each of which is associated with a (generally multidimensional) probability distribution jedlik.phy.bme.hu/~gerjanos/HMM/node4.html—r4#r4. Transitions among the states are governed by a set of probabilities called transition probabilities. In a particular state an outcome or observation can be generated, according to the associated probability distribution. It is only the outcome, not the state visible to an external observer and therefore states are "hidden" to the outside; hence the name Hidden Markov Model.

In order to define an HMM completely, following elements are needed.

The number of states of the model, N

The number of observation symbols in the alphabet, M If the observations are continuous then M is infinite.

A set of state transition probabilities $\Lambda=\{a_{ij}\}a_{ij}=p\{q_{t+1}=j|q_t=i\}$, $1 \leq i, j \leq N$, where $q_t$ denotes the current state.

Transition probabilities should satisfy the normal stochastic constraints, $a_{ij} \geq 0$, $1 \leq i, j \leq N$ and $$\sum_{j=1}^N a_{ij} = 1, 1 \leq i \leq N$$

A probability distribution in each of the states, $B=\{b_j(k)\}$, $b_{j(k)}=p\{o_t=v_k|q_t=j\}$, $1 \leq j \leq N$, $1 \leq k \leq M$ where $v_k$ denotes the $k^{th}$ observation symbol in the alphabet, and $o_t$ the current parameter vector.

Following stochastic must be satisfied. $b_j \geq 0$, $1 \leq j \leq N$, $1 \leq k \leq M$ and $$\sum_{k=1}^M b_{j(k)} = 1, 1 \leq j \leq N$$

If the observations are continuous then we will have to use a continuous probability density function, instead of a set of discrete probabilities. In this case we specify the parameters of the probability density function. Usually the probability density is approximated by a weighted sum of M Gaussian distributions $$N, b_b(o_t) = \sum_{m=1}^M c_{jm}\mathcal{N}\left(\mu_{jm}, \sum_{jm}, o_t\right),$$

where, $c_{jm}$=weighting coefficients, $\mu_{jm}$=mean vectors, $\Sigma_{jm}$=Covariance matrices, $c_{jm}$ should satisfy the stochastic constrains, $c_{jm} \geq 1$, $1 \leq j \leq N$, $1 \leq m \leq M$, and $$\sum_{m=1}^M c_{jm} = 1, 1 \leq j \leq N.$$

The initial state distribution, $\pi=\{\pi_i\}$, where, $\pi_i=p\{=q_1=i\}$, $1 \leq i \leq N$ Therefore, we can use the compact notation $\lambda=(\Lambda, B, \pi)$ to denote an HMM with discrete probability distributions, while $\lambda=(\Lambda, c_{jm}, \mu_{jm}, \Sigma_{jm}, \pi)$ to denote one with continuous densities. For the sake of mathematical and computational tractability, following assumptions are made in the theory of HMMs.

(1) The Markov assumption: As given in the definition of HMMs, transition probabilities are defined as, $a_{ij}=p\{q_{t+1}=j|q_t=i\}$. In other words it is assumed that the next state is dependent only upon the current state. This is called the Markov assumption and the resulting model becomes actually a first order HMM. However generally the next state may depend on past k states and it is possible to obtain a such model, called an $k^{th}$ order HMM by defining the transition probabilities as follows.

$$a_{i_1 i_2 \ldots i_k j} = p\{q_{t+1}=j | q_t=i_1, q_{t-1}=i_2, \ldots, q_{t-k+1}=i_k\},$$
$$1 \le i_1, i_2, \ldots, i_k, j \le N.$$

But it is seen that a higher order HMM will have a higher complexity. Even though the first order HMMs are the most common, some attempts have been made to use the higher order HMMs too.

(2) The stationarity assumption: Here it is assumed that state transition probabilities are independent of the actual time at which the transitions takes place. Mathematically, $p\{q_{t_1+1}=j|q_{t_1}=i\}=p\{q_{t_2+1}=j|q_{t_2}=i\}$, for any $t_1$ and $t_2$.

(3) The output independence assumption

This is the assumption that current output (observation) is statistically independent of the previous outputs (observations). We can formulate this assumption mathematically, by considering a sequence of observations, $O=o_1, o_2, \ldots, o_T$. Then according to the assumption for an HMM $$\lambda, p\{O|q_1, q_2, \ldots, q_T, \lambda\} = \prod_{t=1}^{T} p(o_t|q_t, \lambda).$$

However unlike the other two, this assumption has a very limited validity. In some cases this assumption may not be fair enough and therefore becomes a severe weakness of the HMMs. A Hidden Markov Model (HMM) is a Markov chain, where each state generates an observation. You only see the observations, and the goal is to infer the hidden state sequence. HMMs are very useful for time-series modeling, since the discrete state-space can be used to approximate many non-linear, non-Gaussian systems. HMMs and some common variants (e.g., input-output HMMs) can be concisely explained using the language of Bayesian Networks, as we now demonstrate. Consider the Bayesian network in FIG. 1, which represents a hidden Markov model (HMM). (Circles denote continuous-valued random variables, squares denote discrete-valued, clear means hidden, shaded means observed.) This encodes the joint distribution P(Q, Y)=P(Q$_1$)P(Y$_1$|Q$_1$)P(Q$_2$|Q$_1$)P(Y$_2$|Q$_2$) . . . . For a sequence of length T, we simply "unroll" the model for T time steps. In general, such a dynamic Bayesian network (DBN) can be specified by just drawing two time slices (this is sometimes called a 2TBN)—the structure (and parameters) are assumed to repeat. The Markov property states that the future is independent of the past given the present, i.e., Q$_{\{t+1\}}$\indep Q$_{\{t-1\}}$|Q$_t$. We can parameterize this Markov chain using a transition matrix, M$_{ij}$=P(Q$_{\{t+1\}}$=j|Q$_t$=i), and a prior distribution, $\pi_i$=P(Q$_1$=i).

Figure 2:
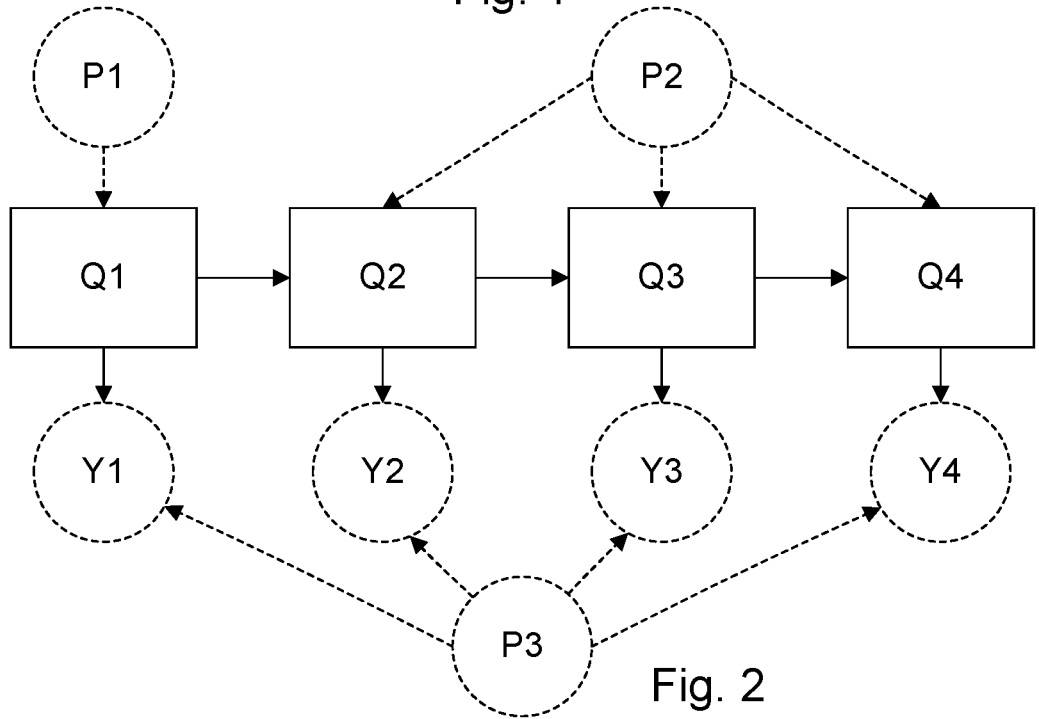
FIG. 2 shows a Markov chain.

Assume that this is a homogeneous Markov chain, i.e., the parameters do not vary with time. This assumption can be made explicit by representing the parameters as nodes: see FIG. 2: P1 represents $\pi$, P2 represents the transition matrix, and P3 represents the parameters for the observation model. If these parameters are random variables (as in the Bayesian approach), parameter estimation becomes equivalent to inference. If the parameters are fixed, but unknown, quantities, parameter estimation requires a separate learning procedure (usually EM). In the latter case, the parameters are not typically represented in the graph; shared parameters (as in this example) are implemented by specifying that the corresponding CPDs are "tied".

Figure 3:
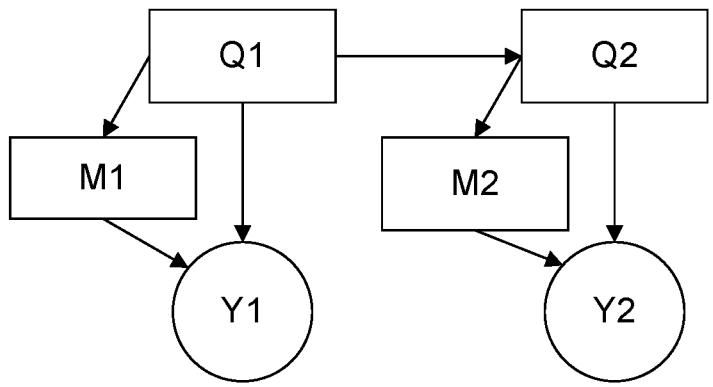
FIG. 3 shows a model of the output of a Markov chain as a mixture of Gaussians.

An HMM is a hidden Markov model because we don't see the states of the Markov chain, $Q_t$, but just a function of them, namely $Y_t$. For example, if $Y_t$ is a vector, we might define $P(Y_t=y|Q_t=i)=N(y, \mu_i \sigma_i)$. A richer model, widely used in speech recognition, is to model the output (conditioned on the hidden state) as a mixture of Gaussians. This is shown in FIG. 3. Some popular variations on the basic HMM theme are illustrated in FIGS. 4A, 4B and 4C, which represent, respectively, an input-output HMM, a factorial HMM, and a coupled HMM. (In the input-output model, the CPD P(Q|U) could be a softmax function, or a neural network.) Software is available to handle inference and learning in general Bayesian networks, making all of these models trivial to implement. It is noted that the parameters may also vary with time. This does not violate the presumptions inherent in an HMM, but rather merely complicates the analysis since a static simplifying presumption may not be made. A discrete-time, discrete-space dynamical system governed by a Markov chain emits a sequence of observable outputs: one output (observation) for each state in a trajectory of such states. From the observable sequence of outputs, we may infer the most likely dynamical system. The result is a model for the underlying process. Alternatively, given a sequence of outputs, we can infer the most likely sequence of states. We might also use the model to predict the next observation or more generally a continuation of the sequence of observations.

The Evaluation Problem and the Forward Algorithm: We have a model $\lambda=(\Lambda, B, \pi)$ and a sequence of observations $O=o_1, o_2, \ldots, o_T$, and $p\{O|\lambda\}$ must be found. We can calculate this quantity using simple probabilistic arguments. But this calculation involves number of operations in the order of $N^T$. This is very large even if the length of the sequence, T is moderate. Therefore we have to look for another method for this calculation. Fortunately there exists one which has a considerably low complexity and makes use an auxiliary variable, $\alpha_t(i)$ called forward variable.

The forward variable is defined as the probability of the partial observation sequence $o_1, o_2, \ldots, o_T$, when it terminates at the state i. Mathematically, $$\alpha_t(i)=p\{o_1,o_2,\ldots,o_t,q_t=i|\lambda\} \qquad 1.1$$

Then it is easy to see that following recursive relationship holds.

$$\alpha_{t+1}(j) = b_j(o_{t+1}) \sum_{i=1}^{N} \alpha_t(i) a_{ij}, \; 1 \le j \le N, \; 1 \le t \le T-1 \qquad 1.2$$

where, $\alpha_1(j)=\pi_j b_j(o_1)$, $1 \le j \le N$. Using this recursion we can calculate $\alpha_{T(i)}$, $1 \le i \le N$ and the required probability is given by $$p\{O|\lambda\} = \sum_{i=1}^{N} \alpha_T(i). \qquad 1.3$$

The complexity of this method, known as the forward algorithm is proportional to $N^2 T$, which is linear with respect to T whereas the direct calculation mentioned earlier, had an exponential complexity. In a similar way we can define the backward variable $\beta_t(i)$ as the probability of the partial observation sequence $o_{t+1}, o_{t+2}, \ldots, o_T$, given that the current state is i. Mathematically, $$\beta_t(i) = p\{o_{t+1}, o_{t+2}, \ldots, o_T | q_t = i, \lambda\} \quad 1.4$$

As in the case of $\alpha_t(i)$ there is a recursive relationship which can be used to calculate $\beta_t(i)$ efficiently.

$$\beta_t(i) = \sum_{j=1}^{N} \beta_{t+1}(j) a_{ij} b_j(o_{t+1}), \ 1 \le t \le T-1 \quad 1.5$$

where, $\beta_T(i) = 1$, $1 \le i \le N$.
Further we can see that, $$\alpha_t(i)\beta_t(i) = p\{O, q_t = i | \lambda\}, \ 1 \le i \le N, \ 1 \le t \le T \quad 1.6$$

Therefore this gives another way to calculate $p\{O|\lambda\}$, by using both forward and backward variables as given in eqn. 1.7. See, jedlik.phy.bme.hu/~gerjanos/HMM/, expressly incorporated herein by reference.

$$p\{O|\lambda\} = \sum_{i=1}^{N} p\{O, q_t = i | \lambda\} = \sum_{i=1}^{N} \alpha_t(i)\beta_t(i) \quad 1.7$$

Eqn. 1.7 is very useful, specially in deriving the formulas required for gradient based training.

The Decoding Problem and the Viterbi Algorithm: While the estimation and evaluation processes described above are sufficient for the development of an HMM system, the Viterbi algorithm provides a quick means of evaluating a set of HMM's in practice as well as providing a solution for the decoding problem. In decoding, the goal is to recover the state sequence given an observation sequence. The Viterbi algorithm can be viewed as a special form of the forward-backward algorithm where only the maximum path at each time step is taken instead of all paths. This optimization reduces computational load and allows the recovery of the most likely state sequence. The steps to the Viterbi are: Initialization. For all states i, $\delta_1(i) = \pi_i b_i(O_1)$; $\psi_1(i) = 0$; Recursion. From t=2 to T and for all states j, $\delta_t(j) = \text{Max}_i[\delta_{t-1}(i) a_{ij}] b_j(O_t)$; $\psi_t(j) = \arg \max_i[(\delta_{t-1}(i) a_{ij}]$; Termination. $P = \text{Max}_{s \in S_p}[\delta_T(s)]$; $s_T = \arg \max_{s \in S_p}[\delta_T(s)]$; Recovering the state sequence. From t=T-1 to 1, $s_t = \psi_{t+1}(s_{t+1})$.

In many HMM system implementations, the Viterbi algorithm is used for evaluation at recognition time. Note that since Viterbi only guarantees the maximum of $Pr(O,S|\lambda)$ over all state sequences S (as a result of the first order Markov assumption) instead of the sum over all possible state sequences, the resultant scores are only an approximation.

So far the discussion has assumed some method of quantization of feature vectors into classes. However, instead of using vector quantization, the actual probability densities for the features may be used. Baum-Welch, Viterbi, and the forward-backward algorithms can be modified to handle a variety of characteristic densities. In this context, however, the densities will be assumed to be Gaussian. Specifically, $$b_j(O_t) = \frac{1}{\sqrt{(2\pi)^d |\sigma_j|}} e^{\frac{1}{2}(O_t - \mu_j)^t \sigma_j^{-1}(O_t - \mu_j)}$$

Initial estimations of $\mu$ and $\sigma$ may be calculated by dividing the evidence evenly among the states of the model and calculating the mean and variance in the normal way. Whereas flat densities were used for the initialization step before, the evidence is used here. Now all that is needed is a way to provide new estimates for the output probability. We wish to weight the influence of a particular observation for each state based on the likelihood of that observation occurring in that state. Adapting the solution from the discrete case yields $$\overline{\mu}_j = \frac{\sum_{t=1}^{T} \gamma_t(j) O_t}{\sum_{t=1}^{T} \gamma_t(j)}$$

and $$\overline{\sigma}_j = \frac{\sum_{t=1}^{T} \gamma_t(j)(O_t - \overline{\mu}_j)(O_t - \overline{\mu}_j)^t}{\sum_{t=1}^{T} \gamma_t(j)}$$

For convenience, $\mu_j$ is used to calculate $\overline{\sigma}_j$ instead of the re-estimated $\overline{\mu}_j$. While this is not strictly proper, the values are approximately equal in contiguous iterations and seem not to make an empirical difference. See, www-white.media.mit.edu/~testarne/asl/asl-tr375, expressly incorporated herein by reference. Since only one stream of data is being used and only one mixture (Gaussian density) is being assumed, the algorithms above can proceed normally, incorporating these changes for the continuous density case. We want to find the most likely state sequence for a given sequence of observations, $O = o_1, o_2, \ldots, o_T$ and a model, $\lambda = (A, B, \pi)$. The solution to this problem depends upon the way "most likely state sequence" is defined. One approach is to find the most likely state $q_t$ at t=t and to concatenate all such '$q_t$'s. But sometimes, this method does not give a physically meaningful state sequence. Therefore we would seek another method which has no such problems. In this method, commonly known as Viterbi algorithm, the whole state sequence with the maximum likelihood is found. In order to facilitate the computation we define an auxiliary variable, $$\delta_t(i) = \max_{q_1 q_2 \ldots q_{t-1}} p\{q_1, q_2, \ldots, q_{t-1}, q_t = i, o_1, o_2, \ldots, o_{t-1} | \lambda\},$$

which gives the highest probability that partial observation sequence and state sequence up to t=t can have, when the current state is i. It is easy to observe that the following recursive relationship holds.

$$\delta_{t+1}(j) = b_j(o_{t+1}) \left[\max_{1 \le i \le N} \delta_t(i) a_{ij}\right], \ 1 \le i \le N, \ 1 \le t \le T-1 \quad 1.8$$

where, $\delta_1(j) = \pi_j b_j(o_1), \ 1 \le j \le N$

So the procedure to find the most likely state sequence starts from calculation of $\delta_T(j)$, $1 \le j \le N$ using recursion in 1.8, while always keeping a pointer to the "winning state" in the maximum finding operation. Finally the state j*, is found where $$j^* = \arg\max_{1 \le j \le N} \delta_T(j),$$

and starting from this state, the sequence of states is backtracked as the pointer in each state indicates. This gives the required set of states.

This whole algorithm can be interpreted as a search in a graph whose nodes are formed by the states of the HMM in each of the time instant t, $1 \leq t \leq T$.

The Learning Problem: Generally, the learning problem is how to adjust the HMM parameters, so that the given set of observations (called the training set) is represented by the model in the best way for the intended application. Thus it would be clear that the "quantity" we wish to optimize during the learning process can be different from application to application. In other words there may be several optimization criteria for learning, out of which a suitable one is selected depending on the application. There are two main optimization criteria found in ASR literature; Maximum Likelihood (ML) and Maximum Mutual Information (MMI). The solutions to the learning problem under each of those criteria is described below.

Maximum Likelihood (ML) criterion: In ML we try to maximize the probability of a given sequence of observations $O^W$, belonging to a given class w, given the HMM $\lambda_w$ of the class w, with respect to the parameters of the model $\lambda_w$. This probability is the total likelihood of the observations and can be expressed mathematically as $L_{tot}=p\{O^W|\lambda_w\}$.

However since we consider only one class w at a time we can drop the subscript and superscript 'w's. Then the ML criterion can be given as, $$L_{tot}=p\{O|\lambda\} \qquad 1.9$$

However there is no known way to analytically solve for the model $\lambda=(\Lambda, B, \pi)$, which maximize the quantity $L_{tot}$. But we can choose model parameters such that it is locally maximized, using an iterative procedure, like Baum-Welch method or a gradient based method, which are described below.

Baum-Welch Algorithm: This method can be derived using simple "occurrence counting" arguments or using calculus to maximize the auxiliary quantity $$Q(\lambda, \bar{\lambda}) = \sum_q p\{q|O, \lambda\} \log\left[p\{O, q, \bar{\lambda}\}\right]$$

over $\bar{\lambda}$ [jedlik.phy.bme.hu/~gerjanos/HMM/node11.html—r4#r4], [jedlik.phy.bme.hu/~gerjanos/HMM/node11.html—r21#r21, p 344-346,]. A special feature of the algorithm is the guaranteed convergence.

To describe the Baum-Welch algorithm, (also known as Forward-Backward algorithm), we need to define two more auxiliary variables, in addition to the forward and backward variables defined in a previous section. These variables can however be expressed in terms of the forward and backward variables.

First one of those variables is defined as the probability of being in state i at t=t and in state j at t=t+1. Formally, $$\xi_t(i,j)=p\{q_t=i,q_{t+1}=j|O,\lambda\} \qquad 1.10$$

This is the same as, $$\xi_t(i,j) = \frac{p\{q_t=i, q_{t+1}=j|O, \lambda\}}{p\{O|\lambda\}} \qquad 1.11$$

Using forward and backward variables this can be expressed as, $$\xi_t(i,j) = \frac{\alpha_t(i)a_{ij}\beta_{t+1}(j)b_j(o_{t+1})}{\sum_{i=1}^{N}\sum_{j=1}^{N}\alpha_t(i)a_{ij}\beta_{t+1}(j)b_j(o_{t+1})} \qquad 1.12$$

The second variable is the a posteriori probability, $$\lambda_t(i)=p\{q_t=i|O,\lambda\} \qquad 1.13$$

that is the probability of being in state i at t=t, given the observation sequence and the model. In forward and backward variables this can be expressed by, $$\gamma_t(i) = \left[\frac{\alpha_t(i)\beta_t(i)}{\sum_{i=1}^{N}\alpha_t(i)\beta_t(i)}\right] \qquad 1.14$$

One can see that the relationship between $\gamma_t(i)$ and $\xi_t(i,j)$ is given by, $$\gamma_t(i) = \sum_{j=1}^{N}\xi_t(i,j), \ 1 \leq i \leq N, \ 1 \leq t \leq M \qquad 1.15$$

Now it is possible to describe the Baum-Welch learning process, where parameters of the HMM is updated in such a way to maximize the quantity, $p\{O|\lambda\}$. Assuming a starting model $\lambda=(\Lambda,B,\pi)$, we calculate the '$\alpha$'s and '$\beta$'s using the recursions 1.5 and 1.2, and then '$\xi$'s and '$\gamma$'s using 1.12 and 1.15. Next step is to update the HMM parameters according to eqns 1.16 to 1.18, known as re-estimation formulas.

$$\bar{\pi}_i = \lambda_1(i), \ 1 \leq i \leq N, \qquad 1.16$$

$$\bar{a}_{ij} = \frac{\sum_{t=1}^{T-1}\xi_t(i,j)}{\sum_{t=1}^{T-1}\gamma_t(i)}, \ 1 \leq i \leq N, \ 1 \leq j \leq N, \qquad 1.17$$

$$\bar{b}_j(k) = \frac{\sum_{\substack{t=1\\o_t=v_k}}^{T}\lambda_t(j)}{\sum_{t=1}^{T}\gamma_t(j)}, \ 1 \leq j \leq N, \ 1 \leq k \leq M \qquad 1.18$$

These reestimation formulas can easily be modified to deal with the continuous density case too.

Gradient based method: In the gradient based method, any parameter $\Theta$ of the HMM $\lambda$ is updated according to the standard formula, $$\Theta^{new} = \Theta^{old} - \eta\left[\frac{\partial J}{\partial \Theta}\right]_{\Theta=\Theta_{old}} \qquad 1.19$$

where J is a quantity to be minimized. We define in this case, $$J=E_{ML}=-\log(p\{O|\lambda\})=-\log(L_{tot}) \qquad 1.20$$

Since the minimization of $J=E_{ML}$ is equivalent to the maximization of $L_{tot}$, eqn. 1.19 yields the required optimization criterion, ML. But the problem is to find the derivative $$\frac{\partial J}{\partial \Theta}$$

for any parameter $\Theta$ of the model. This can be easily done by relating J to model parameters via $L_{tot}$. As a key step to do so, using the eqns. 1.7 and 1.9 we can obtain, $$L_{tot} = \sum_{i=1}^{N} p\{O, q_t = i|\lambda\} = \sum_{i=1}^{N} \alpha_t(i)\beta_t(i) \quad 1.21$$

Differentiating the last equality in eqn. 1.20 with respect to an arbitrary parameter $$\Theta, \frac{\partial J}{\partial \Theta} = -\frac{1}{L_{tot}} \frac{\partial L_{tot}}{\partial \Theta} \quad 1.22$$

Eqn. 1.22 gives $$\frac{\partial J}{\partial \Theta},$$

if we know $$\frac{\partial L_{tot}}{\partial \Theta}$$

which can be found using eqn. 1.21. However this derivative is specific to the actual parameter concerned. Since there are two main parameter sets in the HMM, namely transition probabilities $\alpha_{ij}$, $1 \leq i$, $j \leq N$ and observation probabilities $b_j(k)$, $1 \leq j \leq N$, $1 \leq k \leq M$, we can find the derivative $$\frac{\partial L_{tot}}{\partial \Theta}$$

for each of the parameter sets and hence the gradient, $$\frac{\partial J}{\partial \Theta}.$$

Gradient with respect to transition probabilities: Using the chain rule, $$\frac{\partial L_{tot}}{\partial a_{ij}} = \sum_{t=1}^{T} \frac{\partial L_{tot}}{\partial \alpha_t(j)} \frac{\partial \alpha_t(j)}{\partial a_{ij}} \quad 1.23$$

By differentiating eqn. 1.21 with respect to $\alpha_t(j)$ we get, $$\frac{\partial L_{tot}}{\partial \alpha_t(j)} = \beta_t(j), \quad 1.24$$

and differentiating (a time shifted version of) eqn 1.2 with respect to $\alpha_{ij}$, $$\frac{\partial \alpha_t(j)}{\partial a_{ij}} = b_j(o_t)\alpha_{t-1}(i) \quad 1.25$$

Eqns. 1.23, 1.24 and 1.25 give, $$\frac{\partial L_{tot}}{\partial a_{ij}},$$

and substituting this quantity in eqn. 1.22 (keeping in mind that $\Theta=a_{ij}$ in this case), we get the required result, $$\frac{\partial J}{\partial a_{ij}} = -\frac{1}{L_{tot}} \sum_{t=1}^{T} \beta_t(j) b_j(o_t) \alpha_{t-1}(i) \quad 1.26$$

Gradient with respect to observation probabilities: Using the chain rule, $$\frac{\partial L_{tot}}{\partial b_j(o_t)} = \frac{\partial L_{tot}}{\partial \alpha_t(j)} \frac{\partial \alpha_t(j)}{b_j(o_t)} \quad 1.27$$

Differentiating (a time shifted version of) the eqn. 1.2 with respect to $b_j(o_t)$, $$\frac{\partial \alpha_t(j)}{\partial b_j(o_t)} = \frac{\alpha_t(j)}{b_j(o_t)} \quad 1.28$$

Finally we get the required probability, by substituting for $$\frac{\partial L_{tot}}{\partial b_j(o_t)}$$

in eqn. 1.22 (keeping in mind that $\Theta=b_j(o_t)$ in this case), which is obtained by substituting eqns. 1.28 and 1.24 in eqn. 1.27.

$$\frac{\partial J}{\partial b_j(o_t)} = -\frac{1}{L_{tot}} \frac{\alpha_t(j)\beta_t(j)}{b_j(o_t)} \quad 1.29$$

Usually this is given the following form, by first substituting for $L_{tot}$ from eqn. 1.21 and then substituting from eqn. 1.14.

$$\frac{\partial J}{\partial b_j(o_t)} = \frac{\gamma_t(j)}{b_j(o_t)}, \quad 1.30$$

If the continuous densities are used then $$\frac{\partial J}{\partial c_{jm}}, \frac{\partial J}{\partial \mu_{jm}},$$

and $$\frac{\partial J}{\partial \Sigma_{jm}}$$

can be found by further propagating the derivative $$\frac{\partial J}{\partial b_j(o_t)}$$

using the chain rule. The same method can be used to propagate the derivative (if necessary) to a front end processor of the HMM. This will be discussed in detail later.

Maximum Mutual Information (MMI) Criterion

In ML we optimize an HMM of only one class at a time, and do not touch the HMMs for other classes at that time. This procedure does not involve the concept "discrimination" which is of great interest in Pattern Recognition. Thus, the ML learning procedure gives a poor discrimination ability to the HMM system, specially when the estimated parameters (in the training phase) of the HMM system do not match with the inputs used in the recognition phase. This type of mismatches can arise due to two reasons. One is that the training and recognition data may have considerably different statistical properties, and the other is the difficulties of obtaining reliable parameter estimates in the training.

The MMI criterion on the other hand consider HMMs of all the classes simultaneously, during training. Parameters of the correct model are updated to enhance it's contribution to the observations, while parameters of the alternative models are updated to reduce their contributions. This procedure gives a high discriminative ability to the system and thus MMI belongs to the so called "discriminative training" category.

In order to have a closer look at the MMI criterion, consider a set of HMMs $\Lambda = \{\lambda_v, 1 \leq v \leq V\}$.

The task is to minimize the conditional uncertainty of a class v of utterances given an observation sequence $\hat{O}$ of that class. This is equivalent minimize the conditional information, with respect to $\Lambda$, $$I(v|\hat{O},\Lambda) = -\log p\{v|\hat{O},\Lambda\} \quad 1.31$$

In an information theoretical framework this leads to the minimization of conditional entropy, defined as the expectation ($E(\bullet)$) of the conditional information I, $$H(V|O) = E[I(v|\hat{O}] \quad 1.32$$

where V represents all the classes and O represents all the observation sequences. Then the mutual information between the classes and observations, $$H(V,O) = H(V) - H(V|O) \quad 1.33$$

become maximized; provided H(V) is constant. This is the reason for calling it Maximum Mutual Information (MMI) criterion. The other name of the method, Maximum A Posteriori (MAP) has the roots in eqn. 1.31 where the a posteriori probability $p\{v|\hat{O},\Lambda\}$ is maximized.

Even though the eqn. 1.31 defines the MMI criterion, it can be rearranged using the Bayes theorem to obtain a better insight, as in eqn. 1.34, where w represents an arbitrary class.

$$E_{MMI} = -\log p\{v|\hat{O},\Lambda\} = -\log \frac{p\{v,\hat{O},\Lambda\}}{p(\hat{O},\Lambda)} = -\log \frac{p\{v,\hat{O},\Lambda\}}{\sum_w p\{w,\hat{O},\Lambda\}} \quad 1.34$$

If we use an analogous notation as in eqn. 1.9, we can write the likelihoods, $$L_{tot}^{clamped} = p\{v,\hat{O}|\lambda\}, L_{tot}^{free} = \sum_w p\{w,\hat{O}|\lambda\} \quad 1.35, 1.36$$

In the above equations the superscripts damped and free are used to imply the correct class and all the other classes respectively.

If we substitute eqns. 1.35 and 1.36 in the eqn. 1.34, we get, $$E_{MMI} = -\log \frac{L_{tot}^{clamped}}{L_{tot}^{free}} \quad 1.37$$

As in the case of ML re-estimation [ ] or gradient methods can be used to minimize the quantity $E_{MMI}$. In the following a gradient based method, which again makes use of the eqn. 1.19, is described. Since $E_{MMI}$ is to be minimized, in this case $J = E_{MMI}$, and therefore J is directly given by eqn. 1.37. The problem then simplifies to the calculation of gradients $$\frac{\partial J}{\partial \Theta},$$

where $\Theta$ is an arbitrary parameter of the whole set of HMMs, $\Lambda$. This can be done by differentiating 1.37 with respect to $\Theta$, $$\frac{\partial J}{\partial \Theta} = \frac{1}{L_{tot}^{free}} \frac{\partial L_{tot}^{free}}{\partial \Theta} - \frac{1}{L_{tot}^{clamped}} \frac{\partial L_{tot}^{clamped}}{\partial \Theta} \quad 1.38$$

The same technique, as in the case of ML, can be used to compute the gradients of the likelihoods with respect to the parameters. As a first step likelihoods from eqns. 1.35 and 1.36, are expressed in terms of forward and backward variables using the form as in eqn. 1.7.

$$L_{tot}^{clamped} = \sum_{i \in class\ v} \alpha_t(i)\beta_t(i), L_{tot}^{free} = \sum_w \sum_{i \in class\ w} \alpha_t(i)\beta_t(i) \quad 1.39, 1.40$$

Then the required gradients can be found by differentiating eqns. 1.39 and 1.40. But we consider two cases; one for the transition probabilities and another for the observation probabilities, similar to the case of ML.

Gradient with respect to transition probabilities: Using the chain rule for any of the likelihoods, free or damped, $$\frac{\partial L_{tot}^{(\bullet)}}{\partial a_{ij}} = \sum_{t=1}^{T} \frac{\partial L_{tot}^{(\bullet)}}{\partial \alpha_t(j)} \frac{\partial \alpha_t(j)}{\partial a_{ij}} \qquad 1.41$$

Differentiating eqns. 1.39 and 1.40 with respect to $\alpha_t(j)$, to get two results for free and damped cases and using the common result in eqn. 1.25, we get substitutions for both terms on the right hand side of eqn. 1.41. This substitution yields two separate results for free and damped cases.

$$\frac{\partial L_{tot}^{clamped}}{\partial a_{ij}} = \delta_{kv} \sum_{t=1}^{T} \beta_t(j) b_j(o_t) \alpha_{t-1} \qquad 1.42$$

$i \in$ class $k$, where $\delta_{kv}$ is a Kronecker delta.

$$\frac{\partial L_{tot}^{free}}{\partial a_{ij}} = \sum_{t=1}^{T} \beta_t(j) b_j(o_t) \alpha_{t-1}(i) \qquad 1.43$$

Substitution of eqns. 1.42 and 1.43 in the eqn. 1.38 (keeping in mind that $\Theta = a_{ij}$ in this case) gives the required result, $$\frac{\partial J}{\partial a_{ij}} = \left[ \frac{1}{L_{tot}^{free}} - \frac{\delta_{kv}}{L_{tot}^{clamped}} \right] \sum_{t=1}^{T} \beta_t(j) b_j(o_t) \alpha_{t-1}(i), \qquad 1.44$$

Gradient with respect to observation probabilities: Using the chain rule for any of the likelihoods, free or damped, $$\frac{\partial L_{tot}^{(\bullet)}}{\partial b_j(o_t)} = \frac{\partial L_{tot}^{(\bullet)}}{\partial \alpha_t(j)} \frac{\partial \alpha_t(j)}{\partial b_j(o_t)} \qquad 1.45$$

Differentiating eqns. 1.39 and 1.40 with respect to $\alpha_t(j)$, to get two results for free and damped cases, and using the common result in eqn. 1.28, we get substitutions for both terms on the right hand side of eqn. 1.45. This substitution yields two separate results for free and damped cases.

$$\frac{\partial L_{tot}^{clamped}}{\partial b_j(o_t)} = \delta_{kv} \frac{\alpha_t(j) \beta_t(j)}{b_j(o_t)}, \text{ and } \frac{\partial L_{tot}^{free}}{\partial b_j(o_t)} = \frac{\alpha_t(j) \beta_t(j)}{b_j(o_t)}, \qquad 1.46, 1.47$$

$j \in$ class $k$ where $\delta_{kv}$ is Kronecker delta

Substitution of eqns. 1.46 and 1.47 in eqn. 1.38 we get the required result, $$\frac{\partial J}{\partial b_j(o_t)} = \left[ \frac{1}{L_{tot}^{free}} - \frac{\delta_{kv}}{L_{tot}^{clamped}} \right] \frac{\alpha_t(j) \beta_t(j)}{b_j(o_t)} \qquad 1.48$$

$j \in$ class $k$

This equation can be given a more aesthetic form by defining, $$\gamma_t(j)^{clamped} = \delta_{kv} \frac{\alpha_t(j) \beta_t(j)}{L_{tot}^{clamped}}, \text{ and } \gamma_t(j)^{free} = \frac{\alpha_t(j) \beta_t(j)}{L_{tot}^{clamped}}, \qquad 1.49, 1.50$$

$j \in$ class $k$ where $\delta_{kv}$ is Kronecker delta

With these variables we express the eqn. 1.48 in the following form.

$$\frac{\partial J}{\partial b_j(o_t)} = \frac{1}{b_j(o_t)} \left[ \lambda_t(j)^{free} - \lambda_t(j)^{clamped} \right] \qquad 1.51$$

This equation completely defines the update of observation probabilities. If however continuous densities are used then we can further propagate this derivative using the chain rule, in exactly the same way as mentioned in the case ML. Similar comments are valid also for preprocessors.

Training: We assume that the preprocessing part of the system gives out a sequence of observation vectors $O = \{o_1, o_2, \ldots, o_N\}$. Starting from a certain set of values, parameters of each of the HMMs $\lambda_i$, $1 \le i \le N$ can be updated as given by the eqn. 1.19, while the required gradients will be given by eqns. 1.44 and 1.48. However, for this particular case, isolated recognition, likelihoods in the last two equations are calculated in a peculiar way. First consider the damped case. Since we have an HMM for each class of units in isolated recognition, we can select the model $\lambda_l$ of the class/to which the current observation sequence $O^1$ belongs. Then starting from eqn. 1.39, $$L_{tot}^{clamped} = L_l^l \sum_{i \in \lambda_l} \alpha_t(i) \beta_t = \sum_{i \in \lambda_l} \alpha_T(i) \qquad 1.52$$

where the second line follows from eqn. 1.3. Similarly, for the free case, starting from eqn. 1.40, $$L_{tot}^{free} = \sum_{m=1}^{N} L_m^l = \sum_{m=1}^{N} \left[ \sum_{i \in \lambda m} \alpha_t(i) \beta_t(i) \right] \qquad 1.53$$

$$\sum_{m=1}^{N} \sum_{i \in \lambda_m} \alpha_T(i)$$

where $L_m^l$ represents the likelihood of the current observation sequence belonging to class l, in the model $\lambda_m$. With those likelihoods defined in eqns. 1.52 and 1.53, the gradient giving equations 1.44 and 1.48 will take the forms, $$\frac{\partial J}{\partial a_{ij}} = \left[ \frac{1}{\sum_{m=1}^{N} L_m^l} - \frac{\delta_{kl}}{L_l^l} \right] \sum_{t=1}^{T} \beta_t(j) b_j(o_t) \alpha_{t-1} \qquad 1.54$$

$i, j \in \lambda_k$, $$\frac{\partial J}{\partial b_{ij}(o_t)} = \left[ \frac{1}{\sum_{m=1}^{N} L_m^l} - \frac{\delta_{kl}}{L_l^l} \right] \frac{\alpha_t(j) \beta_t(j)}{b_j(o_t)} \qquad 1.55$$

$j \in \lambda_k$

Now we can summarize the training procedure as follows:

(1) Initialize the each HMM, $\lambda_i=(A_i, B_i, \pi_i)$, $1 \le i \le N$ with values generated randomly or using an initialization algorithm like segmental K means [jedlik.phy.bme.hu/~gerjanos/HMM/node19.html—r4#r4].

(2) Take an observation sequence and: Calculate the forward and backward probabilities for each HMM, using the recursions 1.5 and 1.2; Using the equations 1.52 and 1.53 calculate the likelihoods; Using the equations 1.54 and 1.55 calculate the gradients with respect to parameters for each model; Update parameters in each of the models using the eqn. 1.19.

(3) Go to step (2), unless all the observation sequences are considered.

(4) Repeat step (2) to (3) until a convergence criterion is satisfied.

This procedure can easily be modified if the continuous density HMMs are used, by propagating the gradients via chain rule to the parameters of the continuous probability distributions. Further it is worth to mention that preprocessors can also be trained simultaneously, with such a further back propagation.

Recognition: Comparative to the training, recognition is much simpler and the procedure is given below.

(1) Take an observation sequence to be recognized and Calculate the forward and backward probabilities for each HMM, using the recursions 1.5 and 1.2.

As in the equation 1.53 calculate the likelihoods, $L_m^l$, $1 \le m \le N$.

The recognized class $l^*$, to which the observation sequence belongs, is given by $$l^* = \arg\max_{1 \le m \le N} L_m^l.$$

(3) Go to step (2), unless all the observation sequences to be recognized are considered.

The recognition rate in this case can be calculated as the ratio between number of correctly recognized speech units and total number of speech units (observation sequences) to be recognized.

Use of Fourier Transform in Pre-Processing

The Hartley Transform is an integral transform which shares some features with the Fourier Transform, but which (in the discrete case), multiplies the kernel by $$\cos\left(\frac{2\pi kn}{N}\right) - \sin\left(\frac{2\pi kn}{N}\right) \text{ instead of} \qquad 1.56$$

$$e^{-2\pi kn/M} = \cos\left(\frac{2\pi kn}{N}\right) - i\sin\left(\frac{2\pi kn}{N}\right). \qquad 1.57$$

The Hartley transform produces real output for a real input, and is its own inverse. It therefore can have computational advantages over the discrete Fourier transform, although analytic expressions are usually more complicated for the Hartley transform.

The discrete version of the Hartley transform can be written explicitly as $$\mathcal{H}[a] := \frac{1}{\sqrt{N}} \sum_{n=0}^{N-1} a_n \left[\cos\left(\frac{2\pi kn}{N}\right) - \sin\left(\frac{2\pi kn}{N}\right)\right] \qquad 1.58$$

$$:= \Re\mathcal{F}[a] - \Im\mathcal{F}[a] \qquad 1.59$$

where $\mathcal{F}$ denotes the Fourier Transform. The Hartley transform obeys the convolution property $$\mathcal{H}[a*b]_k = \frac{1}{2}\left(A_k B_k - \overline{A}_k \overline{B}_k + A_k \overline{B}_k + \overline{A}_k B_k\right) \qquad 1.60$$

where $\overline{a} \equiv a_o$, $\qquad 1.61$ $\overline{a}_{n/2} \equiv a_{n/2}$, $\qquad 1.62$ $a_k \equiv a_{n-k}$, $\qquad 1.63$ (Arndt). Like the fast Fourier Transform algorithm, there is a "fast" version of the Hartley transform algorithm. A decimation in time algorithm makes use of $$\mathcal{H}_n^{left}[a] = \mathcal{H}_{n/2}[a^{even}] + \chi \mathcal{H}_{n/2}[a^{odd}] \qquad 1.64$$

$$\mathcal{H}_n^{right}[a] = \mathcal{H}_{n/2}[a^{even}] + \chi \mathcal{H}_{n/2}[a^{odd}] \qquad 1.65$$

where $\chi$ denotes the sequence with elements $$a_n \cos\left(\frac{\pi n}{N}\right) - \overline{a}\sin\left(\frac{\pi n}{N}\right) \qquad 1.66$$

A decimation in frequency algorithm makes use of $$\mathcal{H}_n^{even}[a] = \mathcal{H}_{n/2}[a^{left} + a^{right}] \qquad 1.67$$

$$\mathcal{H}_n^{odd}[a] = \mathcal{H}_{n/2}[a^{left} - a^{right}] \qquad 1.68$$

The discrete Fourier transform $$A_k \equiv \mathcal{F}[a] = \sum_{n=0}^{N-1} e^{-2\pi i kn/N} a_n \qquad 1.69$$

can be written $$\begin{bmatrix} A_k \\ A_{-k} \end{bmatrix} \sum_{n=0}^{N-1} \begin{bmatrix} e^{-2\pi i kn/N} & 0 \\ 0 & e^{-2\pi i kn/N} \end{bmatrix} \qquad 1.70$$

$$\sum_{n=0}^{N-1} \frac{1}{2}\begin{bmatrix} 1-i & 1+i \\ 1+i & 1-i \end{bmatrix}\begin{bmatrix} \cos\left(\frac{2\pi kn}{N}\right) & \sin\left(\frac{2\pi kn}{N}\right) \\ -\sin\left(\frac{2\pi kn}{N}\right) & \cos\left(\frac{2\pi kn}{N}\right) \end{bmatrix}\frac{1}{2}\begin{bmatrix} 1+i & 1-i \\ 1-i & 1+i \end{bmatrix}\begin{bmatrix} a_n \\ a_n \end{bmatrix} \qquad 1.71$$

so $F=T^{-1}HT$. See, mathworld.wolfram.com/HartleyTransform.html.

A Hartley transform based fixed pre-processing may be considered, on some bases, inferior to that based on Fourier transform. One explanation for this is based on the respective symmetries and shift invariance properties. Therefore we expect improved performances from Fourier transform even when the pre-processing is adaptive. However a training procedure which preserves the symmetries of weight distributions must be used. Main argument of the use of Hartley transform is to avoid the complex weights. A Fourier transform, however, can be implemented as a neural network containing real weights, but with a slightly modified network structure than the usual MLP. We can easily derive the equations which give the forward and backward pass.

Forward pass is given by, $$\left[\sum_{i=0}^{N-1} x_t(i)\cos\left(\frac{2\pi ij}{N}\right)\right]^2 + \left[\sum_{i=0}^{N-1} x_t(i)\sin\left(\frac{2\pi ij}{N}\right)\right]^2 = \tilde{X}_t^2(j) \qquad 2.1$$

where N denotes the window length, and $\tilde{X}_t(j)=|X_t(j)|$. If we use the notation $$\theta_{ij} = \frac{2\pi ij}{N},$$

and error is denoted by J, then we can find $$\frac{\partial J}{\partial \Theta ij}$$

simply by using the chain rule, $$\frac{\partial J}{\partial \theta_{ij}} = \sum_{t=1}^{T} \frac{\partial J}{\partial \tilde{X}_t^2(j)} \frac{\partial \tilde{X}_t^2(j)}{\partial \theta_{ij}} \qquad 2.2$$

We assume that $$\frac{\partial J}{\partial \tilde{X}_t^2(j)}$$

is known and $$\frac{\partial \tilde{X}_t^2(j)}{\partial \theta_{ij}}$$

can simply be found by differentiating eqn. 2.1 with respect to $\theta_{ij}$. Thus we get, $$\frac{\partial \tilde{X}_t^2}{\partial \theta_{ij}} = 2x_t(i)\cos(\theta_{ij})\sum_{k=1}^{N-1} x_t(k)\sin(\theta_{kj}) - 2x_t(i)\sin(\theta_{ij})\sum_{k=1}^{N-1} x_t(k)\cos(\theta_{kj}) \qquad 2.3$$

Eqns. 2.2 and 2.3 define the backward pass. Note that $\theta_{ij}$ can be further back propagated as usual.

Training procedure which preserves symmetry: We can use a training procedure which preserves symmetrical distribution of weights in the Hartley or Fourier transform stages. In addition to the improved shift invariance, this approach can lead to parameter reduction. The procedure starts by noting the equal weights at initialization. Then the forward and backward passes are performed as usual. But in updating we use the same weight update for all the equal weights, namely the average value of all the weight updates corresponding to the equal weights. In this way we can preserve any existing symmetry in the initial weight distributions. At the same time number of parameters is reduced because only one parameter is needed to represent the whole class of equal weights. See, "A Hybrid ANN-HMM ASR system with NN based adaptive preprocessing", Narada Dilp Warakagoda, M.Sc. thesis (Norges Tekniske Høgskole, Institutt for Teleteknikk Transmisjonsteknikk), jedlik-.phy.bme.hu/~gerjanos/HMM/hoved.html. As an alternate to the Hartley transform, a Wavelet transform may be applied. The fast Fourier transform (FFT) and the discrete wavelet transform (DWT) are both linear operations that generate a data structure that contains segments of various lengths, usually filling and transforming it into a different data vector of length.

The mathematical properties of the matrices involved in the transforms are similar as well. The inverse transform matrix for both the FFT and the DWT is the transpose of the original. As a result, both transforms can be viewed as a rotation in function space to a different domain. For the FFT, this new domain contains basis functions that are sines and cosines. For the wavelet transform, this new domain contains more complicated basis functions called wavelets, mother wavelets, or analyzing wavelets. Both transforms have another similarity. The basis functions are localized in frequency, making mathematical tools such as power spectra (how much power is contained in a frequency interval) and scalegrams (to be defined later) useful at picking out frequencies and calculating power distributions. The most interesting dissimilarity between these two kinds of transforms is that individual wavelet functions are localized in space. Fourier sine and cosine functions are not. This localization feature, along with wavelets' localization of frequency, makes many functions and operators using wavelets "sparse" when transformed into the wavelet domain. This sparseness, in turn, results in a number of useful applications such as data compression, detecting features in images, and removing noise from time series. One way to see the time-frequency resolution differences between the Fourier transform and the wavelet transform is to look at the basis function coverage of the time-frequency plane. In a windowed Fourier transform, where the window is simply a square wave, the square wave window truncates the sine or cosine function to fit a window of a particular width. Because a single window is used for all frequencies in the WFT, the resolution of the analysis is the same at all locations in the time-frequency plane.

An advantage of wavelet transforms is that the windows vary. In order to isolate signal discontinuities, one would like to have some very short basis functions. At the same time, in order to obtain detailed frequency analysis, one would like to have some very long basis functions. A way to achieve this is to have short high-frequency basis functions and long low-frequency ones. This happy medium is exactly what you get with wavelet transforms. One thing to remember is that wavelet transforms do not have a single set of basis functions like the Fourier transform, which utilizes just the sine and cosine functions. Instead, wavelet transforms have an infinite set of possible basis functions. Thus, wavelet analysis provides immediate access to information that can be obscured by other time-frequency methods such as Fourier analysis. Wavelet transforms comprise an infinite set. The different wavelet families make different trade-offs between how compactly the basis functions are localized in space and how smooth they are. Some of the wavelet bases have fractal structure. The Daubechies wavelet family is one example.

Within each family of wavelets (such as the Daubechies family) are wavelet subclasses distinguished by the number of coefficients and by the level of iteration. Wavelets are classified within a family most often by the number of vanishing moments. This is an extra set of mathematical relationships for the coefficients that must be satisfied, and is directly related to the number of coefficients. For example, within the Coiflet wavelet family are Coiflets with two vanishing moments, and Coiflets with three vanishing moments.

The Discrete Wavelet Transform: Dilations and translations of the "Mother function," or "analyzing wavelet" Φ(x) define an orthogonal basis, our wavelet basis:

$$\Phi_{(s,l)}(x) = 2^{\frac{-s}{2}}\Phi(2^{-s}x - l).$$

The variables s and l are integers that scale and dilate the mother function Φ(x) to generate wavelets, such as a Daubechies wavelet family. The scale index S indicates the wavelet's width, and the location index l gives its position. Notice that the mother functions are resealed, or "dilated" by powers of two, and translated by integers. What makes wavelet bases especially interesting is the self-similarity caused by the scales and dilations. Once we know about the mother functions, we know everything about the basis. Note that the scaling-by-two is a feature of the Discrete Wavelet Transform (DWT), and is not, itself, compelled by Wavelet theory. That is, while it is computationally convenient to employ a binary tree, in theory, if one could define a precise wavelet that corresponds to a feature of a data set to be processed, this wavelet could be directly extracted. Clearly, the utility of the DWT is its ability to handle general cases without detailed pattern searching, and therefore the more theoretical wavelet transform techniques based on precise wavelet matching are often reserved for special cases. On the other hand, by carefully selecting wavelet basis functions, or combinations of basis functions, a very sparse representation of a complex and multidimensional data space may be obtained. The utility, however, may depend on being able to operate in the wavelet transform domain (or subsequent transforms of the sparse representation coefficients) for subsequent analysis. Note that, while wavelets are generally represented as two dimensional functions of amplitude and time, it is clear that wavelet theory extends into n-dimensional space.

Thus, the advantageous application of wavelet theory is in cases where a modest number of events, for example having associated limited time and space parameters, are represented in a large data space. If the events could be extracted with fair accuracy, the data space could be replaced with a vector quantized model (VQM), wherein the extracted events correspond to real events, and wherein the VQM is highly compressed as compared to the raw data space. Further, while there may be some data loss as a result of the VQM expression, if the real data corresponds to the wavelet used to model it, then the VQM may actually serve as a form of error correction. Clearly, in some cases, especially where events are overlapping, the possibility for error occurs. Further, while the DWT is often useful in denoising data, in some cases, noise may be inaccurately represented as an event, while in the raw data space, it might have been distinguished. Thus, one aspect of a denoised DWT representation is that there is an implicit presumption that all remaining elements of the representation matrix are signal.

A particular advantage of a DWT approach is that it facilitates a multiresolution analysis of data sets. That is, if decomposition of the raw data set with the basis function, transformed according to a regular progressions, e.g., powers of 2, then at each level of decomposition, a level of scale is revealed and presented. It is noted that the transform need not be a simple power of two, and itself may be a function or complex and/or multidimensional function. Typically, non-standard analyses are reserved for instances where there is, or is believed to be, a physical basis for the application of such functions instead of binary splitting of the data space.

Proceeding with the DWT analysis, we span our data domain at different resolutions, see www.eso.org/projects/esomidas/doc/user/98NOV/volb/node308.html, using the analyzing wavelet in a scaling equation:

$$W(x) = \sum_{k=1}^{N-2}(-1)^k c_{k+1}\Phi(2x + k),$$

where W(x) is the scaling function for the mother function Φ(x), and $c_k$ are the wavelet coefficients. The wavelet coefficients must satisfy linear and quadratic constraints of the form $$\sum_{k=0}^{N-1} c_k = 2, \quad \sum_{k=0}^{N-1} c_k c_{k+2l} = 2\delta_{l,0},$$

where δ is the delta function and l is the location index.

One of the most useful features of wavelets is the ease with which one can choose the defining coefficients for a given wavelet system to be adapted for a given problem. In Daubechies' original paper, I. Daubechies, "Orthonormal Bases of Compactly Supported Wavelets," *Comm. Pure Appl. Math*, Vol 41, 1988, pp. 906-966, she developed specific families of wavelet systems that were very good for representing polynomial behavior. The Haar wavelet is even simpler, and it is often used for educational purposes. (That is, while it may be limited to certain classes of problems, the Haar wavelet often produces comprehensible output which can be generated into graphically pleasing results).

It is helpful to think of the coefficients $\{c_0, \ldots, c_n\}$ as a filter. The filter or coefficients are placed in a transformation matrix, which is applied to a raw data vector. The coefficients are ordered using two dominant patterns, one that works as a smoothing filter (like a moving average), and one pattern that works to bring out the data's "detail" information. These two orderings of the coefficients are called a quadrature mirror filter pair in signal processing parlance. A more detailed description of the transformation matrix can be found in W. Press et al., *Numerical Recipes in Fortran*, Cambridge University Press, New York, 1992, pp. 498-499, 584-602.

To complete our discussion of the DWT, let's look at how the wavelet coefficient matrix is applied to the data vector. The matrix is applied in a hierarchical algorithm, sometimes called a pyramidal algorithm. The wavelet coefficients are arranged so that odd rows contain an ordering of wavelet coefficients that act as the smoothing filter, and the even rows contain an ordering of wavelet coefficient with different signs that act to bring out the data's detail. The matrix is first applied to the original, full-length vector. Then the vector is smoothed and decimated by half and the matrix is applied again. Then the smoothed, halved vector is smoothed, and halved again, and the matrix applied once more. This process continues until a trivial number of "smooth-smooth-smooth . . . " data remain. That is, each matrix application brings out a higher resolution of the data while at the same time smoothing the remaining data. The output of the DWT consists of the remaining "smooth (etc.)" components, and all of the accumulated "detail" components.

The Fast Wavelet Transform: If the DWT matrix is not sparse, so we face the same complexity issues that we had previously faced for the discrete Fourier transform. Wickerhauser, *Adapted Wavelet Analysis from Theory to Software*, AK Peters, Boston, 1994, pp. 213-214, 237, 273-274, 387. We solve it as we did for the FFT, by factoring the DWT into a product of a few sparse matrices using self-similarity properties. The result is an algorithm that requires only order n operations to transform an n-sample vector. This is the "fast" DWT of Mallet and Daubechies.

Wavelet Packets: The wavelet transform is actually a subset of a far more versatile transform, the wavelet packet transform. M. A. Cody, "The Wavelet Packet Transform," *Dr. Dobb's Journal*, Vol 19, April 1994, pp. 44-46, 50-54. Wavelet packets are particular linear combinations of wavelets. V. Wickerhauser, *Adapted Wavelet Analysis from Theory to Software*, AK Peters, Boston, 1994, pp. 213-214, 237, 273-274, 387. They form bases which retain many of the orthogonality, smoothness, and localization properties of their parent wavelets. The coefficients in the linear combinations are computed by a recursive algorithm making each newly computed wavelet packet coefficient sequence the root of its own analysis tree.

Adapted Waveforms: Because we have a choice among an infinite set of basis functions, we may wish to find the best basis function for a given representation of a signal. Wickerhauser, Id. A basis of adapted waveform is the best basis function for a given signal representation. The chosen basis carries substantial information about the signal, and if the basis description is efficient (that is, very few terms in the expansion are needed to represent the signal), then that signal information has been compressed. According to Wickerhauser, Id., some desirable properties for adapted wavelet bases are: speedy computation of inner products with the other basis functions; speedy superposition of the basis functions; good spatial localization, so researchers can identify the position of a signal that is contributing a large component; good frequency localization, so researchers can identify signal oscillations; and independence, so that not too many basis elements match the same portion of the signal.

For adapted waveform analysis, researchers seek a basis in which the coefficients, when rearranged in decreasing order, decrease as rapidly as possible. to measure rates of decrease, they use tools from classical harmonic analysis including calculation of information cost functions. This is defined as the expense of storing the chosen representation. Examples of such functions include the number above a threshold, concentration, entropy, logarithm of energy, Gauss-Markov calculations, and the theoretical dimension of a sequence. Multiresolution analysis results from the embedded subsets generated by the interpolations at different scales.

A function $f(x)$ is projected at each step j onto the subset $V_j$. This projection is defined by the scalar product $c_j(k)$ of $f(x)$ with the scaling function $\phi(x)$ which is dilated and translated: $c_j(k)=\langle f(x), 2^{-j}\phi(2^{-j}x-k)\rangle$. As $\phi(x)$ is a scaling function which has the property:

$$\frac{1}{2}\phi\left(\frac{x}{2}\right) = \sum_n h(n)\phi(x-n)$$

or where $\hat{\phi}(2v)=\hat{h}(v)\hat{\phi}(v)$ where $\hat{h}(v)$ is the Fourier transform of the function $\Sigma_n h(n)\delta(x-n)$. We get: $\hat{h}(v)=\Sigma_n h(n)e^{-2\pi nv}$. The property of the scaling function of $\phi(x)$ is that it permits us to compute directly the set $c_{j+1}(k)$ from $c_j(k)$. If we start from the set $c_0(k)$ we compute all the sets $c_j(k)$, with $j>0$, without directly computing any other scalar product: $c_{j+1}(k)=\Sigma_n h(n-2k)c_j(n)$. At each step, the number of scalar products is divided by 2. Step by step the signal is smoothed and information is lost. The remaining information can be restored using the complementary subspace $W_{j+1}$ of $V_{j+1}$ in $V_j$. This subspace can be generated by a suitable wavelet function $\Psi(x)$ with translation and dilation.

$$\frac{1}{2}\psi\left(\frac{x}{2}\right) = \sum_n g(n)\phi(x-n)$$

or $\psi(2v)=\hat{g}(v)\hat{\phi}(v)$

We compute the scalar products $\langle f(x), 2^{-(j+1)}\psi(2^{-(j+1)}x-k)\rangle$ with:

$$w_{j+1}(k) = \sum_n g(n-2k)c_j(n)$$

With this analysis, we have built the first part of a filter bank. In order to restore the original data, Mallet uses the properties of orthogonal wavelets, but the theory has been generalized to a large class of filters by introducing two other filters $\tilde{h}$ and $\tilde{g}$ named conjugated to h and g.

The restoration, that is, the inverse transform after filtering in the transform domain, is performed with:

$$c_j(k) = 2\sum_l \left[c_{j+1}(l)\tilde{h}(k+2l) + w_{j+1}(l)\tilde{g}(k+2l)\right]$$

In order to get an exact restoration, two conditions are required for the conjugate filters:

Dealiasing condition:

$$\hat{h}\left(v+\frac{1}{2}\right)\hat{\tilde{h}}(v) + \hat{g}\left(v+\frac{1}{2}\right)\hat{\tilde{g}}(v) = 0$$

Exact restoration: $\hat{h}(v)\hat{\tilde{h}}(v)+\hat{g}(v)\hat{\tilde{g}}(v)=1$ In the decomposition, the function is successively convolved with the two filters H (low frequencies) and G (high frequencies). Each resulting function is decimated by suppression of one sample out of two. The high frequency signal is left, and we iterate with the low frequency signal. In the reconstruction, we restore the sampling by inserting a 0 between each sample, then we convolve with the conjugate filters $\tilde{H}$ and $\tilde{G}$, we add the resulting functions and we multiply the result by 2. We iterate up to the smallest scale.

Orthogonal wavelets correspond to the restricted case where:

$$\hat{g}(v) \quad e^{-2\pi v}\hat{h}*\left(v+\frac{1}{2}\right)$$
$$\hat{\tilde{h}}(v) \quad \hat{h}*(v) \qquad \text{and} \quad |\hat{h}(v)|^2 + \left|\hat{h}\left(v+\frac{1}{2}\right)\right|^2 = 1$$
$$\hat{\tilde{g}}(v) \quad \hat{g}*(v)$$

We can easily see that this set satisfies the dealiasing condition and exact restoration condition. Daubechies wavelets are the only compact solutions. For biorthogonal wavelets we have the relations:

$$\hat{g}(v) \quad e^{-2\pi v}\hat{\bar{h}}*\left(v+\frac{1}{2}\right)$$
$$\hat{g}(v) \quad e^{2\pi v}\hat{h}*\left(v+\frac{1}{2}\right)$$
and $\hat{h}(v)\hat{\bar{h}}(v) + \hat{h}*\left(v+\frac{1}{2}\right)\hat{\bar{h}}*\left(v+\frac{1}{2}\right) = 1$ Which also satisfy the dealiasing condition and exact restoration condition. A large class of compact wavelet functions can be derived. Many sets of filters were proposed, especially for coding. The choice of these filters must be guided by the regularity of the scaling and the wavelet functions. The complexity is proportional to N. The algorithm provides a pyramid of N elements.

The 2D algorithm is based on separate variables leading to prioritizing of x and y directions. The scaling function is defined by: $\phi(x, y) = \phi(x)\phi(y)$ The passage from a resolution to the next one is done by:

$$f_{j+1}(k_x, k_y) = \sum_{l_x=-\infty}^{+\infty} \sum_{l_y=-\infty}^{+\infty} h(l_x - 2k_x)h(l_y - 2k_y)f_j(l_x, l_y)$$

The detail signal is obtained from three wavelets: a vertical wavelet: $\psi^1(x,y) = \phi(x)\psi(y)$, a horizontal wavelet: $\psi^2(x,y) = \psi(x)\phi(y)$ and a diagonal wavelet: $\psi^3(x,y) = \psi(x)\psi(y)$, which leads to three sub-images:

$$C^1_{j+1}(k_x, k_y) = \sum_{l_x=-\infty}^{+\infty} \sum_{l_y=-\infty}^{+\infty} g(l_x - 2k_x)h(l_y - 2k_y)f_j(l_x, l_y)$$

$$C^2_{j+1}(k_x, k_y) = \sum_{l_x=-\infty}^{+\infty} \sum_{l_y=-\infty}^{+\infty} h(l_x - 2k_x)g(l_y - 2k_y)f_j(l_x, l_y)$$

$$C^3_{j+1}(k_x, k_y) = \sum_{l_x=-\infty}^{+\infty} \sum_{l_y=-\infty}^{+\infty} g(l_x - 2k_x)g(l_y - 2k_y)f_j(l_x, l_y)$$

TABLE 1

| Wavelet transform representation of an image (two-dimensional matrix) | | | |
|---|---|---|---|
| $F^{(2)}$ | H.D. k = 2 | Horizontal Details j = 1 | Horizontal Details j = 0 |
| V.D. j = 2 | D.D. j = 2 | | |
| | Vertical Details j = 1 | Diagonal Details j = 1 | |
| | | Vertical Details j = 0 | Diagonal Details j = 0 |

The wavelet transform can be interpreted as the decomposition on frequency sets with a spatial orientation.

The á trous algorithm: The discrete approach of the wavelet transform can be done with the special version of the so-called á trous algorithm (with holes). One assumes that the sampled data $\{c_0(k)\}$ are the scalar products at pixels k of the function $f(x)$ with a scaling function $\phi(x)$ which corresponds to a low pass filter. The first filtering is then performed by a twice magnified scale leading to the $\{c_1(k)\}$ set. The signal difference $\{c_0(k)\} - \{c_1(k)\}$ contains the information between these two scales and is the discrete set associated with the wavelet transform corresponding to $\phi(x)$. The associated wavelet is therefore $\psi(x)$, $$\frac{1}{2}\psi\left(\frac{x}{2}\right) = \phi(x) - \frac{1}{2}\phi\left(\frac{x}{2}\right)$$

The distance between samples increasing by a factor 2 from the scale $(i-1)(j>0)$ to the next one, $c_i(k)$ is given by:

$$c_i(k) = \sum_l h(l)c_{i-1}(k + 2^{i-1}l),$$

and the discrete wavelet transform $w_i(k)$ by: $w_i(k) = c_{i-1}(k) - c_i(k)$.

The coefficients $\{h(k)\}$ derive from the scaling function $$\phi(x): \frac{1}{2}\phi\left(\frac{x}{2}\right) = \sum_l h(l)\phi(x - l)$$

The algorithm allowing one to rebuild the data frame is evident: the last smoothed array $c_{n_p}$ is added to all the differences $w_i$.

$$c_0(k) = c_{n_p}(k) \sum_{j=1}^{n_p} w_j(k)$$

If we choose the linear interpolation for the scaling function $\phi$:

$\phi(x) = 1 - |x|$ if $x \in [-1, 1]$ $\phi(x) = 0$ if $x \notin [-1, 1]$ we have:

$$\frac{1}{2}\phi\left(\frac{x}{2}\right) = \frac{1}{4}\phi(x+1) + \frac{1}{2}\phi(x) + \frac{1}{4}\phi(x-1)$$

$c_1$ is obtained by:

$$c_1(k) = \frac{1}{4}c_0(k-1) + \frac{1}{2}c_0(k) + \frac{1}{4}c_0(k+1)$$

and $c_{j+1}$ is obtained from $c_j$ by $$c_{j+1}(k) = \frac{1}{4}c_j(k - 2^j) + \frac{1}{2}c_j(k) + \frac{1}{4}c_j(k + 2^j)$$

The wavelet coefficients at the scale j are:

$$c_{j+1}(k) = -\frac{1}{4}c_j(k - 2^j) + \frac{1}{2}c_j(k) - \frac{1}{4}c_j(k + 2^j)$$

The above á trous algorithm is easily extensible to the two dimensional space. This leads to a convolution with a mask of 3×3 pixels for the wavelet connected to linear interpolation. The coefficients of the mask are:

$$\begin{pmatrix} \frac{1}{16} & \frac{1}{8} & \frac{1}{16} \\ \frac{1}{8} & \frac{1}{4} & \frac{1}{8} \\ \frac{1}{16} & \frac{1}{8} & \frac{1}{16} \end{pmatrix}$$

At each scale j, we obtain a set $\{w_j(k,l)\}$ (we will call it wavelet plane in the following), which has the same number of pixels as the image.

If we choose a $B_3$-spline for the scaling function, the coefficients of the convolution mask in one dimension are (1/16, 1/4, 1/8, 1/4, 1/16), and in two dimensions:

$$\begin{pmatrix} \frac{1}{256} & \frac{1}{64} & \frac{3}{128} & \frac{1}{64} & \frac{1}{256} \\ \frac{1}{64} & \frac{1}{16} & \frac{3}{32} & \frac{1}{16} & \frac{1}{64} \\ \frac{3}{128} & \frac{3}{32} & \frac{9}{64} & \frac{3}{32} & \frac{3}{128} \\ \frac{1}{64} & \frac{1}{16} & \frac{3}{32} & \frac{1}{16} & \frac{1}{64} \\ \frac{1}{256} & \frac{1}{64} & \frac{3}{128} & \frac{1}{64} & \frac{1}{256} \end{pmatrix}$$

The Wavelet transform using the Fourier transform: We start with the set of scalar products $c_0(k) = \langle f(x), \phi(x-k) \rangle$. If $\phi(x)$ has a cut-off frequency $$v_c \leq \frac{1}{2},$$

the data are correctly sampled. The data at the resolution j=1 are:

$$c_1(k) = \left\langle f(x), \frac{1}{2}\phi\left(\frac{x}{2} - k\right)\right\rangle$$

and we can compute the set $c_1(k)$ from $c_0(k)$ with a discrete filter $\hat{h}(v)$:

$$\hat{h}(v) = \begin{cases} \frac{\hat{\phi}(2v)}{\hat{\phi}(v)} & \text{if } |v| < v_c \\ 0 & \text{if } v_c \leq |v| < \frac{1}{2} \end{cases},$$

and $\forall v, \forall n \; \hat{h}(v+n) = \hat{h}(v)$, where n is an integer. So: $\hat{c}_{j+1}(v) = \hat{c}_j(v)\hat{h}(2^j v)$ The cut-off frequency is reduced by a factor 2 at each step, allowing a reduction of the number of samples by this factor.

The wavelet coefficients at the scale j+1 are:

$$w_{j+1}(k) = \langle f(x), 2^{-(j+1)}\psi(2^{-(j+1)}x - k)\rangle$$

and they can be computed directly from $c_j(k)$ by: $\hat{w}_{j=1}(v) = \hat{c}_j(v)\hat{g}(2^j v)$ where g is the following discrete filter:

$$\hat{g}(v) = \begin{cases} \frac{\hat{\psi}(2v)}{\hat{\phi}(v)} & \text{if } |v| < v_c \\ 1 & \text{if } v_c \leq |v| < \frac{1}{2} \end{cases},$$

and $\forall v, \forall n \; \hat{g}(v+n) = \hat{g}(v)$.

The frequency band is also reduced by a factor 2 at each step. Applying the sampling theorem, we can build a pyramid of $$N + \frac{N}{2} + \ldots + 1 = 2N$$

elements. For an image analysis the number of elements is $$\frac{4}{3}N^2.$$

The over-determination is not very high. The B-spline functions are compact in this direct space. They correspond to the autoconvolution of a square function. In the Fourier space we have:

$$\hat{B}_l(v) = \frac{\sin \pi v^{l+1}}{\pi v}.$$

$B_3(x)$ is a set of 4 polynomials of degree 3. We choose the scaling function $\phi(v)$ which has a $B_x(x)$ profile in the Fourier space:

$$\hat{\phi}(v) = \frac{3}{2}B_3(4v)$$

In the direct space we get:

$$\phi(x) = \frac{3}{8}\left[\frac{\sin\frac{\pi x}{4}}{\frac{\pi x}{4}}\right]^4$$

This function is quite similar to a Gaussian one and converges rapidly to 0. For 2-D the scaling function is defined by $$\hat{\phi}(u, v) = \frac{3}{2}B_3(4r),$$

with $r = \sqrt{(u^2+v^2)}$. It is an isotropic function. The wavelet transform algorithm with $n_p$ scales is the following one:
1. We start with a B3-Spline scaling function and we derive $\psi$, h and g numerically.
2. We compute the corresponding image FFT. We name $T_0$ the resulting complex array;
3. We set j to 0. We iterate:
4. We multiply $T_j$ by $\hat{g}(2^j u, 2^j v)$. We get the complex array $W_{j+1}$. The inverse FFT gives the wavelet coefficients at the scale $2^j$;

5. We multiply $T_j$ by $\hat{h}(2^j u, 2^j v)$. We get the array $T_{j+1}$. Its inverse FFT gives the image at the scale $2^{j+1}$. The frequency band is reduced by a factor 2.
6. We increment j
7. If $j \leq n_p$, we go back to 4.
8. The set $\{w_1, w_2, \ldots, w_{n_p}, c_{n_p}\}$ describes the wavelet transform.

If the wavelet is the difference between two resolutions, we have: $\hat{\psi}(2v)=\hat{\phi}(v)-\hat{\phi}(2v)$ and: $\hat{g}(v)=1-\hat{h}(v)$ then the wavelet coefficients $\hat{w}_j(v)$ can be computed by $\hat{c}_{j-1}(v)-\hat{c}_j(v)$.

The Reconstruction: If the wavelet is the difference between two resolutions, an evident reconstruction for a wavelet transform $\mathcal{W}=\{w_1, w_2, \ldots, w_{n_p}, c_{n_p}\}$ is:

$$\hat{c}_0(v) = \hat{c}_{n_p}(v) + \sum_j \hat{w}_j(v)$$

But this is a particular case and other wavelet functions can be chosen. The reconstruction can be done step by step, starting from the lowest resolution. At each scale, we have the relations:

$$\hat{c}_{j+1} = \hat{h}(2^j v)\hat{c}_j(v) \quad \hat{w}_{j+1} = \hat{g}(2^j v)\hat{c}_j(v)$$

we look for $c_j$ knowing $c_{j+1}$, $w_{j+1}$, h and g. We restore $\hat{c}_j(v)$ with a least mean square estimator:

$$\hat{p}_h(2^j v)|\hat{c}_{j+1}(v) - \hat{h}(2^j v)\hat{c}_j(v)|^2 + \hat{p}_g(2^j v)|\hat{w}_{j+1}(v) - \hat{g}(2^j v)\hat{c}_j(v)|^2$$

is minimum. $\hat{p}_h(v)$ and $\hat{p}_g(v)$ are weight functions which permit a general solution to the restoration of $\hat{c}_j(v)$. By $\hat{c}_j(v)$ derivation we get: $\hat{c}_j(v)=\hat{c}_{j+1}(v)\tilde{\hat{h}}(2^j v)+\hat{w}_{j+1}(v)\tilde{\hat{g}}(2^j v)$, where the conjugate filters have the expression:

$$\tilde{\hat{h}}(v) = \frac{\hat{p}_h(v)\hat{h}*(v)}{\hat{p}_h(v)|\hat{h}(v)|^2 + \hat{p}_g(v)|\hat{g}(v)|^2},$$

$$\tilde{\hat{g}}(v) = \frac{\hat{p}_g(v)\hat{g}*(v)}{\hat{p}_h(v)|\hat{h}(v)|^2 + \hat{p}_g(v)|\hat{g}(v)|^2}$$

It is easy to see that these filters satisfy the exact reconstruction equation. In fact, above pair of equations give the general solution to this equation. In this analysis, the Shannon sampling condition is always respected. No aliasing exists, so that the dealiasing condition is not necessary (i.e., it is satisfied as a matter of course). The denominator is reduced if we choose: $\hat{g}(v)=\sqrt{1-|\hat{h}(v)|^2}$. This corresponds to the case where the wavelet is the difference between the square of two resolutions: $|\hat{\psi}(2v)|^2=|\hat{\phi}(v)|^2-|\hat{\phi}(2v)|^2$ The reconstruction algorithm is:
1. We compute the FFT of the image at the low resolution.
2. We set j to $n_p$. We iterate:
3. We compute the FFT of the wavelet coefficients at the scale j.
4. We multiply the wavelet coefficients $\hat{w}_j$ by $\tilde{\hat{g}}$.
5. We multiply the image at the lower resolution $\hat{c}_j$ by $\tilde{\hat{h}}$.
6. The inverse Fourier Transform of the addition of $\hat{w}_j\tilde{\hat{g}}$ and $\hat{c}_j\tilde{\hat{h}}$ gives the image $c_{j+1}$.
7. j=j−1 and we go back to 3.

The use of a scaling function with a cut-off frequency allows a reduction of sampling at each scale, and limits the computing time and the memory size.

Thus, it is seen that the DWT is in many respects comparable to the DFT, and, where convenient, may be employed in place thereof. While substantial work has been done in the application of wavelet analysis and filtering to image data, it is noted that the wavelet transform analysis is not so limited. In particular, one embodiment of the present invention applies the transform to describe statistical events represented within a multidimensional data-space. By understanding the multi-resolution interrelationships of various events and probabilities of events, in a time-space representation, a higher level analysis is possible than with other common techniques. Likewise, because aspects of the analysis are relatively content dependent, they may be accelerated by digital signal processing techniques or array processors, without need to apply artificial intelligence. On the other hand, the transformed (and possibly filtered) data set, is advantageously suitable for intelligent analysis, either by machine or human.

Generally, there will be no need to perform an inverse transform on the data set. On the other hand, the wavelet analysis may be useful for characterizing and analyzing only a limited range of events. Advantageously, if an event is recognized with high reliability within a transform domain, the event may be extracted from the data representation and an inverse transform performed to provide the data set absent the recognized feature or event. This allows a number of different feature-specific transforms to be conducted, and analyzed. This analysis may be in series, that is, having a defined sequence of transforms, feature extractions, and inverse transforms. On the other hand, the process may be performed in parallel. That is, the data set is subjected to various "tests", which are conducted by optimally transforming the data to determine if a particular feature (event) is present, determined with high reliability. As each feature is identified, the base data set may be updated for the remaining "tests", which will likely simplify the respective analysis, or improve the reliability of the respective determination. As each event or feature is extracted, the data set becomes simpler and simpler, until only noise remains.

It should be noted that, in some instances, a high reliability determination of the existence of an event cannot be concluded. In those cases, it is also possible to perform a contingent analysis, leading to a plurality of possible results for each contingency. Thus, a putative feature is extracted or not extracted from the data set and both results passed on for further analysis. Where one of the contingencies is inconsistent with a subsequent high reliability determination, that entire branch of analysis may be truncated. Ideally, the output consists of a data representation with probabilistic representation of the existence of events or features represented within the data set. As discussed below, this may form the basis for a risk-reliability output space representation of the data, useable directly by a human (typically in the form of a visual output) and/or for further automated analysis.

It is also noted that the data set is not temporally static, and therefore the analysis may be conducted in real time based on a stream of data.

The Process to be Estimated: The Kalman filter addresses the general problem of trying to estimate the state $x \in \mathfrak{R}^n$ of a discrete-time controlled process that is governed by the linear stochastic difference equation $$x_k = Ax_{k-1} + Bu_k + w_{k-1}, \qquad 3.1$$

with a measurement $$z_k \in \mathfrak{R}^m \text{ that is } z_k = Hx_k \pm v_k. \qquad 3.2$$

The random variables $w_k$ and $v_k$ represent the process and measurement noise (respectively). They are assumed to be independent (of each other), white, and with normal probability distributions $$p(w) \sim N(0, Q), \quad \quad 3.3$$

$$p(v) \sim N(0, R). \quad \quad 3.4$$

In practice, the process noise covariance Q and measurement noise covariance R matrices might change with each time step or measurement, however here we assume they are constant.

Kalman, Rudolph, Emil, "New Approach to Linear Filtering and Prediction Problems", Transactions of the ASME—Journal of Basic Engineering, 82D:35-45 (1960) (describes the namesake Kalman filter, which is a set of mathematical equations that provides an efficient computational (recursive) solution of the least-squares method. The filter is very powerful in several aspects: it supports estimations of past, present, and even future states, and it can do so even when the precise nature of the modeled system is unknown.)

The n×n matrix A in the difference equation (3.1) relates the state at the previous time step k−1 to the state at the current step k, in the absence of either a driving function or process noise. Note that in practice A might change with each time step, but here we assume it is constant. The n×1 matrix B relates the optional control input $u \in \Re^l$ to the state x. The m×n matrix H in the measurement equation (3.2) relates the state to the measurement $z_k$. In practice H might change with each time step or measurement, but here we assume it is constant.

The Computational Origins of the Filter: We define $\hat{x}^- \in \Re^n$ (note the "super minus") to be our a priori state estimate at step k given knowledge of the process prior to step k, and $\hat{x}_k \in \Re^n$ to be our a posteriori state estimate at step k given measurement $z_k$. We can then define a priori and a posteriori estimate errors as $e_k^- \equiv x_k - \hat{x}_k^-$ and $e_k \equiv x_k - \hat{x}_k$. The a priori estimate error covariance is then $$P_k^- = E[e_k^- e_k^{-T}], \quad \quad 3.5$$

and the a posteriori estimate error covariance is $$P_k = E[e_k e_k^T]. \quad \quad 3.6$$

In deriving the equations for the Kalman filter, we begin with the goal of finding an equation that computes an a posteriori state estimate $\hat{x}_k$ as a linear combination of an a priori estimate $\hat{x}_k^-$ and a weighted difference between an actual measurement $z_k$ and a measurement prediction $H\hat{x}_k^-$ as shown below in (3.7). Some justification for (3.7) is given in "The Probabilistic Origins of the Filter" found below. See, www.cs.unc.edu/~welch/kalman/kalman_filter/kalman-1.htm, expressly incorporated herein by reference. $\hat{x}_k = \hat{x}_k^- + K(z_k - H\hat{x}_k^-)$.

The difference $(z_k - H\hat{x}_k^-)$ in (3.7) is called the measurement innovation, or the residual. The residual reflects the discrepancy between the predicted measurement $H\hat{x}_k^-$ and the actual measurement $z_k$. A residual of zero means that the two are in complete agreement.

The n×m matrix K in (3.7) is chosen to be the gain or blending factor that minimizes the a posteriori error covariance (3.6). This minimization can be accomplished by first substituting (3.7) into the above definition for $e_k$, substituting that into (3.6), performing the indicated expectations, taking the derivative of the trace of the result with respect to K, setting that result equal to zero, and then solving for K.

For more details see [Maybeck79; Brown92; Jacobs93]. One form of the resulting K that minimizes (3.6) is given by $$K_k = P_k^- H^T (H P_k^- H^T + R)^{-1} = \frac{P_k^- H^T}{H P_k^- H^T + R}. \quad \quad 3.8$$

Looking at (3.8) we see that as the measurement error covariance R approaches zero, the gain K weights the residual more heavily. Specifically, $$\lim_{R_k \to 0} K_k = H^{-1}.$$

On the other hand, as the a priori estimate error covariance $P_k^-$ approaches zero, the gain K weights the residual less heavily. Specifically, $$\lim_{P_k^- \to 0} K_k = 0.$$

Another way of thinking about the weighting by K is that as the measurement error covariance R approaches zero, the actual measurement $z_k$ is "trusted" more and more, while the predicted measurement $H\hat{x}_k^-$ is trusted less and less. On the other hand, as the a priori estimate error covariance $P_k^-$ approaches zero the actual measurement $z_k$ is trusted less and less, while the predicted measurement $H\hat{x}_k^-$ is trusted more and more.

The Probabilistic Origins of the Filter: The justification for (3.7) is rooted in the probability of the a priori estimate $\hat{x}_k^-$ conditioned on all prior measurements $z_k$ (Bayes' rule). For now let it suffice to point out that the Kalman filter maintains the first two moments of the state distribution, $$E[x_k] = \hat{x}_k$$

$$E[(x_k - \hat{x}_k)(x_k - \hat{x}_k)^T] = P_k$$

The a posteriori state estimate (3.7) reflects the mean (the first moment) of the state distribution—it is normally distributed if the conditions of (3.3) and (3.4) are met. The a posteriori estimate error covariance (3.6) reflects the variance of the state distribution (the second non-central moment). In other words, $$p(x_k | z_k) \sim N(E[x_k], E[(x_k - \hat{x}_k)(x_k - \hat{x}_k)^T]) = N(\hat{x}_k, P_k).$$

For more details on the probabilistic origins of the Kalman filter, see [Maybeck79; Brown92; Jacobs93].

The Discrete Kalman Filter Algorithm: The Kalman filter estimates a process by using a form of feedback control: the filter estimates the process state at some time and then obtains feedback in the form of (noisy) measurements. As such, the equations for the Kalman filter fall into two groups: time update equations and measurement update equations. The time update equations are responsible for projecting forward (in time) the current state and error covariance estimates to obtain the a priori estimates for the next time step. The measurement update equations are responsible for the feedback—i.e., for incorporating a new measurement into the a priori estimate to obtain an improved a posteriori estimate.

The time update equations can also be thought of as predictor equations, while the measurement update equations can be thought of as corrector equations. Indeed, the final estimation algorithm resembles that of a predictor-corrector algorithm for solving numerical problems as shown below in FIG. 5, which shows the ongoing discrete Kalman filter cycle. The time update projects the current state estimate ahead in time. The measurement update adjusts the projected estimate by an actual measurement at that time.

The specific equations for the time and measurement updates are presented below:

Discrete Kalman filter time update equations.

$$x_k^- = A\hat{x}_{k-1} + Bu_k, \qquad 3.9$$

$$P_k^- = AP_{k-1}A^T + Q \qquad 3.10$$

Again notice how the time update equations (3.9) and (3.10) project the state and covariance estimates forward from time step k−1 to step k. A and B are from (3.1), while Q is from (3.3). Initial conditions for the filter are discussed in the earlier references.

Discrete Kalman filter measurement update equations.

$$K_k = P_k^- H^T (HP_k^- H^T + R)^{-1}, \qquad 3.11$$

$$x_k = \hat{x}_k^- + K_k(z_k - H\hat{x}_k^-), \qquad 3.12$$

$$P_k = (i - K_k H) P_k^- \qquad 3.13$$

Figure 6:
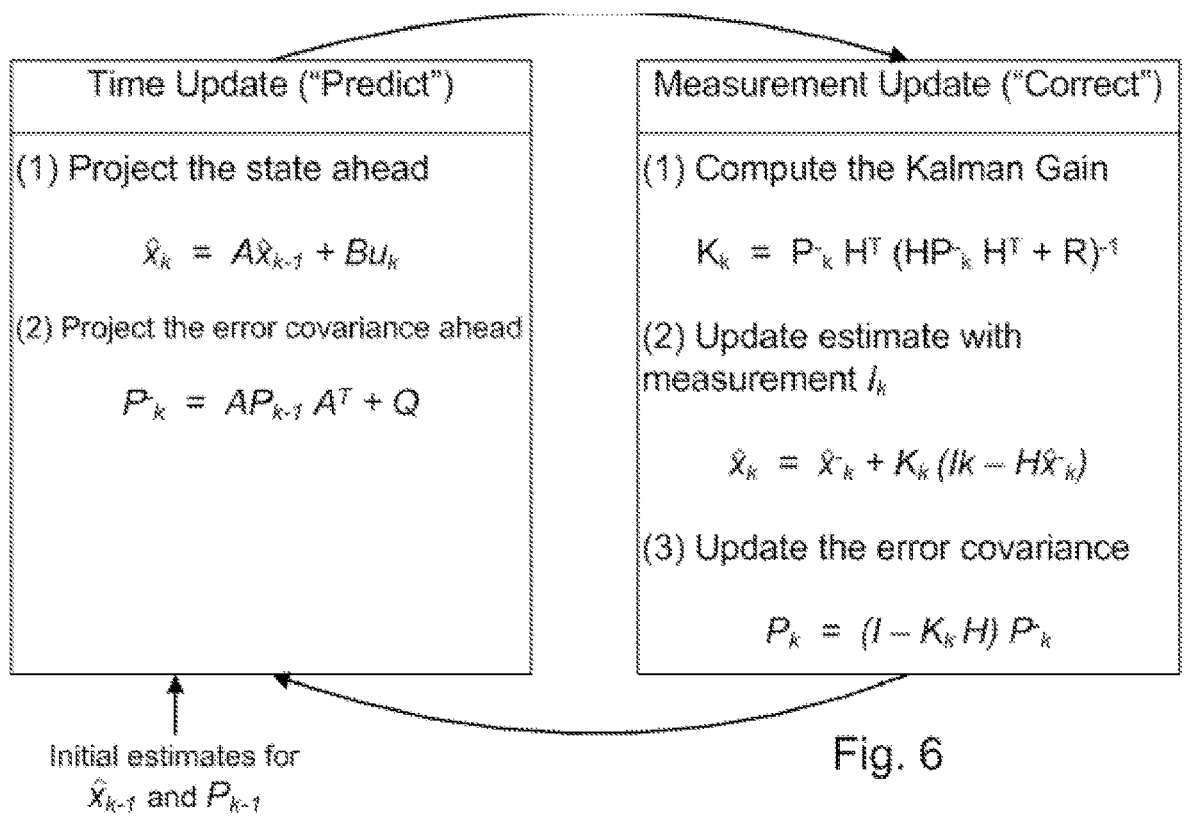
FIG. 6 shows aspects of the discrete Kalman filter cycle algorithm.

The first task during the measurement update is to compute the Kalman gain, $K^k$. Notice that the equation given here as (3.11) is the same as (3.8). The next step is to actually measure the process to obtain $z_k$, and then to generate an a posteriori state estimate by incorporating the measurement as in (3.12). Again (3.12) is simply (3.7) repeated here for completeness. The final step is to obtain an a posteriori error covariance estimate via (3.13). All of the Kalman filter equations can be algebraically manipulated into to several forms. Equation (3.8) represents the Kalman gain in one popular form. After each time and measurement update pair, the process is repeated with the previous a posteriori estimates used to project or predict the new a priori estimates. This recursive nature is one of the very appealing features of the Kalman filter—it makes practical implementations much more feasible than (for example) an implementation of a Wiener filter [Brown92] which is designed to operate on all of the data directly for each estimate. The Kalman filter instead recursively conditions the current estimate on all of the past measurements. FIG. 6 offers a complete picture of the operation of the filter, combining the high-level diagram of FIG. 5 with the equations (3.9) to (3.13).

Filter Parameters and Tuning: In the actual implementation of the filter, the measurement noise covariance R is usually measured prior to operation of the filter. Measuring the measurement error covariance R is generally practical (possible) because we need to be able to measure the process anyway (while operating the filter) so we should generally be able to take some off-line sample measurements in order to determine the variance of the measurement noise. The determination of the process noise covariance Q is generally more difficult as we typically do not have the ability to directly observe the process we are estimating. Sometimes a relatively simple (poor) process model can produce acceptable results if one "injects" enough uncertainty into the process via the selection of Q. Certainly in this case one would hope that the process measurements are reliable. In either case, whether or not we have a rational basis for choosing the parameters, often times superior filter performance (statistically speaking) can be obtained by tuning the filter parameters Q and R. The tuning is usually performed off-line, frequently with the help of another (distinct) Kalman filter in a process generally referred to as system identification. Under conditions where Q and R, are in fact constant, both the estimation error covariance $P_k$ and the Kalman gain $K_k$ will stabilize quickly and then remain constant (see the filter update equations in FIG. 6). If this is the case, these parameters can be pre-computed by either running the filter off-line, or for example by determining the steady-state value of $P_k$ as described in [Grewal93].

It is frequently the case however that the measurement error (in particular) does not remain constant. For example, observing like transmitters, the noise in measurements of nearby transmitters will generally be smaller than that in far-away transmitters. Also, the process noise Q is sometimes changed dynamically during filter operation—becoming $Q_k$—in order to adjust to different dynamics. For example, in the case of tracking the head of a user of a 3D virtual environment we might reduce the magnitude of $Q_k$ if the user seems to be moving slowly, and increase the magnitude if the dynamics start changing rapidly. In such cases $Q_k$ might be chosen to account for both uncertainty about the user's intentions and uncertainty in the model.

2 the Extended Kalman Filter (EKF)

The Process to be Estimated: As described above, the Kalman filter addresses the general problem of trying to estimate the state $x \in \Re^n$ of a discrete-time controlled process that is governed by a linear stochastic difference equation. But what happens if the process to be estimated and (or) the measurement relationship to the process is non-linear? Some of the most interesting and successful applications of Kalman filtering have been such situations. A Kalman filter that linearizes about the current mean and covariance is referred to as an extended Kalman filter or EKF. In something akin to a Taylor series, we can linearize the estimation around the current estimate using the partial derivatives of the process and measurement functions to compute estimates even in the face of non-linear relationships. To do so, we must begin by modifying some of the analysis presented above. Let us assume that our process again has a state vector $x \in \Re^n$, but that the process is now governed by the non-linear stochastic difference equation $$x_k = f(x_{k-1}, u_k, w_{k-1}), \qquad 4.1$$

with a measurement $z_k = \Re^m$ that is $$z_k = h(x_k, v_k), \qquad 4.2$$

where the random variables $w_k$ and $v_k$ again represent the process and measurement noise as in (4.3) and (4.4). In this case the non-linear function $f$ in the difference equation (4.1) relates the state at the previous time step k−1 to the state at the current time step k. It includes as parameters any driving function $v_k$ and the zero-mean process noise $w_k$. The non-linear function h in the measurement equation (4.2) relates the state $x_k$ to the measurement $z_k$. See, www.cs.unc.edu/~welch/kalman/kalman_filter/kalman-2.html, expressly incorporated herein by reference.

In practice of course one does not know the individual values of the noise $w_k$ and $v_k$ at each time step. However, one can approximate the state and measurement vector without them as $$\tilde{x}_k = f(\hat{x}_{k-1}, u_k, 0) \qquad 4.3$$

and $$\tilde{z}_k = h(\tilde{x}_k, 0) \qquad 4.4$$

where $\hat{x}_k$ is some a posteriori estimate of the state (from a previous time step k).

It is important to note that a fundamental flaw of the EKF is that the distributions (or densities in the continuous case) of the various random variables are no longer normal after undergoing their respective nonlinear transformations. The EKF is simply an ad hoc state estimator that only approximates the optimality of Bayes' rule by linearization. Some interesting work has been done by Julier et al. in developing a variation to the EKF, using methods that preserve the normal distributions throughout the non-linear transformations [Julier96].

The Computational Origins of the Filter: To estimate a process with non-linear difference and measurement relationships, we begin by writing new governing equations that linearize an estimate about (4.3) and (4.4), $$x_k = \tilde{x}_k + A(x_{k-1} - \hat{x}_{k-1}) + Ww_{k-1}, \quad\quad 4.5$$

$$z_k = \tilde{z}_k + H(x_k - \tilde{x}_k) + Vv_k \quad\quad 4.6$$

Where $x_k$ and $z_k$ are the actual state and measurement vectors, $\tilde{x}_k$ and $\tilde{z}_k$ are the approximate state and measurement vectors from (4.3) and (4.4), $\hat{x}_k$ is an a posteriori estimate of the state at step k, the random variables $w_k$ and $v_k$ represent the process and measurement noise as in (3.3) and (4.4).

A is the Jacobian matrix of partial derivatives of $f$ with respect to x, that is $$A_{(i,j)} = \frac{\partial f_{(i)}}{\partial x_{(j)}}(\hat{x}_{k-1}, u_k, 0),$$

W is the Jacobian matrix of partial derivatives of $f$ with respect to w, $$W_{(i,j)} = \frac{\partial f_{(i)}}{\partial W_{(j)}}(\hat{x}_{k-1}, u_k, 0),$$

H is the Jacobian matrix of partial derivatives of h with respect to x, $$H_{(i,j)} = \frac{\partial h_{(i)}}{\partial x_{(j)}}(\tilde{x}_k, 0),$$

V is the Jacobian matrix of partial derivatives of h with respect to v, $$V_{(i,j)} = \frac{\partial h_{(i)}}{\partial v_{(j)}}(\tilde{x}_k, 0).$$

Note that for simplicity in the notation we do not use the time step subscript $k_k$ with the Jacobians A, W, H, and V, even though they are in fact different at each time step.

Now we define a new notation for the prediction error, $$\tilde{e}_{x_k} \equiv x_k - \tilde{x}_k, \quad\quad 4.7$$

and the measurement residual, $$\tilde{e}_{z_k} \equiv z_k - \tilde{z}_k. \quad\quad 4.8$$

Remember that in practice one does not have access to $x_x$ in (4.7), it is the actual state vector, i.e. the quantity one is trying to estimate. On the other hand, one does have access to $z_k$ in (4.8), it is the actual measurement that one is using to estimate $z_k$. Using (4.7) and (4.8) we can write governing equations for an error process as $$\tilde{e}_{x_k} = A(X_{k-1} - \hat{x}_{k-1}) + \varepsilon_k, \quad\quad 4.9$$

$$\tilde{e}_{z_k} = H\tilde{e}_{x_k} + \eta_k, \quad\quad 4.10$$

where $\varepsilon_k$ and $\eta_k$ represent new independent random variables having zero mean and covariance matrices $WQW^T$ and $VRV^T$, with Q and R as in (3.3) and (3.4) respectively. Notice that the equations (4.9) and (4.10) are linear, and that they closely resemble the difference and measurement equations (3.1) and (3.2) from the discrete Kalman filter. This motivates us to use the actual measurement residual $\tilde{e}_{z_k}$ in (4.8) and a second (hypothetical) Kalman filter to estimate the prediction error $\tilde{e}_{x_k}$ given by (4.9). This estimate, call it $\hat{e}_k$, could then be used along with (4.7) to obtain the a posteriori state estimates for the original non-linear process as $$\hat{x}_k = \tilde{x}_k + \hat{e}_k. \quad\quad 4.11$$

The random variables of (4.9) and (4.10) have approximately the following probability distributions:

$$p(e_{x_k}) \sim N(0, E[\tilde{e}_{x_k}\tilde{e}_{x_k}^T])$$

$$p(\tilde{\varepsilon}_k) \sim N(0, WQ_k W^T)$$

$$p(\eta_k) \sim N(0, VR_k V^T)$$

Given these approximations and letting the predicted value of $\hat{e}_k$ be zero, the Kalman filter equation used to estimate $\hat{e}_k$ is $$\hat{e}_k = K_k \tilde{e}_{z_k}. \quad\quad 4.12$$

By substituting (4.12) back into (4.11) and making use of (4.8) we see that we do not actually need the second (hypothetical) Kalman filter:

$$\hat{x}_k = \tilde{x}_k + K_k \tilde{e}_{z_k} = \tilde{x}_k + K_k(z_k - \tilde{z}_k) \quad\quad 4.13$$

Equation (4.13) can now be used for the measurement update in the extended Kalman filter, with $\tilde{x}_k$ and $\tilde{z}_k$ coming from (4.3) and (4.4), and the Kalman gain $K_k$ coming from (3.11) with the appropriate substitution for the measurement error covariance.

The complete set of EKF equations is shown below. Note that we have substituted $\hat{x}_k^-$ for $\tilde{x}_k^-$ to remain consistent with the earlier "super minus" a priori notation, and that we now attach the subscript k to the Jacobians A, W, H, and V, to reinforce the notion that they are different at (and therefore must be recomputed at) each time step.

EKF time update equations.

$$\hat{x}_k = f(\hat{x}_{k-1}, u_k, 0), \quad\quad 4.14$$

$$P_k^- = A_k P_{k-1} A_k^T + W_k Q_{k-1} W_k^T \quad\quad 4.15$$

As with the basic discrete Kalman filter, the time update equations (4.14) and (4.15) project the state and covariance estimates from the previous time step k−1 to the current time step k. Again $f$ in (4.14) comes from (4.3), $A_k$ and $W_k$ are the process Jacobians at step k, and $Q_k$ is the process noise covariance (3.3) at step k.

Figure 7:
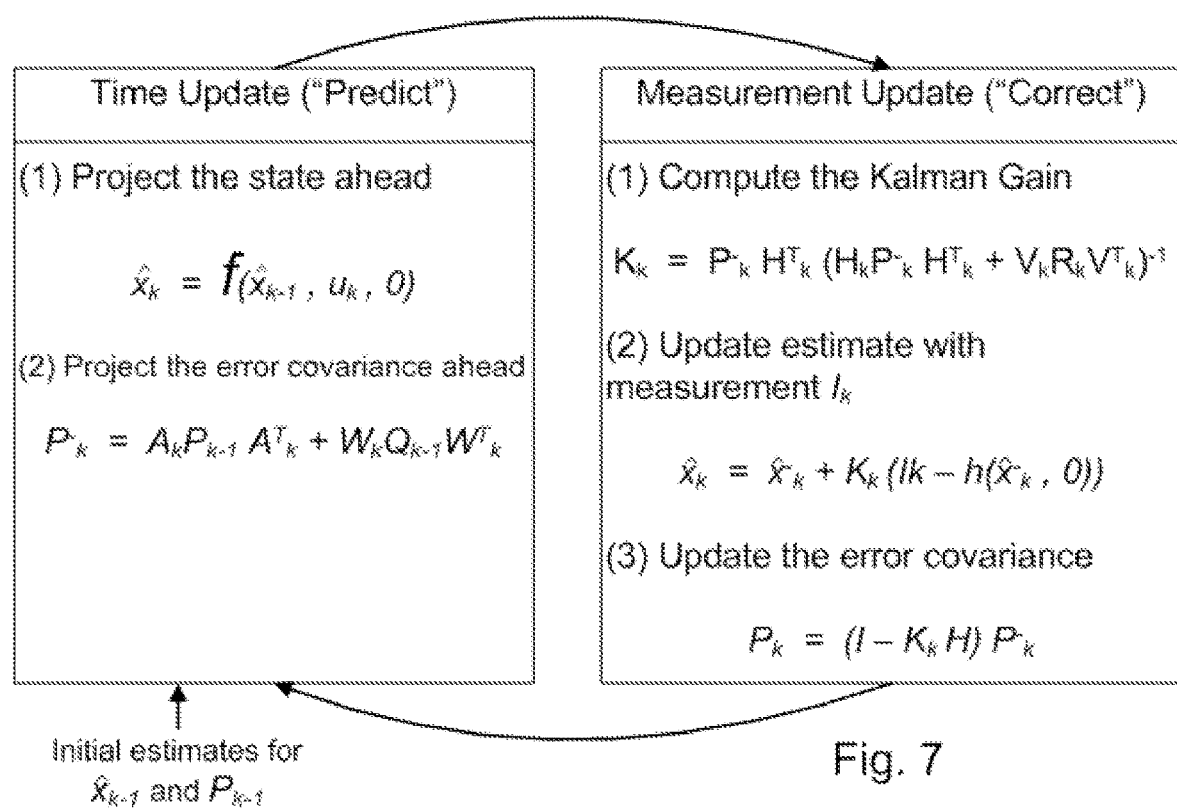
FIG. 7 shows aspects of the extended Kalman filter cycle.

EKF measurement update equations: As with the basic discrete Kalman filter, the measurement update equations (4.16), (4.17) and (4.18) correct the state and covariance estimates with the measurement $z_k$. Again h in (4.17) comes from (3.4), $H_k$ and V are the measurement Jacobians at step k, and $R_k$ is the measurement noise covariance (3.4) at step k. (Note we now subscript R allowing it to change with each measurement.) The basic operation of the EKF is the same as the linear discrete Kalman filter as shown in FIG. 5. FIG. 7 offers a complete picture of the operation of the EKF, combining the high-level diagram of FIG. 5 with the equations (4.14) through (4.18). An important feature of the EKF is that the Jacobian $H_k$ in the equation for the Kalman gain $K_k$ serves to correctly propagate or "magnify" only the relevant component of the measurement information. For example, if there is not a one-to-one mapping between the measurement $z_k$ and the state via h, the Jacobian $H_k$ affects the Kalman gain so that it only magnifies the portion of the residual $z_k-h(\hat{x}_k^-, 0)$ that does affect the state. Of course if over all measurements there is not a one-to-one mapping between the measurement $z_k$ and the state via h, then as you might expect the filter will quickly diverge. In this case the process is unobservable.

$$K_k = P_k^- H_k^T (H_k P_k^- H_k^T + V_k R_k V_k^T)^{-1}, \quad 4.16$$

$$\hat{x}_k = \hat{x}_k^- + K_k(z_k - h(\hat{x}_k^-, 0)), \quad 4.17$$

$$P_k = (I - K_k H_k) P_k^- \quad 4.18$$

The Process Model: In a simple example we attempt to estimate a scalar random constant, a voltage for example. Let's assume that we have the ability to take measurements of the constant, but that the measurements are corrupted by a 0.1 volt RMS white measurement noise (e.g. our analog to digital converter is not very accurate). In this example, our process is governed by the linear difference equation $x_k = Ax_{k-1} + Bu_k + w_k = x_{k-1} + w_k$, with a measurement $z = \Re^1$ that is $z_k = Hx_k + v_k = x_k + v_k$.

The state does not change from step to step so A=1. There is no control input so u=0. Our noisy measurement is of the state directly so H=1. (Notice that we dropped the subscript k in several places because the respective parameters remain constant in our simple model.)

The Filter Equations and Parameters: Our time update equations are $\hat{x}_k^- = \hat{x}_{k-1}$, $P_k^- = P_{k-1} + Q$, and our measurement update equations are $$K_k = P_k^- (P_k^- + R)^{-1} = \frac{P_k^-}{P_k^- + R}, \quad 5.1$$

$$\hat{x}_k = \hat{x}_k^- + K_k(z_k - \hat{x}_k^-), P_k = (1 - K_k) P_k^-.$$

Presuming a very small process variance, we let Q=1e−5. (We could certainly let Q=0 but assuming a small but non-zero value gives us more flexibility in "tuning" the filter as we will demonstrate below.) Let's assume that from experience we know that the true value of the random constant has a standard normal probability distribution, so we will "seed" our filter with the guess that the constant is O. In other words, before starting we let $\hat{X}_{k-1}=0$.

Similarly we need to choose an initial value for $P_{k-1}$, call it $P_0$. If we were absolutely certain that our initial state estimate $\hat{x}=0$ was correct, we would let $P_0=0$. However given the uncertainty in our initial estimate $\hat{x}_0$, choosing $P_0=0$ would cause the filter to initially and always believe $\hat{x}_k=0$. As it turns out, the alternative choice is not critical. We could choose almost any $P_0 \neq 0$ and the filter would eventually converge. It is convenient, for example, to start with $P_0=0$.

Brown92 Brown, R. G. and P. Y. C. Hwang. 1992. Introduction to Random Signals and Applied Kalman Filtering, Second Edition, John Wiley & Sons, Inc.

Gelb74 Gelb, A. 1974. Applied Optimal Estimation, MIT Press, Cambridge, Mass.

Grewal93 Grewal, Mohinder S., and Angus P. Andrews (1993). Kalman Filtering Theory and Practice. Upper Saddle River, N.J. USA, Prentice Hall.

Jacobs93 Jacobs, O. L. R. 1993. Introduction to Control Theory, 2nd Edition. Oxford University Press.

Julier96 Julier, Simon and Jeffrey Uhlman. "A General Method of Approximating Nonlinear Transformations of Probability Distributions," Robotics Research Group, Department of Engineering Science, University of Oxford [cited 14 Nov. 1995]. Available from www.robots.ox.ac.uki/~siju/work/publications/Unscented.zip.

Kalman60 Kalman, R. E. 1960. "A New Approach to Linear Filtering and Prediction Problems," Transaction of the ASME—Journal of Basic Engineering, pp. 35-45 (March 1960).

Lewis86 Lewis, Richard. 1986. Optimal Estimation with an Introduction to Stochastic Control Theory, John Wiley & Sons, Inc.

Maybeck79 Maybeck, Peter 5.1979. Stochastic Models, Estimation, and Control, Volume 1, Academic Press, Inc.

Sorenson70 Sorenson, H. W. 1970. "Least-Squares estimation: from Gauss to Kalman," IEEE Spectrum, vol. 7, pp. 63-68, July 1970.

See, also:

"A New Approach for Filtering Nonlinear Systems" by S. J. Julier, J. K. Uhlmann, and H. F. Durrant-Whyte, Proceedings of the 1995 American Control Conference, Seattle, Wash., Pages: 1628-1632. Available from www.robots.ox-.ac.uk/~siju/work/publications/ACC95_pr.zip Simon Julier's home page at www.robots.ox.ac.uki/~siju/.

"Fuzzy Logic Simplifies Complex Control Problems", Tom Williams, Computer Design, Mar. 1, 1991.

"Neural Network And Fuzzy Systems—A Dynamical Systems Approach To Machine Intelligence", Bart Kaska; Prentice Hall 1992; Englewood Cliffs, N.J.; pp. 13, 18, 19.

B. Krogh et al., "Integrated Path Planning and Dynamic Steering Control for Autonomous Vehicles," 1986.

Brockstein, A., "GPS-Kalman-Augmented Inertial Navigation System Performance," Naecom '76 Record, pp. 864-868, 1976.

Brooks, R., "Solving the Fine-Path Problem by Good Representation of Free Space," IEEE Transactions on Systems, Man, and Cybernetics, pp. 190-197, March-April, 1983.

Brown, R., "Kalman Filtering Study Guide-A Guided Tour," Iowa State University, pp. 1-19, 1984.

Brown, R., Random Signal Analysis & Kalman Filtering, Chapter 5, pp. 181-209, no date.

D. Kuan et al., "Model-based Geometric Reasoning for Autonomous Road Following," pp. 416-423, 1987.

D. Kuan, "Autonomous Robotic Vehicle Road Following," IEEE Transactions on Pattern Analysis and Machine Intelligence, pp. 647-658, 1988.

D. Touretzky et al., "What's Hidden in the Hidden Layers?," Byte, pp. 227-233, August 1989.

Data Fusion in Pathfinder and Travtek, Roy Sumner, VNIS '91 conference, October 20-23, Dearborn, Mich.

Database Accuracy Effects on Vehicle Positioning as Measured by the Certainty Factor, R. Borcherts, C. Collier, E. Koch, R. Bennet, VNIS '91 conference from October 20-23, Dearborn, Mich.

Daum, F., et al., "Decoupled Kalman Filters for Phased Array Radar Tracking," IEEE Transactions on Automatic Control, pp. 269-283, March 1983.

Denavit, J. et al., "A Kinematic Notation for Lower-Pair Mechanisms Bases on Matrices," pp. 215-221, June, 1955.

Dickmanns, E. et al., "Guiding Land Vehicles Along Roadways by Computer Vision", The Tools for Tomorrow, Oct. 23, 1985.

Edward J. Krakiwsky, "A Kalman Filter for Integrating Dead Reckoning, Map Matching and GPS Positioning", IEEE Plans '88 Position Location and Navigation Symposium Record, Kissemee, Fla. USA, Nov. 29-Dec. 2, 1988, pp. 39-46.

Fuzzy Systems and Applications, United Signals and Systems, Inc., Bart Kosko with Fred Watkins, Jun. 5-7, 1991.

IEEE Journal of Robotics & Automation, vol. 4, No. 4, August. 1988, IEEE (New York) J. LeM "Domain-dependent reasoning for visual navigation of roadways, pp. 419-427 (Nissan) Mar. 24, 1988.

J. Crowley, "Part 3: Knowledge Based Supervision of Robotics Systems," 1989 IEEE Conference on Robotics and Automation, pp. 37-42, 1989.

Kaczmarek, K. W., "Cellular Networking: A Carrier's Perspective", 39th IEEE Vehicular Technology Conference, May 1, 1989, vol. 1, pp. 1-6.

Knowledge Representation in Fuzzy Logic, Loth A. Zadeh, IEEE Transactions on Knowledge and Data Engineering, vol. 1, No. 1, March 1989.

Sennott, J. et al., "A Queuing Model for Analysis of A Bursty Multiple-Access Communication Channel," IEEE, pp. 317-321, 1981.

Sheridan, T. "Three Models of Preview Control," IEEE Transactions on Human Factors in Electronics, pp. 91-102, June 1966.

Sheth, P., et al., "A Generalized Symbolic Notation for Mechanism," Transactions of the ASME, pp. 102-112, February 1971.

Sorenson, W., "Least-Squares estimation: From Gauss to Kalman," IEEE Spectrum, pp. 63-68,July 1970.

"Automobile Navigation System Using Beacon Information" pp. 139-145.

W. Uttal, "Teleoperators," Scientific American, pp. 124-129, December 1989.

Wareby, Jan, "Intelligent Signaling: FAR & SS7", Cellular Business, pp. 58, 60 and 62, July 1990.

Wescon/87 Conference Record, vol. 31, 1987, (LA, US) M. T. Allison et al "The next generation navigation system", pp. 941-947.

Ekaterina L.-Rundblad, Alexei Maidan, Peter Novak, Valeriy Labunets, Fast Color Wavelet-Haar Hartley-Prometheus Transforms For Image Processing, www.prometheus-inc.com/asi/algebra2003/papers/katya2.pdf.

Richard Tolimieri and Myoung An, Group Filters And Image Processing, www.prometheus-inc.com/asi/algebra2003/papers/tolimieri.pdf.

Daniel N. Rockmore, Recent Progress And Applications In Group FFTs, www.prometheus-inc.com/asi/algebra2003/papers/rockmore.pdf.

Thomas Theußl and Robert F. Tobler and Eduard Grolier, "The Multi-Dimensional Hartley Transform as a Basis for Volume Rendering", citeseer.nj.nec.com/450842.html.

See also, U.S. Patent Nos. (expressly incorporated herein by reference): U.S. Pat. Nos. 3,582,926; 4,291,749; 4,314,232; 4,337,821; 4,401,848; 4,407,564; 4,419,730; 4,441,405; 4,451,887; 4,477,874; 4,536,739; 4,582,389; 4,636,782; 4,653,003; 4,707,788; 4,731,769; 4,740,779; 4,740,780; 4,752,824; 4,787,039; 4,795,223; 4,809,180; 4,818,048; 4,827,520; 4,837,551; 4,853,687; 4,876,594; 4,914,705; 4,967,178; 4,988,976; 4,995,258; 4,996,959; 5,006,829; 5,043,736; 5,051,735; 5,070,323; 5,070,931; 5,119,504; 5,198,797; 5,203,499; 5,214,413; 5,214,707; 5,235,633; 5,257,190; 5,274,560; 5,278,532; 5,293,115; 5,299,132; 5,334,974; 5,335,276; 5,335,743; 5,345,817; 5,351,041; 5,361,165; 5,371,510; 5,400,045; 5,404,443; 5,414,439; 5,416,318; 5,422,565; 5,432,904; 5,440,428; 5,442,553; 5,450,321; 5,450,329; 5,450,613; 5,475,399; 5,479,482; 5,483,632; 5,486,840; 5,493,658; 5,494,097; 5,497,271; 5,497,339; 5,504,622; 5,506,595; 5,511,724; 5,519,403; 5,519,410; 5,523,559; 5,525,977; 5,528,248; 5,528,496; 5,534,888; 5,539,869; 5,547,125; 5,553,661; 5,555,172; 5,555,286; 5,555,502; 5,559,520; 5,572,204; 5,576,724; 5,579,535; 5,627,547; 5,638,305; 5,648,769; 5,650,929; 5,653,386; 5,654,715; 5,666,102; 5,670,953; 5,689,252; 5,691,695; 5,702,165; 5,712,625; 5,712,640; 5,714,852; 5,717,387; 5,732,368; 5,734,973; 5,742,226; 5,752,754; 5,758,311; 5,777,394; 5,781,872; 5,919,239; 6,002,326; 6,013,956; 6,078,853; 6,104,101; and 6,449,535. M. Krebs, "Cars That Tell You Where To Go," The New York Times, Dec. 15, 1996, section 11, p. 1. L. Kraar, "Knowledge Engineering," Fortune, Oct. 28, 1996, pp. 163-164. S. Heuchert, "Eyes Forward: An ergonomic solution to driver information overload," Society of Automobile Engineering, September 1996, pp. 27-31. J. Braunstein, "Airbag Technology Take Off," Automotive & Transportation Interiors, August 1996, p. 16. I. Adcock, "No Longer Square," Automotive & Transportation Interiors, August 1996, p. 38

One embodiment of the present invention advances the art by explicitly communicating reliability or risk information to the user. Therefore, in addition to communicating an event or predicted event, the system also computes or determines a reliability of the information and outputs this information. The reliability referred to herein generally is unavailable to the original detection device, though such device may generate its own reliability information fora sensor reading.

Therefore, the user interface according to this embodiment is improved by outputting information relating to both the event and a reliability or risk with respect to that information.

According to a preferred embodiment of the invention, a vehicle travel information system is provided, for example integrated with a vehicular navigation system. In a symmetric peer-to-peer model, each vehicle includes both environmental event sensors and a user interface, but the present invention is not dependent on both aspects being present in a device. As the vehicle travels, and as time advances, its context sphere is altered. For any context sphere, certain events or sensed conditions will be most relevant. These most relevant events or sensed, to the extent known by the system, are then output through a user interface. However, often, the nature or existence of relevant or potentially relevant event is unreliable, or reliance thereon entails risk.

In the case of a vehicle traveling along a roadway, there are two particular risks to analyze: first, that the recorded event may not exist (false positive), and second, that an absence of indication of an event is in error (false negative). For example, the degree of risk may be indicated by an indication of color (e.g., red, yellow green) or magnitude (e.g., a bar graph or dial).

In many cases, the degree of risk is calculable, and thus may be readily available. For example, if the event sensor is a detection of police radar, reliability may be inferred from a time since last recording of an event. If a car is traveling along a highway, and receives a warning of traffic enforcement radar from a car one mile ahead, there is a high degree of certainty that the traffic enforcement radar will actually exist as the vehicle proceeds along the highway. Further, if the traffic radar is in fixed location, there is a high degree of certainty that there is no traffic enforcement radar closer than one mile. On the other hand, if a warning of traffic radar at a given location is two hours old, then the risk of reliance on this information is high, and the warning should be deemed general and advisory of the nature of risks in the region. Preferably, as such a warning ages, the temporal proximity of the warning is spread from its original focus.

On the contrary, if the warning relates to a pothole in a certain lane on the highway, the temporal range of risk is much broader: even a week later, the reliability of the continued existence at that location remains high. However, over the course of a year, the reliability wanes. On the other hand, while there may be a risk of other potholes nearby, the particular detected pothole would not normally move.

The algorithm may also be more complex. For example, if a traffic accident occurs at a particular location, there are generally acceptable predictions of the effect of the accident on road traffic for many hours thereafter. These include rubbernecking, migrations of the traffic pattern, and secondary accidents. These considerations may be programmed, and the set of events and datapoints used to predict spatial and temporal effects, as well as the reliability of the existence of such effects. This, in turn, may be used to advise a traveler to take a certain route to a destination.

Eventually, the reliability of the information is inferred to be so low as to cause an expiration of the event, although preferably a statistical database is maintained to indicate geographic regional issues broadly.

Therefore, the system and method according to the present invention provides an output that can be considered "two dimensional" (or higher dimensional); the nature of the warning, and the reliability of the warning. In conjunction, the system may therefore output a reliability of an absence of warning. In order to conserve communications bandwidth, it is preferred that an absence of warning is inferred from the existence of a communications channel with a counterpart, along with a failure of a detection of an event triggering a warning. Alternately, such communications may be explicit.

The present invention can provide a mobile warning system having a user interface for conveying an event warning and an associated reliability or risk of reliance on the warning.

Preferably, the reliability or risk of reliance is assessed based on a time between original sensing and proximity. The reliability may also be based on the nature of the event or sensed condition. An intrinsic reliability of the original sensed event or condition may also be relayed, as distinct from the reliability or risk of reliance assuming the event or condition to have been accurately sensed.

In order to determine risk, often statistical and probabilistic techniques may be used. Alternately, non-linear techniques, such as neural networks, may be employed. In employing a probabilistic scheme, a sensor reading at time zero, and the associated intrinsic probability of error are stored. A model is associated with the sensor reading to determine a decay pattern. Thus, in the case of traffic enforcement radar, the half-life for a "radar trap" for K band radar being fixed in one location is, for example, about 5 minutes. Thereafter, the enforcement officer may give a ticket, and proceed up the road. Thus, for times less than three minutes, the probability of the traffic enforcement radar remaining in fixed position is high. For this same time-period, the probability that the traffic enforcement officer has moved up the road against the direction of traffic flow is low. A car following 3 miles behind a reliable sensor at 60 mph would therefore have a highly reliable indication of prospective conditions. As the time increases, so does the risk; a car following ten miles behind a sensor would only have a general warning of hazards, and a general indication of the lack thereof. However, over time, a general (and possibly diurnal or other cyclic time-sensitive variation) risk of travel within a region may be established, to provide a baseline.

It is noted that the risks are not limited to traffic enforcement radar or laser. Rather, the scheme according to the present invention is generalized to all sorts of risks. For example, a sensor may detect or predict sun glare. In this case, a model would be quite accurate for determining changes overtime, and assuming a reliable model is employed, this condition could generally be accurately predicted.

Another example is road flooding. This may be detected, for example, through the use of optical sensors, tire drag sensors, "splash" sensors, or other known sensors. In this case, the relevant time-constant for onset and decay will be variable, although for a given location, the dynamics may be modeled with some accuracy, based on sensed actual conditions, regional rainfall, ground saturation, and particular storm pattern. Therefore, a puddle or hydroplaning risk may be communicated to the driver in terms of location, likely magnitude, and confidence.

It is noted that these three independent parameters need not all be conveyed to the user. For example, the geographic proximity to an event location may be used to trigger an output. Therefore, no independent output of location may be necessary in this case. In some cases, the magnitude of the threat is relevant, in other cases it is not. In many present systems (e.g., radar detection), threat magnitude is used as a surrogate for risk. However, it is well understood that there are high magnitude artifacts, and low magnitude true threats, and thus this paradigm has limited basis for use. The use of risk or confidence as an independent factor may be express or intermediate. Thus, a confidence threshold may be internally applied before communicating an event to the user. In determining or predicting risk or confidence, it may be preferred to provide a central database. Therefore, generally more complex models may be employed, supported by a richer data set derived from many measurements over an extended period of time. The central database may either directly perform the necessary computations, or convey an appropriate model, preferably limited to the context (e.g., geography, time, general environmental conditions), for local calculation of risk.

The incorporated references relate, for example, to methods and apparatus which may be used as part of, or in conjunction with the present invention. Therefore, it is understood that the present invention may integrate other systems, or be integrated in other systems, having complementary, synergistic or related in some way. For example, common sensors, antennas, processors, memory, communications hardware, subsystems and the like may provide a basis for combination, even if the functions are separate.

The techniques according to the present invention may be applied to other circumstances. Therefore, it is understood that the present invention has, as an object to provide a user interface harnessing the power of statistical methods. Therefore, it is seen that, as an aspect of the present invention, a user interface, a method of providing a user interface, computer software for generating a human-computer interface, and a system providing such a user interface, presents a prediction of a state as well as an indication of a statistical reliability of the prediction.

Within a vehicular environment, the statistical analysis according to the present invention may also be used to improve performance and the user interface of other systems. In particular, modern vehicles have a number of indicators and warnings. In most known systems, warnings are provided at pre-established thresholds. According to the present invention, a risk analysis may be performed on sensor and other data to provide further information for the user, e.g., an indication of the reliability of the sensor data, or the reliability under the circumstances of the sensor data as basis for decision. (For example, a temperature sensor alone does not indicate whether an engine is operating normally.)

Example 1

The present example provides a mobile telecommunications device having a position detector, which may be absolute, relative, hybrid, or other type, and preferably a communications device for communicating information, typically location relevant information. The device may serve as a transmitter, transmitting information relevant to the location (or prior locations) of the device, a receiver, receiving information relevant to the location (or prospective location) of the device, or a composite. In the case of a transmitter device or stand-alone device, a sensor is provided to determine a condition of or about the device or its context. This sensor may populate a map or mapping system with historical map data.

During use, a receiving device seeks to output location context-relevant information to the user, and therefore in this embodiment includes a human user interface. Typically, in a vehicle having a general linear or highly constrained type path, a position output is not a critical feature, and may be suppressed in order to simplify the interface. Rather, a relative position output is more appropriate, indicating a relative position (distance, time, etc.) with respect to a potential contextually relevant position. In addition, especially in systems where a plurality of different types of sensors or sensed parameters are available, the nature of the relevant context is also output. Further, as a particular feature of the present invention, a risk or reliability assessment is indicated to the user. This risk or reliability assessment is preferably statistically derived, although it may be derived through other known means, for example Boolean analysis, fuzzy logic, or neural networks.

For example, the device may provide weather information to the user. Through one or more of meteorological data from standard reporting infrastructure (e.g., NOAA, Accuweather®, etc.), mobile reporting nodes (e.g., mobiles devices having weather sensors), satellite data, and other weather data sources, a local weather map is created, preferably limited to contextual relevance. In most cases, this weather map is stored locally; however, if the quality of service for a communications link may be assured, a remote database system serving one or more devices may be provided. For example, a cellular data communications system may be used to communicate with the Internet or a service provider.

The mobile unit, in operation, determines its position, and, though explicit user input and/or inferential analysis, determines the itinerary or expected path of the device and time sequence. The device (or associated systems) then determines the available weather information for the route and anticipated itinerary (which may itself be dependent on the weather information and/or reaction thereto). This available information is then modeled, for example using a statistical model as described hereinabove, to predict the forthcoming weather conditions for the device or transporting vehicle. The device then determines the anticipated conditions and relevance sorts them. In this case, both positive and negative information may be useful, i.e., a warning about bad weather, ice, freezing road surfaces, fog, sand-storms, rain, snow, sleet, hail, sun glare, etc., and an indication of dry, warm, well-illuminated road surfaces may both be useful information.

In addition, through the analysis, a number of presumptions and predictions are made, for example using a chain. Therefore, while the system may predict a most likely state of affairs, this alone does not provide sufficient information for full reliance thereon. For example, the present road surface freezing conditions thirty miles ahead on a road may be a poor indicator of the road conditions when the device is at that position. In addition to changes in the weather, human action may be taken, such as road salt, sand, traffic, etc., which would alter the conditions, especially in response to a warning. On the other hand, a report of freezing road conditions one mile ahead would generally have high predictive value for the actual road conditions when the device is at that location, assuming that the vehicle is traveling in that direction. In many cases, there is too much raw information to effectively display to the user all relevant factors in making a reliability or risk determination. Thus, the device outputs a composite estimation of the reliability or risk, which may be a numeric or non-parametric value. This is output in conjunction with the nature of the alert and its contextual proximity.

As stated above, there will generally be a plurality of events, each with an associated risk or reliability and location. The relevance of an event may be predicted based on the dynamics of the vehicle in which the device is transported and the nature of the event. Thus, if the vehicle requires 170 feet to stop from a speed of 60 MPH, a warning which might trigger a panic stop should be issued between 170-500 feet in advance. If the warning is triggered closer than 170 feet, preferably the warning indicates that the evasive maneuver will be necessary.

In this case, the risk indicator includes a number of factors. First, there is the reliability of the data upon which the warning is based. Second, there is the reliability of the predictive model which extrapolates from, the time the raw data is acquired to the conjunction of the device and the location of the event. Third, there is an assessment of the relative risks of, responding to a false positive versus failing to respond to a false negative. Other risks may also be included in the analysis. Together, the composite risk is output, for example as a color indicator. Using, for example, a tricolor (red-green-blue) light emitting diode (LED) or bicolor LED (red-green), a range of colors may be presented to the user. Likewise, in an audio alert, the loudness or harmonic composition (e.g., harmonic distortion) of a tone or alert signal may indicate the risk or reliability. (In the case of loudness, preferably a microphone measures ambient noise to determine a minimum loudness necessary to indicate an alert).

The position detector is preferably a GPS or combined GPS-GLONASS receiver, although a network position detection system (e.g., Enhanced 911 type system) may also be employed. Preferably, the position detector achieves an accuracy of ±30 meters 95% of the time, and preferably provides redundant sensors, e.g., GPS and inertial sensors, in case of failure or error of one of the systems. However, for such purposes as pothole reporting, positional accuracies of 1 to 3 meters are preferred. These may be obtained through a combination of techniques, and therefore the inherent accuracy of any one technique need not meet the overall system requirement. The position detector may also be linked to a mapping system and possibly a dead reckoning system, in order to pinpoint a position with a geographic landmark. Thus, while precise absolute coordinate measurements of position may be used, it may also be possible to obtain useful data at reduced cost by applying certain presumptions to available data. In an automotive system, steering angle, compass direction, and wheel revolution information may be available, thereby giving a rough indication of position from a known starting point. When this information is applied to a mapping system, a relatively precise position may be estimated. Therefore, the required precision of another positioning system used in conjunction need not be high, in order to provide high reliability position information. For example, where it is desired to map potholes, positional accuracy of 10 cm may be desired, far more precise than might be available from a normal GPS receiver mounted in a moving automobile. Systems having such accuracy may then be used as part of an automated repair system. However, when combined with other data, location and identification of such events is possible. Further, while the system may include or tolerate inaccuracies, it is generally desired that the system have high precision, as compensation for inaccuracies may be applied.

A typical implementation of the device provides a memory for storing events and respective locations. Preferably, further information is also stored, such as a time of the event, its character or nature, and other quantitative or qualitative aspects of the information or its source and/or conditions of acquisition. This memory may be a solid state memory or module (e.g., 64-256 MB Flash memory), rotating magnetic and/or optical memory devices, or other known types of memory.

The events to be stored may be detected locally, such as through a detector for radar and/or laser emission source, radio scanner, traffic or road conditions (mechanical vehicle sensors, visual and/or infrared imaging, radar or LIDAR analysis, acoustic sensors, or the like), places of interest which may be selectively identified, itinerary stops, and/or fixed locations. The events may also be provided by a remote transmitter, with no local event detection. Therefore, while means for identifying events having associated locations is a part of the system as a whole, such means need not be included in every apparatus embodying the invention.

Radar detectors typically are employed to detect operating emitters of X (10.5 GHz), K (25 G Hz) and Ka (35 GHz) radar emissions from traffic control devices or law enforcement personnel for detecting vehicle speed by the Doppler effect. These systems typically operate as superheterodyne receivers which sweep one or more bands, and detect a wave having an energy significantly above background. As such, these types of devices are subject to numerous sources of interference, accidental, intentional, and incidental. A known system, Safety Warning System (SWS) licensed by Safety Warning System L.C., Englewood Fla., makes use of such radar detectors to specifically warn motorists of identified road hazards. In this case, one of a set of particular signals is modulated within a radar band by a transmitter operated near the roadway. The receiver decodes the transmission and warns the driver of the hazard.

LIDAR devices emit an infrared laser signal, which is then reflected off a moving vehicle and analyzed for delay, which relates to distance. Through successive measurements, a sped can be calculated. A LIDAR detector therefore seeks to detect the characteristic pulsatile infrared energy.

Police radios employ certain restricted frequencies, and in some cases, police vehicles continuously transmit a signal. While certain laws restrict interception of messages sent on police bands, it is believed that the mere detection and localization of a carrier wave is not and may not be legally restricted. These radios tend to operate below 800 MHz, and thus a receiver may employ standard radio technologies.

Potholes and other road obstructions and defects have two characteristics. First, they adversely affect vehicles which encounter them. Second, they often cause a secondary effect of motorists seeking to avoid a direct encounter or damage, by slowing or executing an evasive maneuver. These obstructions may therefore be detected in three ways; first, by analyzing the suspension of the vehicle for unusual shocks indicative of such vents; second, by analyzing speed and steering patterns of the subject vehicle and possibly surrounding vehicles; and third, by a visual, ultrasonic, or other direct sensor for detecting the pothole or other obstruction. Such direct sensors are known; however, their effectiveness is limited, and therefore an advance mapping of such potholes and other road obstructions greatly facilitates avoiding vehicle damage and executing unsafe or emergency evasive maneuvers. An advance mapping may also be useful in remediation of such road hazards, as well.

Traffic jams occur for a variety of reasons. Typically, the road carries traffic above a threshold, and for some reason the normal traffic flow patterns are disrupted. Therefore, there is a dramatic slowdown in the average vehicle speed, and a reduced throughput. Because of the reduced throughput, even after the cause of the disruption has abated, the roadways may take minutes to hours to return to normal. Therefore, it is typically desired to have advance warnings of disruptions, which include accidents, icing, rain, sun glare, lane closures, road debris, police action, exits and entrances, and the like, in order to allow the driver to avoid the involved region or plan accordingly. Abnormal traffic patterns may be detected by comparing a vehicle speed to the speed limit or a historical average speed, by a visual evaluation of traffic conditions, or by broadcast road advisories. High traffic conditions are associated with braking of traffic, which in turn results in deceleration and the illumination of brake lights. Brake lights may be determined by both the specific level of illumination and the center brake light, which is not normally illuminated. Deceleration may be detected by an optical, radar or LIDAR sensor for detecting the speed and/or acceleration state of nearby vehicles.

While a preferred embodiment of the present invention employs one or more sensors, broadcast advisories, including those from systems according to or compatible with the present invention, provide a valuable source of information relating to road conditions and information of interest at a particular location. Therefore, the sensors need not form a part of the core system. Further, some or all of the required sensors may be integrated with the vehicle electronics ("vetronics"), and therefore the sensors may be provided separately or as options. It is therefore an aspect of an embodiment of the invention to integrate the transceiver, and event database into a vetronics system, preferably using a digital vetronics data bus to communicate with existing systems, such as speed sensors, antilock brake sensors, cruise control, automatic traction system, suspension, engine, transmission, and other vehicle systems.

According to one aspect of the invention, an adaptive cruise control system is provided which, in at least one mode of operation, seeks to optimize various factors of vehicle operation, such as fuel efficiency, acceleration, comfort, tire wear, etc. For example, an automatic acceleration feature is provided which determines a most fuel-efficient acceleration for a vehicle. Too slow an acceleration will result in increased time at suboptimal gear ratios, while too fast acceleration will waste considerable fuel. Actual operating efficiency may be measured during vehicle use, allowing an accurate prediction of fuel efficiency under dynamically changing conditions, such as acceleration. Vehicle sensors may assist in making a determination that optimum acceleration is safe; objects both in front and behind the vehicle may be sensed. If an object is in front of the vehicle, and the closing speed would predict a collision, then the acceleration is decreased, or even brakes applied. If an object is rapidly advancing from the rear, the acceleration may be increased in order to avoid impact or reduce speed differential. See, U.S. Pat. Nos. 6,445,308, 6,436,005, 6,418,367, expressly incorporated herein by reference.

Likewise, the operation of a vehicle may be optimized approaching a stop, such as a stop sign, red light, or the like. In this case, the system optimization may be more complex. In addition to fuel economy, wear on brakes, engine (especially if compression braking is employed), transmission, tires, suspension, time, accident-related risks, and the like, may also be included. In the case of a stop sign, the issue also arises with respect to a so-called "rolling stop". Such a practice provides that the vehicle does not actually stop, but reaches a sufficiently low speed that the driver could stop if required by circumstances. While this practice is technically considered a violation, in many instances, it is both efficient and useful. For example, a stop line is often located behind an intersection, with impaired visibility. Thus, the vehicle might come to a complete stop, begin to accelerate, and then find that the intersection is not clear, and be forced to stop again. One particular reason for a rolling stop is the storage of energy in the vehicular suspension during acceleration and deceleration. As the vehicle comes to a stop, the springs and shock absorbers of the suspension undergo a damped oscillation, which is relatively uncomfortable, and destabilizes the vehicle and its contents.

According to one aspect of the present invention, the driver may locate a deceleration target and/or a target speed. The vehicle navigation system may assist, recording an exact location of a stop line, geographic (hills, curves, lane marker locations, etc.), weather conditions (ice, sand, puddles, etc.) and other circumstances surrounding the vehicle. Other vehicles and obstructions or pedestrians, etc. may also be identified and modeled. Using models of the various components, as well as cost functions associated with each, as well as subjective factors, which may include vehicle occupant time-cost and comfort functions, an optimal acceleration or deceleration profile may be calculated. The system may therefore express control over throttle, brakes, transmission shifts, clutch, valve timing, suspension controls, etc., in order to optimize vehicle performance.

See U.S. (expressly incorporated herein by reference): U.S. Pat. Nos. 6,503,170; 6,470,265; 6,445,308; 6,292,743; 6,292,736; 6,233,520; 6,230,098; 6,220,986; 6,202,022; 6,199,001; 6,182,000; 6,178,377; 6,174,262; 6,098,016; 6,092,014; 6,092,005; 6,091,956; 6,070,118; 6,061,003; 6,052,645; 6,034,626; 6,014,605; 5,990,825; 5,983,154; 5,938,707; 5,931,890; 5,924,406; 5,835,881; 5,774,073; 6,442,473; 4,704,610; 5,712,632; 5,973,616; and 6,008,741.

The radio used for the communications subsystem can be radio frequency AM, FM, spread spectrum, microwave, light (infrared, visible, UV) or laser or maser beam (millimeter wave, infrared, visible), or for short distance communications, acoustic or other communications may be employed. The system preferably employs an intelligent transportation system (ITS) or Industrial, Scientific and Medical (ISM) allocated band, such as the 915 MHz, 2.4 MHz or 5.8 GHz band. (The 2.350-2.450 GHz band corresponds to the emission of microwave ovens, and thus the band suffers from potentially significant interference). The 24.125 GHz band, corresponding to K-band police radar, may also be available; however, transmit power in this band is restricted, e.g., less than about 9 mW. The signal may be transmitted through free space or in paths including fiber optics, waveguides, cables or the like. The communication may be short or medium range omnidirectional, line of sight, reflected (optical, radio frequency, retroreflector designs), satellite, secure or non-secure, or other modes of communications between two points, that the application or state-of-the-art may allow. The particular communications methodology is not critical to the invention, although a preferred embodiment employs a spread spectrum microwave transmission.

A particularly preferred communications scheme employs steerable high gain antennas, for example a phased array antenna, which allows a higher spatial reuse of communications bands and higher signal to noise ratio that an omnidirectional antenna.

A number of Dedicated Short Range Communications (DSRC) systems have been proposed or implemented in order to provide communications between vehicles and roadside systems. These DSRC systems traditionally operate in the 900 MHz band for toll collection, while the FCC has recently made available 75 MHz in the 5.850-5.925 GHz range for such purposes, on a co-primary basis with microwave communications, satellite uplinks, government radar, and other uses. However, spectrum is also available in the so-called U-NII band, which encompasses 5.15-5.25 GHz (indoors, 50 mW) and 5.25-5.35 (outdoors, 250 mW). A Japanese ITS ("ETC") proposal provides a 5.8 GHz full duplex interrogation system with a half duplex transponder, operating at about 1 megabit per second transmission rates.

In August 2001, the DSRC standards committee (ASTM 17.51) selected 802.11a as the underlying radio technology for DSRC applications within the 5.850 to 5.925 GHz band. The IEEE 802.11a standard was modified, in a new standard referred to as 802.11a R/A (roadside applications) to meet DSRC deployment requirements, and includes OFDM modulation with a lower data rate, 27 MBS for DSRC instead of 54 MBS for 802.11a.

Proposed DSRC applications include: Emergency Vehicle Warning—Currently, emergency vehicles only have sirens and lights to notify of their approach. With DSRC, the emergency vehicle can have the traffic system change traffic lights to clear traffic along it's intended route. Also, this route information can be broadcast to other cars to provide user/vehicle specific directions to reduce collisions; Traffic congestion data can be exchanged between vehicles. Oncoming traffic exchanges information on traffic status ahead so that vehicle navigation systems can dynamically provide the best route to a destination; An industry standard interoperable tolling platform could expand the use of toll systems or processing payments at parking lots, drive-through establishments (food, gas), etc.; and Safety applications could benefit from use of DSRC. The DSRC automaker consortium (DaimlerChrysler, GM, Ford, Toyota, Nissan, & VW) are seeking ways to enhance passenger safety with DSRC communications. For example, in a typical collision, a car has only 10 milliseconds to tighten seatbelts, deploy airbags, etc. If an additional advance warning of 5 milliseconds was provided, one could tighten seatbelts, warm-up the airbags, etc. to prepare the car for collision. Using radar, GPS data, etc. a car can determine that a collision is imminent, and it can then notify the car about to be hit to prepare for collision.

See: ASTM E2213-02-Standard Specification for Telecommunications and Information Exchange Between Roadside and Vehicle Systems—5 GHz Band Dedicated Short Range Communications (DSRC) Medium Access Control (MAC) and Physical Layer (PHY) Specifications (This standard, ASTM E2213-02-Standard Specification for Telecommunications and Information Exchange Between Roadside and Vehicle Systems—5 GHz Band Dedicated Short Range Communications (DSRC) Medium Access Control (MAC) and Physical Layer (PHY) Specifications, describes a medium access control layer (MAC) and physical layer (PHY) specification for wireless connectivity using dedicated short-range communications (DSRC) services. This standard is based on and refers to the Institute of Electrical and Electronics Engineers (IEEE) standard 802.11 (Wireless LAN Medium Access Control and Physical Layer specifications), and standard 802.11a (Wireless LAN Medium Access Control and Physical Layer specifications High-Speed Physical Layer in the 5 GHz band). This standard is an extension of IEEE 802.11 technology into the high-speed vehicle environment. It contains the information necessary to explain the difference between IEEE 802.11 and IEEE 802.11a operating parameters required to implement a mostly high-speed data transfer service in the 5.9-GHz Intelligent Transportation Systems Radio Service (ITS-RS) band or the Unlicensed National Information Infrastructure (UNII) band, as appropriate). ANSI X3.38-1988 (R1994)—Codes—Identification of States, the District of Columbia, and the Outlying and Associated Areas of the United States for Information Interchange; ASTM PS111-98—Specification for Dedicated Short Range Communication (DSRC) Physical Layer Using Microwave in the 902 to 928 MHz Band; ASTM PS105-99—Specification for Dedicated Short Range Communication (DSRC) Data Link Layer: Medium Access and Logical Link Control; CEN Draft Document: prENV278/9/#65 Dedicated Short Range Communication (DSRC)—Application Layer (Layer 7); IEEE Std 1489-1999—Standard for Data Dictionaries for Intelligent Transportation Systems—Part 1: Functional Area Data Dictionaries; GSS Global Specification for Short Range Communication. The platform for Interoperable Electronic Toll Collection and Access Control; ISO 3166-1:1997—Codes for the representation of names of countries and their subdivisions—Part 1: Country codes; ISO 3779:1983—Road vehicles—Vehicle identification numbering (VIN)—Content and structure; ISO/IEC 7498-1:1994—Information technology—Open Systems Interconnection—Basic Reference Model: The Basic Model; ISO 7498-2:1989—Information processing systems—Open Systems Interconnection—Basic Reference Model—Part 2: Security Architecture; ISO/IEC 7498-3:1997—Information technology—Open Systems Interconnection—Basic Reference Model: Naming and addressing; ISO/IEC 7498-4:1989—Information processing systems—Open Systems Interconnection—Basic Reference Model—Part 4: Management framework; ISO 3780:1983—Road vehicles—World manufacturer identifier (WMI) code; ISO/IEC 8824-1:1995—Information technology—Abstract Syntax Notation One (ASN.1): Specification of basic notation; ISO/IEC 8825-2: 1996—Information technology—ASN.1 encoding rules: Specification of Packed Encoding Rules (PER); ISO TC204 WG15 Committee Of Japan TICS/DSRC—DSRC Application Layer High Data Rate mobile environment; ASTM E2158-01—Standard Specification for Dedicated Short Range Communication (DSRC) Physical Layer Using Microwave in the 902-928 MHz Band; ASTM PS 105-99—Standard Provisional Specification for Dedicated Short Range Communication (DSRC) Data Link Layer; IEEE Std 1455-1999—Standard for Message Sets for Vehicle/Roadside Communications; IEEE Std 802.11-1999—Information Technology—Telecommunications and information exchange between systems—Local and metropolitan area networks—Specific requirements—Part 11: Wireless LAN Medium Access Control and Physical Layer specifications; IEEE Std 802.11a-1999—Information Technology—Telecommunications and information exchange between systems—Local and metropolitan area networks—Specific requirements—Part 11: Wireless LAN Medium Access Control and Physical Layer specifications: High Speed Physical Layer in the 5 GHz band. Each of which is expressly incorporated herein in its entirety.

It is noted that the present technology has the capability for streamlining transportation systems, by communicating traffic conditions almost immediately and quickly allowing decisions to be made by drivers to minimize congestion and avoid unnecessary slowdowns. A particular result of the implementation of this technology will be a reduction in vehicular air pollution, as a result of reduced traffic jams and other inefficient driving patterns. To further the environmental protection aspect of the invention, integration of the database with cruise control and driver information systems may reduce inefficient vehicle speed fluctuations, by communicating to the driver or controlling the vehicle at an efficient speed. As a part of this system, therefore, adaptive speed limits and intelligent traffic flow control devices may be provided. For example, there is no need for fixed time traffic lights if the intersection is monitored for actual traffic conditions. By providing intervehicle communications and identification, such an intelligent system is easier to implement. Likewise, the 55 miles per hour speed limit that was initially presented in light of the "oil crisis" in the 1970's, and parts of which persist today even in light of relatively low petroleum pricing and evidence that the alleged secondary health and safety benefit is marginal or non-existent, may be eliminated in favor of a system which employs intelligence to optimize the traffic flow patterns based on actual existing conditions, rather than a static set of rules which are applied universally and without intelligence.

The communications device may be a transmitter, receiver or transceiver, transmitting event information, storing received event information, or exchanging event information, respectively. Thus, while the system as a whole typically involves a propagation of event information between remote databases, each system embodying the invention need not perform all functions.

In a retroreflector system design, signal to noise ratio is improved by spatial specificity, and typically coherent detection. An interrogation signal is emitted, which is modulated and redirected back toward its source, within a relatively wide range, by a receiver. Thus, while the receiver may be "passive", the return signal has a relatively high amplitude (as compared to non-retroreflective designs under comparable conditions) and the interrogator can spatially discriminate and coherently detect the return signal. Both optical and RF retroreflector systems exist. This technique may also be used to augment active communications schemes, for example allowing a scanning or array antenna to determine an optimal position or spatial sensitivity or gain, or a phased array or synthetic aperture array to define an optimal spatial transfer function, even in the presence of multipath and other types of signal distortion and/or interference.

According to one embodiment of the invention, a plurality of antenna elements are provided. These may be, for example, a set of high gain antennas oriented in different directions, or an array of antennas, acting together. Accordingly, the antenna structure permits a spatial division multiplexing to separate channels, even for signals which are otherwise indistinguishable or overlapping. For example, this permits a single antenna system to communicate with a plurality of other antenna systems at the same time, with reduced mutual interference. Of course, these communications channels may be coordinated to further avoid overlap. For example, the communications band may be subdivided into multiple channels, with respective communications sessions occurring on different channels. Likewise, a plurality of different bands may be simultaneously employed, for example 802.11g (2.4 GHz), 802.11a (5.4 GHz), and 802.11a R/A (5.9 GHz). In another embodiment, a mechanically scanning high gain antenna may provide directional discrimination. Such an antenna may be, for example, a cylindrical waveguide electromagnetically reflective at one end, having a diameter corresponding to the wavelength of the band, and with a probe extending about half-way into the cylinder perpendicularly to its axis, at about a quarter wavelength from the reflective end. Likewise, a so-called "Pringles Can Antenna", which has been termed a Yagi design, and known modifications thereof, have been deemed useful for extending the range of 802.11b communications.

According to one embodiment, a radome may be provided on the roof of a vehicle, having therein an antenna array with, for example, 4-64 separate elements. These elements, are, for example, simple omnidirectional dipole antennas. The size and spacing of the antenna elements is generally determined by the wavelength of the radiation. However, this distance may be reduced by using a different dielectric than air. For example, see U.S. Pat. No. 6,452,565, expressly incorporated herein by reference. See, also www.antenova.com (Antenova Ltd., Stow-cum-Quy, Cambridge, UK). A preferred radome also includes a GPS antenna, as well as cellular radio antenna (IS-95, PCS, GSM, etc.).

In a preferred embodiment, the communications device employs an unlicensed band, such as 900 MHz (902-928 MHz), FRS, 49 MHz, 27 MHz, 2.4-2.5 GHz, 5.4 GHz, 5.8 GHz, etc. Further, in order to provide noise immunity and band capacity, spread spectrum RF techniques are preferred.

In one embodiment, communications devices are installed in automobiles. Mobile GPS receivers in the vehicles provide location information to the communications devices. These GPS receivers may be integral or separate from the communications devices. Event detectors, such as police radar and laser (LIDAR) speed detectors, traffic and weather condition detectors, road hazard detectors (pot holes, debris, accidents, ice, mud and rock slides, drunk drivers, etc.), traffic speed detectors (speedometer reading, sensors for detecting speed of other vehicles), speed limits, checkpoints, toll booths, etc., may be provided as inputs to the system, or appropriate sensors integrated therein. The system may also serve as a beacon to good Samaritans, emergency workers and other motorists in the event of accident, disablement, or other status of the host vehicle.

It is noted that at frequencies above about 800 MHz, the transmitter signal may be used as a part of a traffic radar system. Therefore, the transmitted signal may serve both as a communications stream and a sensor emission. Advantageously, an electronically steerable signal is emitted from an array. Reflections of the signal are then received and analyzed for both reflection time coefficients and Doppler shifts. Of course, a radar may use static antennas and/or mechanically scanning antennas, and need not completely analyze the return signals.

Functions similar to those of the Cadillac (GM) On-Star system may also be implemented, as well as alarm and security systems, garage door opening and "smart home" integration. Likewise, the system may also integrate with media and entertainment systems. See, U.S. Pat. Nos. 6,418,424; 6,400,996; 6,081,750; 5,920,477; 5,903,454; 5,901,246; 5,875,108; 5,867,386; 5,774,357, expressly incorporated herein by reference. These systems may reside in a fixed location, within the vehicle, or distributed between fixed and mobile locations. The system may also integrate with a satellite radio system, and, for example, the satellite radio antenna may be included in the antenna system for other communication systems within the vehicle.

The memory stores information describing the event as well as the location of the event. Preferably, the memory is not organized as a matrix of memory addresses corresponding to locations, e.g., a "map", but rather in a record format having explicitly describing the event and location, making storage of the sparse matrix more efficient and facilitating indexing and sorting on various aspects of each data record. Additional information, such as the time of the event, importance of the event, expiration time of the event, source and reliability of the event information, and commercial and/or advertising information associated with the event may be stored. The information in the memory is processed to provide a useful output, which may be a simple alphanumeric, voice (audible) or graphic output or the telecommunications system. In any case, the output is preferably presented in a sorted order according to pertinence, which is a combination of the abstract importance of the event and proximity, with "proximity" weighted higher than "importance". Once a communication or output cycle is initiated, it may continue until the entire memory is output, or include merely output a portion of the contents.

Typically, a navigation system includes a raster "map" of geographic regions, which is further linked to a database of features, geocoded to the map. Alternately, the map may itself be a set of geocoded features, without a raster representation. Various events and features defined by the sensors provided by the present system, or received through a communications link, may therefore be overlaid or integrated into the geocoded features. Advantageously, all of the geocoded features are separately defined from the static geography, and therefore may be separately managed and processed. For example, geologic features are persistent, and absent substantial human activity or natural disaster, are persistent. Other features, such as roads, attractions, and other conditions, are subject to change periodically. Each geocoded feature (or indeed, any feature or event, whether geocoded or not) may be associated with a time-constant representing an estimated life; as the time since last verification increases, the probability of change also increases. This may be used to provide a user with an estimation of the reliability of the navigation system, or indeed any output produced by the system. It is noted that the time-constant may also be replaced with an expression or analysis which is a function of time, that is, to account for diurnal, weekly, seasonal, annual, etc. changes. Such expression or analysis need to be repetitive; for example, after an abnormality in traffic flow, traffic patterns tend to remain distorted for a long period (e.g., hours) after the abnormality is corrected, or after a driver passes the abnormality; this distortion is both temporally and spatially related to the original abnormality, and may be statistically estimated. Chaos, fractal and/or wavelet theories may be particularly relevant to this analysis.

In outputting information directly to a human user, thresholds are preferably applied to limit output to events which are of immediate consequence and apparent importance. For example, if the communications device is installed in a vehicle, and the information in the memory indicates that a pothole, highway obstruction, or police radar "trap" is ahead, the user is informed. Events in the opposite direction (as determined by a path or velocity record extracted from the position detector) are not output, nor are such events far away. On the other hand, events such as road icing, flooding, or the like, are often applicable to all nearby motorists, and are output regardless of direction of travel, unless another communications device with event detector indicates that the event would not affect the local communications device or the vehicle in which it is installed.

According to an embodiment of the invention, relevance of information and information reliability are represented as orthogonal axes. For each set of facts or interpretation (hypothesis) thereof, a representation is projected on the plane defined by these two axes. This representation for each event generally takes the form of a bell curve, although the statistics for each curve need not be Gaussian. The area under the superposed curves, representing the constellation of possible risks or relevances, are then integrated, starting with relevance=1.00 (100%), proceeding toward relevance=0.00 (0%). As the area under a given peak exceeds a threshold, which need not be constant, and indeed may be a function of relevance or reliability, and/or subjective factors, the event is presented as a warning output to the user. This method ensures that the output includes the most relevant events before less relevant events, but excluding those events with low reliability. Using a dynamic threshold, highly relevant events of low reliability are presented, while low relevance events of even modest reliability are suppressed. It is possible for the threshold to exceed 1.0, that is, a complete suppression of irrelevant events, regardless of reliability.

Alternately, the event projection into the relevance-reliability plane may be normalized by a function which accounts for the desired response function, with a static threshold applied.

The reason why the determination employs an integration of a stochastic distribution, rather than a simple scalar representation of events, is that this allows certain events with broad distributions, but a mean value below that of another event with a narrower distribution, to be ranked ahead, as being more significant. This has potentially greater impact for events having decidedly non-normal distributions, for example with significant kurtosis, skew, multimodality, etc., and in which a mean value has no readily interpretable meaning.

The present invention therefore provides a method, comprising receiving a set of facts or predicates, analyzing the set of facts or predicates to determine possible events, determining, from the possible events, a relevance to a user and associated statistical distribution thereof, and presenting a ranked set of events, wherein said ranking is dependent on both relevance and associated statistical distribution. The associated statistical distribution, for example, describes a probability of existence of an associated event, and the relevance comprises a value function associated with that event if it exists, wherein said ranking comprises an analysis of probability-weighted benefits from each event to an overall utility function for the user. The ranking may comprises a combinatorial analysis of competing sets of rankings.

It is therefore apparent that each event, that is, a set of facts or factual predicates, or conclusions drawn therefrom, are represented as a distribution projected into a relevance-reliability plane. On the abscissa, relevance has a scale of 0 to 1. At zero relevance, the information is considered not useful, whereas at a relevance value approaching 1, the information is considered very relevant. Since the determination of relevance is generally not exact nor precise, there is an associated reliability, that is, there is a range of possibilities and their likelihoods relating to a set of presumed facts. The various possibilities sum to the whole, which means that the area under the curve (integral from 0 to 1 of the distribution curve) should sum to 1, although various mathematical simplifications and intentional or unintentional perturbations may alter this area. Relevance requires a determination of context, which may include both objective and subjective aspects. Relevance typically should be determined with respect to the requestor, not the requestee, although in certain circumstances, the requestee (possibly with adjustments) may serve as a proxy for the requestor. There are a number of methods for weighting higher relevances above lower relevances. One way is to determine a transfer function which masks the normalized distribution with a weighting function. This may be a simple linear ramp, or a more complex function. As discussed above, a numeric integration from 1 to 0, with a respective decision made when the integral exceeds a threshold, allowing multiple decisions to be ranked, is another possibility.

Using a hierarchal analysis, this process may occur at multiple levels, until each significant hypothesis is analyzed, leaving only putative hypothesis which are insignificant, that is, with sufficient external information to distinguish between the respective possibilities. In order to simplify the output set, redundancy is resolved in favor of the most specific significant hypothesis, while insignificant hypotheses are truncated (not presented). As the number of significant hypotheses becomes in excess of a reasonable number (which may be an adaptive or subjective determination), related hypotheses may be grouped. Relatedness of hypotheses may be determined based on commonality of factual predicates, resulting user action, or other commonality. That is, the grouping may be the same as, or different from, the hierarchy of the analysis.

It is also noted that the projection need not be in the relevance-reliability plane. Rather, the analysis is intended to present useful information: that which represents information having a potential materiality to the user, and which has significance in a statistical sense. Therefore, a data analysis which does not purely separate relevance and reliability, but nevertheless allows a general balancing of these issues, may nevertheless be suitable. This type of analysis may also be used to normalize utility functions between respective bidders. To determine a cost, a local set of events or factual predicates are analyzed with respect t to a received context. The various hypotheses are projected onto a relevance-reliability plane. With respect to each user, the projection of each event is normalized by that user's conveyed utility function. It is useful to maintain the stochastic distribution representation for each event, since this facilitates application of the user utility function. The winning bidder is the bidder with the highest normalized integration of the event representation in the relevance-reliability projection plane.

Advantageously, according to embodiment of the present invention, output information is presented to the user using a statistical and/or probabilistic analysis of both risk and reliability. Risk is, for example, the estimated quantitative advantage or disadvantage of an event. In the case of competing risks, a cost function may be employed to provide a normalized basis for representation and analysis. While the risk is generally thought of as a scalar value, there is no particular reason why this cannot itself be a vector or multiparameter function, such as a mean and standard deviation or confidence interval. Reliability is, for example, the probability that the risk is as estimated. Likewise, the reliability may also be a scalar value, but may also be a complex variable, vector or multiparameter function.

Since a preferred use of the risk and reliability estimates is as part of a user interface, these are preferably represented in their simplest forms, which will typically take a scalar form, such as by projection from a high dimensionality space to a low dimensionality space, or an elimination or truncation of information which is predicted to be of low significance in a decision-making process. However, where the risk, or risk profile, cannot be simply represented, or such representation loses significant meaning, a higher dimensionality representation may be employed. For human user interfaces, graphic displays are common, which generally support two-dimensional graphics, representing three dimensional distributions, for example, x, y, and brightness or color. Using a time sequence of graphic elements, one or more additional dimensions may be represented. Likewise, some graphic displays are capable of representing depth, and thus support an additional degree of freedom. Therefore, it can be seen that the risk and reliability are not intrinsically limited to scalar representations, and where the quantity and quality of the information to be presented warrants, a higher dimensionality or additional degrees of freedom may be presented.

In a voice output system, a sequence of information may be output, trading immediacy and semantic complexity for information content. Complex sounds or other grammars may also be employed, especially where the relevance has a short time-constant.

According to one embodiment of the invention, risk and reliability are separately output to the user. It is understood that both risk and reliability may be output in an integral or interrelated form as well. For example, a driver might wish to employ a radar detector. A traditional radar detector emits a signal indicative of signal type and signal strength. Based on these emissions, the driver decides on a course of action. Ideally, the driver responds immediately (if necessary) to the first detected signal, even if this is of low signal strength or potentially an artifact. On the other hand, the system according to the present invention may analyze the reliability of the detected signal as an indicator of risk. For example, on a highway, an X band radar signal directed from in front of the vehicle, which commences at relatively high signal strength, and which occurs in a location having a past history of use as a location for monitoring traffic speeds for enforcement purposes, and which was recently confirmed (e.g., within the past 5 minutes) as being an active traffic enforcement site, would be deemed a high reliability signal. On the other hand, on the same highway, if a continuously emitted (or half-wave 60 Hz emission) X band signal is detected, in a location where such a signal is consistently detected by other drivers, and none is cited for violation of traffic laws, then this detection would be considered a low reliability detection of a risk or traffic enforcement radar. While a threshold of reliability may be applied, and thus a "squelch" applied to the risk output, preferably, the reliability signal is presented separately. When risk and reliability are both high, for example, an enhanced alert may be presented. When risk is high but reliability low, an indication may be nevertheless presented to the user for his analysis. This scheme would assist the user in dealing with statistical aberrations, as well as intentional masking of conditions. For example, a traffic enforcement radar system may be intentionally used in an area of normal interference with radar detectors; the system according to the present invention would present an alert to the user of this possibility.

Such analysis is not limited to radar detectors. For example, a bridge may be likely to freeze (i.e., become slippery) under certain conditions. Some of these conditions may be detected, such as local weather, past precipitation, and the like. Indeed, recent road sand and salt may also be accounted for. However, uncertainty remains as to the actual road surface conditions, which may change over the course of a few minutes. Therefore, the system according to the present invention may determine the risk, i.e., slippery road conditions, and the reliability of its determination. This reliability may be estimated from actual past experience of the system in question, as well as from other systems including appropriate sensors, for which data is available.

According to the present invention, to risk tolerance, or more properly stated, the reliability-adjusted risk tolerance of a user may be used to "normalize" or otherwise adjust the outputs of the system. Thus, for example, an emergency vehicle may take higher risks than would normally be acceptable. Clearly, if there is a 100% probability that the vehicle will skid on black ice on the road ahead, this risk would be unacceptable for any rational driver seeking to continue driving. On the other hand, an ambulance driver on an urgent call may be willing to undertake a 5% risk that the road is slippery, while a normal driver might be willing to accept only a 1% risk. The ambulance driver, in the above example, generally takes a number of risks, and caution must be balanced to assure that the goals are met, and indeed that risks are not increased as a result of undue caution. For example, driving at a slow speed increases the risk that the vehicle will be rear-ended, or that the driver will fall asleep during the trip. Even pulling over the side of the road does not eliminate risk to zero, so it is important to do a comparative risk analysis.

The risk/reliability analysis is not limited to driving condition alerts. For example, the system may be used to advise the user regarding the need for preventive maintenance or repair. The system may also be used as part of an entertainment system: What is the likelihood that a channel will broadcast an undesired commercial within the next minute? Should a recording stored in memory be purged in favor of a new recording? What radio station will be most acceptable to the set of occupants of the vehicle? In some cases, therefore, the risk/reliability analysis may be used by an automated system, and need not be presented directly to the user; in other instances, the set of information is for presentation to the user.

Another aspect of the invention involves a method for presentation of a multidimensional risk profile to a user. According to prior systems, a "risk" is presented to a user as a binary signal, modulated binary signal, and/or a scalar value. A signal type (e.g., band, SWS code, etc. for a radar detector, temperature, wind speed, wind direction, barometric pressure and trend, for a weather gauge) may also be expressed. Accordingly, as set of orthogonal scalar values is presented representing different parameters. Certainly, graphic representations of mean and standard deviation are well known; however, the reliability aspect of the present invention is not analogous to a simple standard deviation—it typically represents something qualitatively different. For example, a determination of the magnitude of the risk variable carries its own standard deviation, which, though a possible element of a reliability determination, does not address the issue of how the measured parameter (with its own statistical parameters of measurement) relates to the underlying issue. In some cases, there with be a direct relationship and near 100% correlation between the measured parameter and risk variable; in other cases, the measured parameter has poor correlation with the risk variable, and further analysis is necessary.

The system preferably ages event data intelligently, allowing certain types of events to expire or decrease in importance. A traffic accident event more than 12 hours old is likely stale, and therefore would not be output, and preferably is purged; however, locations which are the site of multiple accidents may be tagged as hazardous, and the hazard event output to the user as appropriate.

A temporal analysis may also be applied to the event data, and therefore diurnal variations and the like accounted for. Examples of this type of data include rush hour traffic, sun glare (adjusted for season, etc.), vacation routes, and the like.

Thus, user outputs may be provided based on proximity, importance, and optionally other factors, such as direction, speed (over or under speed limit), time-of-day, date or season (e.g., sun glare), freshness of event recordation, and the like.

According to the present invention, a stored event may be analyzed for reliability. Such reliability may be determined by express rules or algorithms, statistically, or otherwise, generally in accordance with particular characteristics of the type of event. Thus, even where a detected value, at the time of measurement, has a high reliability for indicating an event or condition, over time the reliability may change.

U.S. Pat. No. 6,175,803 (Chowanic, et al., Ford Global Technologies, Inc.), expressly incorporated herein by reference in its entirety, relates to a telematics system which employs routing criteria which include a statistical risk index. The route and associated risks may be output together, and a risk-minimized route may be automatically selected.

According to a preferred embodiment, audio and/or visual warnings are selectively provided. In this case, a warning of only a single event is provided at any given time. Typically, a visual alert indicator illuminates, and an initial tone alert indicates the nature of an urgent warning. The visual indicator also outputs a strength or proximity of the alert. Typically, these basic indicators are illuminated red, because this color is societally associated with alerts, and this causes less constriction of the iris of the eye at night. A separate visual indicator, such as a bar graph, meter, or color coded indicator (e.g., bicolor or tricolor light emitting diode) provides a separate reliability or risk of reliance indication. After acoustically indicating the nature and strength or proximity of the warning, an acoustic indication of reliability or risk of reliance may be enunciated. The visual reliability or risk of reliance indicator is constantly active, while the warning indicator is selectively active when an alert is present.

Typically, alerts will be classified by category, and a separate algorithm applied to determine the appropriate reliability factor, for example an exponential decay. As updated information is received or becomes available, this replaces presumably less reliable older data as a basis for a reliability determination. The system may also anticipate a geographic change in location of the event, for example a traffic enforcement officer in motion, or a traffic jam, along with reliability information for the prediction.

When multiple alerts are simultaneously active, low priority alerts are suppressed, and the active higher-priority alerts alternate. Priority of alerts, in this case, may be determined based on the nature of the alert, contextual proximity, the reliability of the measurement of the alert, the reliability of reliance on the recorded information, and a comparison of the respective alerts and potential interaction.

At any time, there will likely be a number "issues" to be analyzed. In order to provide an efficient user interface, these issues are analyzed to determine urgency or importance, and only those which meet criteria are particularly presented. For example, the fact that the fuel gauge reads half-full is not normally a cause for particular alert. However, if the vehicle is passing a gas station which has a relatively low price, the alert may be welcome. Without further information, these facts together reach a sufficient importance to produce an alert. See, U.S. Pat. No. 6,484,088 (Reimer, Nov. 19, 2002, Fuel optimization system with improved fuel level sensor), expressly incorporated herein by reference. That is, the risk (need for fuel; capacity to purchase additional fuel; distance to next gas station and margin of safety given present fuel supply; etc.), and the reliability (fuel price predicted to be cheaper than other fuel along predicted vehicle path before urgent need for fuel; etc.), together meet a "threshold" (which, of course, may be particularly dynamic in nature). Additional information, however, may reduce the importance of this information below a threshold level; for example, the present trip is time critical; the same gas station is predicted to be passed a number of times before the fuel tank is empty; other stations predicted to be passed have lower prices; pricing is anticipated to be more advantageous at a later time (e.g., gas sale on Monday; anticipated trip to another locale with lower gas prices; etc.), etc. Thus, the set of facts including available information is analyzed, for example using Bayesian techniques, Hierarchal Markov Models or other techniques, to predict the importance to the user. Each of these facts or predicates, or sets of facts and/or predicates, of course, has its own estimated reliability, and thus the overall conclusion is thereby limited. Accordingly, this reliability of the logical conclusion is output along with the conclusion itself.

With sufficient facts or predicates available, there may be competing outputs, both relating to fuel use, conservation, and refill strategies and otherwise. Thus, the system must compare the competing prospective outputs to determine which are actually presented. It may be useful in such circumstances to compute a cost function for presenting this data. In this way, for example, an advertiser or other external influence may be permitted to impact the overall analysis, e.g., presentation of data though the user interface. This cost function may also balance driving conditions: for example, when stopped at a traffic light, less urgent messages may be presented with lower risk of driver distraction. The user interface typically supports only a limited amount of information to be conveyed, and ergonomics may further limit the amount of information. Thus, there will typically arise the issue of screening information for presentation to the user.

The cost function is analogous to a utility function, which may be perturbed or modified based on subjective factors. As such, automated negotiations are possible based on bidder and auctioneer contexts, and predetermined and/or adaptive parameters. By communicating complex, un-normalized information, and allowing an ex post facto reduction in dimensionality or degrees of freedom, greater efficiency may be obtained.

In choosing which information to present, a preferred embodiment according to the present invention analyzes the risk and reliability, to produce a composite weight or cost, which may then be compared with other weights or costs, as well as a dynamic threshold, which may be separately analyzed or implemented as a part of a cost function. Taking a simple case first, information which is immediately applicable, represents a high degree of risk, and which is reliable, is presented with a highest weighting. If the same indication is unreliable, then the presentation is deweighted. A high risk with a low reliability would compete with a low risk with high reliability for presentation through the user interface. As previously discussed, a cost function may be used to factor in external or artificial considerations as well.

If the risk or reliability changes as a function of time, and this is the significant temporal relationship, then these factors may be changed updated, and the user interface modified according to a present condition. In some cases, the presentation relating to an event need not be continuous. That is, as a result of presentation to the user, the cost function is modified, and the event is not again represented until the cost function exceeds the presentation threshold. The change in cost function may indeed be purely a function of time, or take into consideration dynamically changing variables. For example, if a traffic jam is ten minutes ahead on the road (using predicted travel speeds), and there are a number of opportunities within the path leading toward the traffic to circumvent it, the urgency of taking a detour is low. As the time until the traffic decreases, or as the last opportunities for detour are approaching, any decision by the user become critical. This required decision is, in this case, the risk. On the other hand, the traffic may be caused by a traffic light or other temporary obstruction. Therefore, the reliability of the risk indication will depend on an analysis of the surrounding circumstances and the likelihood that the predicted risk will be the actual risk. Time, in this case, is not clearly independent of the other factors, and therefore need not represent an independent output to the user. It is noted that such analysis of risk and reliability may be facilitated by a wavelet domain transform, which need not be a discrete wavelet transform (DWT), although the binary decomposition properties of this transform may prove convenient or advantageous in various circumstances. In particular, the purpose of the transform is not necessarily a storage or computation-efficient representation; rather, the purpose is to significantly separate degrees of freedom to simplify the statistical and probabilistic analysis. It is also noted that the particular wavelets may be complex, high dimensionality, asymmetric functions, and need not be wavelets of a traditional kind used in image compression.

It may also be useful to transform the data into various domains, such as time, frequency, wavelet, alternate iterated function system, or the like, for filtering and denoising. Preferably, adaptive thresholds are employed, although in many instances the filtering may be performed in a context-independent manner. On the other hand, where appropriate, the filtering may be context sensitive, that is, the modifications of the data set during the filtering are dependent on a calculated risk, reliability, or relevance, or another parameter. Further analysis may be performed either in the transform domain, inverse transform to the original representation, or using a different transform.

It is also possible to employ a fractal (iterated function system) analysis and/or transform of the data. In this case, a function within a space, of any dimensional order, is decomposed into a representation of a set of components, which may include continuous functions (wavelet) or discontinuous functions (geometric shape), each of which may be translated, scaled only any axis, and amplitude scaled. Indeed, where convenient, the function within a space may be decomposed into a plurality of separate representations. Thus, according to one example, a number of feature-specific decompositions may be applied where appropriate. In the case of non-linear functions, it may be possible to decompose the function into a linear component and a non-linear component, wherein a relatively simplified non-linear component may be subjected to a type-specific analysis. Thus, it is understood that even relatively complex and seemingly intractable problems may be addressed. It is further noted that incalculable aspects of a fact or predicate net may be represented within the context of a reliability variable. As such, a network is analyzed, and to the extent possible, numeric analysis applied to reduce the result to low-dimensionality terms. The predicted magnitude or potential magnitude of the residual function or the uncertainty bounds may then be estimated, resulting in a contribution to the reliability output. Of course, the reliability estimate need be limited to unknowns, and may also represent a contribution from an analytical technique which produces a calculated uncertainty.

In a typical process, a data set, which may include a plurality of dimensions, is first processed to reduce noise. For example, error correction and detection algorithms may be applied to eliminate spurious data or correct data which has been corrupted. This process may also include a sub-process for eliminating intentional spurious data, for example, data communicated by a malfeasant, or data generated automatically in a random or pseudorandom manner to make the entire dataset suspect as a source of incriminating evidence. This is discussed in more detail, below. The data may also be filtered or denoised using one or more various algorithms, especially where the data is obtained continuously from local sensors. Preferably, one or more model-based algorithms is employed to optimally process data or portions of data. This later function may be consolidated with a feature extractor to correlate data with patterns which likely indicate a known event, to classify the signal. A multidimensional hidden Markov tree (HMT) analysis may be used to process the data. A known principal component analysis (PCA) may, for example, precede the HMT, to reduce the dimensionality of the data matrix by extracting the linear relationship between the variables and decorrelating the cross correlation in the data matrix. The hidden Markov tree is a statistical model governing the wavelet coefficients, and exploiting its tree structure in the time-frequency domain. Each wavelet coefficient is modeled as a Gaussian mixture with a hidden state variable. See, Detection and Classification of Abnormal Process Situations Using Multi-dimensional Wavelet Domain Hidden Markov Trees (Nov. 9, 2000), Amid Bakhtazad, www.chem.eng.usyd.edu.au/events/poster_2000/present6/ppframe.htm In order to prevent a data transmission from being used as self-incriminating evidence, steps may be taken to undermine the reliability of any single piece of data within a data set. In the former case, a random or pseudorandom process may be used to corrupt the database. This may take the form of modifications of existing records and/or generation of phantom records. Typically, such corruptions are made in such manner that a corresponding filter in a receiving unit, with high reliability, will be able to "uncorrupt" the data. However, without knowledge of the actual corruption parameters, which are not transmitted, the reconstruction is statistical and not lossless. Therefore, with high reliability, the content of the database is communicated, but not in such manner that anyone could opine that individual data within the database is real. For example, a database with GPS and chronology will necessarily include data which may be used to derive the speed of the vehicle. When that speed is in excess of the speed limit, a transmission or retention of the data may be used as an admission of transgression of speed limit laws. Using a known filter scheme implemented at the receiver, an algorithm at the transmitter may operate on the data to corrupt that data in such manner that the receiver will correct the data. By applying a low parameter at the transmitter, the reliability of the received data can be controlled. The transmitter may, for example, determine that 25% of the data is to be corrupted, and 1% corrupted in such manner that the receive filter does not accurately reconstruct the data. However, the corrupt 1% may be distributed such that 99% is flagged as spurious, based on, for example, excess or negative speeds, non-monotonic travel, etc. Thus, 0.01% of the corrupt data is conveyed without being caught, a statistic which is likely less than other, non-intentional corrupting influences. Each of these parameters may be independently controlled at the transmitter. Likewise, it is even possible for these corrupting parameters to be transmitted, alerting the receiver that the data may be suspect. Again, since these are statistical processes, no single data point would have evidentiary reliability.

Using various cryptographic techniques, such as public key infrastructure (PKI), it may also be possible to secretly synchronize the internal filters of the communicating devices, to maintain high reliability of user alerts, while masking the data itself. Thus, using secure hardware and appropriate software techniques, all or most of the corruptions may be corrected or eliminated. For example, the transmitter uses a pseudorandom noise generator to control a corruption of data to be transmitted. Information related to the cryptographic key used to initialize the pseudorandom noise generator is securely conveyed to the receiver, for example using a Kerberos or other type of cryptographic key negotiation. The receiver then initializes its own corresponding pseudorandom noise generator to generate a synchronized stream, allowing it to decorrupt the data. Clearly, various techniques, including those known in the art, may be combined to remedy weaknesses of any given scheme. Preferably, a plurality of different algorithms are available, should one or more prove broken.

See, Matthew Crouse and Robert Nowak and Richard Baraniuk, "Wavelet-Based Statistical Signal Processing Using Hidden Markov Models", Proceedings ICASSP-97 (IEEE International Conference on Acoustics, Speech and Signal Processing), IEEE Transactions on Signal Processing, 1997, and cited references, expressly incorporated herein by reference. See, also, B. Vidakovic, Wavelet-based nonparametric Bayes methods, Technical Report, ISDS, Duke University, Merlise Clyde, and Heather Desimone and Giovanni Parmigiani, Prediction Via Orthogonalized Model Mixing, Journal of the American Statistical Association, 91(435)1197 (1996); Katrin Keller, Souheil Ben-Yacoub, and Chafic Mokbel, Combining Wavelet-domain Hidden Markov Trees with Hidden Markov Models, IDIAP-RR 99-14 (1999), expressly incorporated herein by reference. See, also, Attoor Sanju Nair, Jyh-Charn Liu, Laurence Rilett and Saurabh Gupta, "Non-Linear Analysis of Traffic Flow," the 4th International IEEE conference on Intelligent Transportation systems, Oakland Calif., Aug. 25-29, 2001, (accepted), expressly incorporated herein by reference.

In like manner, additional dimensions of analysis may be added, resulting in further modifications of a cost function.

Urgency is a subset of relevance. Relevance may also be treated as an independent factor; that is, not included within risk or reliability. For example, a fact representing a risk may be known with high certainty, for example, a weather condition on a road: this fact, however, has low relevance if the car is parked in a covered garage. Thus, according to an aspect of the invention, the relevance may be considered an independent variable. Typically, in this case, the risk and reliability are together analyzed to determine a cost function; the cost function is then filtered using a relevance criteria (which, for example, produces a modified cost function), and typically sorted or ranked by weight. This relevance therefore replaces a simple threshold with respect to making ultimate decisions regarding information presentation to the user. Relevancy may be determined by explicit input from the user, implicit user input, collaborative processes, statistical analysis of other user under like circumstances, or the like. It is noted that the cost function may be personalized for each user.

In some cases, a dimensionless cost function is too simplistic, and leads to results which fail to convey useful information to the user; in those cases, sets of outputs may be presented based on one or more criteria, or an estimated composite function. Therefore, it is understood that a complex "cost function" or utility function, resulting in an output having various degrees of freedom, may be employed.

Preferably, the system according to the present invention is integrated with a vehicular telematics system, thus providing access to various vehicle data, in addition to environmental data. However, it is not so limited, and may be used in any type of man-machine interface wherein complex data is to be presented to a user for human consideration.

It is noted that, in some instances, a fact or predicate set may possibly represent a plurality of different events. In this case, it ma sometimes be useful to group these events together. This is particularly the case if the nature of the alert and likely response to the alert by the user is similar, regardless of the particular event giving rise to the sensor readings. In that case, the risks, reliabilities, and relevance are aggregated in an appropriate fashion, for example vector summed or composite magnitude, and an aggregate cost function output, along with a generic alert. This generic alert may then be subdivided into its components, for example in a lower-hierarchal level user interface output. In this manner, a set of possible events, none of which would exceed an alert threshold individually, may together exceed the threshold and indeed receive a high ranking.

Another way of analyzing this situation is that the system may analyze the available data at a number of hierarchal levels. At each level, the risk, reliability and optionally relevance is determined, and the result stored. The user interface may then select events based on redundancy and generic alerts, superceding the particular ranking of events at a homogeneous level of analysis. For example, data indicating stopped traffic ahead may be consistent with an accident, stop light, or construction. These may be divided into normal events (with low risk) (traffic light) and abnormal events (with high risk)(accident or construction). The former would not generally issue an alert, unless a suitable bypass is available that would be efficient. The later, on the other hand, would likely generate an alert. The available information may not be able to distinguish between an accident and construction, and indeed, the individual probabilities of these may be insignificant. However, together, the probabilities may be significant. Likewise, since these are two alternative, generally inconsistent possibilities, the reliability of each will be greatly reduced. Grouped together, however, their joint reliability is estimated to be about the remaining likelihood after the traffic light is accounted for, with high reliability. With respect to relevance, each of these events would have similar relevance, which would be high, assuming the stopped traffic is along the itinerary of the vehicle. Thus, a composite alert of "abnormal stopped traffic 1 mile ahead; reliability 33%" would be a useful compromise to maintain an efficient user interface while conveying the useful information. Of course, the underlying system should generally still compute the probabilities, reliability and relevance for each possibility, since this analysis may yield more useful information and provide better guidance to the user.

The ranking may, for example, employ a combinatorial analysis of a set of rankings based on a self-consistent probability-weighted utility of each event within a ranked set. That is, if various events are mutually inconsistent, then a ranking is limited by a presumption of the existence of one event, and competing hypotheses are established as different rankings. In a rigorous sense, the utility may be determined by a mathematical integration of the appropriate function, although in many instances either the data will be represented as a field which can be simply summed, or simplifying presumptions may be applied to make the evaluation tractable.

According to an aspect of the invention, a user transmits a relevance or cost function to corresponding other users, which then calculate the most useful information to transmit based on the circumstances of the intended recipient. Likewise, a plurality of users may exchange their respective relevance or cost functions. This relevance or cost function is, for example, a current position, immediate itinerary, and any other particular relevance factors. Such other factors might include heavy load, urgent transit, travel preferences, or the like. Upon receipt, the device of the other corresponding user then calculates relevance and/or cost functions using its local data set based on the received parameters. This calculation is then used as a filter to determine a priority of data to be transmitted. As the time available for transmission grows, the amount of information transmitted may be complete. For example, two cars traveling adjacent on a highway or parked near each other may conduct a complete data exchange. When optimizing the broadcast of data based on a plurality of use's relevance or cost functions, a weighting may be applied which balances the maximum good for the many with the urgent needs of the few. Likewise, accommodations may be made for anticipated duration of communication for the respective users, and the availability of packet forwarding and secondary retransmission.

Since all devices share a common transmission medium, it is generally useful to compute a cost function for use of the shared medium as well, allowing peers access to the medium after the marginal utility for the current user has declined. Access to the shared medium may also be allocated on a round robin basis, especially when demand is highest. Each device preferably monitors all local transmissions, since these will likely include data of some relevance to each device. Likewise, by monitoring such transmissions, one device may make presumptions as to the state of the local database of another device (especially given a knowledge of its present position and path), and therefore avoid redundant transmissions of data. Likewise, in such a peer to peer network, a voting scheme may be instituted, allowing the peer with the "best" data, i.e., the data which is most reliable, most accurate, most recent, most detail, or other criteria to transmit with higher priority.

Known packet data broadcast protocols may be used to convey the information. Likewise, known peer-to-peer techniques and protocols may be used to communicate, or control communications, between peers.

According to another aspect of the invention, a user may broadcast or transmit a specific query for information, using as at least a part of the query a relevance or cost function. Recipients of the broadcast or transmission then execute a search of their database based on the received query, and respond accordingly. This query may be a broad or narrow request for information, and thus need not result in a complete exchange of data.

In order to optimally allocate communications bandwidth, users within an area may engage in a local auction, that is, each user bids for use of the shared medium, with those deferred and the supplier of information receiving credits. An accounting for these credits may, for example, take place each time a device connects with a central database, for example, using a "hotspot" or other access to the Internet. These credits may, for example, be converted into economic values. In like manner, advertisers may also bid for access to users, with users, for example, receiving credit for receipt of advertising. Such bidding may be on an individual or group basis. Typically, advertising will be relevant, for example as a location-based output, but need not be.

It is also possible to conduct auctions or otherwise account for control of the communications medium using a zero-sum temporal averaging. That is, each user has an a priori equal right to access. As a user takes advantage of that access, its rights decrease, until exhausted. Over time, rights are added, and accrued rights expire. For example, rights may have a half-life of 5 minutes, with a regression to a predetermined value. As more users compete for control over the medium, cost increases. Suppliers of information may receive partial credits from the consumer. Value transmission may take place using a modified micropayment scheme, for example a variant of Agora Micropayment Protocol, "Agora: A Minimal Distributed Protocol for Electronic Commerce", Eran Gabber and Abraham Silberschatz, Bell Laboratories or MPTP, Micro Payment Transfer Protocol (MPTP) Version 0.1, W3C Working Draft 22 Nov. 1995, www.w3.org/pub/WWW/TR/WD-mptp-951122.

Thus, within a cell, each user is a primary recipient, a secondary recipient, a supplier, or undefined. A primary recipient bids for access and control of the medium, i.e., the communications band. This bid takes the form of a cell identification (i.e., the controlling user's location and itinerary), as well as an economic function representing the required information and valuation thereof by the user. The bids are broadcast and each recipient calculates an actual value for the bid using its own database and the relevance function. The calculated economic values, filtered by the recipient databases, are then broadcast, and the highest actual valuation is deemed winner. A negotiation then occurs between the bidder and the holder of the valued information, for payment for the transmission, and other bidders receive a lesser value as a concession. Secondary recipients of the information also pay for the information, based on their respective bids, with a redistribution to the other bidders as a concession. Devices which are not active bidders have no economic effect, although these may accumulate and use transmitted information from others. Thus, an economic redistribution occurs efficiently, while optimally allocating scarce bandwidth.

In general, the auction parameters may be too complex for interactive user entry. Rather, the user cost function itself represents the user valuation, and therefore is usable as a bidding function. In the cost function, both subjective and objective values are observed. With respect to objective values, the relationship of a user context and an event known by the recipient provides a relevance, and therefore the objective valuation. This objective valuation is then warped by user subjective factors. Some users may be quite willing to pay more for a better quality of service. At least a portion of this value is distributed to other users, this system allows even those with low valuation to access the network, since these deferred users will accumulate credits. In some cases, the credits may be provided with cash value (i.e., an ability of a user to extract cash proceeds from the system), while in other cases, these credits are limited to use with the system, with no redemption rights. The use of a central authority for the purchase of usage credits therefore allows a profit incentive for the authority responsible for the system. A user may therefore express a higher valuation by purchasing units from an authority, or by providing value to other users of the system, which may, for example, require enhanced hardware purchases to include more and/or better sensors of various conditions.

A negotiation or auction may also include external elements, such as fixed infrastructure. In this case, the scarce resource is, for example, the right of way. Elements of the fixed infrastructure which are subject to negotiation include traffic lights, draw bridges, railroad crossings, etc. Typically, such infrastructure systems have low intelligence. By employing communications with interested parties, a more efficient outcome may be predicted as compared to "fair", though unintelligent decisions. Thus, competing drivers may bid for a right of way or green light. The traffic signal may be arbiter of the negotiation, or merely recipient of the defined result. In some instances, the negotiation is free of cost, for example, a traffic light with but one car approaching and no hazards surrounding. In this case, the signal allows the driver to pass, unobstructed. In another instance, a large amount of traffic may be present, seeking to pass through an intersection. All of the vehicles seeking to pass present "bids" for the right, with bids representing common interests or outcomes pooled. The aggregate bids are then compared for action. In this case, the transaction may have no economic impact, but rather the utility functions may be relatively non-subjective. For example, emergency vehicles may have a non-subjectively determined high valuation, cars driving toward the intersection with a present state of traffic flow control in their favor at a medium valuation, and stopped traffic with a low valuation. As the duration of the stop increases, a delay factor increases the valuation for the stopped traffic to compensate, allowing or forcing the signal to change. The objective criteria used in this circumstance (which may, for example, be defined by a municipality or traffic engineer) may include optimization of pollution, energy efficiency, effects of traffic flow on other intersections, speed control, and other considerations.

It is noted that, since external elements communicate using the same communications system, and indeed various communications systems may share the same band, the concept of bidding for use of the shared or scarce resource may transcend a given communications purpose, and, other than communicating using a common protocol for the bidding and auction process, other users of the band need not communicate public information.

A user may also provide a subjective element to a context, for example, a driver may be in a rush or be late for a meeting. This may be explicitly input by the user, as a factor which adjusts the cost function higher, or may be derived implicitly from observation of user behavior. Likewise, a driver may be in no particular rush, and therefore place a low relevance to information which might be of particular benefit to allow him to travel faster.

Thus, in a purely fair system, each user is allocated a "fair" chance for access to the scarce bandwidth resource, and bids using equally distributed credits to compensate those users deferred, and particularly those users who provide useful information. A user bids using a cost function, representing the maximum value of the resource to that user. Using known auction theory, for example, the cost to the winning bidder may be the price bid by the second-highest bidder. Of course, other known auction types may be employed. The cost function may be automatically generated by a user based on available funds, likely future required use of the funds, a relevance or context which allows for adaptive bidding based on the value of the information to be provided, and user-subjective factors. The actual normalized bid is resolved by the respective recipients, which then broadcast the results. The maximum value bidder then controls the scarce bandwidth resource until the bid-for communication is completed or exhausted. In order to avoid inefficient reauction overhead, a periodic auction may be conducted, with all bidders placed in a queue.

Clearly, in real world situations, a number of additional distortions will take place. Bidders may become unavailable prior to completion of a communication. Interference may require retransmission.

As discussed above, each "limited resource" may be subject to auction. Preferably, a spatial division multiplexing scheme is employed, wherein each band has one or more frequency channels. High gain, directional antennas are employed, such that there is a high degree of frequency reuse within a local area. However, there will be a statistical degree of competition for the frequencies. In addition, there will be competition from other competing uses for the band, which may also engage in an auction scheme for access. Typically, by efficiently negotiating an auction between all users of the resource (i.e., the overhead for negotiation is negligible as compared to the actual usage), overall throughput and capacity will be increased.

For example, each system may include 8-16 transceivers or the ability to conduct 8-16 communication sessions simultaneously. In the former case, 8-16 directional antennas having relatively low overlap are arrayed in different directions, providing a physical separation. In the later case, a phased array or synthetic aperture antenna system electronically defines 8-16 independent apertures, also with low overlap. Each spatial domain aperture and its associated coverage area represents a different resource which may be allocated. Therefore, multiple simultaneous negotiations may occur simultaneously. Each aperture may be a separate radio, with packets routed there-between, or the radios may be coordinated.

It is also noted that the communications system may be used not only for packet data communications between peers, but also as a real time communication system for data streams, such as voice communications. In this case, handoffs may be necessary between various nodes in order to assure continuous end-to-end communications. Such handoffs and multiple hop communications may be predicted in advance and pre-negotiated. Such communications predictions may, indeed, involve multiple systems, such as various cellular carriers and protocols, 802.11 hot spots, and a mobile ad-hoc network with sporadic links to fixed infrastructure. This, in turn, allows a balancing of competitive uses for the resources, quality of service, cost, and reliability. For example, by providing a mobile ad-hoc supplementation for a fixed cellular infrastructure, the incidence of dropped calls and service unavailability may be reduced. Likewise, cellular carriers may allocate their infrastructure build-outs and capital investments where the return on investment will be maximum. On the other hand, cellular users in such regions may employ other users to act as repeaters for extending the effective range of their equipment. In this case, the compensation and/or negotiation therefore for use of the system may come, in whole, or in part, from the fixed infrastructure provider. On the other hand, if the system is sponsored by the fixed infrastructure carrier, then the repeater services hosted by each node may be at no incremental cost to the fixed service provider.

This later possibility provides an interesting opportunity. Since the fixed cellular infrastructure providers generally own licensed spectrum, the implementation of repeater or ad hoc services between mobile units may be coordinated centrally, with mobile-to-mobile communications using cellular channels, which may be time domain (TDMA), frequency domain (FDMA), code division (CDMA and related systems), or other type of band-sharing scheme in accordance with the more global standards generally established for these services. Typically, mobile-to-mobile communications use omnidirectional antennas, and packet data communications may use excess system capacity, e.g., capacity not presently being used for voice or other toll or real-time service. The fixed infrastructure my also provide coordination of information communication services, local buffering, ad multicast f information of general interest. It is therefore clear that the present invention may comprise both disruptive and incremental technologies, and the underlying business model may therefore be modified to suit.

A particular issue which is advantageously addressed during the design phase is the security of the system against "hackers" or malfeasants. This may be dealt with by providing a central database of authorized users, with peer reporting of accounting and apparent abuse. If a user is suspected of abuse, its access rights may be extinguished. This, in turn, will at least prevent the user from engaging in auctions, and, if transmissions are encrypted or otherwise secure, may prevent eavesdropping on normal communications streams. This same result may be imposed on a user who exhausts his credits, although it is preferred that a user who is otherwise in compliance with normal regulations be permitted to receive communications and indeed to gain new credits by transmitting useful information.

Since the system is a packet data system, similar to in many respects, and possibly an extension of, the Internet, various known Internet security paradigms may be applied and employed.

While it is often useful to engage in fair auctions or games, it is also possible to engage in unfair auctions. For example, since there may be external financial requirements for maintenance of the system, these may be paid by subscription fees, or subsidized by advertisers. The advertiser may transmit its own cost function, and bid for presentation to given users, or engage in a broadcast for all users. In this case, more valuable users will gain more credits, and therefore have more control over the network. This is not "fair", but the distortions implicit in this technique may be tolerable. Likewise, a bidder may purchase credits, but typically this purchase will be consumed by the service operator, and not paid to the users as a whole. However, presumably, this will on the whole reduce normal service pricing for all users. Indeed, various promotional techniques may be used to distort allocation of bandwidth, without departing from the general scope of the invention.

It is noted that this implicit auction process, wherein a user bids a utility function rather than a normalized economic value, is a distinct part of the invention, applicable to a plurality of contexts and environments, well beyond telematics. Likewise, the concept of bidding for quality of service to control a shared resource, against competing users, is also applicable to other contexts, notably peer-to-peer networks, other shared transmission medium networks, and queues.

In order to define a user's subjective preferences, value functions, and the like, a number of methods may be employed. Certainly, express and explicit inputs may be received from a user. Likewise, a user model may be constructed by observation of the user. A user may be classified as a member of a group having common preferences, and then the preferences associated with the group may serve as a proxy for the user himself. This is called a collaborative profile, the basis for a collaborative filter. In order to classify a user into a group, personality tests and/or common attributes may be employed. According to a particular aspect of the invention, a user may be classified by game play. By using game theory, irrational or subjective user biases. By using games, a user's utility function r valuation may be assessed. Likewise, risk tolerance and demand for immediate gratification can be determined. Further, game theory in the form of wagering may also assist in determining economic normalizations. Games, especially with the results augmented by collaborative profiling, may through a limited number of iterations, elicit relatively detailed information. Indeed, through inter-relation with commercial sponsorship (or state associated lotteries), the economic incentives and risks of the game may be made quite real.

In communicating data to another communications device, typically it is desired to transmit (or exchange) all of the memory or all of a "public" portion of the memory, with the received information sorted and processed by the receiving unit and relevant information persistently stored in the memory. After exchange, conflicts may be resolved by a further exchange of information. An error detection and correction (EDC) protocol may be employed, to assure accurate data transmission.

Since the communication bandwidth is necessarily limited, and the communications channels subject to noise and crowding, it is often important to prioritize transmissions. It is noted that, without a complete communication of the memory, it is difficult to determine which events a communications partner is aware of, so that an initial communication may include an identification of the partners as well as recent encounters with other partners, to eliminate redundant communications, where possible. Vehicles traveling in the same direction will often be in close proximity longer than vehicles traveling in opposite directions. Further, the information of relevance to a vehicle traveling in the same direction will differ from the information of relevance to a vehicle traveling in the opposite direction. Thus, in addition to an identification of the communications device, the recent path and proposed path and velocity should also be exchanged. Based on this information, the data is prioritized and sorted, formatted and transmitted. Since the communications channel will likely vary in dependence on distance between partners, the communications protocol may be adaptive, providing increased data rate with decreasing distance, up to the channel capacity. Further, when the vehicles are relatively close, a line-of-sight communications scheme may be implemented, such as infrared (e.g., IRdA), while at larger distances (and/or for all distances) a spread spectrum 915 MHz, 2.4 GHz or 5.825 GHz RF communications scheme implemented.

Where multiple communications devices are present within a common communications region, these may be pooled, allowing transmissions from one transmitter to many receivers. In addition, within a band, multiple channels may be allocated, allowing multiple communications sessions. In this case, a single arbitration and control channel is provided to identify communications devices and communications parameters. Preferably, a communications device has the capability to monitor multiple channels simultaneously, and optionally to transmit on multiple channels simultaneously, where channel congestion is low. The channels are typically frequency division. Where such frequency division channels are defined, communications may be facilitated by so-called "repeaters", which may itself be a mobile transceiver according to the present invention. Preferably, such a repeater unit itself monitors the data stream, and may even process the data stream based on its internal parameters before passing it on.

In order to assure data integrity and optimize data bandwidth, both forward and retrospective error correction are applied. Data is preferably packetized, with each packet including error detection and correction information. Successful receipt of each packet is acknowledged on a reverse channel, optionally interspersed with corresponding data packets traveling in the reverse direction (e.g., full duplex communications). Where the data error rate (raw or corrected) is unacceptably high, one or more "fallback" modes may be implemented, such as reduced data rates, more fault tolerant modulation schemes, and extended error correction and detection codes. Transmitter power may also be modulated within acceptable limits.

A central repository of event data may be provided, such as on the Internet or an on-line database. In this case, event information may be administered remotely, and local storage minimized or eliminated.

Communications with the central database may be conducted through cellular infrastructure, wired or wireless local area network hotspots, or in other communications bands and other communications schemes.

Where primary event information storage is remote from the device, preferably local storage is based on an itinerary (route) and frequently traveled areas, with less frequently traveled and not prospectively traveled routes stored remotely. This allows consolidated update of memory by a large number of sources, with statistical error detection and correction of errant event information. The itinerary information may be programmed in conjunction with a GPS system and mapping/navigation software.

According to one embodiment of the invention, a plurality of functions are integrated into a single device, a sensor or detector for sensor emissions, for example speed control devices, a human computer interface, a computer system including processor, memory, and operating system, geospatial positioning device, and wireless communication system. Preferably, the system supports accessory inputs and outputs, which may be through wired or wireless means. The human computer interface preferably includes both a graphic display and a natural language (e.g., voice) interface. The computer system preferably possesses sufficient machine intelligence to filter outputs based on relevance and context, as well as interpret inputs as usable commands.

Data communications over a wireless link, for communicating between vehicles, preferably is highly compressed and fault tolerant. For digital data, this typically requires error detection and correction codes, while for data representing analog information, the information may be encoded such that more important information is transmitted in a more robust manner than less important information. For example, image information may be communicated in a hierarchically compressed manner, with higher order information transmitted in a manner less susceptible to interference and signal fading than lower order information.

The digital data may be compressed, for example, using a dictionary lookup, run length encoding, and/or model-based vector quantization method. Thus, since transceivers will typically be within 2000 meters from each other, relative position may be relayed in an offset format, with a grid size based on GPS precision and required accuracy, e.g., about 50-100 meters. The encoding may be adaptive, based, for example, on stored map information, with information representation density highest on traveled routes and lower in desolate areas. Thus, a sort of differential-corrected positional coding may be established between units.

By integrating functions, efficiencies are achieved. Thus, a single central processor, memory, program store and user interface may suffice for all functions. Further, the power supply and housing are also consolidated. While GPS and telecommunication antennas may be maintained as distinct elements, other portions of the system may also be integrated. In a device intended for vehicular applications, the GPS and other functions may be available to other vehicular systems, or the required data received from other systems.

Communication between communications devices may employ unlicensed spectrum or licensed spectrum, and may communicate between mobile units or between mobile and fixed resources. For example, excess capacity of a traditional cellular system may be used for inter-vehicle communications. Thus, the system may include or encompass a typical cellular (AMPS, IS-136, IS-95, CDPD, PCS and/or GSM) type telecommunications device, or link to an external telecommunications device.

Even where the cellular telephony infrastructure is not involved, mobile hardware may be reused for the present invention. For example, digital or software defined cellular telephone handsets may permit programmed use outside the normal cellular system protocols.

According to the present invention, messages may be passed between a network of free roving devices. In order to maintain network integrity, spurious data should be excluded. Thus, in order to prevent a "hacker" or miscreant (e.g., overzealous police official) from intentionally contaminating the dispersed database, or an innocent person from transmitting corrupted data, the ultimate source of event data is preferably recorded. When corrupt or erroneous data is identified, the source may then also be identified. The identity of the corrupting source is then transmitted or identified, for example to other radios or to a central database, whereupon, units in the field may be programmed to ignore the corrupt unit, or to identify its location as a possible event to be aware of. Further, assuming the hardware of the corrupted unit remains operational, a code may be transmitted to it deactivating it or resetting or reprogramming it.

Preferably, data is transmitted digitally, and may be encrypted. Encryption codes may be of a public-key/private key variety, with key lookup and/or certificate verification, either before each data exchange, or on a global basis with published updates. In fact, corrupt or unauthorized units may be deactivated by normal and authorized units within the network, thus inhibiting "hacking" of the network. Communications may be metered or otherwise controlled externally, with charges assessed based on usage factors. As discussed above, units may bid for control over the transmission medium, and an accounting may take place either between corresponding units, with a central database, or both. Thus, a subscription based system is supported.

Techniques corresponding to the Firewire (IEEE 1394) copy protection scheme may be implemented, and indeed the system according to the present invention may implement or incorporate the IEEE 1394 interface standard. The IEEE 1394 key management scheme may be useful for implementing subscription schemes and for preventing tampering.

One way to subsidize a subscription-based system is through advertising revenue. Therefore, the "events" may also include messages targeted to particular users, either by location, demographics, origin, time, or other factors. Thus, a motel or restaurant might solicit customers who are close by (especially in the evening), or set up transponders along highways at desired locations. Travelers would then receive messages appropriate to time and place. While the user of the system according to the present invention will typically be a frequent motorist or affluent, the system may also provide demographic codes, which allow a customized response to each unit. Since demographic information is personal, and may indicate traveler vulnerability, this information is preferably not transmitted as an open message and is preferably not decodable by unauthorized persons. In fact, the demographic codes may be employed to filter received information, rather than to broadcast interests.

Commercial messages may be stored in memory, and therefore need not be displayed immediately upon receipt. Further, such information may be provided on a so-called "smart card" or PC Card device, with messages triggered by location, perceived events, time and/or other factors. In turn, the presentation of commercial messages may be stored for verification by an auditing agency, thus allowing accounting for advertising fees on an "impression" basis.

The communications device may also receive data through broadcasts, such as using FM sidebands, paging channels, satellite transmission and the like. Thus, locationally or temporally distant information need not be transmitted between mobile units. Satellite radio systems may also be integrated.

While low power or micropower design is desirable, in an automobile environment, typically sufficient power is continuously available to support sophisticated and/or power hungry electronic devices; thus, significant design freedom is provided to implement the present invention using available technologies.

Figure 8:
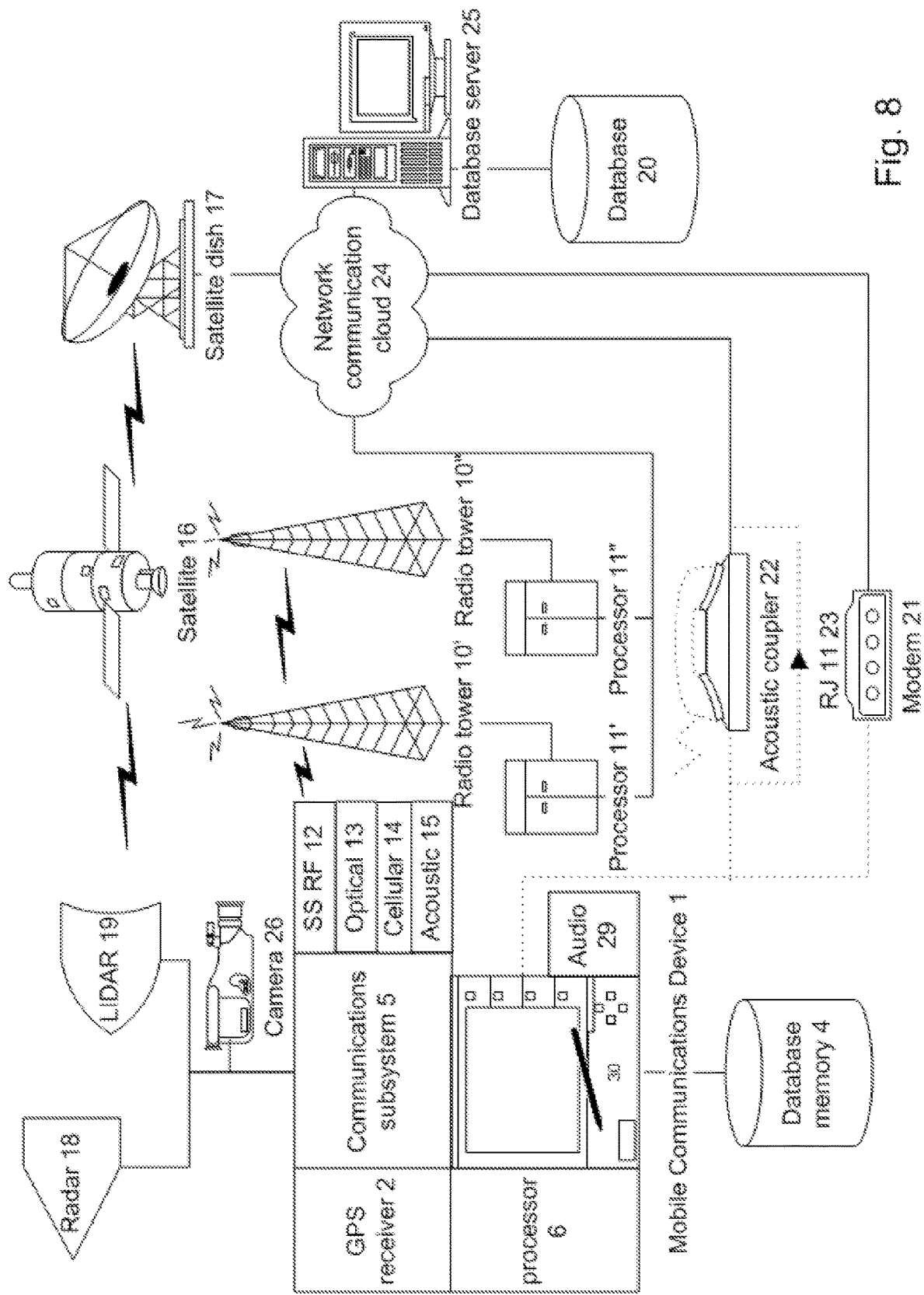
FIG. 8 shows a block diagram of a preferred embodiment of a communications system according to the present invention.
Figure 9:
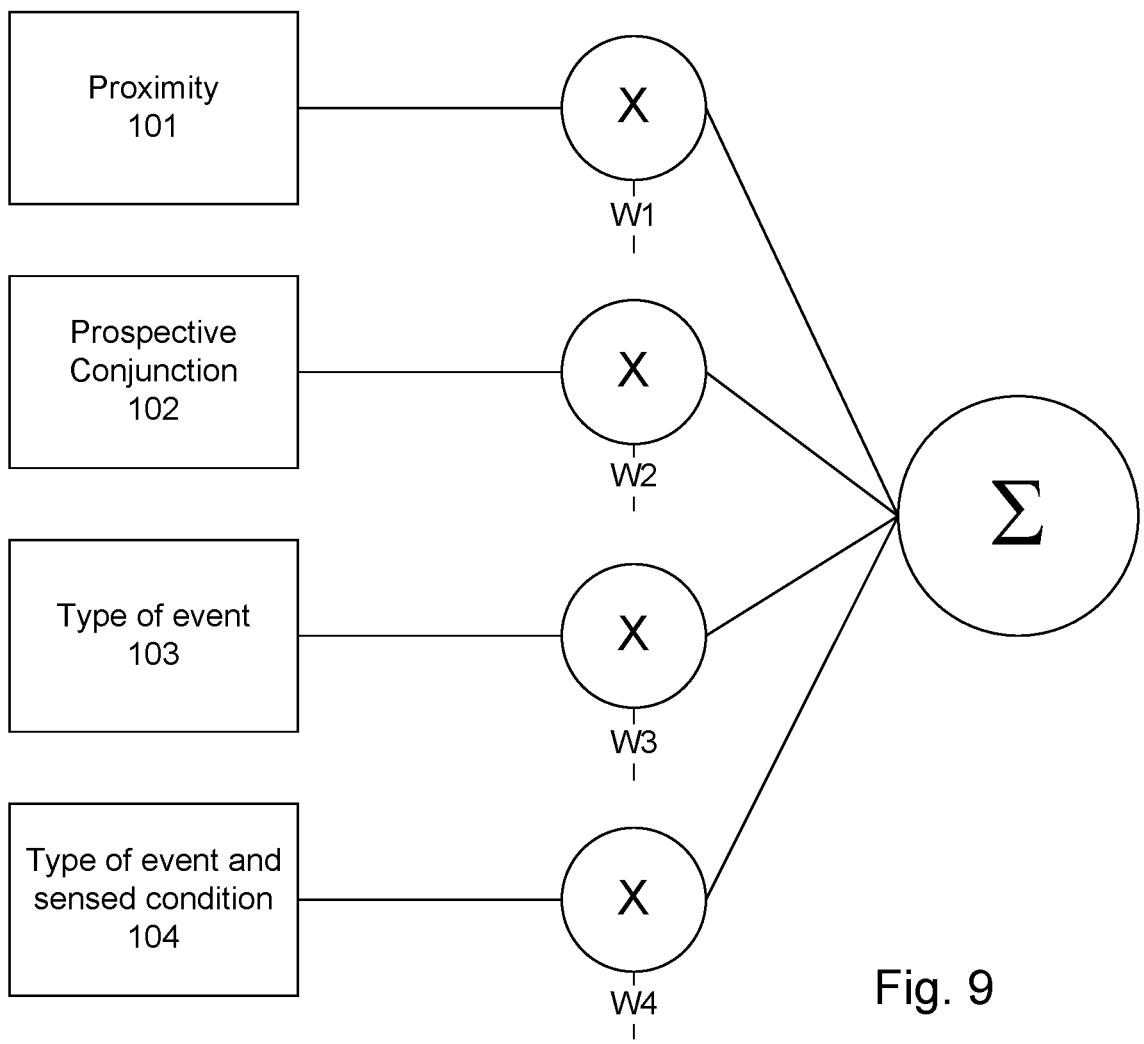
FIG. 9 is a schematic diagram showing the prioritization scheme.
Figure 10:
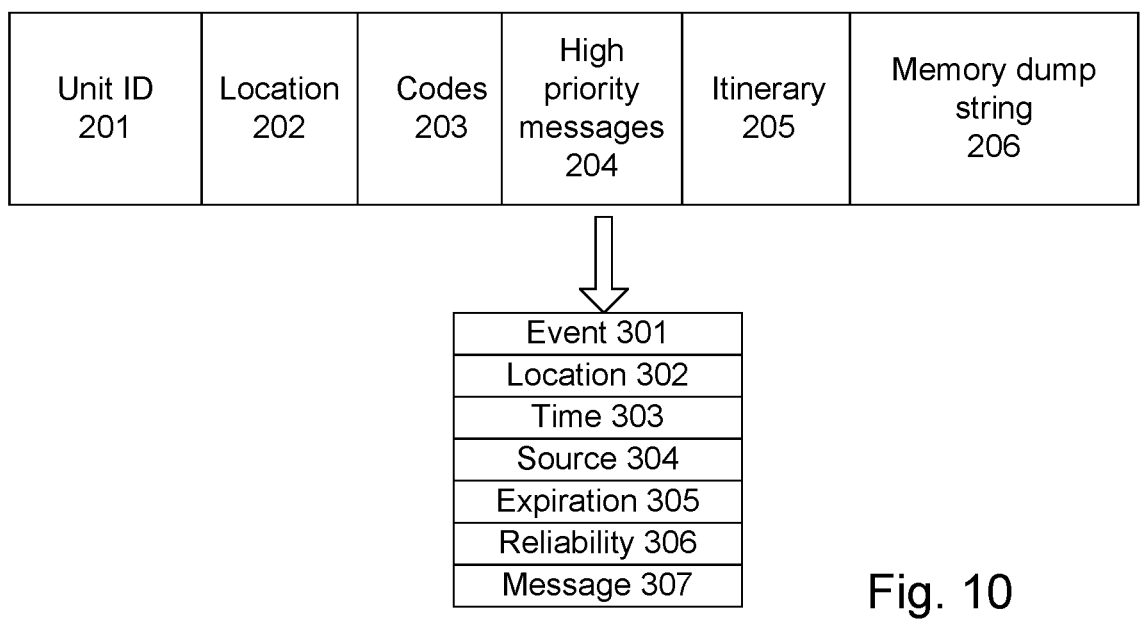
FIG. 10 is a block diagram representing a message format.

FIG. 8 shows a block diagram of a communications device embodiment of the present invention. The mobile communications device 1 includes a location sensing system 2, producing a location output 3; a memory 4, for example storing a set of locations and associated events; a telecommunications subsystem 5, for example communicating event and location information between a remote system and the memory 4; and a processor 6, for example processing the location output in conjunction with the stored locations and associated events in the memory 4, to determine a priority thereof.

The location sensing system 2 may include a known GPS receiver, which produces data that is analyzed by the processor 6. In an alternate embodiment, the GPS receiver includes its own processor and outputs coordinate positions, e.g., Cartesian coordinates, latitude and longitude, to the communications device processor 6, e.g., through a serial port or data bus, such as PC card, Universal serial Bus (USB), Firewire (IEEE 1394), peripheral connect interface (PCI), or other bus, such as that present within an automobile for communication of signals between subsystems. The location sensing system may also determine a position based on the GLONASS system, LORAN, inertial reference, cellular base stations 10',10", triangulation with fixed radio sources, such as FM radio and television stations, environmental markers and/or transponders, or the like. The location system may also be network based, for example relying on a cellular network to produce georeferenced position information.

The communications subsystem 5 is, for example, an 802.11g wireless Ethernet local area network system, having a router and switch controlling communications between 8 separate spatially distinct channels, defined by a "smart antenna". These spatially distinct channels are agile and having an aperture capable of being steered in real time to adjust for a change in relative position and orientation. The router and switch permit forwarding of packets received through one channel to another, as well as local communications control. The radio transceiver 12, operates in the unlicensed 2.4 GHz band, according to FCC regulations for this type of equipment. The system may alternately or additionally communicate in other unlicensed bands, such as 27 MHz, 49 MHz, FRS band, 900 MHz, 5.4 GHz, 5.8-5.9 GHz using various known modulation schemes and data communication protocols. Further, licensed radio bands may also be used, including FM radio sidebands (88-108 MHz), television PRO channel, cellular telephony channels, DECT, PCS and GSM channels, and the like. Likewise, satellite systems 16, 17 may be used to communicate with the mobile communications device 1. Thus, for example, instead of direct communication between mobile units, the existing cellular telephony 10',10" infrastructure may be used to provide intercell, local, and/or regional communications between units, controlled by cellular telephone switching processors 11',11". These communications may be given a lower priority than voice communications on the cellular telephone network, and therefore may use otherwise excess bandwidth, thus allowing reduced costs and reduced user fees or subscription rates.

The memory 4 may be of any standard type, for example, one or more of static random-access memory, dynamic random-access memory, ferroelectric memory, magnetic domain memory (e.g., diskette, hard disk), non-volatile semiconductor memory (e.g., UV-EPROM, EEPROM, Flash, non-standard electrically erasable programmable non-volatile memory), optically readable memory (e.g., R-CDROM, RW-CDROM, R-DVD, DVD-RAM, etc.), holographic memory, and the like. Preferably, common memory devices, such as EDO, SDRAM, RIMM, DDR, are employed, at least for a volatile portion of the memory, allowing simple upgrades and industry standard compatibility.

While the preferred embodiment includes a radio frequency transceiver for transmitting event data and receiving event data, embodiments are also possible which either transmit or receive the relevant data, but not both. For example, regulations may limit certain transmissions or relevant event sensors, e.g., radar detectors in trucks. In these cases, a receive-only embodiment may be appropriate. Further, while radio frequency communications are preferred, due to their range, data capacity and availability, optical communications systems 13, e.g., infrared LED's and laser diodes, acoustic communication 15, passive backscatter communications (employing an RF transceiver such as the spread spectrum transceiver 12), and the like may also be employed in conjunction or in substitution of a radio frequency system. Optical communication systems 13 may employ various detectors, including optical homodyne detectors, or other coherent optical detectors, or other types of optical sensors, such as PIDs, CCDs, silicon photodiodes, and the like.

Under some circumstances, a wired or dedicated link between units may be appropriate. For example, a central database 20 may provide consolidated and reliable data. The relevant portion of the database 20 may be downloaded by telephone through a modem 21, either through a physical connection 23 (e.g., POTS or ISDN, line), through a broadband Internet connect, or other network 24, to a database server 25. The memory 4 of the mobile unit may also be uploaded to the central database 20, after processing by the database server 25, during the same connection or session.

Thus, according to the present invention, the public switched telephone network 24 may be involved both during intermittent mass data communications with a central database 20, and also using, for example, cellular telephony 14, for the normal operation of the system (e.g., communications between mobile units). As discussed above, general access to and control over the communications channel may be arbitrated on a bid and auction basis, as appropriate to avoid contention.

The processor 6 analyzes the information stored in memory 4 to provide a prioritized output. Thus, the memory may store information relating to a relatively large number of events, without overwhelming the capacity of a human user or communications partner. Priority may be based on a number of factors, including proximity of a stored location to a sensed location or a spatial-temporal proximity of a stored location to a loci of an itinerary 101, a prospective conjunction 102 of a sensed location with a stored location, a type of event 103, a type of event and a sensed condition associated with the mobile communications device 104, or other factors or a combination of factors. Neural networks, fuzzy logic and/or traditional logic paradigms may also be employed to prioritize the outputs. These logical paradigms are provided in known manner, and, especially in the case of neural network-based systems, a training aspect may be supplied with the system to allow it to adapt to the preferences and capabilities of the user. Thus, for a human user, events which are forthcoming and important are output, while past events and those in the distant future, if at all, are low priority. On the other hand, for communications with other devices, the prioritization is primarily in consideration of the fact that the communication between units may be only short lived; therefore, the data is communicated in order to priority, preferably of the recipient device. In an adaptive device, if the user believes that the information from the device is inappropriate, a simple input is provided, which is later analyzed to alter the information presentation algorithm. Likewise, if an information alert retrospectively turns out to be erroneous is a predictable manner, i.e., relating to a route not taken, the system may internally adjust the algorithm without user input.

In order to sort the priorities, the intended recipient may, for example, identify itself 201 and communicate its location 202 an itinerary or intended or prospective path 205. High priority messages 204 and various codes 203 may be interspersed through the communication string. The transmitting unit then outputs data 206 in order of the computed or predicted importance of the event and the time before the recipient encounters the event. Static events, such as fixed location radar emission sources, which may, for example, indicate a source for interference with a radar detector, or a speed detection/control device, may be transmitted as well. In the case where there is contention for the band, the communications session is limited by the scope of the authorization for use of the band. Where there is no contention, the duration of the communications channel will generally control the amount of information communicated.

Therefore, it is noted that the present invention provides a means for mapping events and for analyzing their significance. Thus, this embodiment does not merely rely on processed sensor outputs to supply information to the user; rather, sensor outputs may be filtered based on past experience with the particular location in question. If a particular user does not have direct experience with a location, then the experience of others at that location may be substituted or combined to improve analysis of the sensor signal. Therefore, the signal analysis from the sensor need not be subjected to a relatively high threshold to avoid false alarms. A low threshold is acceptable because other information is employed to determine the nature of the physical elements that give rise to the event and sensor activation.

It is noted that, in the case of "false alarms", the response of the unit is to detect the event, e.g., radar signal, correlate it with a stored "false alarm" event, and suppress an alarm or modify the alarm signal. Thus, information stored in memory and/or transmitted between units, may signify an important alarm or a suppression of an erroneous alarm. In this context is apparent that the integrity of the database structure, especially from corruption by the very sources of alarms which are intended to be detected, is important. To the extent that the environment responds to the existence and deployment of the system according to the present invention, for example by detecting transmissions between units to identify and locate units, and thereby alter the nature of an event to be detected, the present system may also be adaptive, in terms of its function and signature spectral patterns. In one aspect, the system may employ a so-called "FLASH" upgradable memory, which controls system, operation. Therefore, periodically, the system operation may be altered. The communications may selectively occur on a plurality of bands, using a plurality of protocols. Thus, for example, the system may have tri-band capability, e.g., 900 MHz, 2.4 GHz and 5.8 GHz. The mapping feature of the present invention may also be used to identify the locations of such monitoring sites. The system may also mask its transmissions as other, more common types of transmissions or environmental sources of emissions. A direct sequence spread spectrum technique may be employed that is difficult to detect without knowing the spread spectrum sequence seed. Of course, an aspect of the present invention is open communications, which as a matter of course are not securely encrypted and which would identify the transponder and its location. This problem may be addressed, in part, relying on laws which prevent unauthorized eavesdropping and unauthorized interception and decryption of communications, unauthorized "copying" of copyright works and defeating of copy protection schemes thereof, control over availability of authorized transceivers, and patent protection of the design and implementation. According to one embodiment of the invention, channel use and control is established over a first channel, which may be out of band with respect to the normal data communications channel. Preferably, this control channel is longer-range and more robust than the data communications channel, permitting control to precede normal communications capability, and providing enhanced recover and network reconfiguration capabilities.

According to one embodiment, all communications are direct sequence spread spectrum over a wide band, with medium to high security codes, e.g., 10 bits or greater length chip sequence and 12 bits or greater data encryption, and more preferably 16 bit or greater chip sequence and 16 bit or greater data encryption. The chip sequence of the control and arbitration channel, which should be available to all compatible units, may be adaptive or changing, for example following a formula based on time, location, and/or an arbitrary authorization code provided with a subscription update. Further, the chip sequence may vary based on selective availability (SA) deviancies in GPS data, or based on the identity of satellites in view of the receiver. While such information might be available to "pirates", miscreants, hackers and scofflaws, the algorithm for generating the chip sequence might be held as confidential, and thus the system unusable without specific authorization and incompatible with equipment without such algorithm. Such systems employing secure encryption with open access have been employed in satellite television (General Instrument Video-Cipher II) and the like. It is noted that, in order to mask a message in a spread spectrum signal, multiple active channels may be employed, one or more of which transmits the desired data and the remainder transmitting noise or masking data.

Employing 2.4 or 5.8 GHz communications bands, data rates of 10 megabits per second (MBPS) are possible, although lower rates, such as 0.5-1.0 MBPS may be preferred to reduce loss due to interference or adverse communications conditions and maintain availability of simultaneous communications on multiple channels within the band in a small geographic area.

Where mobile devices are traveling parallel and at similar speeds, or both are stopped, an extended communications session may be initiated. In this case, the data prioritization will be weighted to completely exchange a public portion of the database, although emphasis will still be placed on immediately forthcoming events, if anticipated. On the other hand, where computed or user-input trajectories indicate a likely brief encounter, the immediate past events are weighted most heavily.

In order to analyze temporal or spatial relevance, the memory 4 preferably stores an event identifier 301, a location 302, a time of detection of an event 303, a source of the event information 304, an encoding for a likely expiration of the event 305, a reliability indicator for the event 306, and possibly a message associated with the event 307 including other information. These data fields may each be transmitted or received to describe the event, or selectively transmitted based on the nature of the event or an initial exchange between units specifying the information which will be communicated. Other types of relevance may also be accounted for, as discussed above.

For example, in a radar detector embodiment, mobile police radar "traps" are often relocated, so that a particular location of one event should not be perpetuated beyond its anticipated or actual relevance. In this case, expirations may be stored, or calculated based on a "type" of event according to a set of rules. False alarms, due to security systems, traffic control and monitoring systems, and the like, may also be recorded, to increase the reliability any warnings provided.

Likewise, traffic jams often resolve after minutes or hours, and, while certain road regions may be prone to traffic jams, especially at certain hours of the day and/or days of the week, abnormal condition information should not persist indefinitely.

The preferred embodiment according to the present invention provides an event detector, which, in turn is preferably a police radar 18 and LIDAR 19 detector. Other detected events may include speed of vehicle, traffic conditions, weather conditions, road conditions, road debris or potholes, site designation, sources of radio signals or interference or false alarms for other event detectors, and particular vehicles, such as drunk drivers or unmarked police cars (possibly by manual event input). The event detector may include, for example, a sensor. such as a camera 26, which may analyze traffic control indicia (such as speed limits, cautions, traffic lights). The event may also include a commercial message or advertisement, received, for example from a fixed antenna beside a road, which, for example, is stored as the message 307. Such a commercial message 307 may be presented immediately or stored for future output. The received message, whether commercial or not, may be a static or motion graphic image, text or sound message. The user output of the system 27 may thus be visual, such as a graphic or alphanumeric (text) display, indicator lights or LED's 28, audible alerts or spoken voice through an audio transducer 29.

The camera is, for example, a color or infrared charge coupled device (CCD) or complementary metal oxide silicon field effect transistor (CMOS) imager, having resolution of 0.3 to 6.0 megapixels. Image communication may be, for example H.261 or H.263+, using H.323 or H.324 protocol, or MPEG-4. The imager may also be incorporated as part of a mobile videoconferencing system, although a dual imager system (one for imaging persons and the other for imaging road conditions) may be implemented. Other ITU standards, e.g., T.120, may be employed for data communications, although the particular nature of the data communications channel(s) may compel other communications protocols.

In order to maintain the integrity of the database stored in memory 4, 20, it may be useful to store the originator of a record, i.e., its source 304. Thus, if event information from that origin is deemed unreliable, all records from that source may be purged, and future messages ignored or "flagged". As stated above, even the proximity of an unreliable or modified unit may be detrimental to system operation. Therefore, where the location of such a unit is known, other units in proximity may enter into a silent mode. Further, normal units may transmit a "kill" message to the unreliable unit, causing it to cease functioning (at least in a transmit mode) until the problem is rectified or the unit reauthorized.

The unit is preferably tamper-proof, for example, codes necessary for unit activation and operation are corrupted or erased if an enclosure to the unit is opened. Thus, techniques such as employed in the General Instrument VideoCipher II and disclosed in U.S. Pat. No. 4,494,114, may be employed.

The communications subsystem preferably employs an error correction/error detection protocol, with forward error correction and confirmation of received data packet. The scheme may be adaptive to the quality of the communication channel(s), with the packet length, encoding scheme, transmit power, bandwidth allocation, data rate and modulation scheme varied in an adaptive scheme to optimize the communication between units. In many cases, units engaged in communication will exchange information bidirectionally. In that case, a full duplex communication protocol is preferred; on the other hand, where communication is unidirectional, greater data communication rates may be achieved employing the available bandwidth and applying it to the single communication session.

In some instances, it may be desired to maintain privacy of communications. In that case, two possibilities are available; spread spectrum communications, preferably direct sequence spread spectrum communications is employed, to limit eavesdropping possibilities. Second, the data itself may be encrypted, using, for example, a DES, PGP, elliptic keys, or RSA type encryption scheme. Keys may be supplied or exchanged in advance, negotiated between partners, or involve a public key-private key encryption algorithm. For example, the spread spectrum communications chip sequence may be based on an encrypted code. Ultrawideband (UWB) communications techniques may also be employed.

In order to provide flexibility in financing the communications devices, the commercial messages 307 discussed above may be employed. Further, by circulating authorization tokens or codes 203, a subscription service may be provided. Thus, in a simplest subscription scheme, the communications device has a timer function, which may be a simple clock or GPS referenced. The user must input an authorization code periodically in order for the device to continue operating. Thus, similarly to satellite television receivers and some addressable cable television decoders, failure to provide the authorization code, which may be entered, e.g., by telephone communication or through a keypad 30, renders the device temporarily or permanently inoperative. In order to reduce the burden of reauthorizations, the authorization codes or tokens may be passed through the communications "cloud" 24, so that devices 1, if used, will eventually receive the authorization data. Conversely, a code 203 may be circulated which specifically deactivates a certain device 1, for example for non-payment of the subscription fee or misuse of the device (e.g., in an attempt to corrupt other user's databases). The authorization process is preferably integral to the core operation of the system, making bypassing authorization difficult.

Where a number of communications devices are in proximity, a multi-party communication session may be initiated. For example, the communications subsystem may have simultaneous multi-channel capability, allowing each unit to transmit on a separate channel or use a shared channel. Where the number of channels or channel capacity is insufficient, units may take turns transmitting event information on the same channel (e.g., according to estimated priority), or time division multiplex (TDM) the channel(s). Preferably, the communication scheme involves a number of channels within a band, e.g., 1 common control channel and 24 data communications channels. Since some communication sessions may be relatively short, e.g., limited to a few seconds, a data communications channel preferably has a maximum capacity of tens of kilobits per second or higher. In some cases, hundreds of kilobits, or megabit range bandwidths are achievable, especially with a small number of channels (e.g., one channel). For example, so-called third generation (3G) cellular communications protocols may be employed.

Thus, for example, a DSSS spread spectrum transceiver operating in the 2.5 GHz band might have a usable bandwidth of 10 megabits per second, even while sharing the same band with other transceivers in close proximity. Where necessary, directional antennas or phased arrays may be employed to provide spatial discrimination.

The system preferably has advanced ability to detect channel conditions. Thus, where communications are interrupted by physical limitations in the channel, the impairment to the communications channel is detected and the communications session paused until the impairment abates. This, in turn, will allow other units, which might not be subject to the impairment, to use the same channel during this interval. The channel impairment may be detected by a feedback protocol between communications partners, or by means of symmetric antennas and communications systems, by which an impairment of a received signal may be presumed to affect the transmitted signal as well. The latter requires a high degree of standardization of equipment design and installation for effectiveness.

It is particularly noted that, where the events to be detected and the communications subsystem operate in the same band, structures may be shared between the communications and event detection systems, but this also increases the possibilities for interference.

As one embodiment of the invention, the processor may be provided as a standard personal digital assistant (PDA) with a PC Card or PCMCIA slot for receiving a standard GPS receiver and another standard PC Card slot for receiving an 802.11b/g/a/a R/A module. The PDA, in turn has memory, which may include random access memory, flash memory, and rotating magnetic memory (hard disk), for example. The PDA has a processing system which is capable of running applications written in general purpose, high level languages such as C. The PDA may operate under a standard operating system, such as Microsoft Windows CE, Palm OS, Linux, or a proprietary operating system. A software application written in a high-level language can normally be ported to run in the PDA processing system. Thus, the basic elements of the hardware platform are all available without customization. In a preferred embodiment, an event sensor is provided, such as a police radar and laser speed detection equipment system (e.g., "radar detector") is provided. This may employ a modified commercially available radar detector, to produce a serial data stream or parallel signal set. For example, radar detectors providing an alphanumeric display often transmit data to the display controller by means of a serial data signal. This signal may be intercepted and interfaced with a serial port or custom port of the PDA.

Optionally, the GPS Smart Antenna is "differential-ready" to apply differential GPS (DGPS) error correction information to improve accuracy of a GPS determined location. The application program for the PDA may be provided in a semiconductor memory cartridge or stored on hard disk.

The PDA 30 includes the processing system, including a microprocessor, memory, precoded program instructions and data stored in memory, a microprocessor bus for addresses, data, and control, an interrupt bus for interrupt signals, and associated hardware, operates in a conventional manner to receive digital signals, process information, and issue digital signals. A user interface in the PDA includes a visual display or audible output to present signals received from the processing system to a user, a user entry system to issue signals from the user to the processing system. The user interface may include one or more push keys, toggle switches, proximity switches, trackballs, joysticks or pressure sensitive keys, a touch-sensitive display screen, microphones or a combination of any of the above used together or with other similar type user input methods. The PDA sends digital signals representing addresses, data, and commands to the memory device and receives digital signals representing instructions and data from the memory. A PDA interface electrically connects the processing system to a GPS Smart Antenna. If the PDA and GPS are not integrated, a preferred interface comprises a computer standard low to medium speed serial data interface, such as RS-232, RS-422, or USB (1.0,1.1, 2.0), IEEE-1394, Bluetooth (especially if the communications system operates in another band), through a cabled interface for connection to the GPS Smart Antenna.

The GPS Smart Antenna system includes a GPS receiver antenna to receive GPS satellite signals from GPS satellite transmitters, a GPS frequency downconverter to downconvert the approximately 1.575 GHz frequency of the L1 GPS satellite signals to a lower frequency (LF) signal that is suitable for digital processing, and to issue the LF to a GPS processor. The GPS processor demodulates and decodes the LF signal and provides location information for at least one of (i) location of the GPS antenna, (ii), GPS satellite pseudoranges between the GPS satellites and the GPS antenna, (iii) rate of change of location of the GPS antenna, (iv) heading of the GPS antenna, and (v) time to a GPS interface. Optionally, the GPS Smart Antenna and GPS processor are differential-ready. An optional input select switch, controlled by the GPS processor upon a request from the PDA, allows a single serial interface to receive either a control signal from the PDA or a DGPS error correction signal from an optional DGPS radiowave receiver. Alternately, a DGPS-type system may be coordinated between multiple mobile receivers, top provide high relative position accuracy, even where the absolute position accuracy is low. Since the event position calculations are based on the relative position frame, the effect is to accurately position the events with respect to the vehicle.

The user device may display, for example, map features according to a coordinate system such as latitude and longitude. The display may also include an indication of the location of the GPS receiver, an itinerary, proposed route, and indications of the location of various events. By correlating the GPS with a stored map, the absolute location of the vehicle may be determined by map matching techniques. In accordance with the present invention, these events are derived from the event detector or the memory. Other communications devices may also be located on the display.

The user entry system has both touchscreen keys and press keys in the present embodiment. With a touchscreen, a user enters a request by touching a designated portion overlying a visual display with his finger (or soft pointer, such as a plastic pen). The touchscreen senses the touch and causes a digital signal to be sent to the processing system indicating where the touch was made. Switches such as rotary switches, toggle switches, or other switches can equally well be applied. An advantage of the touchscreen is that a label or a placement of the touchscreen, and a corresponding function of the touchscreen, may be changed by the computer controlling the display any number of times without changing electrical or mechanical hardware. In the present embodiment, zoom keys may be employed change scale and resolution of a map on the display. Zooming in decreases the scale, so that the map is viewed with greater resolution over a lesser area of the map. Zooming out increases the scale, so that a greater area of the map is viewed with lesser resolution. A map orientation key selects an orientation of a direction on the map with a direction on the visual display, for example, orientations of north up or current ground track up. It is noted that these map functions are generally known, and known techniques may be generally applied for such map functions. According to the present invention, in addition to normal map functions, the event data may be overlayed on the map to provide additional dimensions of display data. Further, by providing these data, which are dynamic, the map system becomes useful even to travelers who are well aware of the geography and layout of the region being traveled.

One communications scheme, a 900 MHz spread spectrum communications system, operates as follows. The RF receiver includes an antenna, low noise amplifier (LNA) with a noise temperature below 80 degrees Kelvin and a helical bandpass filter to cancel the image frequency noise. The filtered signal is then down-converted to an intermediate frequency (IF) of about 70 MHz, which is the result of mixing the filtered received signal with a local oscillator signal of between about 832-858 MHz at about 17 dbm. Of course, other tuning frequencies may be selected, for example, to avoid interference with other equipment. The local oscillator thus operates at about 850 MHz and is locked to a reference of 10.625 MHz. The 70 MHz IF frequency is amplified and filtered by a SAW filter 906 with a bandwidth of 1.5-10 MHz, depending on the data signal bandwidth. The IF is then demodulated to baseband, employing a demodulator using an inverse sequence from the transmitted spread spectrum sequence. Thus, in a frequency hopping embodiment, the demodulator synthesizes a signal having the appropriate frequency sequence. In a direct sequence spread spectrum embodiment, the demodulator provides the appropriate pseudorandom code sequence to demodulate the received signal. Time synchronization may be affected by using the timing functions of the GPS receiver. The demodulated signal is then decoded into messages, which are typically digital bitstreams.

In a 2.4 GHz system, the RF semiconductor technology will typically include gallium arsenide integrated circuits. In a 5.8 GHz system, the RF section semiconductors are preferably silicon germanium. Once demodulated to below about 1 GHz, standard silicon technologies may be employed.

The baseband demodulator may also comprise a digital radio, employing a digital signal processor, receiving a digitized IF signal and outputting a data stream. In this case, it may be preferred to digitize at an IF frequency below 70 MHz. For example, with a data stream having a bandwidth of 1.5 MHz, the preferred IF is 3-10 MHz, with quadrature digitization of the analog signal at that IF. The IF signal may be processed in parallel with a plurality of demodulators, allowing multiple signals to be received simultaneously.

In the 900 MHz embodiment, a PLL, such as a 1.1 gigahertz PLL frequency synthesizer, Part No. MC145190 available from Motorola Semiconductors, Phoenix, Ariz., may be used to generate the first IF. This frequency synthesizer, referenced to the 9.6 MHz reference frequency, generates a local oscillator signal of approximately 860 megahertz. This PLL synthesizer chip produces a locked stable output signal which is low pass filtered to produce a variable voltage to control voltage control oscillator. VC0 is, for example, Part No. MQC505-900 operating at approximately 860 megahertz and available from Murata of Tokyo, Japan. The feedback through sense keeps synthesizer chip stable to produce a stable, fixed course output. A second PLL produces a fine control frequency. The second PLL includes a synthesizer chip, e.g., Part No. MC145170 available from Motorola Semiconductor of Phoenix, Ariz. This PLL frequency synthesizer chip has digital controls for control by a microcontroller. The output of the fine synthesizer chip is low pass filtered to produce a variable DC voltage to control a voltage-controlled oscillator, e.g., Part No. MQC309-964, operating within the 900 megahertz band. The fine adjust frequency is band pass filtered with an SAW band pass filter with a center frequency of approximately 38 megahertz. The band pass filter is, for example, Part No. SAF38.9MZR80Z also available from Murata of Tokyo, Japan. The output of the second PLL is controlled in accordance with the output frequency desired based on the frequency of the hop transmitted at the current time. By adjusting the fine frequency, which would be mixed with the coarse frequency, the output frequency in the 900 megahertz band is produced with very little phase noise, very little phase jitter and extremely narrow noise skirt. Thus, this double loop system serves to demodulate the signal to a low IF frequency or to baseband.

Example 2

Ad hoc networks are a good candidate for analysis and optimization according to game theory. A multihop ad hoc network requires a communication to be passed through a disinterested node. The disinterested node incurs a cost, thus leading to a disincentive to cooperate. Meanwhile, bystander nodes must defer their own communications. By understanding the decision analysis of the various nodes in a network, it is possible to define a system which, in accordance with game theory, provides a benefit or incentive to promote cooperation and network reliability and stability. The incentive, in economic form, may be charged to the node(s) benefiting from the communication, and is preferably based on a value of the benefit received. This network optimization employs a modified combinatorial (VCG) auction, which optimally compensates those burdened by the communication, while charging the benefiting participants. Equilibrium usage and headroom may be influenced by deviating from a zero-sum condition. The mechanism seeks to define fairness in terms of market value, providing probable participation benefit for all nodes, leading to network stability.

I. Introduction

I describe the application of game theory concepts to the arbitration of access to bandwidth in an ad hoc communications network, more particularly to network including mobile nodes. According to applicable elements of game theory, an agent makes a decision to cooperate with a system having established rules, or to circumvent it. Likewise, cheating, i.e., adopting behavior contrary to an expected nor, may be an option, and can be analyzed in the context of a decision. Therefore, a game theoretic approach addresses the situation where the operation of an agent which has freedom of choice, allowing optimization on a high level, considering the possibility of alternatives to a well-designed system. According to game theory, the best way to ensure that a system retains compliant agents, is to provide the greatest anticipated benefit, at the least anticipated cost, compared to the alternates.

Mobile ad hoc networks encompass multihop networks, which, by their nature, require participation of disinterested nodes to operate. Technically, however, the multihop scenario is not intrinsic, since it is reasonable to presume that in some networks, all nodes are within range of each other. Each scenario poses a classic game theory issue to each node: why defer to other nodes if no direct benefit is obtained? The multihop network adds the further issue of: why participate in communications between other nodes if no direct benefit is obtained? We discuss a set of mechanisms, incentives and rationales as a framework for analyzing node behavior and optimization, and seeks to respond to these issues by proposing appropriate incentives to promote network efficiency and stability.

In these sections, we seek to avoid mathematical expression of the principles, as well as formal proofs. This is for three reasons: these mathematical expressions and proofs are detailed elsewhere, the recitation of these formulae and associated derivation are distracting to the essence presented herein, and such a presentation might imply that, in practice, complete information may be available in order to fully evaluate and employ such expressions. In fact, it is likely that any real and feasible implementation of will sufficiently deviate from a tractable theoretical model, and thus require substantial simplifying presumptions, to make any such presentation misleading.

II. Background

The application of game theory to ad hoc networks has been addressed in various forms to date. In general, there is a divergence between approaches which define a real-world system, with all of its complexity, and required functionality, and those which seek to mathematically tractable model having a definite set of rules and presumptions leading to a comprehensible and useful result. Each level of complexity and relaxation of limitations on the system, decreases the ability to accurately model the system and produce a result directly applicable to a deployable control system. Construction and evaluation of models lags their theoretical exposition. Focus is on a theoretical framework for the arbitration control system, with the modeling and evaluation remaining as the subject of later work.

An ad hoc network is a wireless network which does not require fixed infrastructure or centralized control. The terminals in the network cooperate and communicate with each other, in a self-organizing network. In a multihop network, communications can extend beyond the scope of a single node, employing neighboring nodes within the scope, to forward messages. In a mobile ad hoc network, constraints are not placed on the mobility of nodes, that is, they can relocate within a time scale which is short with respect to the communications, thus requiring consideration of dynamic changes in network architecture.

Ad hoc networks pose control issues with respect to contention, routing and information conveyance. There are typically tradeoffs involving equipment size, cost and complexity, protocol complexity, throughput efficiency, energy consumption, and "fairness" of access arbitration. Other factors may also come into play.

Game theory studies the interactions of multiple independent decision makers, each seeking to fulfill their own objectives. Game theory encompasses, for example, auction theory and strategic decision-making. By providing appropriate incentives, a group of independent actors may be persuaded, according to self-interest, to act toward the benefit of the group. That is, the selfish individual interests are aligned with the community interests. In this way, the community will be both efficient and the network of actors stable and predictable. Of course, any system wherein the "incentives" impose too high a cost, themselves encourage circumvention. In this case, game theory also addresses this issue.

We first analyze the issues that give rise to cooperative problems in ad hoc networks. We then survey game theory in its traditional forms, followed by a more complete discussion of ad hoc networks. We then focus on published examples of the application of game theory to the control and analysis of ad hoc networks, more particularly on the theoretical costs and benefits applicable to nodes in ad hoc networks, the behavior of communications nodes, and apply game theory to define incentives predicted to result in an efficient ad hoc network. Finally, we provide a new framework for a real-time telematics information communication network proposed for deployment.

III. Cooperative Problems in Ad Hoc Networks To understand why game theory is applicable the control over ad hoc networks, consider the analogy of a classroom. The teacher acts as a central authority and arbitrator to ensure decorum. The teacher recognizes one student at a time for public communication. This is an example of centralized control. If there were no teacher to recognize a student, pandemonium would result, unless a suitable process of self-organization is established, which obtains cooperation dictating common rules, adopted according to mutual incentives.

Now, suppose one student wishes to send a note across the room. Presumably, there are multiple paths to the destination. But how can the student be sure that the note will be forwarded? How does one know which neighbor to hand-off to? Suppose that forwarding the note imposes a burden, such as the risk of being caught and sanctioned? Consider the possibility, after conclusion of negotiations for forwarding, a student fails to fulfill his assumed responsibility?

It is therefore clear that the issues of subjective and objective costs and benefits, distance, complexity, and reliability, are therefore interrelated, and there may be practical restraints on achieving theoretical system capacity.

The game theoretic solution is to link an incentive or benefit to the desired behavior, to promote each agent cooperate with note forwarding, on a rational basis. The ultimate payoff should be borne by the student receiving the benefit. Thus, by linking a benefits to costs, a stable society is achieved, approaching a desirable equilibrium.

In order to incentivize the intermediaries, a student could compensate them by taping dimes to the note, instructing each forwarding student to remove one dime (the packet purse model). Alternately, the recipient may be expected to pay for the transmission through an acknowledgement message with attached value (the packet trade model). However, how do we know that the first recipient will not remove all the money and throw away the note? How can the intermediaries ensure, in the packet trade model, that the recipient will eventually pay? How does the responsible party know how much must be paid? These models also require stability of the route during the process, and imply a priori knowledge of the route. This approach does not permit variations in compensation, e.g., some students might accept a nickel, and others in a critical position, might require a quarter. In cases of unreliable routes, should the originator send two notes by alternate paths, or attempt to pay more for a single reliable delivery?

Even with imposition of a traffic sensitive cost, one node of the network may seek to send an inordinate number of messages, resulting in congestion. A node in a critical location may become wealthy, and its fees rise, leading to instability. Likewise, in a virtual construct, what does one use as currency? We see that consideration must be given to keeping traffic below capacity, since highly loaded networks often have decreased efficiency.

IV. Game Theory

Game theory is the study of the interaction of independent agents, in an environment where there are rules, decisions, and outcomes. Game theory defines the theoretical basis for strategy, as well as providing a framework for analyzing real-world actors. Game theory may be applied to automated systems, providing a basis for the analysis and optimization of such systems. Aspects of game theory have been applied to telecommunications, for example to optimize network routing, and has quality of service implications. Communications resources may be treated as utilities, and auctions have been applied to the optimization of allocation of utility resources.

Each game has a set of rules or constraints, under which the agents operate. "Cheating", if permitted at all, is modeled as an available decision of an agent to comply with other constraints. Therefore, the game is valid as a model only for the rules and constraints considered. Each decision maker pursues a goal, and may take into account their knowledge or expectations of the other decision makers' behavior. According to game theory, rationality leads to optimality, and therefore analyzing the game and acting logically in accordance with the rules leads to the best outcome.

It is conceptually simple for an automated system to act rationally. That is, given a set of facts and circumstances, the rational analysis is fixed and obtainable. On the other hand, humans acting on purely mental consideration may deviate from rationality. For example, humans exhibit a broad range of risk tolerance, which is not directly explained by rational analysis. It is noted that risk tolerance, and other aspects of behavior, have been modeled, and as such, can themselves be treated scientifically and rationally. In fact, game theory expressly recognizes that agents may express private values which are not rationally explained, and that by understanding these values, a strategic advantage is obtained. Thus, while rationality is assumed as an optimum strategy for each entity, real entities have imperfect estimates of payoff and risk, and indeed may miscalculate or misconstrue the circumstances. Such perturbations may be compensated, under certain circumstances, by way of various parameters added to the modeling equation.

Game theory is typically encompassed in the study of economics, since a self-interested node will always try to increase its wealth, and all other concepts may be considered in terms of their subjective economic costs and benefits. Game theory can be used not only to analyze a defined game, but also to define a game having a desired outcome, i.e., to optimize a set of rules and constraints. The preferences of a node can be expressed either with a utility function, or with preference relations, ranking various consequences.

Games can be divided into noncooperative and cooperative games. In cooperative games, the joint actions of groups are analyzed, i.e. what is the outcome if a group of players cooperate. In noncooperative games, the actions of the single players are considered. The cooperative game model may be used to analyze heterogeneous ad hoc networks. In strategic games, decisions are made at the commencement of the game. In extensive games, decisions may be made interactively. The strategic game model is suitable for representing simple real-life events such as a sealed bid auction. A progressive bid auction may be modeled as an extensive game.

Games can also be divided according to their payoff structures. A game is called zero-sum game if the sum of the utilities is constant in every outcome. Zero-sum games are considered strictly competitive games. For example, an auction is a zero-sum game, since the buyer pays the seller, with no other gains or losses incurred. If the players are fully informed about each other's moves, the game has perfect information. Only extensive games consider the issue of perfect information. In games with complete information the utility function of each player is known. In a game with incomplete information, the privacy of a player's utility function is held as a strategic advantage.

Pareto efficiency exists if there is no other outcome that would make all players better off. An equilibrium is a result of the optimization of the individual players, but does not imply that the result is "good" or globally optimum. The solution of a strategic game is a Nash equilibrium. Every strategic game with finite number of players, each with a finite set of actions, has an equilibrium point. This Nash equilibrium is a point from which no single player wants to deviate unilaterally. When a game is played, the rationality assumption will force the game into a Nash equilibrium outcome. If the outcome is not a Nash equilibrium, at least one player would gain a higher payoff by choosing another action. If there are multiple equilibriums, more information on the behavior of the players is needed to determine the outcome of the game.

In the strategic and extensive games, the solution of a game is a complete set of strategies that achieve a Nash equilibrium. In cooperative games, the solution comprises the subsets of players or coalitions from which no member has an incentive to break away. Cooperative games can be divided between games in which the coalition is free to internally distribute a payoff (transferable payoff), and those in which the payoff is personal to coalition members (non-transferable payoff). A dominant strategy is one in which the same decision is made based on the various different rational strategies an agent may adopt.

To better understand game theory, it is useful to consider simple games. In one game, called the prisoner's dilemma, two criminals are arrested and charged with a crime. The police do not have enough evidence to convict the suspects, unless at least one confesses. They are not able to communicate. If neither confesses, they will be convicted of a minor crime and sentenced for one month. If one confesses, and the other does not, the confessing one will be given immunity and released and the other will be sentenced for nine months. If both confess, both will be sentenced for six months.

Another famous game is the battle of the sexes. A couple is going to spend an evening out. She wishes to attend the opera and he wishes to attend a hockey match, but each gains a benefit of the other's company.

In the prisoner's dilemma, all the outcomes except (Confess; Confess) are Pareto efficient. In the battle of the sexes, an outcome in which husband and wife attend different events are not Pareto efficient. The outcome (Confess; Confess) is the equilibrium, while outcome (Don't confess; Don't confess) results in higher payoff for both the criminals, but it is not an equilibrium because both the players have an incentive to deviate from it. In the battle of the sexes, the pure strategy equilibrium points are (Opera; Opera) and (Hockey; Hockey). There is also a third Nash equilibrium with mixed strategies, in which both choose their preferred option with probability 2:3. The prisoner's dilemma is a good example of a sub-optimal equilibrium. Both players would gain a higher payoff by playing (Don't confess; Don't confess).

Another example of game theory is the so-called tragedy of the commons. In this game, a set of farmers live in a community with a grass-filled square. Each farmer is confronted with a decision as to whether to acquire another goat, which eats grass in the square. So long as the benefit of having the goat is in excess of the personal detriment of that goat's grass consumption, it is a dominant strategy to acquire the goat, even though the necessary result of all farmers acting rationally is the loss, to all, of the benefits of the square.

In computer networks, issues arise as the demand for communications bandwidth approaches the theoretical limit. Under such circumstances, the behavior of nodes will affect how close to the theoretical limit the system comes, and also which communications are permitted. The well-known collision sense, multiple access (CSMA) protocol allows each node to request access to the network, essentially without cost or penalty, and regardless of the importance of the communication. While the protocol incurs relatively low overhead and may provide fully decentralized control, under congested network conditions, the system may exhibit instability, that is, a decline in throughput as demand increases, resulting in ever increasing demand on the system resources and decreasing throughput. According to game theory, the deficit of the CSMA protocol is that it is a dominant strategy to be selfish and hog resources, regardless of the cost to society, resulting in "the tragedy of the commons."

Game theory is most readily applied in the optimization of communications routes through a defined network, to achieve the best surplus allocation. The problems of determining the network topology, and conducting the communications themselves, are also applications of game theory. Since the communications incidental to the network access arbitration require consideration of some of the same issues as the underlying communications, elements of game theory apply correspondingly. Due to various uncertainties, the operation of the system is stochastic. This presumption, in turn, allows estimation of optimality within an acceptable margin of error, permitting simplifying assumptions and facilitating implementation.

In an ad hoc network used for conveying real-time information, as might be the case in a telematics system, there are potentially unlimited data communication requirements, and network congestion is almost guaranteed. Therefore, using a CSMA protocol as the paradigm for basic information conveyance is destined for failure, unless there is a disincentive to network use. On the other hand, a system which provides more graceful degradation under high load, sensitivity to the importance of information to be communicated, and efficient utilization of the communications medium would appear more optimal. Such a system is proposed below in Section VII.

One way to impose a cost which varies in dependence on the societal value of the good or service, is to conduct an auction, which is a mechanism to determine the market value of the good or service, at least between the auction participants. In an auction, the bidder seeks to bid the lowest value, up to a value less than or equal to his own private value (the actual value which the bidder appraises the good or service, and above which there is no surplus), that will win the auction. Since competitive bidders can minimize the gains of another bidder by exploiting knowledge of the private value attached to the good or service by the bidder, it is generally a dominant strategy for the bidder to attempt to keep its private value a secret, at least until the auction is concluded, thus yielding strategies that result in the largest potential gain. Auction strategies become more complex when the bidder himself is not a consumer or collector, but rather a reseller. In this case, the private value of the bidder is influenced by the perception of the private value of other bidders, and thus may change over the course of the auction in a successive price auction. On the other hand, in certain situations, release or publication of the private value is a dominant strategy, and can result in substantial efficiency, that is, honesty in reporting the private value results in the maximum likelihood of prospective gain.

A so-called Vickrey-Clarke-Groves, or VCG, auction, is a type of auction suitable for bidding, in a single auction, for the goods or services of a plurality of offerors, as a unit. In the classic case, each bidder bids a value vector for each available combination of goods or services. The various components and associated ask price are evaluated combinatorially to achieve the minimum sum to meet the requirement. The winning bid set is that which produces the maximum value of the accepted bids, although the second (Vickrey) price is paid. In the present context, each offeror submits an ask price (reserve) or evaluatable value function for a component of the combination. If the minimum aggregate to meet the bid requirement is not met, the auction fails. If the auction is successful, then the set of offerors selected is that with the lowest aggregate bid, and they are compensated that amount.

The surplus, i.e., gap between bid and ask, is then available to compensate the deferred bidders. This surplus is distributed proportionately to original the bid value for the bidder, thus further encouraging an honest valuation of control over the resource.

The network is such that, if any offeror asks an amount that is too high, it will be bypassed. Since the bidder pays the second highest price, honesty in bidding the full private value is encouraged, with the further incentive of the losing bidder payment being proportional to the bid. VCG auctions have found application in providing segment links to route goods, or information in a network. In defining the goods and services that are the subject of the auction, it is possible to value the non-interference of a competitor; that is, a competitor is both a buyer and seller in the sale multi-good auction, with the purchase and sale being inconsistent combinations.

The traditional VCG auction, is postulated as being optimal for allocation of multiple resources between agents. It is "strategy-proof" and efficient, meaning that it is a dominant strategy for agents to report their true valuation for a resource, and the result of the optimization is a network which maximizes the value of the system to the agents. Game theory also allows an allocation of cost between various recipients of a broadcast or multicast. That is, the communication is of value to a plurality of nodes, and a large set of recipient nodes may efficiently receive the same information. This allocation from multiple bidders to multiple sellers is a direct extension of VCG theory, and a similar algorithm may be used to optimize allocation of costs and benefit.

V. Ad Hoc Networks

In an ad hoc network, there is no central authority controlling network operation, and there is typically a presumption that some nodes cannot directly communicate with others, leading to a requirement for communication intermediaries to forward packets, i.e., a multihop architecture. A mobile ad hoc network adds the further presumption that nodes are not stationary, and therefore a route discovery mechanism is required.

In order to determine the network architecture state, each node must broadcast its existence, and, for example, a payload of information including its identity, location, itinerary (navigation vector) and possibly an "information value function" and/or "information availability function". Typically, the system operates in a continuous state, so that, after stabilization, it is reasonable to estimate of the present state based on the prior state information. In a system with mobile nodes, the mobility may be predicted, or updates provided as necessary. Using an in-band or out-of-band propagation mechanism, this information must propagate through a sphere of influence or to a network edge, which may be physically or artificially defined. Nodes may be presumed to operate with a substantially common estimation of network topology, and therefore only deviations from previously propagated information need be propagated. Of course, a mechanism should be provided for initialization and in case a new node joins the network. If such estimates were accurate, the network could then be modeled similarly to a non-mobile network, with certain extensions. On the other hand, typical implementations will present substantial deviations between actual network architecture and predicted network architecture, requiring substantial fault tolerance in the fundamental operation of the protocol and system.

If we presume that there is a spatial or temporal limit to relevance, for example, 5 miles or 10 hops, or 1 to 5 minutes, then the network state propagation may be so limited. Extending the network to encompass a large number of nodes, will necessarily reduce the tractability of the optimization, although this may also produce substantial benefits, especially if the hop distance is relatively short with respect to the desired communication range. Each node may therefore impose a local estimate of relevance as a filter on communications, especially arbitration communications. This consideration is accommodated by communicating, from each node, an update to all other nodes within its network relevance boundary, and a state variable which represents an estimate of relevant status beyond the arbitrarily defined boundary. The boundary estimate is advantageous in order to ensure long range consistency. On a practical note, assuming a cost is incurred by employing the ad hoc network, which scales with the number of hops, then at some point, especially considering the latency and reliability issues of ad hoc networks with a large number of hops, it is more efficient to employ cellular communications or the like. On the other hand, making the ad hoc network suitable and reliable for 100 hop communications will necessarily impede communications over a much smaller number of hops, thus disincentivizing the more reasonable uses of the network.

For example, the propagation of network state and other protocol-level information may conveniently occur over a finite number of hops, for example 5-10, in an outward direction, a condition which may be assessed by GPS assistance. For each hop, a relatively simple protocol, such as a collision sense-multiple access (CSMA) protocol, may be employed, with each node propagating information according to a set of rules. (It is noted that, since this communication is not "limitless" in contrast to bulk real-time sensor data, CSMA may be an appropriate and efficient protocol).

An example of the application of game theory to influence system architecture arises when communications latency is an issue. A significant factor in latency is the node hop count. Therefore, a system may seek to reduce node hop count by using an algorithm other than a nearest neighbor algorithm, bypassing some nodes with longer distance communications. In analyzing this possibility, one must not only look at the cost to the nodes involved in the communication, but also the cost to nodes which are prevented from simultaneously accessing the network. As a general proposition, the analysis of the network must include the impact of each action, or network state, on every node in the system, although simplifying presumptions may be appropriate where information is unavailable, or the anticipated impact is trivial.

There are a number of known and proven routing models proposed for forwarding of packets in ad hoc networks. These include Ad Hoc On-Demand Distance Vector (AODV) Routing, Optimized Link State Routing Protocol (OLSR), Dynamic Source Routing Protocol (DSR), and Topology Dissemination Based on Reverse-Path Forwarding (TBRPF). In most systems analyzed to date, the performance metrics studied were power consumption, end-to-end data throughput and delay, route acquisition time, percentage out-of-order delivery, and efficiency. A critical variable considered in many prior studies is power cost, presuming a battery operated transceiver with finite available power. There can be significant differences in optimum routing depending on whether node has a transmit power control, which in turn controls range, and provides a further control over network topology. Likewise, steerable antennas, antenna arrays, and other forms of multiplexing provide further degrees of control over network topology. Note that the protocol-level communications are preferably broadcasts, while information conveyance communications are typically point-to-point. Prior studies typically presume a single transceiver, with a single antenna, and thus use an omni-directional antenna, with in-band protocol data, for all communications. The tradeoff made in limiting system designs according to these presumptions should be clear.

Routing protocols in ad hoc networks typically employ three strategies: flooding, proactive routing, and reactive routing. Flooding protocols broadcast packets to all the nodes in the network, while the remaining protocols do not. In proactive routing, the protocol maintains route information all the time, while in reactive routing, a route is discovered only when needed. All or some of these strategies may be employed simultaneously. Flooding typically consumes too much bandwidth and energy to be efficient, as compared to more sophisticated strategies. However, in cases with very high mobility, the flooding protocols best ensure that the transmission reaches its destination.

In proactive routing, each node stores and updates routing information constantly. The routing tables can be updated based on perceived changes in the network topology. Therefore, a new transmission can start immediately without a route discovery delay. However, the constant exchange of routing information adds overhead to the protocol. OLSR and TBRPF protocols use proactive routing. The overhead traffic of a proactive routing protocol increases as the mobility of the nodes increases, since the routing information needs to be updated in shorter intervals.

In reactive routing, when a node wishes to transmit, it starts a route discovery process in order to find a path to the receiver. The routes remain valid until the route is no longer needed. AODV and DSR protocols use reactive routing. In the AODV protocol, to find a route to a receiver, a terminal broadcasts a route request message containing the address of the receiver and the lifespan of the message. Terminals receiving the message add their address to the packet and forward it if the lifespan is not exhausted. If a receiver or a terminal knowing the route to the receiver receives the route request message, it sends a route reply back to the requester. If the sender does not receive a route reply before a timeout occurs, it sends another route request with a longer lifespan. The use of sequential route requests with incremental increases in timeout allows a mapping of the network by hop count.

In order for an ad hoc network to be effective, the nodes need to cooperate. This cooperation comes at a cost. In power constrained systems, for example, the cost is battery consumption. In other scenarios, the network utilization is itself a burden. The various nodes must cooperate in both arbitration and control, e.g., route discovery and optimization, and the information forwarding itself. In fact, participation in the route discovery, without notice that the node will fail to forward information packets, has been shown in studies to be more detrimental to the network than simply abstaining entirely.

It is the general self-interest of a node to conserve its own resources, maintain an opportunity to access resources, while consuming whatever resource of other nodes as it desires. Clearly, this represents the "tragedy of the commons", in which selfish individuals fail to respect the very basis for the community they enjoy, and a network of rational nodes operating without significant incentives to cooperate would likely fail. On the other hand, if donating a node's resources generated an associated benefit to that node, while consuming network resources imposed a cost, stability and reliability can be achieved. So long as the functionality is sufficient to meet the need, and the economic surplus is "fairly" allocated, that is, the cost incurred is less than the private value of the benefit, and that cost is transferred as compensation to those burdened in an amount in excess of their incremental cost, adoption of the system should increase stability. In fact, even outside of these bounds, the system may be more stable than one which does not tax system use nor reward altruistic behavior. While the system is a zero-sum system, and over time, the economic effects will average out, in any particular instance, the incentive for selfish behavior by a node will be diminished.

The concepts of node misbehavior and maliciousness, and competing networks consuming the same resources, are not addressed at length herein. However, these issues are also addressed by aspects of game theory. For example, an ad hoc network may defer to or compete with an interfering network, and the decision of which strategy to adopt is within the province of game theory. The particularities of agent misbehavior or hacking are not completely addressed herein, although real implementations must necessarily consider these issues. Sometimes, the solution to these issues is technological, but in others, the reaction of other nodes to discovery of misbehavior may be sufficient to discourage it. The intent is to formulate a system which is sufficiently robust and advantageous as to disincentivize non-compliance and non-cooperation, that is, the inherent advantages of compliance with the system architecture exceed the anticipated benefits of the alternative.

One way to remedy selfish behavior is to increase the cost of acting this way, that is, to impose a cost or tax for access to the network. In a practical implementation, however, this is problematic, since under lightly loaded conditions, the "value" of the communications may not justify a fixed cost which might be reasonable under other conditions, and likewise, under heavier loads, critical communications may still be delayed or impeded. Note that where the network includes more nodes, the throughput may increase, since there are more potential routes and overall reliability may be increased, but the increased number of nodes will likely also increase network demand. A variable cost, dependent on relative "importance", may be provided, and indeed, as alluded to above, this cost may be market based, in the manner of an auction. In a multihop network, such an auction is complicated by the requirement for a distribution of payments between the chain of nodes, with each node having potential alternate demands for its cooperation. The VCG auction mechanism excludes nodes which ask too high a price, and the auction itself may comprise a value function encompassing reliability, latency, quality of service, or other non-economic parameters, in economic terms. The network may further require compensation to nodes which must defer communications because of inconsistent states, such as in order to avoid interference or duplicative use of an intermediary node, and which take no direct part in the communication. It is noted that the concept of the winner of an auction paying the losers is relatively obscure, and itself upsets the normal analysis, since the possibility of a payment from the winner to the loser alters the allocation of economic surplus between the bidder, seller, and others. Likewise, while the cost to the involved nodes may be real, the cost to the uninvolved nodes may be subjective. Clearly, it would appear that involved nodes should generally be better compensated than uninvolved nodes, although a formal analysis remains to be performed.

In a more general sense, the underlying presumption is that the network provides competitive access to the physical transport medium, and that cooperation with the protocol provides significant advantages over competition with it. Clearly, the issues of commercial success and market dominance are much more complex and not capable of being accurately modeled according to known paradigms; on the other hand, a system providing rational benefits will be more likely to succeed than one with irrational benefits or ill-defined explicable benefits. Under normal circumstances, a well-developed ad hoc network system can present as a formidable coordinated competitor for access to contested bandwidth by other systems, while within the network, high valued communications may receive priority. Thus, a node presented with a communications requirement is presented not with the simple choice of participate or abstain, but rather whether to participate in an ad hoc network with predicted stability and mutual benefit, or one with the possibility of failure due to selfish behavior, and non-cooperation. Even in the absence of a present communication requirement, a network which rewards cooperative behavior may be preferable to one which simply expects altruism.

After the network architecture is defined, compensation is paid to those nodes providing value or subjected to a burden (including foregoing communication opportunity) by those gaining a benefit. The payment may be a virtual currency, with no specific true value, although the virtual currency system provides a convenient method to tax, subsidize, or control the system, and thus apply a normalized extrinsic value.

Game theory also encompasses the concept of that each node may have an associated "reputation" in the community. This reputation may be evaluated as a parameter in an economic analysis, or applied separately. This reputation may be anecdotal or statistical. In either case, if access to resources and payments are made dependent on reputation, nodes will be incentivized to maintain a good reputation, and avoid generating a bad reputation. Therefore, by maintaining and applying the reputation in a manner consistent with the community goals, the nodes are compelled to advance those goals in order to benefit from the community. Game theory distinguishes between good reputation and bad reputation. Nodes may have a selfish motivation to assert that another node has a bad reputation, while it would have little selfish motivation, absent collusion, for undeservedly asserting a good reputation. On the other hand, a node may have a selfish motivation in failing to reward behavior with a good reputation. The virtual currency and reputation may be considered orthogonal, since the status of a node's currency account provides no information about the status of its reputation.

VI. Published Ad Hoc Network Examples

By no way a comprehensive list of published applications of game theory to the control of ad hoc networks, below are discussed a number of prominent examples.

The Terminodes project includes many of the features described above. This project proposes a method to encourage cooperation in ad hoc networks that is based on a virtual currency called nuglets. Each node contains a tamper-proof hardware module which handles the nuglets. When a node forwards a packet it extracts nuglets from the payload. In order to make a transmission, the sender appends nuglets needed to forward the packet through the network to its destination. However, a central node probably likely accumulates excess nuglets, hence it has less value for additional nuglets, leading to lower incentive for network activity. Peripheral nodes may possess insufficient nuglets to support their needs. However, the system appears to achieve a balance over time, assuming random node movement. The Terminodes project is notable for the depth and completeness of its analysis, as well as the progress made toward implementation.

Crowcroft et al. present a traffic-sensitive pricing model. Compensation for packet forwarding is responsive to both required energy consumption and local congestion at a node. This mechanism both enforces cooperation and balances traffic loads to avoid congestion. Stabilization of price and node wealth occurs in static networks.

The Confidant protocol detects node misbehavior and routes traffic around the misbehaving nodes, to isolate them from the network. Misbehavior of neighboring nodes is broadcast to the network by observing nodes. A trust record is used to evaluate the validity of a report, thus disincentivizing misbehavior in the reporting process. The reputation information is applied by a path manager define a route and rejects access requested by misbehaving nodes.

The Core protocol is similar to Confidant; each node maintains reputation information, which is updated based on both observation and third party report. A threshold function is applied to limit access by nodes based on their reputation, resulting in isolation.

Michiardi et al. analyze whether it is optimal to join or defect from an ad hoc network, based on node utility function, payoff share, cost of cooperation, number of cooperating nodes, etc.

Srinivasan et al. apply game theory to model an ad hoc network at a connection level, providing a complicated extended game model. Before a user can transmit, all the nodes along the defined route must accept the relay request. Energy consumption of terminals is restricted by an expected lifetime of batteries, that is, the nodes are modeled as being power constrained. A normalized acceptance rate, a proportion of successful and attempted relays through a node, as observed by neighboring nodes, is sought to be maximized.

Urpi et al. model an ad hoc network at packet level. The model is based on an estimate of neighboring nodes, the remaining energy of node, and various packet traffic metrics. The payoff of the model is simply the access to packet forwarding, weighted by energy cost, provided to a node.

Noncooperative game theory offers a basis for analyzing Internet traffic, wherein each user tries to independently maximize its quality of service. The network operator focuses on maximizing network performance as a whole. Thus, in this case, different players adopt different roles, with different value functions. Game theory may thus by applied to optimize routing, flow control, queuing disciplines and traffic pricing. While ad hoc network routing is similar to the Internet, there are also significant differences. In an ad hoc network, routes may be inconsistent.

Nagle studied the concept of fairness in queuing in packet switches. In a first in-first out queue, a selfish node may saturate the queue with requests. Nagle proposes, as a solution, distinct queues for each source with a round-robin scheduler, providing a fair queuing scheme, which encourages keeping the user's queue as short as possible.

Game theory has also been applied on flow control. Each user tries to maximize its utility, defined by the ratio of average throughput and average delay. It has been shown that a unique Nash equilibrium exists in such a system, which converges to an equilibrium point. The nodes seek to both maximize their own quality of service, but also the fairness of resource allocation, resulting in a Pareto efficient solution.

ALOHA is a wireless CSMA protocol using time division multiplexing. Transmission probabilities are a design specification of the system, but if a player uses a higher probability, his throughput will likely increase, leading to a misbehavior incentive. The selfish system appears to perform no better than a centrally controlled (non-CSMA) system, and performance typically drops by half. A pricing mechanism may be incorporated, thus taxing users for their bandwidth demands.

An extensive analysis of the subject of the application of game theory to the control of ad hoc networks, including both an extensive review of the literature, and new analysis, is provided in the maste's Thesis of Juha Leino, entitled "Applications of Game Theory in Ad Hoc Network", Helsinki University Of Technology (2003). Leino modeled the interaction between one node and the rest of the network as an extensive game. The networks were presumed to be energy constrained, and the nodes to be selfish, with the result stated as the amount of contribution the network can request from a node. Leino modeled nodes with power constrained, power adaptive, omnidirectional transceivers, each of which have a uniform communication demand on the network.

When a node connects to an ad hoc network, it gains both benefits and obligations. The other nodes forward its traffic, hence it can save energy and reach nodes outside its own transmission range, as compared to a single hop transmission. Correspondingly, the node should participate in the network functions like the route discovery and traffic forwarding that consume the resources of the node, in addition to the basic communications themselves. In order to find participation in the network advantageous, the node has gain greater benefits greater than the obligations imposed. This, of course, may be modeled as a game. The node seeks to minimize energy consumption, and the network seeks to ensure its functionality. The decision of the node is to cooperate or to defect.

In one of Leino's models, he requires that reward of forwarding needs to be proportional to the energy consumed when the packet is forwarded. He analyzes the situation of both a honest node and a cheating node, i.e., one that uses the network's resources without full participation in the network overhead. He concluded that if a node has an opportunity to cheat, it adversely affects the network far more than mere defection. Leino also analyzed whether, under his presumptions, a group of honest nodes will voluntarily aggregate as an ad hoc network, or would prefer to remain as a set of independent uncooperative actors, without benefit of multihop transmissions. He concludes that under his presumptions, in some networks, there are nodes which have detrimental involvement in the ad hoc network, and if all such "lose" nodes refuse to participate, the network may collapse. The proportion of losers drops with minimum energy routing, since the average cost is lowered, making gains from participation more likely. There are also networks with no losers, and these provide gains to all participants. Loser nodes tend to be in the center of the network, rather than the periphery.

VII. Real Time Telematics Information Communication

Mobile, self-organizing, ad hoc communications networks have been proposed for telematics systems, for cellular network extension, long range (multihop) traffic information communication, and short range collision avoidance systems.

Telematics is a recently applied term that now encompasses radio transmitters or receivers in vehicles. Three basic schemes exist: wide area broadcast communication, where all relevant nodes are presumed to be within the same communication zone (e.g., satellite radio, RDDS receivers, etc.); cellular communications, where an array of fixed-position low power transceivers contiguously blanket a territory, providing various zones which allow multiplexing within a band; and mesh network communications, which allow ad hoc formation of a communications infrastructure, optionally linking to various fixed infrastructure.

Telematics systems may be used for many purposes, for example, real time traffic information (RTTI), which in an extreme case may involve communication of live video streams. In a more modest system, various sensors may provide road and traffic data, as well as weather and incident information. In other words, the appetite of such a system for bandwidth is potentially limitless, unless constraints are imposed. On the other hand, RTTI is typically not power constrained, since it is vehicle based rather than hand-held, and therefore the cost of using the system will focus more on competition for bandwidth (the limited physical transport layer (PHY) resource) than power consumed in communications. Likewise, communications latency is not critical, unless full duplex voice communications are supported. It is noted that parked vehicles may also be involved in network communications, and the frequency band may be shared with portable communicators with self-contained power sources, making the economic cost of communications and power consumption a potential factor for some nodes, leading to split strategies.

Likewise, especially for voice communications, interfacing with the fixed infrastructure through cellular telephone towers or 802.11 hotspots may impose additional economic constraints on the system. Telematics systems typically include a GPS geolocation system, which may be of great use in mapping nodes for routing navigation functions. Indeed, the telematics system may be integrated within a navigation system and/or entertainment system. This is relevant to the extent that one considers the incremental cost of the hardware and its market placement.

The system is designed to operate over a wide range of node densities, from city rush hour traffic to rural highways. Due to a perceived incompatibility of a RTTI system with cellular infrastructure business models, as well as inconsistent availability of cellular coverage of roadways, the architecture is designed as a decentralized control, with incidental involvement of the cellular networks, except for voice communications outside of the mobile ad hoc network. This decentralized control introduces a substantial level of complexity, since it must account for rapidly changing network architecture, various types of channel impairments, hidden nodes, and temporal and spatial distance issues, and interference.

In defining the system, both the available hardware, costs and purposes for use must be considered. Desirable characteristics of a telematics system include real time telematics information communication, multihop voice communication forwarding, decentralized control, and to the extent possible, user privacy. The hardware may include multichannel directional smart antennas, out-of-band signaling and control, complex and sophisticated computational resources, to provide efficient utilization of an unlicensed or shared band.

That is, it is clear that a system that provides an omnidirectional antenna system with in-band signaling and control, is inefficient as compared to a system which directs its transmitted energy only in the direction of the intended target, and does not intrude on a high capacity physical transport medium with relatively low information content signaling packets.

In a real-time telematics ad hoc network with potentially unlimited data communication requirements, network congestion is almost guaranteed, in a continuous network of mobile nodes. RF interference issues will likely prevent network capacity from scaling with node density. Therefore, an alternate to CSMA was sought that provided more graceful degradation under high load, sensitivity to the importance of information to be communicated, and efficient utilization of the communications medium.

In order to optimize the network, additional information is employed, although this imposes a burden of increased protocol overhead, complexity, and potential loss privacy. One way to remedy selfish behavior is to increase the cost of acting this way, that is, to impose a cost for access to the network. In a practical implementation, however, this is problematic, since under lightly loaded conditions, the "value" of the communications may not justify a fixed cost which might be reasonable under other conditions, and likewise, under heavier loads, critical communications may still be delayed or impeded. Therefore, a variable cost, dependent on relative "importance", may be imposed. In determining this relative importance, a market evaluation, requires a comparison, termed an auction, is employed. In a multihop network, such an auction is complicated by the requirement for distributing payments among the chain of nodes along the route, with each node having potential alternate demands for its cooperation and resources. According to a more sophisticated analysis, one must also compensate nodes not directly involved in the communication for their deference.

In a scenario involving a request for information, the auction is complicated by the fact that the information resource content is unknown to the recipient, and therefore the bid is blind, that is, the value of the information to the recipient is indeterminate. However, game theory supports the communication of a value function or utility function, which can then be evaluated at each node possessing information to be communicated, to normalize its value. Fortunately, it is a dominant strategy in a VCG auction to communicate a truthful value. In this case, a value function may instead be communicated, which can then be evaluated at each node possessing information to be communicated. In a mere request for information conveyance, such as the transport nodes in a multihop network, or in a cellular network infrastructure extension model, the bid may be a true (resolved) value, since the information content is not the subject of the bidding; rather it is the value of the communications per se, and the bidding node can reasonably value its bid.

In a cellular network infrastructure extension model, the bid may represent a resolved value, since the information content is not the subject of the bidding; rather it is the value of the communications per se. In the case of voice, however, the communications are bidirectional and enduring, thus raising quality of service and handoff issues.

Game theory is most readily applied in the optimization of communications routes through a defined network, to achieve the best economic surplus allocation. That is, the problem of determining the network topology, and the communications themselves, are ancillary, though real, applications of game theory. Since the communications incidental to the arbitration require consideration of some of the same issues as the underlying communications, corresponding elements of game theory may apply at both levels of analysis. Due to various uncertainties, the operation of the system is stochastic. This presumption, in turn, allows estimation of optimality within a margin of error, simplifying implementation as compared to a rigorous analysis without regard to statistical significance.

The VCG auction is postulated as being optimal for allocation of multiple resources between agents. It is "strategy-proof" and efficient, meaning that it is a dominant strategy for agents to report their true valuation for a resource, and the result of the optimization is a network which maximizes the value of the system to the agents.

Game theory also allows an allocation of cost between various recipients of a broadcast or multicast. That is, in many instances, telematic information is of value to a plurality of nodes, and a large set of recipient nodes may efficiently receive the same information. This allocation is a direct extension of VCG theory.

The preferred method for acquiring an estimate of the state of the network is through use of a proactive routing protocol. Thus, in order to determine the network architecture state, each node must broadcast its existence, and, for example, a payload of information including its identity, location, itinerary (navigation vector) and "information value function". Typically, the system operates in a continuous state, so that it is reasonable to commence the process with an estimate of the state based on prior information. Using an in-band or out-of-band propagation mechanism, this information must propagate to a network edge, which may be physically or artificially defined. If all nodes operate with a substantially common estimation of network topology, only deviations from previously propagated information need be propagated.

CSMA is proposed for the protocol-related communications because it is relatively simple and robust, and well suited for ad hoc communications in lightly loaded networks. An initial node transmits using an adaptive power protocol, to achieve an effective transmit range of somewhat less than about two times the estimated average inter-nodal distance. This distance therefore promotes propagation to a set of neighboring nodes, without unnecessarily interfering with communications of non-neighboring nodes and therefore allowing this task to be performed in parallel. Neighboring nodes also transmit in succession, providing sequential and complete protocol information propagation over a relevance range.

If we presume that there is a spatial limit to relevance, for example, 5 miles or 10 hops, then the network state propagation may be so limited. Extending the network to encompass a large number of nodes will necessarily reduce the tractability of the optimization. Each node has a local estimate of relevance. This consideration is accommodated, along with a desire to prevent exponential growth in protocol-related data traffic, by receiving an update from all nodes within a node's network relevance boundary, and a state variable which represents an estimate of relevant status beyond the arbitrarily defined boundary. The propagation of network state may thus conveniently occur over a finite number of hops, for example 5-10.

Under conditions of relatively high nodal densities, the system may employ a zone strategy, that is, proximate groups of nodes are treated as an entity for purposes of external state estimation, especially with respect to distant nodes or zones. Such a presumption is realistic, since at extended distances, geographically proximate nodes may be modeled as being similar or inter-related, while at close distances, and particularly within a zone in which all nodes are in direct communication, internode communications may be subject to mutual interference, and can occur without substantial external influence. Alternately, it is clear that to limit latencies and communication risks, it may be prudent to bypass neighboring nodes, thus trading latency for power consumption and overall network capacity. Therefore, a hierarchal scheme may be implemented to geographically organize the network at higher analytical levels, and geographic cells may cooperate to appear externally as a single entity.

A supernode within a zone may be selected for its superior capability, or perhaps a central location. The zone is defined by a communication range of the basic data interface for communications, with the control channel having a longer range, for example at least double the normal data communications range. Communications control channel transmitters operate on a number of channels, for example at least 7, allowing neighboring zones in a hexagonal tiled array to communicate simultaneously without interference. In a geographic zone system, alternate zones which would otherwise be interfering may use an adaptive multiplexing scheme to avoid interference. All nodes may listen on all control channels, permitting rapid propagation of control information.

In order to effective provide decentralized control, either each node must have a common set of information to allow execution of an identical control algorithm, or nodes defer to the control signals of other nodes without internal analysis for optimality. A model of semi-decentralized control is also known, in which dispersed "supernodes", are nominated as master, with other topologically nearby nodes remaining as slave nodes. In the pure peer network, complete information conveyance to each node is required, imposing a relatively high overhead. In a master-slave (or supernode) architecture, increased reliance on a single node trades-off reliability and robustness (and other advantages of pure peer-to-peer networks) for efficiency. A supernode within a cellular zone may be selected for its superior capability, or perhaps is at a central location or is immobile.

Once each control node (node or supernode) has an estimate of network topology, the next step is to optimize network channels. According to VCG theory, each agent has an incentive to broadcast its truthful value or value function for the scarce resource, which in this case, is control over communications physical layer, and or access to information. This communication can be consolidated with the network discovery transmission. Each control node then performs a combinatorial solution for the set of simultaneous equations according to VCG theory (or extensions thereof). This solution should be consistent between all nodes, and the effects of inconsistent solutions may be resolved by collision sensing, and possibly an error/inconsistency detection and correction algorithm specifically applied to this type of information.

As part of the network mapping, communications impairment and interference sources are also mapped. GPS assistance may be particularly useful in this aspect. Where interference is caused by interfering communications, the issue is a determination of a strategy of deference or competition. If the interfering communication is continuous or unresponsive, then the only available strategy is competition. On the other hand, when the competing system uses, for example, a CSMA system, such as 802.11, competition with such a communication simply leads to retransmission, and therefore ultimately increased network load, and deference strategy may be more optimal (dominant), at least and until it is determined that the competing communication is incessant. Other communications protocols, however may have a more or less aggressive strategy. By observation of a system over time, its strategies may be revealed, and game theory permits composition of an optimal strategy.

The optimization process produces a representation of an optimal network architecture during the succeeding period. That is, value functions representing bids are broadcast, with the system then being permitted to determine an optimal real valuation and distribution of that value. Thus, prior to completion of the optimization, potentially inconsistent allocations must be prevented, and each node must communicate its evaluation of other node's value functions, so that the optimization is performed on a normalized economic basis. This step may substantially increase the system overhead, and is generally required for completion of the auction. This valuation may be inferred, however, for transit nodes in a multihop network path, since there is little subjectivity for nodes solely in this role, and the respective value functions may be persistent. For example, the valuation applied by a node to forward information is generally content and involved party independent.

A particular complication of a traffic information system is that the nature of the information held by any node is private to that node (before transmission), and therefore the valuation is not known until after all bids are evaluated. Thus, prior to completion of optimization, each node must communicate its evaluation of other nodes' value functions, so that the optimization is performed on an economic basis. This required step substantially increases the system overhead. This valuation may be inferred, however, for transit nodes in a multihop network path.

After the network usage is defined, compensation is paid to those nodes providing value or subjected to a burden (including foregoing communication opportunity) by those gaining a benefit. The payment is generally of a virtual currency, with no specific true value, although the virtual currency system provides a convenient method to tax the system.

Exerting external economic influences on the system may have various effects on the optimization, and may exacerbate differences in subjective valuations. The application of a monetary value to the virtual currency substantially also increases the possibility of misbehavior and external attacks. On the other hand, a virtual currency with no assessed real value is self-normalizing, while monetization leads to external and generally irrelevant influences as well as possible arbitrage. External economic influences may also lead to benefits, which are discussed in various papers on non-zero-sum games.

In order to provide fairness, the virtual currency (similar to the so-called "nuglets" or "nuggets" proposed for use in the Terminodes project) is self-generated at each node according to a schedule, and itself may have a time dependent value. For example, the virtual currency may have a half-life or temporally declining value. On the other hand, the value may peak at a time after generation, which would encourage deference and short-term savings, rather than immediate spending, and would allow a recipient node to benefit from virtual currency transferred before its peak value. This also means that long term hoarding of the currency is of little value, since it will eventually decay in value, while the system presupposes a nominal rate of spending, which is normalized among nodes. The variation function may also be adaptive, but this poses a synchronization issue for the network. An external estimate of node wealth may be used to infer counterfeiting, theft and failure to pay debts, and to further effect remediation.

The currency is generated and verified in accordance with micropayment theory. Micropayment theory generally encompasses the transfer of secure tokens (e.g., cryptographically endorsed information) having presumed value, which are intended for verification, if at all, in a non-real time transaction, after the transfer to the recipient. The currency is circulated (until expiration) as a token, and therefore is not subject to immediate authentication by source. Since these tokens may be communicated through an insecure network, the issue of forcing allocation of payment to particular nodes may be dealt with by cryptographic techniques, in particular public key cryptography, in which the currency is placed in a cryptographic "envelope" addressed to the intended recipient, e.g., is encrypted with the recipient's public key, which must be broadcast and used as, or in conjunction with, a node identifier. This makes the payment unavailable to other than the intended recipient. The issue of holding the encrypted token hostage and extorting a portion of the value to forward the packet can be dealt with by community pressure, that is, any node presenting this (or other undesirable) behavior might be ostracized. The likelihood of this type of misbehavior is also diminished by avoiding monetization of the virtual currency.

This currency generation and allocation mechanism generally encourages equal consumption by the various nodes over the long term. In order to discourage consumption of bandwidth, an external tax may be imposed on the system, that is, withdrawing value from the system based on usage. Clearly, the effects of such a tax must be carefully weighed, since this will also impose an impediment to adoption as compared to an untaxed system. On the other hand, a similar effect use-disincentive may be obtained by rewarding low consumption, for example by allocating an advertising subsidy between nodes, or in reward of deference. In a model telematics system, an audio and/or visual display provides a useful possibility for advertising and sponsorship; likewise, location-based services may include commercial services.

Each node computes a value function, based on its own knowledge state, risk profile and risk tolerance, and wealth, describing the value to it of additional information, as well as its own value for participating in the communications of others. The value function typically includes a past travel history, future travel itinerary, present location, recent communication partners, and an estimator of information strength and weakness with respect to the future itinerary. It may be presumed that each node has a standard complement of sensors, and accurately acquired descriptive data for its past travel path. Otherwise, a description of the available information is required. One advantage of a value function is that it changes little over time, unless a need is satisfied or circumstances change, and therefore may be a persistent attribute.

Using the protocol communication system, each node transmits its value function (or change thereof), passes through communications from neighboring nodes, and may, for example transmit payment information for the immediate-past bid for incoming communications.

Messages are forwarded outward (avoiding redundant propagation back to the source), with messages appended from the series of nodes. Propagation continues for a finite number of hops, until the entire community has an estimate of the state and value function of each node in the community. Advantageously, the network beyond a respective community may be modeled in simplified form, to provide a better estimate of the network as a whole.

After propagation, each node evaluates the set of value functions for its community, with respect to its own information and ability to forward packets. Each node may then make an offer to supply or forward information, based on the provided information. In the case of multihop communications, the offers are propagated to the remainder of the community, for the maximum number of hops, including the originating node. At this point, each node has a representation of the state of its community, with community edge estimates providing consistency for nodes with differing community scopes, the valuation function each node assigns to control over portions of the network, as well as a resolved valuation of each node for supplying the need. Under these circumstances, each node may then evaluate an optimization for the network architecture, and come to a conclusion consistent with that of other members of its community. If supported, node reputation may be updated based on past performance, and the reputation applied as a factor in the optimization and/or externally to the optimization. As discussed above, a VCG-type auction is employed as a basis for optimization. Since each node receives bid information from all other nodes within the maximum node count, the VCG auction produces an optimized result.

Transmissions are made in frames, with a single bidding process controlling multiple frames, for example a multiple of the maximum number of hops. Therefore, the bid encompasses a frame's-worth of control over the modalities. In the event that the simultaneous use of, or control over, a modality by various nodes is not inconsistent, then the value of the respective nodes may be summed, with the resulting allocation based on, for example, a ratio of the respective value functions. As a part of the optimization, nodes are rewarded not only for supporting the communication, but also for deferring their own respective needs. As a result, after controlling the resources, a node will be relatively less wealthy and less able to subsequently control the resources, while other nodes will be more able to control the resources. The distribution to deferred nodes also serves to prevent pure reciprocal communications, since the proposed mechanism distributes and dilutes the wealth to deferring nodes.

Because each node in the model presented above has complete information, for a range up to the maximum node count, the wealth of each node can be estimated by its neighbors, and payment inferred even if not actually consummated. (Failure of payment can occur for a number of reasons, including both malicious and accidental). Because each hop adds significant cost, the fact that nodes beyond the maximum hop distance are essentially incommunicado is typically of little consequence; since it is very unlikely that a node more than 5 or 10 hops away will be efficiently included in any communication, due to the increasing cost with distance, as well as reduction in reliability and increase in latency. Thus, large area and scalable networks may exist.

Typically, cryptography is employed for both authentication and to preserve privacy. External regulation, in a legal sense at least, is typically imposed by restrictions on hardware and software design, as well as voluntary compliance at risk of detection and legal sanction.

IX. Conclusion

The use of game theory as a basis for analyzing ad hoc networks provides a basis for understanding the behavior of complex networks of independent nodes. By presuming a degree of choice and decision-making by nodes, we obtain an analysis that is robust with respect to such considerations.

The principal issues impeding deployment are the inherent complexity of the system, as well as the overhead required to continuously optimize the system. Further work will allow a determination of a set of simplifying presumptions to reduce protocol overhead and reduce complexity.

The ad hoc network does not exist in a vacuum. There are various competing interests seeking to use the same bandwidth, and technological superiority alone does not assure dominance and commercial success. Game theory may also be used as a tool to analyze the entities which seek to deploy ad hoc networks, especially where they compete.

The present invention therefore provides an automated negotiation for control of a set of resources by competing bidders and offerors, comprising receiving, from each of a plurality of bidders, a utility function representing a value to the bidder to obtain of a set of resources; receiving, from each of a plurality of offerors, a utility function representing a value to the offeror to relinquish a set of resources; computing a set of successful bids from the plurality of bidders and plurality of offers, a successful bid comprising a matching of a maximum aggregate value of the sets of resources to the bidders and a minimum aggregate value of the sets of resources to the offerors, wherein the maximum aggregate value of bids equals or exceeds the minimum aggregate value of offers; and receiving for each set of resources from a bidder placing a respective successful bid a Vickrey price, and paying to for each set of resources to an offeror of a respective successful bid each its offer price, with any surplus being allocated to bidders based on a value bid. The bidder utility function may be evaluated based on private information of an offeror, and communicated as a normalized value.

Example 3

According to a further aspect of the invention, it is desired to understand the subjective risk aversion profile of a person. Risk-aversion is a significant deviation from rationality which can be quantified and understood, and further a calculus is available for applying the risk aversion to normalize systems in which rationality is presumed. Accordingly, the method comprises presenting a game for play by a person, wherein the payoff of the game is real and beneficial to the person. That is, the incentive and risk must be real, with some limits on the ability to extrapolate beyond the scope of risk presented. The person is then sufficiently observed during the game play to comprehend a risk aversion profile of the user. Typically, the game is automated, but this is not required, and, in fact, a competition between two or more players is possible. This scenario is generally quite beneficial where the stakes of the game are identical or similar to the risk aversion personality attribute sought to be defined. The comprehended risk aversion profile may then be used to modify a rationality expectation for the person. The modified rationality expectation may then be applied to optimize an interaction with the person outside of the game play environment.

This process is particularly useful for creating a user-agent to act on behalf of the user, in a manner commensurate with a subjective profile of the user, or to subjectivize a presentation of risk data to a user. For example, in the probability-based user interface discussed above, the event-probability map may be analyzed based on the subjective risk tolerance of the user, and the output optimized accordingly. This method may also be applied for optimally pairing a user with another person or process, based on compatibility.

There has thus been shown and described novel communications devices and systems and methods which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

Telematics References Appendix

On the Propagation of Long-Range Dependence in the Internet—Veres, Kenesi, Molnár. (2000) galahad.elte.hu/~vattay/cikikkeim/vmkv.pdf Anthill: A Framework for the Development of Agent-Based—Babaoglu, Meling. (2002) www.cs.unibo.it/babaoglu/papers/icdcs02.pdf Automatic Web Page Categorization by Link and Context—Attardi, Guili. (1999) aure.iei.pi.cnr.it/~fabrizio/Publications/THAI199/THAI199.ps Distributed Interactive Media—Mauve (2000) www.informatik.uni-mannheim.de/informatik/pi4/publications/library/Mauve2000d.ps.gz Weak Bisimulation for Fully Probabilistic Processes—Baier, Hermanns (1999) web.informatik.uni-bonn.de/l/papers/acta_inf.ps Structured Multimedia Authoring—Hardman, van Rossum, Bulterman (1993) www.cwi.nl/ftp/CWIreports/CST/CS-R9304.ps.Z Solving the modeling problems of object-oriented languages—Aksit, Tekinerdogan (1998) trese.cs.utwente.nl/aop-ecoop98/papers/Aksit.pdf Group Communication in Differentiated Services Networks—Bless, Wehrle (2001) www.tm.uka.de/~bless/IQ2001-ds_multicast.pdf Ad Hoc Relay Wireless Networks over Moving Vehicles on Highways—Chen, Kung, Vlah (2001) www.eecs.harvard.edu/~htk/publication/2001-mobihoc-ckv.pdf A Framework for Generating Network-Based Moving Objects—Brinkhoff (2002) www.fh-wilhelmshaven.de/oow/institute/iapg/personen/brinkhoff/paper/GeoInformatim2002.pdf The Amsterdam Hypermedia Model: extending hypertext—Hardman, Bulterman. (1993) www.cwi.nl/ftp/CWIreports/CST/CS-R9306.ps.Z On functional equivalence of certain fuzzy controllers and—Koczy, Tikk, Gedeon (2000) www.mft.hu/publications/tikk/tikk3.pdf Specification of a Service Management Architecture—Mayerl, Nochta. (2000) www.cooperation-management.de/publikationen/paper/usm2000_mayerl-nochta.pdf Agent-mediated Electronic Commerce: Scientific and Technological—Sierra (2001) www.iiia.csic.es/~sierra/articles/2001/RoadmapAMEC/Roadmap.ps On the Integration of IR and Databases—de Vries, Wilschut (1999) www.cs.utwente.nl/~arjen/Pics/ds8_short.ps.gz Towards a Harmonization of UML-Sequence Diagrams and MSC—Rudolph, Grabowski, Graubmann (1999) www.itm.mu-luebeck.de/publications/SDL99-Harmonization.ps.gz Logarithmic Time Cost Optimal Parallel Sorting is Not Yet Fast in—Natvig (1996) www.idi.ntnu.no/~lasse/publics/SC90.ps CMIFed: A Presentation Environment for Portable—van Rossum. (1993) www.cwi.nl/ftp/CWIreports/CST/CS-R9305.ps.Z Requirements of Traffic Telematics to Spatial Databases—Brinkhoff (1999) www.fh-oldenburg.de/iapg/personen/brinkhof/SSD99.pdf A Task-Specific Ontology for the Application and—Shahar, Miksch, Johnson www-smi.stanford.edu/pubs/SMI_Reports/SMI-96-0649.pdf Practical Considerations in Building a Multi-Lingual—Business Letters John ad.ldc.upenn.edu/W/W97/W97-0906.pdf BPP: A Protocol for Exchanging Pricing Information—Oberle, Ritter, Wehrle www.tm.uka.de/~wehrle/pubs/2001_07_HPSR01_BPP.pdf An Open Architecture for Evaluating Arbitrary Quality of Service—Wehrle (2001) www.tm.uka.de/~wehrle/pubs/2001_06_ICN01_KIDS.pdf Improving the performance of TCP on guaranteed bandwidth—Ritter, Wehrle, Wolf www.tm.uka.de/~wehrle/pubs/2001_02_KIVS01_GR_TCP.pdf Efficient Image Compression of Medical Images Using the Wavelet—Transform And Fuzzy rtsimage.di.uoa.gr/publications/euro00-1.pdf Advanced Mechanisms for Available Rate Usage in ATM—Bless, Holzhausen, www.tm.uka.de/~wehrle/pubs/2001_04_ICATM01_AvRateUsage.pdf An Extensible Agent Architecture for a Competitive—Hoen, Bohte, www.cwi.nl/~hoen/publications/SEN-R0217.ps Elements of an Open Framework for Pricing in the Future—Gerke, Ritter, www.tm.uka.de/~wehrle/pubs/2000_09_Qofis00_Pricing.pdf Traffic Priorization and Differentiation with Active Queue—Walter, Wehrle (2002) www.tm.uka.de/~wehrle/pubs/2002_09_ICTSM02_AF_AR.pdf A Simulation Suite for Internet Nodes with the Ability to—Wehrle, Reber, Kahmann www.tm.uka.de/~wehrle/pubs/2001_01_CNDS01_Sim.pdf Image Compression Using the Wavelet Transform—On Textural Regions of Interest rtsimage.di.uoa.gr/publications/euro98.pdf Towards Better Support of Transaction Oriented—Bless, Holzhausen, www.tm.uka.de/~bless/QofIS20014-qf-online.pdf User feedback on the use of public key certificates—Klobucar (2001) www.e5.ijs.si/staff/tomaz/erk2001.pdf Using Realistic Internet Topology Data for Large Scale Network—Bless www.tm.uka.de/~bless/omnet_ws_2002-1.pdf The Trust Factor in the Virtual Enterprise—Mobile Broadband Service paula.oulu.fi/Publications/Submited/ICE2000f.pdf User and Session Mobility in a Plug-and-Play Network—Mazen Malek Shiaa www.item.ntnu.no/~plugandplay/publications/eunice2002.pdf Dynamic Aggregation of Reservations for Internet Services—Bless www.tm.uka.de/~bless/ictsm10-daris.pdf Advanced Service Creation Using—Distributed Object Technology www.ee.surrey.acuk/Personal/G.Paylou/Publications/Journal-papers/Adam-02b.pdf Semantics and Verification of UML Activity Diagrams for Workflow—Eshuis (2002) wwwhome.cs.utwente.nl/~eshuis/thesis-hypedinks.pdf be cited as a National Research Council report—The Four Way www7.nationalacademies.org/CSTB/wp_geo_armstrong.pdf Support Specification and Selection in TAPAS—Aagesen, Anutariya, Shiaa, Helvik www.item.ntnu.no/~plugandplay/publications/euniceCap2002.pdf Profiling and Internet Connectivity in Automotive—Cilia, Hasselmeyer, www.cs.ust.hk/vldb2002/VLDB2002-papers/S33P08.pdf MIETTA—A Framework for Uniform and Multilingual Access to—Structured Database www.xtramind.com/~holger/paper/ira100.pdf Definition And Utilisation Of OMG IDL TO TTCN-3 MAPPINGS—Ebner, Yin, Li www.itm.mu-luebeck.de/publications/idltottan3mapping.pdf Campiello—New user interface approaches for community—Antonietta Grasso Michael (1998) www11.informatik.tu-muenchen.de/publications/pdf/Grasso1998a.pdf SDL and MSC Based Test Generation for Distributed—Grabowski, Koch. (1998) www.itm.mu-luebeck.de/publications/SDL99-DistributedTesting.ps.gz Autolink—A Tool for Automatic Test Generation from—Koch, Grabowski. (1998) www.itm.mu-luebeck.de/publications/A-98-05/Report-A-98-05.ps.gz PATROCLOS: A Flexible and High-Performance Transport Subsystem—Braun (1994) www.iam.unibe.ch/~braun/lit/vanc_p.ps.gz Multilingual Generation and Summarization of Job—Somers, Black. (1997) sskkii.gu.se/Tree/Reports/anlp97/ANLP.paper.ps Real-time TTCN for testing real-time and multimedia systems—Walter, Grabowski (1997) www.itm.mu-luebeck.de/publications/IWTCS98RT/IWTCS98-RT-TTCN.ps.gz Applying SAMSTAG to the B-ISDN protocol SSCOP—Grabowski, Scheurer, Dai. (1997) www.itm.mu-luebeck.de/publications/IWTCS97SSCOP/IWTCS97-SS-COP.ps.gz A Continuously Available and Highly Scalable—Hvasshovd. (1991) www.idi.ntnu.no/IDT/grupper/DB-grp/tech_papers/hpts91.ps A Modular VLSI Implementation Architecture for—Braun, Schiller. (1994) www.iam.unibe.ch/~braun/lit/vanc_bsz.ps.gz Transportation modelling methods and advanced transport telematics—Toint (1993) thales.math.fundp.ac.be/pub/reports/TR92-24.ps Impact of ATM ABR Control on the Performance of TCP—Tahoe and—Feng, Ghosal networks.cs.ualavis.edu/~ghosal/globecom/globecom_paper.ps Detecting Opportunities for Parallel Observations on the—Michael Lucks Space (1992) www.stsci.edu/public/sst/poms/poms.ps Expression Of Interest—Network Of Excellence www.ctit.utwente.nl/internal/info-programmes/IST/EoI-NoE/eHealth.pdf Optimisation of trapezoidal membership functions in a fuzzy rule—System By The www.univ-savoie.fr/labos/lamii/Busefal/Documents/85-05.pdf A Framework For Video Modelling—Petkovic Jonker (2000) www.cwi.nl/~acoi/DMW/documents/./world/innsb.ps An Architecture For Reverse Charging In The Internet—Sprenkels, Parhonyi, Pras. (2000) wwwsnmp.cs.utwente.nl/nm/research/results/publications/sprenkels/sprenkelsram-reverse-charging.pdf Behavior of a Bayesian Adaptation Method for—Fredouille, Mariéthoz, (2000) ftp.idiap.ch/pub/marietho/publications/AdaptICASSP2000_IRR02.ps.gz Software Process Modeling and Evolution in EPOS—Jaccheri, Larsen, Conradi (1992) www.idt.unit.no/~epos/Papers/capri-final.ps Individual Management of Personal Reachability in—Reichenbach. (1997) www.inf.tu-dresden.de/~hf2/publ/1997/RDFR_97IFIPSec.pdf A Generic Software Component Framework for Distributed—Batteram, Idzenga (1997) www.trc.nl/events/ecscw97oogp/papers/batteram.pdf Efficient Partitioning of Sequences—Olstad, Manne (1995) www.ii.uib.no/fredrikm/fredrik/papers/effident.ps Integrated Video Archive Tools—Hjelsvold, Langørgen, Midtstraum. (1995) www.idt.ntnu.no/IDT/grupper/DB-grp/tech_papers/ACM-MM95.ps MULINEX: Multilingual Web Search and Navigation—Joanne Capstick Abdel (1998) speech.ftw.at/~gor/pub/twlt98/mulinex-twlt98.pdf A Non-Interleaving Semantics for MSC—Heymer (1998) www.itm.mu-luebeck.de/publications/ANIS/ANIS.ps.gz An Overview Of The Cave Project Research—Bimbot, Hutter. (1998) www.ubilab.org/publications/print_versions/pdf/bim98.pdf Cross Language Retrieval with the Twenty-One system—Wessel Kraaij (1998) trec.nist.gov/pubs/trec6/papers/twentyone.ps Verifying Business Processes using SPIN—Janssen, Mateescu, Mauw. (1998) ftp.win.tue.nl/pub/techreports/sjouke/spin98.ps.Z Implementation of a Parallel Transport Subsystem on a—Braun, Schmidt (1993) www.telematik.informatik.uni-karlsruhe.de/~schmidt/schmidt_hpdc93.ps.gz Uniform Versioning: The Change-Oriented Model—Munch, Larsen, Gulla. (1993) www.idt.unit.no/~bjornmu/cov-scm4.ps Architectural Considerations for Personal Mobility In—The Wireless Internet www.item.ntnu.no/~plugandplay/publications/PWC2002.pdf Synchronization In Ad Hoc Networks Based On UTRA TDD—Ebner, Rohling, Halfmann, Lott (2002) www.et2.tu-harburg.de/Mitarbeiter/Ebner/PIMRC02_Ebner.pdf Pervasive Privacy with Identity Management—Jendricke, Kreutzer, Zugenmaier www.teco.edu/~philip/ubicomp2002ws/organize/identity.pdf Formalising Hinting in Tutorial Dialogues—Tsovaltzi, Matheson (2002) www.ltg.ed.acuk/edilog/papers/185.pdf TimedTTCN-3—A Real-Time Extension For TTCN-3—Dai, Grabowski, Neukirchen www.itm.mu-luebeck.de/publications/timedttan3.pdf Mapping CORBA IDL to TTCN-3 based on IDL to TTCN-2 mappings—Ebner (2001) www.itm.mu-luebeck.de/publications/FBT2001/fbt2001_ebner.pdf Mobile Identity Management—Jendricke, Kreutzer, Zugenmaier ftp.informatik.uni-freiburg.de/documents/reports/report178/report00178.ps.gz Causal Reasoning In A Medical—Knowledge Based System www.newcastle.edu.au/school/design-comm-info/staff/gibbon/eds98.ps A Secure Web-based Medical Digital Library—Architecture Based On thalisz.unipi.gr/~jpap/medical.pdf IPv6 Autoconfiguration in Large Scale Mobile Ad-Hoc Networks—Kilian Weniger Martina www.iponair.de/publications/Weniger-EuroWireless02.pdf Serviceware Framework For Developing 3g Mobile—Services Sahin Albayrak (2002) www.ssgrr.it/en/ssgrr2002w/papers/37.pdf Traffic Control methods For High Speed—Packet Switched Networks (2002) hsnlab.ttt.bme.hu/~molnar/files/pch2002.pdf The Impact Of Filtering On Spatial Continuous Queries—Brinkhoff (2002) www.fh-wilhelmshaven.de/oow/institute/iapg/personen/brinkhoff/paper/SDH2002.pdf On the Generation of Time-Evolving Regional Data—Tzouramanis. (2002) delab.csd.auth.gr/papers/GE002tvm.pdf A dynamic service delivery framework based on the OSGi model—Vos, Buytaert, Buytaert (2002) www.ssgrr.it/en/ssgrr2002w/papers/165.pdf Applying bacterial algorithm to optimise trapezoidal—Botzheim, Hámori, Kóczy (2001) www.mft.hu/hallg/200106.pdf Deadlock Probability in Unrestricted Wormhole Routing Networks—Folkestad, Roche (1997) ftp.cs.uda.edu/techreport/1997-reports/970008.ps.Z The Infostations Challenge: Balancing Cost and—Ubiquity In Delivering www.winlab.rutgers.edu/~ryates/papers/ieeepc6b.ps A Proposal for a Combination of Compression and Encryption—Lutz Vorwerk Thomas www.informatik.uni-trier.de/~vorwerk/publics/perth.ps Mobility Management In Plug And Play Network—Architecture Mazen Malek (2002) www.item.ntnu.no/~plugandplay/publications/smartnet2002.pdf Adaptive Importance Sampling Simulation Of Queueing Networks—de Boer www.informs-cs.org/wsc00papers/086.PDF Ics—Forth—Erich Leisch Stelios (1999) www.ics.forth.gr/ICS/acti/cmi_hta/publications/papers/1999/hector_solutions/hector_solutions.pdf Co-Evolution of Bargaining Strategies in a Decentralized—Eymann (2001) www.iig.uni-freiburg.de/~eymann/publications/TEymann01.pdf VBR Video Source Characterization And A Practical—Cselényi, Molnár hsnlab.ttt.bme.hu/~molnar/files/VBR-telsys.ps.gz An approach to dynamic reconfiguration of—Almeida, Wegdam. (2001) www.cs.utwente.nl/~alme/cvitae/sbrc2001—final-footnote.pdf www.ub.utwente.nl/webdocs/ctit/1/0000004f.pdf A GSM/GPS Receiver With a Bandpass Sigma-Delta Analog—Müller, Boehm, Hentschel (1999) www.ifn.et.tu-dresden.de/MNS/veroeffentlichungen/1999/Mueller_T_EUW_99.pdf An Intelligent Educational Metadata Repository—Bassiliades, Kokkoras. (2002) www.csd.auth.gr/%7Elpis/publications/ac-chapter1.pdf Messor: Load-Balancing through a Swarm of Autonomous Agents—Montresor, Meling, Babaoglu (2002) www.cs.unibo.it/babaoglu/papers/ap2p02.pdf Exact trade-off between approximation accuracy and—Tikk, Baranyi www.mft.hu/publications/baranyi/baranyi2.pdf On the Queue Tail Asymptotics for General Multifractal Traffic—Molnar, Dang, Marina hsnlab.ttt.bme.hu/~molnar/files/ifipnw02.pdf Feature Ranking Based On Interclass Separability For Fuzzy—Tikk, Gedeon (2000) www.mft.hu/publications/tikk/tikk8.pdf Public Key Certificate Revocation Schemes—Arnes (2000) www.pvv.ntnu.no/~andrearn/certrev/thesis/CertRevThesis_29Feb2000.ps.gz Competitive market-based allocation of consumer attention—Bohte, Gerding. (2001) www.cwi.nl/ftp/CWIreports/SEN/SEN-R0131.ps.Z Towards Adaptive, Resilient and Self-Organizing—Montresor, Meling, www.elet.polimi.it/Users/DEI/Sections/CompEng/GianPietro.Picco/ntw02-p2p/papers/18.pdf Stability of interpolative fuzzy KH controllers—Tikk, Joó. (2002) www.mft.hu/publications/tikk/tikk4.pdf Comprehensive analysis of a new fuzzy rule interpolation method—Tikk, Baranyi (2000) www.mft.hu/publications/tikk/tikk2.pdf Design and Use of Clinical Ontologies:—Curricular Goals For www-smi.stanford.edu/pubs/SMI_Reports/SMI-1999-0767.pdf Toward Standardization of Electronic Guideline—Elkin, Peleg, Lacson. (2000) www-smi.stanford.edu/pubs/SMI_Reports/SMI-2001-0865.pdf Extracting Information for Automatic Indexing of Multimedia Material—Saggion. (2002) parlevink.cs.utwente.nl/projects/mumis/documents/mumis-lrec2002.pdf Investigation of a new alpha-cut based fuzzy—Baranyi, Tikk, Yam, www.mft.hu/publications/tikk/tikk11.pdf The Evolution of Jini" Technology—In Telematics By wwws.sun.com/software/jini/whitepapers/PsiNapticTelematics.pdf Desktop Synchronous Distance Learning Application—Enhanced With Efficient ru6.cti.gr/Publications/645.pdf; ru6.cti.gr/Publications/904.pdf Adaptive compression of DICOM-image data—Hludov, Engel, Meinel www.informatik.uni-trier.de/~meinel/papers/tes_2.ps Telematic Tools to Support Group Projects in Higher Education—Jan Van Der www.ub.utwente.nl/webdocs/ctit/1/00000004.pdf A Receiver-initiated WDM Multicast Tree Construction Protocol—Ip Dense Mode www.ub.utwente.nl/webdocs/ctit/1/00000032.pdf AUTOLINK—A Tool for the Automatic and—Schmitt, Koch. (1997) 141.83.21.121/publications/ALASA/SchmKochGraHog.ps.gz The Term Processor Generator Kimwitu—van Eijk, Belinfante, Eertink. (1997) wwwtios.cs.utwente.nl/kimwitu/tacas97.ps.gz Security Engineering of Lattice-Based Policies—Bryce (1997) set.gmd.de/~kuehnhsr/CWASAR/D06.1.ann5.ps.gz A scheme for adaptive biasing in importance sampling—Heegaard (1997) www.idt.unit.no/~poulh/publications/IS-adaptive.ps www.item.ntnu.no/~poul h/publications/adapt-scheme-abstract.ps Towards the Industrial Use of Validation—Ek, Grabowski, www.itm.mu-luebeck.de/publications/A-97-03/SDL-Forum-97.ps.gz A Browser for a Versioned Entity-Relationship Database—Gulla (1992) www.idt.unit.no/~epos/Papers/browser.ps The Eternal Resource Locator: An Alternative Means of—Vadav www.usenix.org/publications/library/proceedings/08/full_papers/anderson/anderson.pdf A Continuously Available and Highly Scalable—Hvasshovd. (1991) www.idi.ntnu.no/IDT/grupper/DB-grp/tech_papers/hpts91.ps A Parallel Implementation of XTP on Transputers—Braun, Zifferbart (1991) www.iam.unibe.ch/~braun/lit/lan16_xtp.ps.gz Stublets: A Notion for Mobility-Aware Application Adaption—Dietmar Kottmann Christian (1996) ftp.diku.dk/diku/distlab/wmr96/sommer.ps.gz ATM Traffic Measurements and Analysis on a Real Testbed—Molnár, Cselényi. (1996) hsnlab.ttt.bme.hu/~molnar/files/itc2.ps.gz A CORBA Platform for Component Groupware—Hofte, van der Lugt, Bakker (1996) www.telin.nl/publicaties/1996/ozchi96.pdf The European Web Index: An Internet Search Service for—Lundberg, Ardö. (1996) www.lub.lu.se/desire/radar/reports/D3.12/D3.12.v1.0.ps Results Of The CEO Project WWW Management—Hazewinkel, Van Hengstum, Pras (1996) wwwsnmp.cs.utwente.nl/nm/research/results/publications/pras/WWW.pdf Towards Integrated QoS Management—Schmidt, Zitterbart (1995) www.telematik.informatik.uni-karlsruhe.de/~schmidt/schmidt_hipp94.ps.gz On engineering support for business process modelling—Franken, de Weger. (1996) wwwhome.cs.utwente.nl/~pires/publications/bpr96.pdf Optimization of Spatial Joins Using Filters—Veenhof, Apers, Houtsma (1995) wwwis.cs.utwente.nl:8080/isdoc/confpaper/veenhof.BNC0D95.accepted.ps.gz Software Architecture of Ubiquitous Scientific Computing—Tzvetan Drashansky (1995) www.cs.purdue.edu/homes/saw/publications/95/ubiq-pses.ps Wavefront implementation of Self Organizing Maps on RENNS—Gaute Myklebust (1995) www.idt.unit.no/~gautemyk/icdsp95.ps On the Enterprise Modelling of an—Educational Information, www.ub.utwente.nl/webdocs/ctit/1/0000002f.pdf VBR Video Source Characterization And A Practical—Cselényi, Molnár hsnlab.ttt.bme.hu/~molnar/files/VBR-telsys.ps.gz Use of the CANTOR system for collaborative learning in—Hans Andersen Verner newmedia.colorado.edu/csd/270.pdf Jgroup/ARM: A Distributed Object Group Platform—Meling, Montresor, www.CS.UniBO.it/babaoglu/papers/jgroup-arm.pdf Validation of the Open Service Access API for UMTS—Maarten Wegdam Dirk-Jaap arch.cs.utwente.nl/publications/papers/proms01-osa-lncs22130210.pdf A Hyperlink-Proposal Mechanism to Exemplify Cognitive—Haffner, Roth, Meinel www.informatik.uni-trier.de/~meinel/papers/Paper02.ps Digital Signatures For Automobiles?!—Gollan, Meinel www.informatik.uni-trier.de/~meinel/papers/DigitalSignaturesAuto02.pdf Designing Safe Smart Home Systems for Vulnerable People—Dewsbury, Taylor www.smart-thinking.ukideas.com/_DIRC.pdf Providing X.509-based user—Access Control To ftp.polito.it/pub/security/papers/sec98/sec98.ps.gz Seeing Speech In Space And Time: Psychological And—Ruth Campbell Department www.asel.udel.edu/icslp/cdrom/vol3/1008/a1008.pdf The Process of Designing Appropriate Smart Homes: Including—Guy Dewsbury Bruce www.smait-thinking.ukideas.com/Dewsbury_et_al_Appropriate_design_of_smart_homes.pdf Transparent Dynamic Reconfiguration for CORBA—Almeida, Wegdam, van. (2001) www.cs.utwente.nl/~alme/cvitae/doa01.pdf Dissemination of Mutable Sets of Web Objects—Buchholz, Goebel, Schill, Ziegert (2001) wwwrn.inf.tu-dresden.de/~buchholz/askom/PDCS2001.pdf How to Support the Negotiation of Service Level Agreements—Köppel, Böning, Abeck (1999) www.cooperation-management.de/publikationen/paper/isas99_Abeck-Boening-Koeppel.pdf PAMINA: A Certificate Based Privilege Management System—Nochta, Ebinger, Abeck (2002) www.isoc.org/isoc.conferences/ndss/02/proceedings/papers/nochta.pdf Modeling IT Operations to Derive Provider Accepted Management—Abeck, Mayerl (1999) www.cooperation-management.de/publikationen/paper/im99_abeck-mayerl.pdf On deriving rules for nativised pronunciation in—Trancoso, Viana. (1999) www.l2f.inesc.pt/documents/papers/Trancoso99b.pdf A CANDLE to light the way?—Sebastian Abeck Jodok www.cooperation-management.de/publikationen/paper/ACandletoLightTheWay.pdf Internet Agents for Telemedicine Services—Mea, Roberto, Conti, Di. (1999) www.telemed.uniudit/papers/VDM-M199.pdf Supporting Secure and Transparent Delegation in the CORBA—Zoltn Nochta Taufiq (2001) www.cooperation-management.de/publikationen/paper/pwc2001_nrr_cr.pdf The adaptation and use of a WWW-based coursemanagement system—De Boer, Collis (2000) www.ub.utwente.nl/webdocs/ctit/1/00000059.pdf Evaluation of Mobile Agent Systems with Respect to Failure—Otto Wither October www.item.ntnu.no/~ottow/papers/failsemMASreport.pdf Proactive Services in a Distributed Traffic Telematics—Gura, Held, Kaiser www.informatik.uni-ulm.deks/projekte/core/ProctiveServ.pdf TCP over GPRS—Performance Analysis—Manner (1999) www.cs.helsinki.fi/u/jmanner/papers/Thesis-Manner.ps Ip Over Wavelength-Routed Access Networks—Marcos Rogrio Salvador wwwctit.cs.utwente.nl/~salvador/Eunice99.pdf Increasing Retrievability and Reusability of Learning—Hiddink Van Der www.ub.utwente.nl/webdocs/ctit/1/00000056.pdf Experiences from Development of Home Health Care Applications—Leili Lind Erik ftp.imt.liu.se/pub/bildb/MIpapers/524_LIND.PDF A Review of Parallel Implementations of Backpropagation—Torresen, Tomita www.ifi.uio.no/~jimtoer/chp2.ps ESCORT: Towards Integration in Intersection Control—Andrea Savigni Filippo (2000) www.cs.ud.acuk/staff/A.Savigni/papers/2000_jubilee escort roma.pdf Usability Field-Test Of A Spoken Data-Entry System—Marcello Federico And poseidon.itc.it:7117/~ssi/DITELO/papers/ICASSP99_1.ps FLAMINGO: A Packet-switched IP over WDM Metro Optical Network—Dey Koonen Geuzebroek (2001) wwwctit.cs.utwente.nl/~salvador/NOC2001.pdf Real-time test specification with TTCN-3—Dai, Grabowski, Neukirchen (2001) www.itm.mu-luebeck.de/publications/FBT2001/Abstract_fbt01neukdai.pdf A System for Uniform and Multilingual Access to Structured—Xu, Netter, Stenzhorn (2000) www.cs.ust.hk/ad2000/Demo/04 xu.pdf Corpus-driven learning of Event Recognition Rules—Roberto Basili Maria www.dcs.shef.ac.uk/~fabio/ML4IE/2.PS.gz Web-Support for Activating Use of Theory in Group-Based Learning—Jan Van Der www.ub.utwente.nl/webdocs/ctit/1/0000005a.pdf Automated Generation of Category-Specific Thesauri for—Mardi, Di Marco. (1998) faure.iei.pi.cnr.it/~fabrizio/Publications/TR0698.ps The use of CMC in applied social science training—Interim Report Merja www.stir.ac.uk/schema/deliverables/D5.3.pdf The IT-Potential Of Haptics—Touch access for people with—Sjöström (1999) www.certec.lth.se/doc/touchaccess/TouchAccess.pdf An All-Optical WDM Packet-Switched Network Architecture—Marcos Rogrio Salvador (2001) wwwctit.cs.utwente.nl/~salvador/ICN2001.pdf An Adaptive, Collaborative Environment to Develop—Vizcano. oreto.inf-cr.udm.es/personas/avizcaino/itsenv.ps The HyperMuseum Theme Generator System: Ontology based—Stuer, Meersman, De. (2001) www.archimuse.wm/mw2001/papers/stuer/stuer.html wise.vub.ac.be/Download/Papers/stuerMW2001.pdf Failure Semantics of Mobile Agent Systems Involved in—Otto Wittner Carsten (1999) www.item.ntnu.no/~ottow/papers/failsemNIK99.pdf Cross-Entropy Guided Mobile Agents Finding Cyclic Paths in—Wittner, Helvik (2002) www.item.ntnu.no/~wittner/aamas2002_submitted.pdf Cross Entropy Guided Ant-like Agents Finding Dependable—Wittner, Helvik (2002) www.item.ntnu.no/~wittner/cec2002.pdf Using Information Flow Control to Evaluate Access—Mantel, Schairer, www.dfki.de/~schairer/publications/report00159.ps.gz Network Architecture of a Packet-switched WDM LAN/MAN—Dey Koonen And (2000) wwwctit.cs.utwente.nl/~salvador/LEOS2000.pdf Specification and Validation of a Real-Time Parallel—de Farias, Pires. (1997) www.ub.utwente.nl/webdocs/ctit/1/00000066.pdf Mobile Ip: Security Application—Tuquerres, Salvador, Sprenkels ntrg.csidie/htewari/papers/Mobile1P-Sec.pdf M3POC: a multimedia multicast transport protocol for cooperative—Owezarski www.Iaas.fr/~owe/PUBLIS/99525.ps.gz User Interfaces for All—Kobsa, (eds.)(1999) www.gmd.de/publications/report/0074/Text.pdf Supporting PIM-SM in All-Optical Lambda-Switched Networks—Marcos Rogrio Salvador (2001) wwwctitz.utwente.nl/~salvador/SBRC2001.pdf Managing Distributed Personal Firewalls with Smart—Haffner, Roth, Heuer, www.informatik.uni-trier.de/~meinel/papers/Managing01.ps FINAL REPORT: LAURIN laurin.uibk.ac.at/—Version November Author germanistik.uibk.ac.at/laurin/reports/finalrep01.pdf Some Implications of MSC, SDL and TTCN Time Extensions—Hogrefe, Koch. (2001) www.itm.mu-luebeck.de/publications/DH_BK_HN_2001_SDLForum/sdlforum2001.pdf Supporting IP Dense Mode Multicast Routing Protocols in—Marcos Rogerio Salvador (2000) wwwctit.cs.utwente.nl/~salvador/OPTICOMM2000.pdf Report on the course for Technology Teachers WWW Course of—Jyrki Pulkkinen And telematics.ex.ac.uk/T3/0/downloads/d13-1.pdf A Multi-DSP Laboratory Course—Rinner, Schneider, Steger, Weiss www.iti.tu-graz.ac.at/de/people/schneider/papers/rinner98.pdf Modularity—A Concept For New Neural Network Architectures—Schmidt, Bandar (1998) www.comp.lancs.ac.uk/~albrecht/pubs/pdf/schmit_csa_irbid_1998.pdf Supporting IP Dense Mode Multicast Routing in All-Optical—Marcos Rogrio Salvador (2001) wwwctit.cs.utwente.nl/~salvador/OPTICOMM200.pdf Dagstuhl Seminar on Ubiquitous Computing—September The International (2001) www.inf.ethz.ch/vs/events/dag2001/intro/DagstuhlIntroductions.pdf A Framework For Video Modelling—Centre For Telematics www.cs.utwente.nl/~milan/docs/innsb.ps Conceptual Stage in Designing Multimedia for Tele Learning—Kommers (2001) www.ub.utwente.nl/webdocs/ctit/1/00000060.pdf Signed Preservation Of Online References—Heuer, Losemann, Meinel www.informatik.uni-trier.de/~meinel/papers/webnet00b.ps Chapter 7 Implementation of Baclpropagation Neural—Jim Torresen Department www.ifi.uio.no/~jimtoer/chp3.ps TIMe at a glance—Braek, Gorman, Haugen, Melby, www.s-intef.no/time/report.pdf Executive Summary—The Vision Of www.it.bton.ac.uk/research/seake/knowledge.pdf Supporting the Travelling Tradition: A report on the work—Ken Marks Department (2000) ui4all.ics.forth.gr/i3SD2000/Marks.PDF Circuits and Systems—Benini, De Micheli, Macii, Maloberti www.nd.edu/~stjoseph/newscas/CASMagvol1no1.pdf Enterprise Modelling For An Educational Information—Ing Widya Cees (2001) wwwhome.cs.utwente.nl/~widya/webpapers/iceis2001_205.pdf Telematics For Group-Based Learning: Simplicity Versus—van der Veen, Collis, www.ub.utwente.nl/webdocs/ctit/1/00000057.pdf Research Report 1997-1999—Department Of Computer (1997) www.cs.ucy.ac.cy/Research/archives/rr97-99.ps Translation Resources, Merging Strategies and Relevance—Djoerd Hiemstra Wessel janus.cs.utwente.nl/~hiemstra/papers/defl.pdf An Information System for Long-distance Cooperation in Medicine—Kosch, al. (2000) www.ii.uib.no/para2000/program/jacek.ps Next Generation Internet in Europe—Published By The www.infowin.org/ACTS/ANALYSYS/PRODUCTS/THEMATIC/NGI/ngi_in_europe.pdf R. Mu~noz, M. Saiz-Noeda, A. Su arez and M. Palomar—Grupo De Investigaci (2000) gplsi.dlsi.ua.es/gplsi/articulos/a2000/mt2000.ps Lazy Users and Automatic Video Retrieval Tools in (the) Lowlands—The Lowlands Team carol.wins.uva.nl/~cgmsnoek/pub/trec10video.pdf Remote MIB item look-up service—Pras, Boros, Helthuis (2002) www.simpleweb.org/nm/research/results/publications/pras/2002-04-noms.pdf Use Of Real And Contaminated Speech For Training Of A—Matassoni Omologo And (2001) poseidon.itc.it:7117/~ssi/SHINE/ps/eurospeech01.ps.gz Extending the Data Storage Capabilities of a Java-based—Clemens Cap Nico wwwiuk.informatik.uni-rostock.de/~maibaum/docs/maibtune.ps Towards Precision Tools For ATM Network Design, Dimensioning—Molnár, al. hsnlab.ttt.bme.hu/~molnar/files/peripol.ps.gz Fair Bandwidth Allocation of a Wireless Base Station—Gyorgy Mikl'os Traffic hsnlab.ttt.bme.hu/~molnar/files/igwim99.ps.gz Forecasting the Success of Telecommunication Services in—Detlef Schoder. (2000) www.iig.uni-freiburg.de/telematik/forschung/publikationen/pubfiles/Sc2000.pdf A General Fractal Model of Internet Traffic—Molnar hsnlab.ttt.bme.hu/~molnar/files/multifractalLCN.pdf Correlations in ATM Cell Streams Exposed to Cell Delay Variation—Molnár, Blaabjerg hsnlab.ttt.bme.hu/~molnar/files/hungl.ps.gz A General Traffic Control Framework in ATM Networks—Fodor, Marosits, Molnar (1996) hsnlab.ttt.bme.hu/~molnar/files/gtfs.pz.gz NAVIGATION IN CYBERSPACE Using Multi-Dimensional Scaling—Schoder Institut Fur (1999) www.iig.uni-freiburg.de/telematik/forschung/publikationen/pubfiles/Sc1999a.pdf Performance Measurement Tool for Packet Forwarding Devices—Tam As Kovacshazy www.mit.bme.hu/~khazy/publications/imtc2001_3472.pdf Benefits of a Universal Security Framework—Report By Arnd (2000) www.iig.uni-freiburg.de/telematik/forschung/publikationen/pubfiles/We2000f.pdf Methods for Computing B-ISDN Link Blocking Probabilities—Molnár, Blaabjerg hsnlab.ttt.bme.hu/~molnar/files/link.ps.gz Inter-organizational Networking of Small and—Framework And. (1999) www.jig.uni-freiburg.de/telematik/forschung/publikationen/pubfiles/EgEn1999.pdf Using Objects and Patterns to Implement Domain Ontologies—Guizzardi, Falbo, Filho (2001) wwwhome.cs.utwente.nl/~guizzard/jbcs.pdf Highly Secure Low-cost Computers—Arnd Weber Today's (2000) www.iig.uni-freiburg.de/telematik/forschung/publikationen/pubfiles/We2000e.pdf On Modeling and Shaping Self-Similar ATM Traffic—Andor Moln'ar And hsnlab.ttt.bme.hu/~molnar/files/itc97.ps.gz Pitfalls in Long Range Dependence Testing and Estimation—Molnar, Dang hsnlab.ttt.bme.hu/~molnar/files/pitfalls.pdf.gz Distributed Fair Bandwidth Allocation of a Wireless Base—Gyorgy Miklos Traffic (2000) hsnlab.ttt.bme.hu/~molnar/files/netw00.ps.gz Highly Secure Low-cost PDA-phones—Weber (2000) www.iig.uni-freiburg.de/telematik/forschung/publikationen/pubfiles/We2000d.pdf Sharing Telematics Courses—The CANDLE project—Aiko Pras Centre (2001) www.simpleweb.org/nm/research/results/publications/pras/2001-09-04-eunice.pdf A Prototype for an Agent-based Secure Electronic—Padovan, Sackmann. (2001) www.iig.uni-freiburg.de/telematik/forschung/projekte/e_sicherheit/comet/publikationen/PaSaEyPi2001.pdf On Measurements of Multimedia Traffic in ATM Networks—Cselényi. hsnlab.ttt.bme.hu/~molnar/files/icomt.ps.gz Advanced Generation Tool of Application's Network Traffic—Petroczi, Molnar hsnlab.ttt.bme.hu/~molnar/files/agentant.ps.gz On Burst And Correlation Structure of Teletraffic Models—Molnár, Miklos hsnlab.ttt.bme.hu/~molnar/files/ilkley97.ps.gz Scaling Analysis of IP Traffic Components—Molnar, Dang (2000) hsnlab.ttt.bme.hu/~molnar/files/itcssip00.ps.gz A System for Supporting Cross-Lingual Information Retrieval—Capstick, al. (1999) speech.ftw.at/~gor/pub/ipm/mulinex-ipm99.pdf Spatiotemporal Segmentation and Tracking of Objects for—Kompatsiaris, Strintzis (2000) egnatia.ee.auth.gr/~ikom/CSVT2000.pdf Region-Based Color Image Indexing And Retrieval—Ioannis Kompatsiaris Evagelia (2001) egnatia.ee.auth.gr/~ikom/icip2001.pdf Kompatsiaris—And Michael Strintzis egnatia.ee.auth.gr/~ikom/ICIP00.pdf th IFLA Council and General Conference Aug. 16-25, 2001—Code Number Division www.ifla.org/IV/ifla67/papers/161-165e.pdf Agent-Mediators In Media-On-Demand Eletronic Commerce—Joo Paulo Andrade wwwhome.cs.utwente.nl/~guizzard/mod-amec-cuba.pdf A Web-based Distributed Environment to Support Teleteaching: Ch Bouras Computer ru6.cti.gr/Publications/261.pdf Web-Enabled Distance Education Environment—Bouras, Lampsas, Bazaios. (1998) ru6.cti.gr/Publications/296.pdf ID-No. of presentation: t3a01391—Authors Christos Bouras ru6.cti.gr/Publications/279.pdf Usability meets Security—The Identity-Manager as your—Jendricke, Markotten (2000) www.acsac.org/2000/papers/90.pdf Deployment Scenarios of DVEs in Education—Bouras Computer Technology ru6.cti.gr/Publications/324.pdf Trends: Training Educators Through Networks And—Christos Bouras Computer (1996) ru6.cti.gr/Publications/439.pdf On-Demand Hypermedia/Multimedia Service over—Bouras, Kapoulas. (1996) ru6.cti.gr/Publications/358.pdf Tele-working services from the Greek PTT—Christos Bouras Vaggelis (1999) ru6.cti.gr/Publications/322.pdf HIPPOCRATES: A Tool for Distance Education—Bouras Fotakis Kapoulas ru6.cti.gr/Publications/305.pdf A Platform for the Implementation of the Services—Bouras, Gkamas. (1998) ru6.cti.gr/Publications/259.pdf Training Centres: An Architecture for the Realisation—Christos Bouras Computer ru6.cti.gr/Publications/292.pdf In—Service Training through ODL Environments: From User—Bouras Lampsas Spirakis ru6.cti.gr/Publications/275.pdf Distributed Learning Environment using Advanced Services—Ch Bouras Computer (1999) ru6.cti.gr/Publications/453.pdf Routing Management Application Based On Mobile Agents On—Anglica Reyes Ernesto wwwtgs.cs.utwente.nl/eunice/summerschool/papers/paper9-2.pdf Quality Of Service Monitoring In Ip Networks By Using—Tams Varga Andrs wwwtgs.cs.utwente.nl/eunice/summerschool/papers/paper4-3.pdf Issues on QoS based Routing in the Integrated Services—Gbor Rtvri Department wwwtgs.cs.utwente.nl/eunice/summerschool/papers/paper4-1.pdf Usability Research in a Housing Fair: Problems and—Sajaniemi, Tossavainen (1995) cs.joensuu.fi/pub/Reports/A-1995-7.ps.gz Tele-Education/-Co-Operation Pilot—Pilot Study Plan www.cg.its.tudelft.nl/~charles/publications/MESH_Report_D213.pdf CAVE—Speaker verification in bank and telecom services—Lindberg, Blomberg, Melin ftp.ling.umu.se/pub/phonum/phonum4/65.ps The Catallaxy as a new Paradigm for the Design of—Eymann, Padovan, Schoder (2000) www.iig.uni-freiburg.de/telematik/forschung/publikationen/pubfiles/EyPaSc2000.pdf Internet Accounting—Pras, van Beijnum, Sprenkels. (2001) www.simpleweb.org/nm/research/results/publications/pras/internet-a«ounting.pdf EWI Search and User Interface Functions—Ardö, Cao, Lundberg, Roslund, www.lub.lu.se/combine/docs/D34_search_ui.ps Algebras and Automata for Timed and Stochastic Systems—D'Argenio wwwhomez.utwente.nl/~dargenio/dissertation/dissertation.ps.gz Characterizing Video Coding Computing in Conference Systems—By Tuquerres Tuquerre www.ub.utwente.nl/webdocs/ctit/1/0000004d.pdf A Model to Evaluate Certificate Revocation—Forn Castro Department (2000) www-mat.upces/~jforne/jf_SCI2000_1.pdf Dublin Bus Tracking Service—Design and implementation of a—Fallon (2000) ftp.cs.tcd.ie/pub/tech-reports/reports.00/TCD-CS-2000-47.pdf Integrating Different Strategies for Cross-Language—Buitelaar, Netter, Xu www.dfki.de/lt/mietta/mietta-twlt.ps Integrating Trading and Load Balancing for Efficient—Thißen, Neukirchen (2000) www.itm.mu-Iuebeck.de/publications/DT_HN_2000_ITaLBfEMoSiDS/USM2000.pdf Junction Point Aspect: A Solution to Simplify Implementation of—Berger (2000) micado.project.free.fr/Publi/ecoop2000.ps.gz Csaba Antal—Jzsef Molnr Sndor www.cs.kau.se/~soren/dkdoc/documentstore/cc_fp.ps GRAVE Cave General Video Client—Wasskog (1995) www.idi.ntnu.no/grupper/db/report_diplomas/il_myggo/diplom.ps.Z Z39.50 Application programmer's Interface SYSTEM—Document No Document ftp.ddb.de/pub/dbyosi/ses_v3.ps.gz Hardware Implementation of a Secure Bridge in Ethernet—Forn Soriano Mels www-mat.upc.es/~jforne/jf_GLOBECOM93.pdf Performance Evaluation of Strategies for Integration—Queija, van den Berg. (1999) www.cwi.nl/ftp/CWIreports/PNA/PNA-R9903.ps.Z Inverse Multiplexing for ATM. Operation—Aguilar-Igartua. (1999) marley.upc.es/pub/articles/icatm99.pdf An integrated solution for secure communications over B-ISDN—Forn Mels Department www-mat.upc.es/~jforne/jf_CMS96.pdf Web Representation with Dynamic Thumbnails—Schmid www.compJams.acuk/computing/users/sschmid/Yuforic/YuforicExtAbstr.ps Distributed educational multimedia databases: design, production—Hiddink (1998) wwwhome.ctit.utwente.nl/~hiddinkg/professional/papers/romy/romy.ps Sojourn Times in Non-Homogeneous QBD Processes with Processor—Queija (1999) www.cwi.nl/ftp/CWIreports/PNA/PNA-R9901.ps.Z A guided tour through LGM—How to generate spoken—Krahmer, Landsbergen, www.ipo.tue.nl/homepages/ekrahmer/Pubs/lgm.ps Verifying a Smart Design of TCAP—Arts, van Langevelde (1999) www.cwi.nl/ftp/CWIreports/SEN/SEN-R9910.ps.Z Securing Multimedia Applications over B-ISDN—Jordi Forn Mels www-mat.upc.es/~jforne/jf_PROMS96.pdf Teaching and learning with the WWW in the undergraduate—Oliver, Omani, Cowan elrond.scam.ecu.edu.au/oliver/docs/96/AUSWEB2d.pdf Toward a Standard for Guideline Representation: an—Domenico Pisanelli Aldo saussure.irmkant.rm.cnr.it/onto/publ/amia99/amia99.pdf Time Domain MLE of the Parameters of FBM Traffic—Vidács, Virtamo (1999) keskus.tct.hut.fi/tutkimus/com2/publ/fbm2.pdf Artificial Coordination—Simulating Organizational—Eymann, Padovan, Schoder (1998) www.iig.uni-freiburg.de/~padovan/publications/cefes98.pdf REMOT—A Project to Remotely Monitor and Control Scientific—Experiments Pucillo Oat www.aps.anl.gov/icalepcs97/paper97/p235.pdf Performability Analysis of Markov Reward Models with Rate and impulse reward, Rácz & Telek—(1999) webspn.hit.bme.hu/~telek/cikkek/racz99a.ps.gz Analysis of the Completion Time of Markov Reward Models—Mikl'os Telek Andr'as webspn.hit.bme.hu/~telek/cikkek/tele98b.ps.gz A New Method for Spectral Shaping Coding—Peter Amos Aszl'o webspn.hit.bme.hu/~telek/cikkek/vamo98a.ps.gz MRMSolve: A Tool for Transient Analysis of Large Markov—Raa,Toth,Telek webspn.hit.bme.hu/~telek/cikkek/racz00f.ps.gz Managing Services in Distributed Systems by Integrating—Thißen, Neukirchen (2000) www.itm.mu-luebeck.de/publications/ISCC2000/ISCC2000.pdf.gz Conformance Testing with TTCN—Schieferdecker, Grabowski (2000) www.itm.mu-luebeck.de/publications/I_J_2000_CTwT/Telektronnikk4_2000_CTandTTCN.pdf Analysis and Modelling of Collaborative Learning Interactions-Workshop Notes (2000) collide.informatik.uni-duisburg.de/martin/publication/Muehlenbrock-ECAI-2000.pdf Aligning IT and Organization in the MediaSite project—Iacucci, Axelsson (2000) iris23.htu.se/proceedings/PDF/20final.PDF Enriching Textual Documents with Time-codes from Video—van der Sluis, de Jong (2000) 133.23.229.11/ysuzuki/Prowedingsall/RIA02000/Wednesday/37CP1.ps Modular Automated Transport—Frequently Asked Questions (FAQ)—Schweizer (2000) circwww.epfl.ch/staff/joerg/mat/doc/faq/faq.ps The CIMI Profile Release 1.0H—Profile For Cultural www.cimi.org/public_docs/HarmonizedProfile/CIMIProfile10H.pdf Real-Time Traffic Simulation of the German Autobahn Network—Rickert, Wagner, Gawron (1996) www.zpr.uni-koeln.de/~mr/documents/PASA_96.ps.gz Analysis of a Distributed Wireless Fair Scheduling Scheme—Miklós hsnlab.ttt.bme.hu/~molnar/files/itcssmob00.ps.gz CAC Algorithm Based on Advanced Round Robin Method for QoS—Marosits, Molnar hsnlab.ttt.bme.hu/~molnar/files/isa01.pdf.gz Link Capacity Sharing Between Guaranteed- and Best Effort—Rácz, Telek webspn.hit.bme.hu/~telek/cikkek/racz01a.ps.gz Quality of Service on the Internet: Evaluation of the—Elisabete Reis Elreis (2001) dragao.co.it.pt/conftele2001/proc/pap101.pdf A MixDemonstrator for teaching Security in the Virtual—Jendricke, Rannenberg www.scis.cowan.edu.au/research/wise/WISE1Proceedings/pdf/jendricke.pdf Fair Allocation Of Elastic Traffic For A Wireless Base Station—Gyorgy Miklos Traffic (1999) hsnlab.ttt.bme.hu/~molnar/files/globe99.ps.gz Cell Delay Variation in an ATM Multiplexer—Molnár, Blaabjerg hsnlab.ttt.bme.hu/~molnar/files/cdvsnew.ps.gz Supporting All Service Classes in ATM: A Novel—Marosits. (1999) hsnlab.ttt.bme.hu/~molnar/files/info99.ps.gz The Impact Of Long Range Dependence On Cell Loss In An—Vidcas, Molnar, Gordos (1998) hsnlab.ttt.bme.hu/~molnar/files/globe98.ps.gz Investigation of Fractal Properties in Data Traffic—Dinh, Molnár. hsnlab.ttt.bme.hu/~molnar/files/jc98.ps.gz Performance Evaluation of a General Traffic Control—Marosits. hsnlab.ttt.bme.hu/~molnar/files/ipcc99.ps.gz The Demand for Stored Value Payment Instruments—Ingo Pippow Detlef (2001) www.iig.uni-freiburg.de/telematik/forschung/projekte/e_sicherheit/comet/publikationen/PiScho2001.pdf On The Effects Of Non-Stationarity In Long-Range Dependence Tests—Trang Dinh And hsnlab.ttt.bme.hu/~molnar/files/trendeff.ps.gz Bottlenecks on the Way Towards Fractal Characterization of—Andor Moln'ar Attila hsnlab.ttt.bme.hu/~molnar/files/pmccn97.ps.gz Multimedia Databases in Education—Gerrit Hiddink Centre wwwhome.ctit.utwente.nl/hiddinkg/professional/papers/dolls97.ps Content-based video retrieval—Petkovic (2000) www.edbt2000.uni-konstanz.de/phd-workshop/papers/Petkovic.pdf Adaptive Optimisation of Importance Sampling for—Heegaard (1996) www.idi.ntnu.no/~poulh/publications/nts13a.ps Factors of reuse of Units of Learning Material—Gerrit Hiddink Centre wwwhome.ctit.utwente.nl/~hiddinkg/professional/papers/reuse.ps Multilateral Security A concept and examples for balanced security—Rannenberg (2000) csrc.nist.gov/nissc/2000/proceedings/papers/202ra.pdf Educational Multimedia Databases: Past and Present—Gerrit Hiddink Centre wwwhome.ctit.utwente.nl/~hiddinkg/professional/papers/systems.ps Resource-limited information retrieval in Web-based—Daan Velthausz And (1997) www.trc.nl/publicaties/1997/reslim/resource-limited.pdf CRL supported a smart redesign of a real-life protocol—Thomas Arts Email extranet.telin.nl/dscgi/ds.py/Get/File-8309/fmics99.ps.Z Convergence In The Digital Age-Table Of Content ftp-.cordis.lu/pub/libraries/docs/proceedings.pdf Using Automated Assistance Systems—Puffing The Driver Into Focus—Reichardt (1998) www.claimler-benz.com/research/events/pdf/IV980240.PDF The Cave-Wp4 Generic Speaker Verification System—Jaboulet, KOOLWAAIJ. (1998) www.ubilab.org/publications/print_versions/pdf/jab98.pdf Field Test Of A Calling Card Service Based On—den Os, Boves, www.ubilab.org/publications/print_versions/pdf/den97.pdf Distributed Electronic Commerce Systems—Sonja Zwil Er ftp.cs.umass.edu/pub/net/pub/hgschulz/i96/zwissler.ps.gz Needed Services For Network Performance Evaluation—Dung Dinh Luong gollum.ttt.bme.hu/~luong/tools/at-mip.ps Link Proposals with Case-Based Reasoning Techniques—Haffner, Roth, Heuer, www.ti.fhg.de/conferences/200011171414080.ps Remote Access to Medical Records via the Internet: Feasibility—Pj Lees Ce (1999) www.ics.forth.gr/ICS/acti/cmi_hta/publications/papers/1999/dc99/lees_cic99.pdf Partial Methods Versus End-to-End Measurements—Dung Dinh Luong gollumitt.bme.hu/~luong/tools/ifip.ps The Role of Packet-dropping Mechanisms in QoS Differentiation—Goncalo Quadros Antonio (2000) www-.dei.ucpt/~boavida/papers/2000icon.pdf Component-Based Groupware Tailorability using Monitoring—de Farias, Diakov (2000) amidst.ctit.utwente.nl/publications/cscw_cbg2000.pdf Modeling of Time and Document Aging for Request—Haffner, Roth, Engel. (2000) www.ti.fhg.de/conferences/200009211730520.ps Mpeg-4 Authoring Tool For The Composition Of 3D—Dares. (2001) egnatia.ee.auth.gr/~ikom/ISCAS2001.pdf Disambiguation Strategies for Cross-language Information—Djoerd Hiemstra And (1999) www.cs.utwente.nl/hiemstra/papers/ecdl99.ps the IFLA Council and General Conference Aug. 16-25, 2001—Code Number Division www.ifla.org/IV/ifla67/papers/161-165e.pdf CANDLE: an European E-Education project to—Batlogg, al. (2000) www.ssgrr.it/en/ssgrr2000/papers/164.pdf State-dependent M/G/1 Type Queueing Analysis for—Altman. (2000) www.cwi.nl/ftp/CWIreports/PNA/PNA-R0005.ps.Z Continuous Queries within an Architecture for Querying—Brinkhoff, Weitkämper (2001) www.fh-wilhelmshaven.de/oow/institute/iapg/personen/brinkhoff/paper/SSTD2001.pdf The Distribution And Partitioning Scheme Of The—Jimenez. ches.ing.ula.ve/INVESTIGACION/ARTICULOS/TANIA/SIM-71.ps.gz An Architecture For Video On Demand Agent-Mediated—Almeida, Guizzardi, wwwhome.cs.utwente.nl/~guizzard/vod-amec-workcomp99.pdf Reusing Multi-Media Components: A Catalogue Implementation—Steinmann, Shearer www.fernuni-hagen.de/DVT/Publikationen/Papers/emmsec.pdf Multiagent Systems—Instructor Prof Dh 136.159.122.221/seminar/enmf619_02/enmf02.pdf Twenty-One at CLEF-2000: Translation resources, merging—Djoerd Hiemstra Wessel www.iei.pi.cnr.it/DELOS/CLEF/twentyon.pdf Papabiles—Torday, Bierlaire (2001) rosowww.epfl.ch/mbi/strc-papabiles.pdf Using Objects and Patterns to Implement Domain Ontologies—Guizzardi, Filho (2001) wwwhome.cs.utwente.nl/guizzard/SBES2001vf.pdf Decision Support Systems from a Health Informatics Perspective—Nykänen (2000) acta.uta.fi/pdf/951-44-4897-9.pdf NetTrouble: A TTS for Network Management—Lus Santos Pedro www.dei.uc.pt/~psimoes/papers/its98.pdf Results and experience from the application of a common—Antonis Bouras. (1998) ru6.cti.gr/Publications/318.pdf The Information and Communication Technologies In Education—Christos Bouras Computer ru6.cti.gr/Publications/289.pdf Internet Protocols for Synchronous Distance Learning—Ch Bouras Computer (2000) ru6.cti.gr/Publications/431.pdf The Euro in the Electronic Purse—Allard, Alyankian, Ankri, Collin. (2000) www.eurosmart.com/download/WhitePaper.pdf Monitoring Extensions for Component-Based Distributed—Diakov, van Sinderen. (2000) amidst.ctit.utwente.nl/publications/proms2000.pdf The Q-bit Scheme—Congestion Avoidance Using (1992) gatekeeper.dec.com/pub/doc/sigcomm/ccr/archive/1992/apr92/gbit.ps.Z Performance of a Parallel Transport Subsystem Implementation—Torsten Braun Institute www.iam.unibe.ch/~braun/lit/hpcs93.ps.gz Towards Dynamic Composition of Hybrid Communication Services—Floch, Brcek (2000) www.item.ntnu.no/~jacf/paper/smarnett2000.pdf Optimising the Operation of the World Wide Web in—Hadjiefthymiades, www.cs.auc.clk/~tryfona/papers/cacherel.ps Generating Test Cases for Infinite System Specifications—Stefan Heymer And www.itm.mu-luebeck.de/publications/GTCfISS/HeymerGrabowski.ps.gz Computational Perspectives on Discourse and Dialogue—Bonnie Lynn Webber www.dai.ed.ac.uk/daidb/people/homes/bonnie/handbook.ps.gz Virtual Universities—Ebner, Hogrefe (1999) www.itm.mu-luebeck.de/publications/VFH/ebner_hogrefe_waki99.ps.gz Compensation methods to support generic graph editing: A case—Even, Spelt wwwhome.cs.utwente.nl/~seven/ECOOPWS.pdf Towards the Generation of Distributed Test Cases Using Petri—Heymer, Grabowski www.itm.mu-luebeck.de/publications/FBT99/fbt99.ps.gz Test Case Specification with Real-Time TTCN—Walter, Grabowski www.itm.mu-luebeck.de/publications/TCSwRTTTCN/WalterGrabowski.ps.gz Scientific Approaches and Techniques for Negotiation—Gerding, van Bragt, www.cwi.nl/projects/TA/reports/negotiation.ps Towards an Integrated Test Methodology for Advanced—Grabowski, Walter www.itm.mu-luebeck.de/publications/tcs99.ps.gz TTCN-3—A new Test Specification Language for Black-Box Testing—Grabowski (2000) www.itm.mu-luebeck.de/publications/ttcn3/Grabowski.pdf.gz Test Architectures for Distributed Systems—State of the Art and—Walter (1998) www.itm.mu-luebeck.de/publications/IWTCS98TA/IWTCS98Testarchitectures.ps.gz Asbru: A Task-Specific, Intention-Based, and—Miksch, Shahar, Johnson ftp.ifs.tuwien.ac.at/pub/publications/mik_keml97.pdf Protocol Specifications—Written By Jacob cmc.dsv.su.se/select/SEL-prot-spec-v11-jp-991009.pdf Towards The Third Edition Of TTCN—Grabowski, Hogrefe (1999) www.itm.mu-luebeck.de/publications/iwtcs99.ps.gz A Framework for the Specification of Test Cases for—Walter, Grabowski (1999) www.itm.mu-luebeck.de/publications/Walter-Grabowski-JIST99/jist.ps.gz Verification of Compensation Requirements for the SEPIA—Even, Spelt (1998) wwwhome.cs.utwente.nl/seven/CTIT-TR-98-25.pdf Cote de Resyste—Conformance Testing Reactive www-tios.cs.utwente.nl/Docs/projects/cote-de-resyste/stw.ps Long Cycles and Long Paths in the Kronecker Product of a—Jha, Agnihotri, al. (1995) www.cs.jhu.edu/~rajesh/ps/cta.ps Tutorial on Message Sequence Charts (MSC'96)—Rudolph, Grabowski, Graubmann (1996) www.itm.mu-luebeck.de/publications/MSC96/dis-tutorial.ps.gz The Standardization of Core INAP CS-2 by ETSI—Grabowski, Hogrefe (1999) www.itm.mu-luebeck.de/publications/CS2-Standardization.ps.gz On The Design Of The New Testing Language TTCN-3—Grabowski, Wiles, Willcock. (2000) www.itm.mu-luebeck.de/publications/New_TTCN3/Grabowski-EtAll.pdf.gz omVR—A Safety Training System for a Virtual Refinery—Haller, Kurka, Volkert, www.gup.uni-linz.ac.at:8001/staff/kurka/docs/ismcr99.pdf Senior Online—Telematics De Report cmc.dsv.su.se/sol/sol-transfer-spec.pdf Formal Methods and Conformance Testing—or—What are we—Heymer, Grabowski www.itm.mu-luebeck.de/publications/FBT98/FBT98.ps.gz A Theorem Prover-Based Analysis Tool for Object-Oriented Databases—Spelt, Even (1999) wwwhome.cs.utwente.nl/~seven/CTIT-TR-98-22.pdf Chemistry in Action: Discovering the Behaviour of a Network—Heymer, Grabowski (1998) www.itm.mu-luebeck.de/publications/A-98-18/Report-A-98-18.ps.gz ERP in the e-commerce era—Luttighuis, Biemans extranet.telin.nl/dscgi/ds.py/Get/File-2092/baanUSP.pdf Business-Driven Design of Transaction Services—Biemans, Janssen, Luttighuis. (1999) extranet.telin.nl/dscgi/ds.py/Get/File-664/ICE.pdf Modelling organisations—Wetering (1999) extranet.telin.nl/dscgi/ds.py/Get/File-2902/modellingV2.pdf On Wrapping Query Languages and Ecient XML Integration—Vassilis Christophides Sophie (2000) www.oasis-open.org/cover/vassilisQueryWrap.pdf MESH Release 2 implementation at CTIT—Diakov, van Sinderen, Koprinkov amidst.ctit.utwente.nl/publications/ctit_tr99-08.pdf EUROgatherer: a Personalised Gathering and Delivery—Amato, Straccia, Thanos (2000) faure.iei.pinr.it/%7Estraccia/download/papers/SCI2000/SCI2000.pdf Frameworks for protocol implementation—Barbosa, Pires, van Sinderen (1998) wwwhome.cs.utwente.nl/~sinderen/publications/sbrc98.pdf Neural Networks References Appendix www.inference.phy.cam.ac.uk/mackay/Bayes_FAQ.html
www-2.cs.cmu.edu/Groups/AI/html/faqs/ai/neural/faq.html
www.cs.stir.ac.uk/~ss/NNIntro/InvSlides.html
dir.yahoo.com/Science/Engineering/Electrical_Engineering/Neural_Networks/
www.aist.go.jp/NIBH/~b0616/Links.html
www.creative.net.au/~adrian/mirrors/neural/
www.fi.uib.no/Fysisk/Teori/NEURO/neurons.html
aass.oru.se/~tdt/ann/faq/FAQ.html
www.cis.hut.fi/~jari/research.html
www.eg3.com/WebID/elect/neur-net/blank/overview/a-z.htm
directory.google.com/Top/Computers/Artificial_Intelligence/Neural_Networks
directory.google.com/Top/Computers/Artificial_Intelligence/Neural_Networks/FAQs,_Help,_and_Tutorials/
dmoz.org/Computers/Artificial_Intelligence/Neural_Networks/
dmoz.org/Computers/Artificial_Intelligence/Neural_Networks/FAQs,_Help,_and_Tutorials/
www.cs.qub.ac.uk/~J.Campbell/myweb/book/nn.html
www.cere.pa.cnr.it/IDAschool/lectures/neural.html
cognet.mit.edu/MITECS/Entry/jordan2
www.faqs.org/faqs/ai-faq/neural-nets/part1/preamble.html
zhanshou.hypermart.net/thesis.htm
www.links999.net/hardware/neural.html
www-ra.informatik.uni-tuebingen.de/links/neuronal/welcome_e.html
www.cogneuro.ox.ac.uk/links/ann.html
faculty.cs.tamu.edu/choe/resources/
www.galaxy.com/galaxy/Engineering-and-Technology/Electrical-Engineering/Neural-Networks/
mu.dmt.ibaraki.ac.jp/yanai/neu/faq/
bubl.ac.uk/link/n/neuralnetworks.htm
www.webopedia.com/TERM/n/neural_network.html
www.ie.ncsu.edu/fangroup/neural.dir/indexneural.html
www.geneticprogramming.com/AI/nn.html
www.cs.utk.edu/~yarkhan/neural_networks.html
www.physiol.ox.ac.uk/~ket/nn.html
www.aaai.org/AITopics/html/neural.html
www.inference.phy.cam.ac.uk/mackay/itprnn/book.html
www.hh.se/staff/nicholas/NN_Links.html
xpidea.com/products/neurovcl/neuroabout.htm
www.msm.ele.tue.nl/research/neural/
homepages.goldsmiths.ac.uk/nikolaev/Nnets.htm
www.triumf.ca/project_ETA/neural_network.html
personal.bgsu.edu/~suny/nn.html
www.icmc.sc.usp.br/~andre/ann_links.html
www.stud.ntnu.no/~hirpa/links/AI_links.htm
it.umary.edu/Library/research/www_subjects/neural_networks.html
cindy.cis.nctu.edu.tw/NN/NN5/www.html
www.public.iastate.edu/~acl/links/links.html
www.cs.cf.ac.uk/User/O.F.Rana/neural.html
www.cs.unr.edu/~bebis/CS791S/
www.geocities.com/fastiland/NNwww.html
cns-web.bu.edu/pub/snorrason/bookmarks/neural.html
www.open.brain.riken.go.jp/~cao/index_work.html
svr-www.eng.cam.ac.uk/research/neural/other_neural_net_sites.html R. O. Duda and P. E. Hart. Pattern Classication and Scene Analysis. Wiley, New York, 1973.

S. Ripley, "Pattern Recognition and Neural Networks", Statistics, 33, 1065-1076. Ripley, B. D., 1996: Pattern Recognition and Neural Networks. Cambridge: University Press., 1996, citeseer.ist.psu.edu/ripley96complements.html, and cited references Aha, D. W., Kibler, D. & Albert, M. K. (1991) Instance-based learning algorithms. Machine Learning 6(1), 37-66.

Ali, K. M. & Pazzani, M. J. (1995) On the link between error correlation and error reduction in decision tree ensembles. Technical Report 95-38, Department of Information and Computer Science, University of California at Irvine.

Almond, R. G. (1995) Graphical Belief Modeling. London: Chapman & Hall. ISBN 0-412-06661-0. [Despite the date, this book was actually published in May 1996].

Angluin, D. & Valiant, L. G. (1979) Fast probabilistic algorithms for Hamiltonian circuits and matchings. Journal of Computer and System Sciences 18, 155-193.

Anthony, M. & Shawe-Taylor, J. (1993) A result of Vapnik with applications. Discrete Applied Mathematics 47, 207-217. [Erratum (1994) 52, 211 (the proof of theorem 2.1 is corrected)].

Arbib, M. A. (ed.) (1995) The Handbook of Brain Theory and Neural Networks. Cambridge, Mass.: MIT Press. ISBN 0-262-01148-4.

Atkeson, C. G. (1991) Using locally weighted regression for robot learning. In Proceedings of the IEEE Conference on Robotics and Automation (Sacremento, C A, 1991), pp. 958-963. IEEE Press.

Auer, P., Holte, R. C. & Maass, W. (1995) Theory and application of agnostic PAC-learning with small decision trees. In Proceedings of the Twelfth International Conference on Machine Learning, pp. 21-29. San Francisco: Morgan Kaufmann. Also NeuroCOLT Technical Report NC-TR-96-034 (February 1996).

Bartlett, P. L. & Williamson, R. C. (1996) The VC dimension and pseudodimension of two-layer neural networks with discrete inputs. Neural Computation 8(3), 625-628.

Benveniste, A., M'etivier, M. & Priouret, P. (1990) Adaptive Algorithms and Stochastic Approximations. Berlin: Springer.

Bratko, I. & Muggleton, S. (1995) Applications of inductive logic programming. Communications of the Association for Computing Machinery 38(11), 65-70.

Breiman, L. (1994) Bagging predictors. Technical Report 421, Department of Statistics, University of California at Berkeley.

Breiman, L. (1996a) Bagging predictors. Machine Learning.

Breiman, L. (1996b) The heuristics of instability in model selection. Annals of Statistics.

Breiman, L. (1996c) Bias, variance and arcing classifiers. Technical report, Department of Statistics, UC Berkeley.

Brodley, C. E. & Utgoff, P. E. (1995) Multivariate decision trees. Machine Learning 19, 45-77.

Buntine, W. & Niblett, T. (1992) A further comparison of splitting rules for decision-tree induction. Machine Learning 8, 75-86.

Burnell, L. & Horvitz, E. (1995) Structure and chance: Melding logic and probability for software debugging. Comm. ACM 38(3), 31-41, 57.

Catlett, J. (1991) On changing continuous attributes into ordered discrete attributes. In Proceedings of the European Working Session on Learning-EWSL-91, ed. Y. Kodratoff, pp. 164-178. Berlin: Springer.

Cesa-Bianchi, M., Freund, Y., Helmbold, D. P., Haussler, D., Schapire, R. E. & Warmuth, M. K. (1993) How to use expert advice. In Proceedings of the Twenth-Fifth ACM Symposium on the Theory of Computing (San Diego, Calif., 1993), pp. 382-391. NY: ACM Press.

Cesa-Bianchi, M., Freund, Y., Helmbold, D. P., Haussler, D., Schapire, R. E. & Warmuth, M. K. (1996) How to use expert advice. Journal of the ACM.

Cortes, C. & Vapnik, V. (1995) Support-vector networks. Machine Learning 20, 273-297.

Cost, S. & Salzberg, S. (1993) A weighted nearest neighbor algorithm for learning with symbolic features. Machine Learning 10, 57-78.

Cover, T. M. (1968) Capacity problems for linear machines. In Pattern Recognition, ed. L. Kenai, pp. 283-289. Thompson.

Craven, M. W. & Shavlik, J. W. (1996) Extracting tree-structured representations of trained networks. In Touretzky et al. (1996), pp. 24-30. ISBN 0-262-20107-0.

Dasarathy, B. V. (ed.)(1991) Nearest Neighbor (NN) Norms: NN Paffern Classification Techniques. Los Alamitos, Calif.: IEEE Computer Society Press.

Dougherty, J., Kohavi, R. & Sahami, M. (1995) Supervised and unsupervised discretization of continuous features. In Proc. $12^{th}$ Int. Conf. on Machine Learning, eds A. Prieditis & S. Russell, pp. 194-202. San Francisco: Morgan Kaufmann.

Drucker, H. (1996) Fast decision tree ensembles for optical character recognition. In Proceedings of the Fifth Annual Symposium on Document Analysis and Information Retrieval.

Drucker, H. & Cortes, C. (1996) Boosting decision trees. In Touretzky et al. (1996), pp. 479-485. ISBN 0-262-20107-0.

Drucker, H., Schapire, R. & Simard, P. (1993) Boosting performance in neural networks. International Journal of Paffern Recognition and Artificial Intelligence 7(4), 705-719.

Drucker, H., Cortes, C., Jaeckel, L. D., LeCun, Y. & Vapnik, V. (1994) Boosting and other ensemble methods. Neural Computation 6(6), 1289-1301.

Edwards, D. (1995) Introduction to Graphical Modelling. Springer.

Elomaa, T. & Rousu, J. (1996) Finding optimal multi-splits for numerical attributes in decision tree learning. NeuroCOLT Technical Report Series NC-TR-96-041, Department of Computer Science, University of Helsinki.

Fayyad, U. M. & Irani, K. B. (1993) Multi-interval discretization of continuous-valued attributes in decision tree generation. In Proceedings of the Thirteenth International Joint Conference on Artificial Intelligence (Chambery, France, 1993), pp. 1022-1027. San Francisco: Morgan Kaufmann.

Freund, Y. (1990) Boosting a weak learning algorithm by majority. In Proceedings of the Third Workshop on Computational Learning Theory, pp. 202-216.

Freund, Y. (1995) Boosting a weak learning algorithm by majority. Information and Computation 121(2), 256-285.

Freund, Y. & Schapire, R. E. (1995) A decision-theoretic generalization of on-line learning and an application to boosting. In Proceedings of the Second European Conference on Computational Learning Theory, pp. 23-37. Springer.

Freund, Y. & Schapire, R. E. (1996a) Game theory, on-line prediction and boosting. In Proceedings of the Ninth Annual Conference on Computational Learning Theory.

Freund, Y. & Schapire, R. E. (1996b) Experiments with a new boosting algorithm. In Proceedings of the Thirteenth International Conference on Machine Learning.

Friedman, J. H. (1994) Flexible metric nearest neighbor classification. Technical report, Department of Statistics, Stanford U.

Fukunaga, K. & Flick, T. E. (1984) An optimal global nearest neighbor metric. IEEE Transactions on Pattern Analysis and Machine Intelligence 6, 314-318. [Reprinted in Dasarathy (1991)].

Fulton, T., Kasif, S. & Salzberg, S. (1995) Efficient algorithms for finding multi-way splits for decision trees. In Proceedings of the Twelfth International Conference on Machine Learning, eds A. Prieditis & S. Russell, pp. 244-251. San Francisco: Morgan Kaufmann.

Fung, R. & Del Favarro, B. (1995) Applying Bayesian networks to information retrieval. Comm. ACM 38(3), 42-48, 57.

Hampson, S. E. & Volper, D. J. (1986) Linear function neurons: structure and training. Biological Cybernetics.

Hastie, T. & Tibshirani, R. (1996a) Discriminant adaptive nearest neighbor classification and regression. In Touretzky et al. (1996), pp. 409-415. ISBN 0-262-20107-0.

Hastie, T. & Tibshirani, R. (1996b) Discriminant adaptive nearest neighbor classification. IEEE Transactions on Pattern Analysis and Machine Intelligence 18, 607-618.

Heath, D., Kasif, S. & Salzberg, S. (1993) Learning oblique decision trees. In Proceedings of the Thirteenth International Joint Conference on Artificial Intelligence (Chambery, France, 1993), pp. 1002-1007. San Francisco: Morgan Kaufmann.

Heckerman, D. & Wellman, M. P. (1995) Bayesian networks. Communications of the ACM 38(3), 26-30.

Heckerman, D., Breese, J. S. & Rommelse, K. (1995) Decision-theoretic troubleshooting. Comm. ACM 38(3), 49-57.

Helmbold, D. P. & Schapire, R. E. (1995) Predicting nearly as well as the best pruning of a decision tree. In Proceedings of the Eight Annual Conference on Computational Learning Theory, pp. 61-68. New York: ACM Press.

Helmbold, D. P. & Schapire, R. E. (1996) Predicting nearly as well as the best pruning of a decision tree. Machine Learning.

Ho, T. K. (1995) Random decision forests. In Proceedings of the Third International Conference on Document Analysis and Recognition, pp. 278-282. IEEE Computer Soc. P.

Hochreiter, S. & Schmidhuber, J. (1995) Simplifying neural nets by discovering flat minima. In Tesauro et al. (1995), pp. 529-536. ISBN 0-262-20104-6.

Hochreiter, S. & Schmidhuber, J. (1996) Flat minima. Neural Computation.

Holte, R. C. (1993) Very simple classification rules perform well on most commonly used datasets. Machine Learning 11, 63-91.

Hoffgen, K.-U., Simon, H.-U. & Van Horn, K. S. (1995) Robust trainability of single neurons. Journal of Computer and System Sciences 50(1), 114-125.

Karpinski, M. & Macintyre, A. (1995a) Bounding VC-dimension of neural networks: Progress and prospects. In Proceedings of the Second European Conference on Computational Learning Theory (Barcelona, Spain), ed. P. Vitanyi, number 904 in Lecture Notes in Artificial Intelligence, pp. 337-341. Berlin: Springer.

Karpinski, M. & Macintyre, A. (1995b) Polynomial bounds for VC dimension of sigmoidal neural networks. In Proceedings of the Twenty-Seventh Annual ACM Symposium on Theory of Computing (Las Vegas), pp. 200-208. ACM Press.

Koiran, P. & Sontag, E. D. (1996) Neural networks with quadratic VC dimension. In Touretzky et al. (1996), pp. 197-203. ISBN 0-262-20107-0.

Kooperberg, C., Bose, S. & Stone, C. J. (1996) Polychotomous regression. Journal of the American Statistical Association.

Krogh, A. & Vedelsby, J. (1995) Neural network ensembles, cross validation, and active learning. In Tesauro et al. (1995), pp. 231-238. ISBN 0-262-20104-6.

Langley, P. (1996) Elements of Machine Learning. San Francisco: Morgan Kaufmann.

Langley, P. & Simon, H. A. (1995) Applications of machine learning and rule induction. Comm. ACM 38(11), 54-64.

Lauritzen, S. L. (1996) Graphical Models. Oxford: Clarendon Press. ISBN 0-19-852219-3.

Ljung, L., Pflug, H. & Walk, H. (1992) Stochastic Approximation and Optimization of Random Systems. Berlin: Birkhauser.

Lowe, D. G. (1995) Similarity metric learning for a variable-kernel classifier. Neural Computation 7(1), 72-85.

Maass, W. & bran, G. (1994) How fast can a threshold gate learn? In Computational Learning Theory and Natural Learning Systems: Constraints and Prospects, eds S. J. Hanson, G. A. Drastal & R. L. Rivest, volume I, pp. 381-414. MIT Press.

Marchand, M., Golea, M. & Rujan, P. (1990) A convergence theorem for sequential learning in two-layer perceptrons. Europhysics Letters 11, 487-492.

Muroga, S. (1965) Lower bounds of the number of threshold functions and a maximum weight. IEEE Transactions on Electronic Computers 14, 136-148.

Muroga, S., Toda, I. & Takasu, S. (1961) Theory of majority decision elements. Journal of the Franklin Institute 271, 376-418.

Murthy, S. K., Kasif, S., Salzberg, S. & Beigel, R. (1993) OC1: randomized induction of oblique decision tress. In Proceedings of the Eleventh National Conference on Artificial Intelligence (Washington, D C, 1993), pp. 322-327. AAAI Press. ISBN 0-262-51071-5.

Murthy, S. K., Kasif, S. & Salzberg, S. (1994) A system for the induction of oblique decision trees. J. Art. Intelligence Res. 2, 1-33.

Oliver, J. J. & Hand, D. J. (1995) On pruning and averaging decision trees. In Machine Learning: Proceedings of the Twelfth International Conference, pp. 430-437.

Parberry, I. (1994) Circuit Complexity and Neural Networks. Cambridge, Mass.: MIT Press. ISBN 0-262-16148-6.

Parrondo, J. M. R. & Van der Broeck, C. (1993) Vapnik-Chervonenkis bounds for generalization. J. Phys. A 26, 2211-2223.

Przytula, K. W. & Prasanna, V. K. (1993) Parallel Digital Implementation of Neural Networks. Englewood Cliffs, N.J.: Prentice Hall.

Quinlan, J. R. (1996a) Bagging, boosting, and C4.5. In Proceedings of the Fourteenth National Conference on Artificial Intelligence. Menlo Park, Calif.: AAAI Press.

Quinlan, J. R. (1996b) Improved use of continuous attributes in C4.5. Journal of Artificial Intelligence Research 4, 77-90.

Rachlin, J., Kasif, S., Salzberg, S. & Aha, D. (1994) Towards a better understanding of memory-based and Bayesian classifiers. In Proceedings of the Eleventh International Conference on Machine Learning (New Brunswick, N.J.), pp. 242-250.

Sakurai, A. (1993) Tighter bounds of the VC-dimension of three-layer networks. In Proceedings of the 1993 World Congress on Neural Networks, volume 3, pp. 540-543. Hillsdale, N.J.: Erlbaum.

Schapire, R. E. (1990) The strength of weak learnability. Machine Learning 5(2), 197-227.

Shafer, G. (1996) Probabilistic Expert Systems. Number 67 in CBMS-NSF Regional Conference Series in Applied Mathematics. Philadelphia, Pa.: SIAM. ISBN 0-89871-373-0.

Shlien, S. (1990) Multiple binary decision tree classifiers. Pattern Recognition 23(7), 757-763.

Short, R. D. & Fukunaga, K. (1980) A new nearest neighbor distance measure. In Proceedings of the Fifth IEEE International Conference on Paffern Recognition (Miami Beach, 1980), pp. 81-86. Los Alamitos, Calif.: IEEE Computer Society Press.

Short, R. D. & Fukunaga, K. (1981) The optimal distance measure for nearest neighbor classification. IEEE Transactions on Information Theory 27, 622-627. [Reprinted in Dasarathy (1991)].

Stone, C. J., Hansen, M., Kooperberg, C. & Truong, Y. K. (1997) Polynomial splines and their tensor products in extended linear modeling. Annals of Statistics.

Tesauro, G., Touretzky, D. S. & Leen, T. K. (eds) (1995) Advances in Neural Information Processing Systems 7. Proceedings of the 1994 Conference. Cambridge, Mass.: MIT Press. ISBN 0-262-20104-6.

Touretzky, D. S., Moser, M. C. & Hasselmo, M. E. (eds) (1996) Advances in Neural Information Processing Systems 8. Proceedings of the 1995 Conference. Cambridge, Mass.: MIT Press. ISBN 0-262-20107-0.

Utgoff, P. E. (1989) Perceptron trees: a case study in hybrid concept representations. Connection Science 1(4), 377-391.

Valentin, D., Abdi, H., O'Toole, A. J. & Cottrell, G. (1994) Connectionist models of face processing: A survey. Paffern Recognition 27, 1208-1230.

Vapnik, V. N. (1995) The Nature of Statistical Learning Theory. New York: Springer.

Vapnik, V. N. (1996) Statistical Learning Theory. New York: Wiley.

Wahba, G., Wang, Y., Gu, C., Klein, R. & Klein, B. (1996) Smoothing spline anova for exponential families, with application to the Wisconsin epidemiological study of diabetic retinopathy. Annals of Statistics 23(6), 1865-1895.

Waltz, D. (1990) Memory-based reasoning. In Natural and Artificial Parallel Computation, eds M. Arbib & J. Robinson, pp. 251-276. Cambridge, Mass.: MIT Press.

Wang, L. & Ola, E. (1993) Image compression by MLP and PCA neural networks. In Proceedings of the Eight Scandinavian Conference on Image Analysis (Tromso, Norway), pp. 1317-1324.
Werbos, P. (1987) Learning how the world works. In Proceedings of the IEEE Conference on Systems, Man and Cybernetics, pp. 320-310. New York: IEEE Press.
Werbos, P. J. (1995) Backpropagation: Basics and new developments. pp. 134-139 of Arbib (1995).
Willems, F. M. J., Shtarkov, Y. M. & Tialkens, T. J. (1993) Context tree weighting: A sequential universal source coding procedure for FSMX sources. In Proceedings of the 1993 IEEE International Symposium on Information Theory, p. 59. IEEE Press.
Willems, F. M. J., Shtarkov, Y. M. & Tialkens, T. J. (1995) The context-tree weighting method: Basic properties. IEEE Transactions on Information Theory pp. 653-664.

Wavelets References Appendix

Introductions to Wavelets
G. Kaiser, "A Friendly Guide to Wavelets"
C. S. Burrus and R. A. Gopinath, "A Tutorial Overview of Wavelets, Filter Banks and Interrelationships"
R. A. DeVore and B. J. Lucier, "Wavelets"
T. Edwards, "Discrete Wavelet Transforms: Theory and Application."
E. Gootman and M. Wickerhauser, "Elementary Wavelets."
A. Graps, "An Introduction To Wavelets."
C. Heil and D. Walnut, "Continuous and Discrete Wavelet Transforms."
B. Jawerth and W. Sweldens, "An Overview of Wavelet Based Multiresolution Analysis".
J. Lewalle, "Tutorial on Wavelet Analysis of Experimental Data"
P. Schröder and W. Sweldens, "Building Your Own Wavelets at Home."
G. Strang, "Wavelets."
G. Strang "Wavelets and dilation equations: a brief introduction."
C. Torrence and G. P. Compo, "A Practical Guide to Wavelet Analysis, with Significance and Confidence Testing."
B. Vidakovic "Wavelets for Kids," also part 2.
E. Tolkova, "Orthogonal Wavelets Construction."
Y. Meyer, Wavelets: Algorithms and Applications, Society for Industrial and Applied Mathematics, 1993, pp. 13-31, 101-105.
G. Kaiser, A Friendly Guide to Wavelets, Birkhauser, Boston, 1994, pp. 44-45.
General Theory
L. Andersson, N. Hall, B. Jawerth and G. Peters, "Wavelets on Closed Subsets of the Real Line"
P. Auscher, G. Weiss and M. V. Wickerhauser, "Local Sine and Cosine Bases of Coifman and Meyer and the Construction of Smooth Wavelets"
C. Basdevant and V. Perrier, "Besov Norms in Terms of Continuous Wavelet Transforms and Application to Structure Functions."
B. E. Bassil, G J. Dickson and D. M. Monro, "Orthonormal Wavelets With Balanced Uncertainty".
G. Beylkin and N. Saito, "Multiresolution Representations using the Autocorrelation Functions of Compactly Supported Wavelets."
G. Beylkin and N. Saito, "Wavelets, their Autocorrelation Functions and Multiresolution Analysis of Signals."
G. Beylkin and B. Torrésani, "Implementation of Operators via Filter Banks, Autocorrelation Shell and Hardy Wavelets."
A. G. Bruce, H. Gao and D. Ragozin, "Non-smooth Wavelets: Graphing Functions Unbounded on Every Interval."
C. Cabrelli, C. Heil, and U. Molter, "Accuracy of Lattice Translates of Several Multidimensional Refinable Functions."
R. C. Calderbank, I. Daubechies, W. Sweldens and B. Yeo "Wavelet Transforms that Map Integers to Integers."
D. Chen, "Extended Families of Cardinal Spline Wavelets."
D. Chen, "Spline Wavelets of Small Support."
D. Chen, "Characterization of Biorthogonal Cardinal Spline Wavelet Bases."
D. Chen, "Cardinal Spline Wavelets", dissertation. Also part 2, part 3, part 4, part 5 and part 6.
S. Chen and D. Donoho, "Atomic Decomposition by Basis Pursuit."
A. Cohen, W. Dahmen and R. DeVore, "Multiscale Decompositions on Bounded Domains."
J. Cohen, "The Foot Problem in Wavelet Packet Splitting." A Mathematica notebook converted to Postscript.
J. Cohen, "Schauder Basis for [0,1]." A Mathematica notebook converted to Postscript.
J. Cohen, "The Littlewood-Paley-Stein Wavelet" A Mathematics notebook converted to Postscript.
J. Cohen, "Battle-Lemarie Wavelets." A Mathematica notebook converted to Postscript.
J. Cohen, "The Daubechies Minimum Phase Wavelets." A Mathematica notebook converted to Postscript.
J. Cohen, "Meyer Wavelets." A Mathematica notebook converted to Postscript.
R. Coifman and M. V. Wickerhauser, "Entropy-Based Algorithms for Best Basis Selection"
R. Coifman and M. Wickerhauser, "Best-adapted Wave Packet Bases."
R. Coifman, "Numerical Harmonic Analysis."
R. Coifman, Y. Meyer and M. Witherhauser, "Size Properties of Wavelets Packets."
R. Coifman and Y. Meyer, "Orthonormal Wave Packet Bases."
R. Coifman and M. V. Wickerhauser, "Wavelets and Adapted Waveform Analysis"
R. Coifman, Y. Meyer and M. Witherhauser, "Adapted Wave Form Analysis, Wavelet Packets and Applications."
D. Colella and C. Heil, "Matrix Refinement Equations: Existence and Accuracy."
S. Dahlke, W. Dahmen, E. Schmitt and I. Weinreich, "Multiresolution Analysis and Wavelets on S^2 and S^3."
W. Dahmen, "Stability of Multiscale Transformations."
W. Dahmen and C. A. Micchelli, "Biorthogonal Wavelet Expansions."
G. Davis, S. Mallat and Z. Zhang, "Adaptive Nonlinear Approximations."
G. Davis, "Adaptive Nonlinear Approximations."
G. Davis, S. Mallat and Z. Zhang, "Adaptive Time-Frequency Approximations with Matching Pursuits."
I. Daubechies and W. Sweldens.
C. deBoor, R. DeVore and R. Amos, "On the Construction of Multivariate (Pre)Wavelets."
R. L. deQueiroz, "On Lapped Transforms."
M. Girardi and W. Sweldens, "A New Class of Unbalanced Haar Wavelets That Form an Unconditional Basis for Lp on General Measure Spaces."
S. Haykin and S. Mann, "The Chirplet Transform: A New Signal Analysis Technique Based on Affine Relationships in the Time-Frequency Plane."

C. Heil, G. Strang and V. Strela, "Approximation By Translates of Refinable Functions."

C. Heil and G. Strang, "Continuity of the Joint Spectral Radius: Application to Wavelets."

B. Jawerth and W. Sweldens, "Biorthogonal Smooth Local Trigonometric Bases."

B. Jawerth and W. Sweldens, "Weighted Multiwavelets on General Domains."

M. K. Kwong and P. T. Peter Tang, "W-Matrices, Nonorthogonal Multiresolution Analysis and Finite Signals of Arbitrary Length."

G. Leaf, J. M. Restrepo and G. Schlossnagle, "Periodized Daubechies Wavelets."

J. Lippus, "Wavelet Coefficients of Functions of Generalized Lipschitz Classes."

S. Mallat and Z. Zhang, "Matching Pursuit with Time-Frequency Dictionaries."

E. J. McCoy, D. B. Percival and A. T. Walden, "On the Phase of Least-Asymmetric Scaling and Wavelet Filters."

R. Piessens and W. Sweldens, "Wavelet Sampling Techniques." An abstract is also available.

J. Shen and G. Strang, "The zeros of the Daubechies polynomials."

J. Shen and G. Strang, "Asymptotics of Daubechies Filters, Scaling Functions and Wavelets."

M. J. Shensa, "An Inverse DWT for Nonorthogonal Wavelets"

W. Sweldens, "Compactly Supported Wavelets which are Biorthogonal to a Weighted Inner Product."

W. Sweldens, "The Lifting Scheme: A Custom-Design Construction of Biorthogonal Wavelets." An abstract is also available.

W. Sweldens, "The Lifting Scheme: A Construction of Second Generation Wavelets" An abstract is also available.

B. Suter and X. Xia, "Vector Valued Wavelets and Vector Filter Banks."

C. Taswell, "Wavelet Transform Algorithms for Finite Duration Discrete-Time Signals."

C. Taswell, "Near-Best Basis Selection Algorithms with Non-Additive Information Cost Functions."

K. Urban, "On Divergence-Free Wavelets."

R. O. Wells Jr., "Recent Advances in Wavelet Technology"

M. V. Wickerhauser, "Entropy of a Vector Relative to a Decomposition."

M. V. Wickerhauser, "Lectures on Wavelet Packet Algorithms"

M. V. Wickerhauser, "Smooth Localized Orthonormal Bases"

C. Zarowski, "Notes on Orthogonal Wavelets and Wavelet Packets"

V. Zavadsky, "Multiresolution Approximations of Banach Spaces."

V. Zavadsky, "Wavelet Approximation of Sampled Functions."

B. G. Sherlock and D. M. Monro, "On the Space of Orthonormal Wavelets."

M. Vetterli and C. Herley, "Wavelets and Filter Banks: Theory and Design," IEEE Trans. Sig. Proc., Vol. 40, 1992, p. 2207-2232.

Frame Decompositions

J. Benedetto, C. Heil, and D. Walnut, "Differentiation and the Balian-Low Theorem."

O. Christensen and C. Heil, "Perturbations of Banach Frames and Atomic Decompositions."

D. M. Healy, Jr. and S. Li, "On Pseudo Frame Decompositions and Discrete Gabor Expansions."

S. Li, "General Frame Decompsotions, Pseudo-Duals and Applications for Weyl-Heisenberg Frames."

S. Li, "On Dimension Invariance of Discrete Gabor Expansions."

M-Band Wavelets and Filter Banks

C. S. Burrus and R. A. Gopinath, "On the Correlation Structure of Multiplidty M Scaling Functions"

C. S. Burrus and R. A. Gopinath, "Wavelets and Filter Banks"

C. S. Burrus and R. A. Gopinath, "Unitary FIR Filter Banks and Symmetry"

C. S. Burrus and R. A. Gopinath, "Theory of Modulated Filter Banks and Modulated Wavelet Tight Frames"

C. S. Burrus and R. A. Gopinath, "Factorization Approach to Time-Varying Unitary Filter Bank Trees and Wavelets"

C. Herley, "Boundary Filters for Finite-Length Signals and Time-Varying Filter Banks."

P. Steffen, P. Heller, R. A. Gopinath and C. S. Burrus, "The Theory of Regular M-Band Wavelets"

Wavelets and General Signal Processing

M. Vetterli and J. Kovacevic, "Wavelets and Subband Coding", Prentice Hall, 1995.

D. E. Ashpis and J. Lewalle, "Transport in bypass transition: mapping the active time scales using wavelet techniques"

D. E. Ashpis and J. Lewalle, "Demonstration of wavelet techniques in the spectral analysis of bypass transition data"

C. Basdevant, V. Perrier and T. Philipovitch, "Wavelet Spectra Compared to Fourier Spectra."

J. P. Bonnet, J. Lewalle and M. N. Glauser, "Coherent Structures: Past, Present and Future."

G. Buresti, J. Lewalle and P. Petagna, "Wavelet statistics and the near-field structure of coaxial jets"

C. S. Burrus and R. A. Gopinath, "Wavelet-Based Lowpass/Bandpass Interpolation"

C. S. Burrus, R. A. Gopinath and J. E. Odegard, "Design of Linear Phase Cosine Modulated Filter Banks for Subband Image Compression"

S. Cabrera, V. Krienovich and O. Sirisaengtaksin, "Wavelets Compress Better Than All Other Methods: A 1-D Theorem."

S. Cabrera, V. Krienovich and O. Sirisaengtaksin, "Wavelet Neural Networks are Optimal Approximators for Functions of One Variable."

R. Carmona, W. L. Hwang and B. Torresani, "Characterization of Signals by the Ridges of Their Wavelet Transforms."

R. Carmona, W. L. Hwang and B. Torresani, "Multi-Ridge Detection and Time-Frequency Reconstruction."

R. Coifman, "Adapted Multiresolution Analysis, Computation, Signal Processing and Operator Theory"

R. Coifman, Y. Meyer, S. Quake and M. Wickerhauser, "Signal Processing and Compression with Wave Packets."

R. Coifman, Y. Meyer and M. V. Wickerhauser, "Wavelet Analysis and Signal Processing"

P. Crane, H. Higuchi and J. Lewalle, "On the structure of two-dimensional wakes behind a pair of flat plates"

M. Goldburg, "Applications of Wavelets to Quantization and Random Process Representations." About 1.1 MB.

D. M. Healy, Jr., J. Lu and J. B. Weaver, "Signal Recovery and Wavelet Reproducing Kernels."

D. M. Healy, Jr., J. Lu, J. B. Weaver and Y. Xu, "Noise Reduction With Multiscale Edge Representation and Perceptual Criteria."

D. M. Healy, Jr. and J. Lu, "Contrast Enhancement via Multiscale Gradient Transformations."

W. Hwang and S. Mallet, "Singularity Detection and Processing with Wavelets."

B Jawerth, Y. Liu and W. Sweldens, "Signal Compression with Smooth Local Trigonometric Bases." An abstract is also available.

M. M. Lankhorst and M. D. van der Laan, "Wavelet-Based Signal Approximation with Genetic Algorithms."

J. Lewalle, K. Read and M. T. Schobeiri, "Effect of unsteady wake-passing frequency on boundary layer transition—experimental investigation and wavelet analysis"

J. Lewalle, S J. Murphy and F. W. Peek, "Wavelet analysis of olfactory nerve response to stimulus"

J. Lewalle, "Wavelet analysis of experimental data: some methods and the underlying physics"

G. Strang, "Eigenvalues of (!2)H and convergence of the cascade algorithm."

G. Strang, "Creating and comparing wavelets."

A. R. Tate, "Pattern Recognition Analysis of in vivo Magnetic Resonance Spectra"

D. Donoho, "Nonlinear Wavelet Methods for Recovery of Signals, Densities, and Spectra from Indirect and Noisy Data," Different Perspectives on Wavelets, Proceeding of Symposia in Applied Mathematics, Vol 47, 1. Daubechies ed. Amer. Math. Soc., Providence, R.I., 1993, pp. 173-205.

Wavelets and Image Processing

E. Adelson and E. Simoncelli, "Subband Image Coding with Three-tap Pyramids."

E. H. Adelson, W. T. Freeman, D. J. Heeger and E. P. Simoncelli, "Shiftable Multi-Scale Transforms."

E. H. Adelson and E. P. Simoncelli, "Subband Transforms."

V. R. Algazi, R. R. Estes and J. Lu, "Comparison of wavelet image coders using the Picture Quality Scale (PQS)."

M. Bhatia, W. C. Karl, and A. S. Willsky, "A Wavelet-Based Method for Multiscale Tomographic Reconstruction."

M. Bhatia, W. C. Karl, and A. S. Willsky, "Using Natural Wavelet Bases and Multiscale Stochastic Models for Tomographic Reconstruction."

M. Louys, J. L. Starck, S. Mei, F. Bonnarel, and F. Murtagh, "Astronomical Image Compression."

M. Louys, J. L. Starck and F. Murtagh, "Lossless Compression of Astronomical Images."

F. Murtagh and J. L. Starck, "Wavelets and Multiscale Transforms in Massive Data Sets."

F. Murtagh and J. L. Starck, "Image Processing through Multiscale Analysis and Measurement Noise Modeling."

J. L. Starck and F. Murtagh, "Multiscale Entropy Filtering."

J. L. Starck and F. Murtagh, "Image Filtering by Combining Multiple Vision Models".

F. Murtagh, "Wedding the Wavelet Transform and Multivariate Data Analysis."

F. Murtagh and J. L. Starck, "Pattern Clustering based on Noise Modeling in Wavelet Space."

G. Zheng, J. L. Starck, J. G. Campbell and F. Murtagh, "Multiscale Transforms for Filtering Financial Data Streams."

M. Morehart, F. Murtagh and J. L. Starck, "Multiresolution Spatial Analysis."

F. Murtagh, J. L. Starck and M. W. Berry, "Overcoming the Curse of Dimensionality in Clustering by means of the Wavelet Transform."

R. A. Carmona, R. D. Frostig and W. L. Hwang, "Wavelet Analysis for Brain Function Imaging."

A. Chambolle, R. A. DeVore, N. Lee, and B. J. Luder, "Nonlinear Wavelet Image Processing: Variational Problems, Compression, and Noise Removal through Wavelet Shrinkage."

H. Chao and P. Fisher, "An Approach of Fast Integer Reversible Wavelet Transforms for Image Compression."

R. A. DeVore and B. J. Lucier, "Fast Wavelet Techniques for Near-Optimal Image Processing"

B. Deng, B. D. Jawerth, G. Peters and W. Sweldens, "Wavelet Probing for Compression Based Segmentation". J. Fan and A. Leine, "An Adaptive Approach for Texture Segmentation by Multi-Channel Wavelet Frames.".

W. T. Freeman and E. P. Simoncelli, "The Steerable Pyramid: A Flexible Architecture for Multi-Scale Derivative Computation" C Source Code (75 k)

A. Grzeszaak, M. K. Mandel, S. Panchanathan and T. Yeap, "VLSI Implementation of Discrete Wavelet Transform."

O. Guleryuz, M. T. Orchard and Z. Xiong, "A DCT-based Embedded Image Coder."

D. M. Healy, Jr., J. Lu and J. B. Weaver, "Contrast Enhancement of Medical Images Using Multiscale Edge Representation."

C. Heil, P. N. Heller, G. Strang, V. Strela, and P. Topiwala, "Accuracy of Lattice Translates of Several Multidimensional Refinable Functions."

C. Herley, M. T. Orchard, K. Ramchandran and Z. Xiong, "Flexible Tree-structured Signal Expansions for Compression Using Time-Varying Filter Banks."

M. L. Hilton, B. D. Jawed and A. Sengupta, "Compressing Still and Moving Images with Wavelets" with figure.

P. Kovesi, "Image Features from Phase Congruency"

B. Lin, "Wavelet Phase Filter for Denoising Tomographic Image Reconstruction"

M. K. Mandel, T. Aboulnasr and S. Panchanathan, "Image Indexing Using Moments and Wavelets."

M. K. Mandel, E. Chan, X. Wang and S. Panchanathan, "Multiresolution Motion Estimation Techniques for Video Compression."

M. K. Mandel, S. Pandianathan and T. Aboulnasr, "Choice of Wavelets for Image Compression."

D. M. Monro and B. G. Sherlock, "Psychovisually Tuned Wavelet Fingerprint Compression".

D. M. Monro and B. G. Sherlock, "Optimised Wavelets for Fingerprint Compression".

P. Moulin, "A Multiscale Relaxation Algorithm for SNR Maximization in 2-D Nonorthogonal Subband Coding."

M. T. Orchard, Z. Xiong and Y. Zhang, "A Simple Deblocking Algorithm for JPEG Compressed Images Using Overcomplete Wavelet Representations."

M. T. Orchard, K. Ramchandran and Z. Xiong, "Wavelet Packets Image Coding Using Space-Frequency Quantization."

M. T. Orchard, K. Ramchandran and Z. Xiong, "Space-frequency Quantization for Wavelet Image Coding."

H. Pan, "Uniform Full-Information Image Matching Using Complex Conjugate Wavelet Pyramids".

H. Pan, "General Stereo Image Matching Using Symmetric Complex Wavelets," Wavelet Applications in Signal and Image Processing, Proc. SPIE VI. Denver August 1996 v. 2825.

P. Schröder and W. Sweldens, "Spherical wavelets: Efficiently representing functions on the sphere." P. Schrtider and W. Sweldens, "Spherical Wavelets: Texture Processing."

J. A. Solomon, J. Villasenor, A. B. Watson and G. Y. Yang, "Visual Thresholds For Wavelet Quantization Error."

V. Strela, P. Heller, G. Strang, P. Topiwala and C. Heil, "The application of multiwavelet filter banks to signal and image processing."

Y. Wang, "Image representations using multiscale differential operators."

Y. Wang and S. L. Lee, "Scale-space derived from 6-splines."
G. Weiss, "Time-Frequency and Time-Scaling Methods in Signal and Image Processing"
M. Wickerhauser, "Picture Compression by Best-Basis Subband Coding."
M. V. Wickerhauser, "High-Resolution Still Picture Compression"
Z. Xiong, "Representation and Coding of Images Using Wavelets."
D. M. Monro and B. G. Sherlock, "Space-Frequency Balance in Biorthogonal Wavelets."
Xuejun Li, "Low Bit Rate Wavelet Image and Video Coding Algorithm and Software."
The FBI Wavelet Fingerprint Compression Standard
J. N. Bradley and C. M. Brislawn, "Proposed First-Generation WSQ Bit Allocation Procedure"
J. N. Bradley and C. M. Brislawn, "The Wavelet/Scalar Quantization Compression Standard for Digital Fingerprint Images."
J. Bradley, C. Brislawn and T. Hopper, "WSQ Gray-Scale Fingerprint Image Compression Specification."
J. Bradley, C. Brislawn and T. Hopper, "The FBI Wavelet/Scalar Quantization Standard for Gray-Scale Fingerprint Image Compression"
C. M. Brislawn, Classification of Nonexpansive Symmetric Extension Transforms for Multirate Filter Banks"
C. M. Brislawn, "Fingerprints Go Digital"
C. M. Brislawn, "Preservation of Subband Symmetry in Multirate Signal Coding."
"The FBI Wavelet/Scalar Quantization Fingerprint Image Compression Standard."
Wavelets and Speech Processing
E. Wesfreid and M. V. Wickerhauser, "Adapted Local Trigonometric Transforms and Speech Processing"
M. Wickerhauser, "Acoustic Signal Compression with Wavelets Packets."
Wavelets and Ordinary Differential Equations
G. Beylkin, "On Wavelet-based Algorithms for Solving Differential Equations."
B Jawerth and W. Sweldens, "Wavelet Multiresolution Analyses Adapted for the Fast Solution of Boundary Value Ordinary Differential Equations."
P. Monasse and V. Perrier, "Ondelettes sur l'Intervalle pour la Prise en Compte de Conditions aux Limites"
A. Rieder, "Semi-Algebraic Multi-level Methods Based on Wavelet Decompositions I: Application to Two-Point Boundary Problems"
W. C. Shann and J. C. Xu, "Galerkin-wavelet Methods for Two Point Boundary Value Problems."
Wavelets and Partial Differential Equations
G. Kaiser, "Complex-Distance Potential Theory and Hyperbolic Equations"
A. Averbudi, G. Beylkin R. R. Coifman and M. Israeli, "Multiscale Inversion of Elliptic Operators."
E. Bury, S. Mallet and G. Papanicolaou, "A Wavelet Based Space-Time Adaptive Numerical Method for Partial Differential Equations"
G. Beylkin and N. Coult, "A Multiresolution Strategy for Reduction of Elliptic PDE's and Eigenvalue Problems"
G. Beylkin and J. H. Keiser, "On the Adaptive Numerical Solution of Nonlinear Partial Differential Equations in Wavelet Bases."
D. M. Bond and S. A. Vavasis, "Fast Wavelet Transforms for Matrices Arising From Boundary Element Methods."
T. Chan, W. Tang and W. Wan.
P. Charton and V. Perrier, "Factorisation sur Bases d'Ondelettes du Noyeau de la Chaleur et Algorithmes Matriciels Rapides Assodes."
P. Charton and V. Perrier, "Towards a Wavelet Based Numerical Scheme for the Two-Dimensional Navier-Stokes Equations."
P. Charton and V. Perrier, "A Pseudo-Wavelet Scheme for the Two-Dimensional Navier-Stokes Equations."
S. Dahlke and A. Kunoth, "Biorthogonal Wavelets and Multigrid."
S. Dahlke and I. Weinreich, "Wavelet-Galerkin Methods: An Adapted Biorthogonal Wavelet Basis."
S. Dahlke and I. Weinreich, "Wavelet Bases Adapted to Pseudo-Differential Operators."
W. Dahmen and A. Kunoth, "Multilevel Preconditioning."
W. Dahmen, A. Kunoth and K. Urban "A Wavelet-Galerkin Method for the Stokes-Equations," also full version with pictures.
R. Glowinski, T. Pan, R. O. Wells, Jr. and X. Zhou, "Wavelet and Finite Element Solutions for the Neumann Problem Using Fictitious Domains"
R. Glowinski, A. Rieder, R. O. Wells, Jr. and X. Zhou, "A Wavelet Multigrid Preconditioner for Dirichlet Boundary Value Problems in General Domains."
R. Glowinski, A. Rieder, R. O. Wells, Jr. and X. Zhou, "A Preconditioned CG-Method for Wavelet-Galerkin Discretizations of Elliptic Problems"
F. Heurtaux, F. Planchon and M. V. Wickerhauser, "Scale Decomposition in Burgers' Equation"
J. H. Keiser, "On I. Wavelet Based Approach to Numerical Solution on Nonlinear Partial Differential Equations and II. Nonlinear Waves in Fully Discrete Dynamical Systems."
A. Kunoth, "Multilevel Preconditioning—Appending Boundary Conditions by Lagrange Multipliers."
G. Leaf and J. M. Restrepo, "Wavelet-Galerkin Discretization of Hyperbolic Equations."
J. Lewalle, "Wavelet Transforms of some Equations of Fluid Mechanics"
J. Lewalle, "Energy Dissipation in the Wavelet-Transformed Navier-Stokes Equations"
J. Lewalle, "On the effect of boundary conditions on the multifractal statistics of incompressible turbulence"
J. Lewalle, "Diffusion is Hamiltonian".
D. Lu, T. Ohyoshi and L. Zhu, "Treatment of Boundary Conditions in the Application of Wavelet-Galerkin Method to a SH Wave Problem"
P. Monasse and V. Perrier, "Orthonormal Wavelet Bases Adapted for Partial Differential Equations with Boundary Conditions."
A. Rieder and X. Zhou, "On the Robustness of the Damped V-Cyde of the Wavelet Frequency Decompositions Multigrid Method"
A. Rieder, R. O. Wells,Jr. and X. Zhou, "A Wavelet Approach to Robust Multilevel Solvers for Anisotropic Elliptic Problems."
A. Rieder, R. O. Wells,Jr. and X. Zhou, "On the Wavelet Frequency Decomposition Method"
K. Urban, "A Wavelet-Galerkin Algorithm for the Driven-Cavity-Stokes-Problem in Two Space Dimensions."
O. V. Vasilyev and S. Paolucci, "A Dynamically Adaptive Multilevel Wavelet Collocation Method for Solving Partial Differential Equations in a Finite Domain."
O. V. Vasilyev and S. Paolucci, "Thermoacoustic Wave Propagation Modeling Using a Dynamically Adaptive Wavelet Collocation Method."

O. V. Vasilyev and S. Paolucci, "A Fast Adaptive Wavelet Collocation Algorithm for Multi-Dimensional PDEs."

O. V. Vasilyev, S. Paolucci and M. Sen, "A Multilevel Wavelet Collocation Method for Solving Partial Differential Equations in a Finite Domain."

O. V. Vasilyev, Y. Y. Podladchikov and D. A. Yuen, "Modeling of Compaction Driven Flow in Poro-Viscoelastic Medium Using Adaptive Wavelet Collocation Method."

O. V. Vasilyev, D. A. Yuen and S. Paolucci, "The Solution of PDEs Using Wavelets."

O. V. Vasilyev, D. A. Yuen and Y. Y. Podladchikov, "Applicability of Wavelet Algorithm for Geophysical Viscoelastic Flow.".

R. O. Wells, Jr. and X. Zhou, "Wavelet Solutions for the Dirichlet Problem"

R. O. Wells, Jr. and X. Zhou, "Wavelet Interpolation and Approximate Solution of Elliptic Partial Differential Equations"

R. O. Wells, Jr. and X. Zhou, "Representing the Geometry of Domains by Wavelets with Applications to Partial Differential Equations"

R. O. Wells, Jr., "Multiscale Applications of Wavelets to Solutions of Partial Differential Equations"

Wavelets and Numerical Analysis

G. Beylkin, R. Coifman and V. Rokhlin, "Fast Wavelet Transforms and Numerical Algorithms I."

G. Beylkin, "On the Representation of Operators in Bases of Compactly Supported Wavelets."

G. Beylkin, "On the Fast Algorithm for Multiplication of Functions in the Wavelet Bases."

G. Beylkin, "Wavelets and Fast Numerical Algorithms." Lecture notes for an AMS short course, 1993.

G. Beylkin, "Wavelets, Multiresolution Analysis and Fast Numerical Algorithms" Draft of INRIA lectures, May 1991.

G. Beylkin and M. E. Brewster, "A Multiresolution Strategy for Numerical Homogenization."

P. Charton and V. Perrier, "Produits Rapides Matrices-Vecteur en Bases d'Ondelettes: Application ala Resolution Numerique d'Equation aux Derivees Partielles."

P. Charton, "Produits de Matrices Rapides en Bases d'Ondelettes: Application ala Resolution Numerique d'Equation aux Derivees Partielles."

N. H. Getz, "A Fast Discrete Periodic Wavelet Transform." An associated toolbox of Matlab routines is also available.

L. Jameson, "On the Spline-Based Wavelet Differentiation Matrix."

L. Jameson, "On the Different ion Matrix for Daubechies-Based Wavelets on an Interval."

L. Jameson, "On the Daubechies-Based Wavelet Differentiation Matrix."

L. Jameson, "On the Wavelet Optimized Finite Difference Method."

E. Kolaczyk, "Wavelet Methods for the Inversion of Certain Homogeneous Linear Operators in the Presence of Noisy Data,"

R. Piessens and W. Sweldens, "Quadrature Formulae and Asymptotic Error Expansion of Wavelet Approximations of Smooth Functions."

R. Piessens and W. Sweldens, "Asymptotic Error Expansion of Wavelet Approximations of Smooth Functions II."

W. C. Shann, "Quadratures Involving Polynomials and Daubechies' Wavelets."

W. Sweldens, "Construction and Application of Wavelets in Numerical Analysis."

M. Wickerhauser, "Nonstandard Matrix Multiplication."

M. V. Wickerhauser, "Computation with Adapted Time-Frequency Atoms"

M. V. Wickerhauser, "Wavelet Approximations to Jacobians and the Inversion of Complicated Maps"

Wavelets and Statistics

F. Abramovich, T. Sapatinas and B. W. Silverman, "Wavelet Thresholding via a Bayesian Approach."

F. Abramovich, T. Sapatinas and B. W. Silverman, "Stodiastic Atomic Decompositions in a Wavelet Dictionary."

F. Abramovich and B. W. Silverman, "The Vaguelette-Wavelet Decomposition Approach to Statistical Inverse Problems."

E. H. Adelson and E. P. Simoncelli, "Noise Removal via Bayesian Wavelet Coring."

A. Antoniadis, G. Gregoire and G. P. Nason, "Density and Hazard Rate Estimation for Right Censored Data using Wavelet Methods."

T. Bailey, T. Sapatinas, K. Powell and W. J. Krzanowski, "Signal Detection in Underwater Sounds using Wavelets."

A. G. Bruce, D. L. Donoho, H. Gao and R. D. Martin, "Denoising and Robust Non-linear Wavelet Analysis."

A. G. Bruce and H. Gao, "WaveShrink: Shrinkage Functions and Thresholds."

A. G. Bruce and H. Gao, "WaveShrink with Semisoft Shrinkage."

A. G. Bruce and H. Gao, "Understanding WaveShrink: Variance and Bias Estimation."

A. G. Bruce, H. Gao and D. Ragozin, "S+WAVELETS: An Object-Oriented Toolkit for Wavelet Analysis."

A. G. Bruce and H. Gao, "S+WAVELETS: Algorithms and Technical Details."

J. Buckheit and D. Donoho, "WaveLab and Reproducible Research."

J. F. Burn, A. M. Wilson and G. P. Nason, "Impact During Equine Locomotion: Techniques for Measurement and Analysis."

R. Coifman and N. Saito, "Local Discriminant Bases."

R. Coifman and F. Majid, "Adapted Waveform Analysis and Denoising."

R. Coifman and D. Donoho, "Translation-Invariant De-Noising."

R. Dahlhaus, M. H. Neumann and R, von Sachs, "Non-linear Wavelet Estimation of Time—Varying Autoregressive Processes."

A. Davis, A. Marshak and W. Wiscombe, "Wavelet-Based Multifractal Analysis of Non-Stationary and/or Intermittent Geophysical Signals.".

B. Deylon and A. Juditsky, "Wavelet Estimators. Global Error Measures Revisited."

D. Donoho, "Nonlinear Solution of Linear Inverse Problems by Wavelet-Vaguelette Decomposition"

D. Donoho, "Smooth Wavelet Decompositions with Blocky Coefficient Kernels"

D. Donoho, "De-noising by Soft Thresholding"

D. Donoho, "Interpolating Wavelet Transforms"

D. Donoho, "Unconditional Bases are Optimal Bases for Data Compression and for Statistical Estimation"

D. Donoho and I. Johnstone, "Adapting to Unknown Smoothness by Wavelet Shrinkage"

D. Donoho and I. Johnstone, "Ideal Spatial Adaptation via Wavelet Shrinkage"

D. Donoho and I. Johnstone, "Minimax Estimation via Wavelet Shrinkage"

D. Donoho and I. Johnstone, "Minimax Risk over I_p Balls"

D. Donoho, I. Johnstone, G. Kerkyacharian and D. Picard, "Density Estimation via Wavelet Shrinkage"

D. Donoho, I. Johnstone, G. Kerkyacharian and D. Picard, "Wavelet Shrinkage: Asymptopia?"

D. Donoho and I. Johnstone, "Ideal Denoising in an Orthonormal Basis Chosen From a Library of Bases."

D. Donoho, S. Mallat and R, von Sachs, "Estimating Covariances of Locally Stationary Processes: Rates of Convergence of Best Basis Methods."

T. Downie and B. W. Silverman, "The Discrete Multiple Wavelet Transform and Thresholding Methods."

H. Y. Gao, "Choice of Thresholds for Wavelet Shrinkage Estimate of the Spectrum."

P. Goel and B. Vidakovic, "Wavelet Transformations as Diversity Enhancers"

P. Hall and G. P. Nason, "On Choosing a Non-integer Resolution Level when Using Wavelet Methods."

I. Johnstone, "Minimax Bayes, Asymptotic Minimax and Sparse Wavelet Priors"

I. M. Johnstone and B. W. Silverman, "Wavelet Threshold Estimators for Data with Correlated Noise."

A. Juditsky, "Wavelet Estimators. Adapting To Unknown Smoothness."

A. Juditsky and F. Leblanc, "Computing Wavelet Density Estimators for Stochastic Processes."

G. Katul and B. Vidakovic "Partitioning eddy motion using Lorentz wavelet filtering."

R. Morgan and G. P. Nason, "Wavelet Shrinkage of Itch Response Satoa."

P. Moulin, "Wavelet Thresholding Techniques for Power Spectrum Estimation."

G. P. Nason and B. W. Silverman, "The Discrete Wavelet Transform in S."

G. P. Nason and B. W. Silverman, "The Stationary Wavelet Transform and some Statistical Applications."

G. P. Nason and B. W. Silverman, "Wavelets for Regression and other Statistical Problems."

G. P. Nason, T. Sapatinas and A. Sawczenko, "Statistical Modelling of Time Series using Non-decimated Wavelet Representations."

G. P. Nason, "Wavelet Regression by Cross-Validation"

G. P. Nason, "Functional Projection Pursuit."

M. H. Neumann and R, von Sachs, "Wavelet Thresholding in Anisotropic Function Classes and Application to Adaptive Estimation of Evolutionary Spectra."

A. B. Owen, "Monte Carlo Variance of Scrambled Equidistribution Quadrature."

D. B. Percival, "On the Estimation of the Wavelet Variance."

A. Pinheiro and B. Vidakovic "Estimating the Square Root of a Density Via Compactly Supported Wavelets"

J. Raz, L. Dickerson and B. Turetsky, "A Wavelet Packet Model of Evoked Potentials."

N. Saito, "Local Feature Extraction and Its Applications Using a Library of Bases."

N. Saito, "Simultaneous Noise Suppression and Signal Compression using a Library of Orthonormal Bases and the Minimum Description Length Criterion."

B. Vidakovic, "A Note on Random Densities via Wavelets"

B. Vidakovic "Nonlinear Wavelet Shrinkage with Bayes Rules and Bayes Factors."

R. von Sachs, G. P. Nason and G. Kroisandt, "Adaptive Estimation of the Evolutionary Wavelet Spectrum."

R. von Sachs and K. Schneider, "Smoothing of Evolutionary Spectra by Non-linear Thresholding." Also available are the figures.

R. von Sachs and M. H. Neumann, "A Wavelet-based Test for Stationarity."

R. von Sachs and B. MacGibbon, "Non-parametric Curve Estimation by Wavelet Thresholding with Locally Stationary Errors."

A. T. Walden, D. B. Percival and E. J. McCoy, "Spectrum Estimation by Wavelet Thresholding of Multitaper Estimators."

Yazhen Wang, "Jump and sharp cusp detection by wavelets."

Yazhen Wang, "Function estimation via wavelet shrinkage for long-memory data."

Yazhen Wang, "Small ball problems via wavelets for Gaussian processes."

Yazhen Wang, "Fractal function estimation via wavelet shrinkage."

Yazhen Wang, "Minimax estimation via wavelets for indirect long-memory data."

Yazhen Wang, "Change curve estimation via wavelets" (with an application to image processing); FIG. 4(a), FIG. 4(b).

Yazhen Wang, "Change-point analysis via wavelets for indirect data."

Yazhen Wang, "Self-similarity index estimation via wavelets for locally self-similar processes" (with Cavanaugh and Song).

M. V. Wickerhauser, "Fast Approximate Factor Analysis."

Wavelets and Econometrics

S. A. Greenblatt, "Wavelets in Economics: An Application to Outlier Testing."

M. J. Jensen, "Wavelet Analysis of Fractionally Integrated Processes."

M. J. Jensen, "OLS Estimate of the Fractional Differencing Parameter Using Wavelets Derived From Smoothing Kernels"

Wavelets and Fractals

A. Davis, A. Marshak and W. Wiscombe, "Wavelet-Based Multifractal Analysis of Non-Stationary and/or Intermittent Geophysical Signals.".

C. Jones, 2-D Wavelet Packet Analysis of Structural Self-Organization and Morphogenic Regulation in Filamentous Fungal Colonies.

J. Lewalle, "Wavelet Transforms of the Navier-Stokes Equations and the Generalized Dimensions of Turbulence"

W. Hwang and S. Mallat, "Characterization of Self-Similar Multifractals with Wavelet Maxima."

Wavelets and Communication Theory

J. Dill and A. R. Lindsey, "Wavelet Packet Modulation: A Generalized Method for Orthogonally Multiplexed Communication."

R. Learned, H. Krim, B. Claus, A. S. Willsky, and W. C. Karl, "Wavelet-Packet-Based Multiple Access Communication."

A. R. Lindsey, "Multidimensional Signaling via Wavelet Packets."

A. R. Lindsey, Generalized Orthogonally Multiplexed Communication via Wavelet Packet Bases, chapter 1, chapter 2, chapter 3, chapter 4, chapter 5, chapter 6. Also with appendix and references.

Wavelets and Computer Graphics

M. Cohen, S. Gortler, P. Hanrahan and P. Schroder, "Wavelet Radiosity." With FIG. 12 and FIG. 14.

M. Cohen, S. Gortler, P. Hanrahan and P. Schroder, "Wavelet Projections for Radiosity."

A. Dreger, M. H. Gross R. Koch and L. Lippert, "A New Method to Approximate the Volume Rendering Equation using Wavelet Bases and Piecewise Polynomials," Technical Report No. 220, Computer Science Department, ETH ZUrich, 1994.

A. Fournier, "Wavelets and their Applications in Computer Graphics." This is 2.5 MB compressed.

M. H. Gross and L. Lippert, "Fast Wavelet Based Volume Rendering by Accumulation of Transparent Texture Maps." With FIG. 6, FIG. 7, FIG. 8, FIG. 9, FIG. 10 and FIG. 11. Also abstract available. Technical Report No. 228, Computer Science Department, ETH ZUrich, 1995.

M. H. Gross and R. Koch, "Visualization of Multidimensional Shape and Texture Features in Laser Range Data using Complex-Valued Gabor Wavelets."

M. H. Gross and L. Lippert, "Ray-tracing of Multiresolution B-Spline Volumes." Also abstract available. Technical Report No. 239, Computer Science Department, ETH ZUrich, 1996.

P. Hanrahan and P. Schroder, "Wavelet Methods for Radiance Computations."

C. Herley, "Exact Interpolation and Iterative Subdivision Schemes."

P. Schröder, W. Sweldens and D. Zorin, "Interpolating Subdivision for Meshes with Arbitrary Topology".

Wavelets and Physics

J. C. van den Berg, ed., "Wavelets in Physics", Cambridge University Press, 1999 (a survey of many applications).

G. Kaiser, "A Detailed Introduction to Mathematical and Physical Wavelets"

C. Best and A. Schafer, "Variational Description of Statistical Field Theories using Daubechies' Wavelets."

G. Beylkin, J. Dunn and D. Gines, "Order N Static and Quasi-Static Computations in Electrodynamics using Wavelets."

J. C. Cohen and T. Chen, "Fundamentals of the Discrete Wavelet Transform for Seismic Data Processing."

A. Fournier, "Wavelet Analysis of Observed Geopotential and Wind: Blocking and Local Energy Coupling Across Scales."

A. Fournier, "Wavelet Multiresolution Analysis of Numerically Simulated 3d Radiative Convection."

A. Fournier, "Wavelet Representation of Lower-Atmospheric Long Nonlinear Wave Dynamics, Governed by the Benjamin-Davis-Ono-Burgers Equation."

F. Herrmann, "A scaling medium representation, a discussion on well-logs, fractals and waves." An abstract is also available.

I. Pierce and L. Watkins, "Modelling optical pulse propagation in nonlinear media using wavelets."

W. C. Shann, "Finite Element Methods for Maxwell's Equations with Stationary Magnetic Fields and Galerkin-wavelet Methods for Two Point Boundary Value Problems;" with separate abstract and table of contents.

L. R. Watkins and Y. R. Zhou, "Modelling Propagation in Optical Fibres using Wavelets."

R. O. Wells, "Adaptive Wave Propagation Modelling."

L. Zubair, "Studies in Turbulence using Wavelet Transforms for Data Compression and Scale-Separation."

A. Fournier, "An introduction to orthonormal wavelet analysis with shift invariance: Application to observed atmospheric-blocking spatial structure", J. Atmos. Sci., 2000/12/1.

A. Fournier, "Atmospheric energetics in the wavelet domain I: Governing equations and interpretation for idealized flows", submitted to J. Atmos. Sci., 2000 (revised).

A. Fournier, "Atmospheric energetics in the wavelet domain II: Time-averaged observed atmospheric blocking", submitted to J. Atmos. Sci., 1999.

A. Fournier, "Atmospheric energetics in the wavelet domain III: Instantaneous transfers between block and local eddies", submitted to J. Atmos. SU., 1999.

Hardware and Software Implementation of Wavelet Transforms

J. Fridman and E. S. Manolakos, "On Linear Space-Time Mapping for the 1-D Discrete Wavelet Transform"

J. Fridman and E. S. Manolakos, "Distributed Memory and Control VLSI Architectures for the 1-D Discrete Wavelet Transform."

J. Lu, "Computation of 2-D Wavelet Transform on the Massively Parallel Computer for Image Processing."

MathSoft Engineering & Education, Inc, "Wavelets Extension Pack", 1999.

O. Nielsen and M. Hegland, "A Scalable Parallel 2D Wavelet Transform Algorithm."

Game Theory References Appendix

GEB: Games and Economic BehaviorEMA: Econometrics JET: Journal of Economic Theory IJGT: International Journal of Game Theory AER: American Economic Review QJE: Quarterly Journal of Economics JPE: Journal of Political Economy REStud: Review of Economic Studies Description of Games Roger Myerson, Nash Equilibrium and the History of Economic Theory. JEL 1999

Rationality, Dominance, Weak Dominance etc.

Douglas Bernheim, Rationalizable strategic behavior. EMA 1984

David Pearce, Rationalizable strategic behavior and the problem of perfection. EMA 1984

Douglas Bernheim, Axiomatic haracterization of rational choice in strategic environments. Scand. J. of E. 1986

Shimoii and Watson, Conditional Dominance, rationalizability and game forms. JET 1998

David Roth, Rationalizable predatory pricing. JET 1996

Basu and Weibul, strategy subsets closed under rational behavior. E. Letters 1991

Larry Samuelson, Dominated strategies and common knowledge. GEB 1992

Marx and Swinkels, Order independence for iterated weak dominance. GEB 1997

Equilibrium: Nash, Refinements, Correlated

Selten, Reexamination of the Perfectness concept for equilibrium points in extensive form games. IJGT 1975.

Myerson, Refinements of the Nash equilibrium concept. IJGT 1975.

Kalai and Samet, Persistent equilibria in strategic games. IJGT 1984.

Kohlberg and Mertens, On the strategic stability of Equilibria. Econometrica, 1986.

Aumann, Correlated equilibria as an expression of baysian rationality. Econometrica, 1987.

Aumann and Brandenberger, Espitemic conditions for equilibrium. EMA 1995

Hal Varian, A model of Sales. AER 1980

The Extensive Form Games with Perfect Information

Rubinstein, On the interpretation of game theory. Econometrica 1991

Reny, Common beleifs and the theory of games with perfect information. JET 1993.

Aumann Backward induction and common knowledge of rationality. GEB 1995

Binmore, A note on backward induction: Aumann, Reply to Binmore. GEB 1996

Selten, A Reexamination of the perfectness.

Hyperbolic Discounting
O'Donoghue and Rabin, Doing it now or doing it later. AER 1999
David Laibson, Golden Eggs and Hyperbolic Discounting. WE 1997
The Economics of Altruism
Gary Becker, A theory of social interactions. JPE 1974
Ted Bergstrom, A fresh look at the rotten kid theorem and other household mysteries. JPE 1989
Bernheim and Stark, Altruism within the family reconsidered: do nice guys finish last. AER 1988
Lindbeck and Weibull, Altruism and time consistency: the economics of fait accompli. JPE 1988
Bruce and Waldman, Transfers in kind: why they can be efficient and non-paternalistic. AER 1991
Jack Robles, Paternal altruism or smart parent altruism? CU WP 98-10
Mathew Rabin, Incorporating fairness into economics and game theory. AER 1993
Ray and Ueda, Egalitarianism and incentives. JET 1996
Bernheim, Shleifer and Summers, The strategic bequest motive. JPE 1985
Extensive Form Games without Perfect Information
Kreps and Wilson, Sequential Equilibrium. Econometrica, 1983.
Van Damme, Stable Equilibria and forward induction. JET 1989.
Strategic Information Transmission
Crawford and Sobel, Strategic information transmission. Econometrica 1982.
Cho and Kreps, Signalling games and stable equilibria. WE 1987
Mailath, Okuno-Fuiiwara and Postlewaite, Belief based refinements in signalling games. JET 1993
Milgrom, Roberts, Limit pricing and entry under incomplete information: an equilibrium analysis. EMA 1982 (pages 443-459)
Cho and Sobel, Strategic Stability and uniqueness in signalling games. JET 1990.
Farrell, Meaning and credibility in cheap talk games. GEB
Milgrom and Roberts, Limit pricing and entry under incomplete information, an equilibrium analysis, EMA 1982
Milgrom, Good news and bad news, representation and applications, Rand.
Folk Theorems for Repeated Games
Dilip Abreu. On the theory of infinitely repeated games with Discounting. Econometrica 1988
Benoit and Krishna. Finitely Repeated games. Econometrica, 1985.
James Friedman. A noncooperative equilibrium for supergames. REStud 1971.
James Friedman. Cooperative equilibria in finite horizon supergames. JET 1985.
Fudenberg, Maskins. The Folk Theorem in repeated games with discounting or with incomplete information. Economet. 1986.
Roy Radner. Collusive Behavior in non-cooperative epsilon equilibria in oligopolies with long but finite lives. JET 1980.
Ariel Rubinstein. Equilibrium in supergames with the overtaking criterion. JET 1977.
Renegotiation
Benoit and Krisna, Renegotiation in finitely repeated games. EMA 1993
Bergin and MacCleod, Efficiency and renegotiation in repeated games. JET 1993
Andreas Blume, Interplay communication in repeated games. GEB 1994
Geir Asheim, Extending renegotiation proofness to infinite horizon games. GEB 1991
Bernheim and Ray, Collective dynamic onsistemy in repeated games. GEB 1989
Farrel and Maskin, Renegotiation in Repeated Games. GEB 1989
Cooperative Game Theory
Freidman, Game theory with applications to economics chapter 6 and 7
Nash, The Bargaining problem. EMA 1950
Kalai and Smordinski, Other Solutions to Nash's problem. EMA 1975
Noncooperative Bargaining
Rubinstein, Perfect equiibrium in a bargaining model. EMA 1982
Joel Watson, Alternating offer bargaining with two sided incomplete information. REStud 1999
Reputation
Kreps, Milgrom, Roberts and Wilson, Reputation and imperfect information: predation, reputation and entry deterrence: rational cooperation in the finitely repeated prisoner's dilemna. JET 1981
Aumann and Sorin, Cooperation and Bounded recal. GEB 1989
Schmidt, Reputation and equilibrium characterization in repeated games with conflicting interests, Economet. 1993, 325-352
Cripps and Thomas, Reputation and Commitment in Two person games without discounting, EMA, 1995, 1401-1420
Joel Watson, A reputation refinement without equilibrium, EMA 1993, 199-206
Celentani, Fudenberg and Levine, Maintaining a reputation against a long lived opponent EMA 1996, 691-704
Evolutionary Game Theory
Vince Crawford, An Evolutionary interpretation of VHBB's experimental results on coordination. GEB 1991
Gilboa and Matsui, Social Stability and Equilibrium, E M A 1991
Kandori, Mailath and Rob, Learning, Mutation, and Long Run Equilibria in games, EMA 1993.
Peyton Young, An Evolutionary Model of Bargaining, J E T 1993
Peyton Young, The Evolution of Conventions, E M A 1993
Larry Samuelson, Stochastic Stability with alternative best replies. JET
Noldeke and Samuelson, The Evolution of Backwards and Forwards Induction, GEB 1993
Jack Robles, An Evolutionary Folk Theorem For Finitely Repeated Games CU WP 99-
Kim and Sobel, An Evolutionary Approach to Preplay Communication EMA 1995
General Game Theory
Bierman H. S. & Fernandez L., Game Theory with Economic Applications, Addison-Wesley, 1993.
Dixit & Nalebuff, Thinking Strategically: the Competitive Edge in Business, Politics, and Everyday Life, New York: Norton, 1991. McMillan J., Games, Strategies, and Managers, Oxford: OUP, 1992.
Baird D. G., Gertner R. H., and Picker R. C., Game Theory and the Law, Harvard U. P., 1994.
Rasmusen E., Games and Information: An Introduction to Game Theory, Oxford: B. Blackwell, 2nd edition, 1994.
Ghemawat P., Games Businesses Play: Cases and Models, New York: Wiley, 1995.

Gardner R., Games for Business and Economics, New York: Wiley, 1995.

Strategic Decision Making

Dixit & Nalebuff, Intro; Ch2 Anticipating your rival's response;

Ch3 Seeing through your rival's response.

Barnett, F. W. Making game theory work in practice, Wall Street Journal, 1995.

Bierman & Fernandez, Ch5 Nash equilibrium I, Ch11 Nash equilibrium II

O'Neill B., International escalation and the dollar auction, Journal of Conflict Resolution, 1986.

Schelling T. C., Ch7 Hockey helmets, daylight saving, and other binary choices, in his Micromotives and Macrobehavior, NY: Norton, 1978.

Marks R. E., Competition and common property, 1998.

McMillan J., Ch3 Understanding cooperation and conflict.

McAfee R. P. & J. McMillan, Competition and game theory, Journal of Marketing Research, 1996.

Baird, Gertner, & Picker, Ch1 Simultaneous decision-making and the normal form game.

Gardner, Ch1 Introduction, Ch2 Two-person games, Ch16 Voting games.

Rasmusen, Ch1 The rules of the game.

Schelling, What is game theory? in his Choice and Consequence: Perspectives of an Errant Economist, Camb.: Harvard UP, 1980.

Decision Analysis—Games Against Nature

Apocalpse maybe, and An insurer's worst nightmare, The Economist, 1995/96

Bierman & Fernandez, Chs 1-3.

Ulvila J. W. & R. Brown, Decision analysis comes of age, Harvard Business Review 1982.

Howard R. A., Decision analysis: practice and promise, Management Science, 1988.

Clemen R. T., Making Hard Decisions: An Introduction to Decision Analysis, Belmont, Calif. Duxbury, 1996.

Samson D., Chs 2-6, 11, Managerial Decision Analysis, Chicago: R. D. Irwin, 1988.

Strategic Moves

Dixit & Nalebuff, Ch5 Strategic moves.

Brams S J. & J. M. Togman, Cooperation through threats: the Northern Ireland case, PS: Political Science & Politics, March 1998.

Gardner, Ch4 n-person games, Ch5 Non-cooperative games.

Colman A. M., Ch8 Multi-person games: social dilemmas, in his Game Theory and Exper. Games, Oxford: Pergamon, 1982.

Kay J., Ch3 Co-operation and Co-ordination, in his Foundations of Corporate Success: How Business Strategies Add Value, Oxford: OUP, 1993.

Brams S J., Ch1 International relations games, in Game Theory and Politics, NY: Macmillan, 1975.

Credible Commitment

Dixit & Nalebuff, Ch6 Credible commitments.

Bierman & Fernandez, Ch23 Subgame-perfect equilibrium

Rasmusen, Ch4.1 Subgame perfection.

Gardner, Ch6 Credibility and subgame perfection.

Ghemawat, Ch3 Preemptive capacity expansion in the titanium dioxide industry.

Repetition and Reputation

Dixit & Nalebuff, Ch4 Resolving the Prisoner's Dilemma; Ch9 Cooperation and coordination.

Nowak, M., R. May, & K. Sigmund, The arithmetic of mutual help, Scientific American, 1995

Hofstadter D., Ch29 The Prisoner's Dilemma computer tournaments and the evolution of cooperation, in his Metamagical Themas, Penguin, 1985.

Marks R. E., Midgley F D. F., & Cooper L. G., Adaptive behaviour in an oligopoly, in Evolutionary Algorithms in Management Applications, ed. by J. Biethahn & V. Nissen, (Bedin: Springer-Verlag), 1995.

Baird Gertner & Picker, Ch2 Dynamic interaction and the extensive-form game, Ch5 Reputation and repeated games.

Gardner, Ch7 Repeated games, Ch8 Evolutionary stability and bounded rationality.

Rasmusen, Ch4 Dynamic games and symmetric information, Ch5 Reputation and repeated games with symmetric information.

Unpredictability

Dixit & Nalebuff, Ch7 Unpredictability; Ch8 Brinkmanship.

Bierman & Fernandez, Ch11.9

Gardner, Ch3 Mixed strategies.

Rasmusen, Ch3 Mixed and continuous strategies.

Bargaining

Dixit & Nalebuff, Ch10 The voting strategy; Ch11 Bargaining.

McMillan, Ch5 Gaining bargaining power; Ch6 Using information strategically.

Elster J., Ch14 Bargaining, in Nuts and Bolts for the Social Sciences, Camb.: CUP, 1989

Murnighan J. K., Game's End, Chapter 15 in his: Bargaining Games: A New Approach to Strategic Thinking in Negotiations, NY: William Morrow, 1992.

Bierman & Fernandez, Ch6 Bargaining.

Schelling T. C., Ch2 Essay on bargaining, in The Strategy of Conflict, Camb.: Harvard UP, 1980.

Baird Gertner & Picker, Ch7 Noncooperative bargaining

Gardner, Ch12 Two-person bargains. Ch14 n-person bargaining and the core.

Rasmusen, Ch11 Bargaining.

Brams S J., Negotiation Games: Applying Game Theory to Bargaining and Arbitration, NY: Routledge, 1990.

Using Information Strategically

McMillan, Ch6 Using information strategically

Bierman & Fernandez, Ch17 Bayesian equilibrium, Ch19 Adverse selection and credit rationing Rasmusen, Ch2 Information P-13

Baird Gertner & Picker, Ch4 Signalling, screening, and nonverifiable information Gardner, Ch9 Signaling games.

Bidding in Competition

Revenge of the nerds, It's only a game, and Learning to play the game, The Economist, 1994

Landsburg S. E., Cursed winners and glum losers, Ch18 of his The Armchair Economist: Economics and Everyday Life, New York: The Free Press, 1993.

Norton, R., Winning the game of business, Fortune, 1995,

Koselka, R., Playing poker with Craig McCaw, Forbes, 1995,

Dixit & Nalebuff, Ch12 Incentives.

McMillan, Ch11 Bidding in competition

McAfee R. P. & J. McMillan, Analyzing the airwaves auction, Journal of Economic Perspectives, 1996

R. Marks, Closed tender vs. open bidding auctions, Dec. 22, 1994.
The Economist, Secrets and the prize, 12 Oct. 1996, p. 98.
Scientific American, Making honesty pay, January 1997, p. 13.
Gardner, Ch11 Auctions.
Brams S J. & A. D. Taylor, Fair division by auctions, Ch9 of their Fair Division: From Cake-Cuffing to Dispute Resolution, Cambridge: CUP, 1996.
Rasmusen, Ch12 Auctions.
Contracting, or the Rules of the Game
Kay, Ch4 Relationships and contracts.
Dixit & Nalebuff, Ch12 Incentives.
McMillan, Ch8 Creating incentives; Ch9 Designing contracts; Ch10 Setting executives' salaries.
Williamson O. E., Strategizing, economizing, and economic organization, Strategic Management Journal, 1991.
Bierman & Fernandez, Chi Involuntary unemployment.
Gardner, Ch10 Games between a principal and an agent.
Milgrom P. & Roberts J., Ch5 Bounded rationality and private information; Ch6 Moral hazard and performance incentives. Economics, Organization and Management, Englewood Cliffs: Prentice-Hall, 1992.
Choosing the Right Game: Co-Opetition
Brandenburger A. M. & B J. Nalebuff, The right game: using Game Theory to shape strategy, Harvard Business Review, 1995 mayet.som.yale.edu/coopetition/index2.html
Koselka R., Businessman's dilemma, and Evolutionary economics: nice guys don't finish last, Forbes, Oct. 11, 1993.
Brandenburger A. M. & B J. Nalebuff, Co-opetition: 1. A revolutionary mindset that combines competition and cooperation; 2. The Game Theory Strategy that's changing the game of business. New York: Currency Doubleday, 1996.
Brandenburger A. M. & Harborne W. S. Jr., Value-based business strategy, J. Economics and Management Strategy, 5(1), 1996.
Baird Gertner & Picker, Ch6 Collective action, embedded games, and the limits of simple models.
Morrow J. D., Game Theory for Political Scientists, Princeton: P.U.P., 1994.
Casson M., The Economics of Business Culture: Game Theory, Transaction Costs and Economic Performance, Oxford: OUP, 1991.
Schelling T. C., Altruism, meanness, and other potentially strategic behaviors, Am. Economic Rev 68(2): 229-231, May 1978.
Crawford, Schelling and the analysis of strategic behavior, in Strategy and Choice, ed. by RJ. Zedchauser, MIT Press, 1991.
For a history of game theory since Old Testament times, point your browser at the following URL:
www.canterbury.ac.nz/econ/hist.htm
www.pit.edu/~alroth/alroth.html
Eddie Dekel, Drew Fudenberg and David K. Levine, Learning to Play Bayesian Games (Jun. 20, 2001), www.gametheory.net/html/lectures.html
Drew Fudenberg and David K. Levine, The Nash Threats Folk Theorem With Communication and Approximate Common Knowledge in Two Player Games (Jun. 10, 2002).

Game Theory and Ad Hoc Networks References Appendix

E. Altman, R. El Azouzi, and T. Jimenez. Slotted aloha as a stochastic game with partial information. In Proc. WiOpt'03, 2003.
A Archer and E Tardos. Truthful mechanisms for one-parameter agents. In Proc. 42nd IEEE Symp. On Foundations of Computer Science, 2001.
N. Ben Salem, L. Bunyan, J.P. Hubaux, and Jakobsson M. A charging and rewarding scheme for packet forwarding. In Proceeding of Mobihoc, June 2003.
L. Blazevic, L. Bunyan, S. Capkun, S. Giordiano, J.-P. Hubaux, and J.-Y. Le Boudec. Self-organization in mobile ad-hoc networks: the approach of terminodes. IEEE Communications Magazine, 39(6):166-174, June 2001.
G. E. Bolton and A. Ockenfels. ERC: A theory of equity, reciprocity and competition. The American Economic Review, 90:166-193, March 2000.
A. Bovopoulos and A. Lazar. Asynchronous iterative algorithms for optimal load balancing. In Proceedings of the 22nd Annual Conference on Information Sciences and Systems, pages 1051-1057, 1988.
Felix Brandt and Gerhard Weiß. Antisocial Agents and Vickrey Auctions. In Pre-proceedings of the Eighth International Workshop on Agent Theories, Architectures, and Languages (ATAL-2001), pages 120-132, 2001.
Felix Brandt. A Verifiable, Bidder-Resolved Auction Protocol. In Proceedings of the 5th International Workshop on Deception, Fraud and Trust in Agent Societies, pages 18-25, 2002.
S. Buchegger and J. Le Boudec. Performance analysis of the CONFIDANT protocol. In Proceedings of IEEE/ACM-Workshop on Mobile Ad Hoc Networking and Computing (MobiHOC),June 2002.
R. Buyya, H. Stockinger, J. Giddy, and D. Abramson. Economic Models for Management of Resources in Peer-to-Peer and Grid Computing. In Proceedings of the SPIE International Symposium on The Convergence of Information Technologies and Communications (ITCOM), August 2001.
M. Castro, P. Druschel, A. Ganesh, A. Rowstron, and D. S. Wallach. Security for structured peer-to-peer overlay networks. In Proc. 5th Symposium on Operating Systems Design and Implementation, Boston, Mass., December 2002.
Clarke, E. H. (1971). Multipart pricing of public goods, Public Choice 11, 17-33.
T. Clausen and P. Jacquet. Optimized link state routing protocol. October 2003. hipercom.inria.fr/olsr/S.
S. Corson and J. Mather. Mobile ad hoc networking (MANET): Routing protocol performance issues and evaluation considerations. Request for comments 2501, Internet Engineering Task Force, 1999, www.rfc-editor.org/
J. Crowcroft, R. Gibbens, F. Kelly, and S. Östring. Modelling incentives for collaboration in mobile ad hoc networks. In Proceedings of WiOpt'03, 2003.
Dasgupta, P., P. Hammond, and E. Maskin (1979). The implementation of social choice rules, Rev. Economic Studies 46, 185-216.
Deering, S., D. Estrin, D. Farinacci, V. Jacobson, C. Liu, and L. Wei (1996). The PIM architecture for wide-area multicast routing, ACM/IEEE Transactions on Networking 54, 153-162.
A. Demers, S. Keshav, and S. Shenker. Analysis and simulation of a fair queueing algorithm. In SIGCOMM '89, Proceedings of the ACM Symposium on Communications Architectures & Protocols, pages 1-12, 1989.
C. Douligeris and R. Mazumdar. User optimal flow control in an integrated environment. In Proceedings of the Indo-US Workshop on Signals and Systems, 1988.

Joan Feigenbaum, Christos H Papadimitriou, and Scoff Shenker. Sharing the cost of multicast transmissions. Journal of Computer and System Sciences, 63:21-41, 2001.

Feigenbaum, Joan, Christos Papadimitriou, Rahul Sami, and Scoff Shenker (2002). "A BGP-based Mechanism for Lowest-Cost Routing." In Proc. 21st Symposium on Principles of Distributed Computing, ACM Press, 173-182.

J. Feigenbaum and S. Shenker. Distributed algorithmic mechanism design: Recent results and future directions. In Proc. 6th Int'l Workshop on Discrete Algorithms and Methods for Mobile Computing and Communications, pages 1-13, Atlanta, Ga., September 2002.

T. Fent, G. Feichtinger, and G. Tragler. A dynamic game of offending and law enforcement. Int. Game Theory Rev., 4(471-89, 2002.

Ferguson, D., C. Nikolaou, and Y. Yemini (1989). An economy for flow control in computer networks, in "Proceedings of the 8th Infocom," pp. 100-118, IEEE Computer Society Press, Los Alamitos.

S. Floyd and K. Fall. Promoting the use of end-to-end congestion control. IEEE/ACM Trans. Networking, 7(4): 458-472, August 1999.

E. Friedman and D. Parkes, "Pricing WiFi at Starbucks—Issues in Online Mechanism Design", In Proc. Fourth ACM Conf. on Elec. Commerce (EC'03), 2003. Extended version at www.eecs.harvard.edu/econcs/pubs/online.pdf. citeseer.nj.neccom/article/friedman03pricing.html Friedman, E., and S. Shenker (1997). "Learning and Implementation in the Internet," preprint, www.aciri.org/shenker/decent.ps A. C. Fuqua, T-W Ngan, and D. S. Wallach, "Economic Behavior of Peer-to-Peer Storage Networks", Workshop on Economics of Peer-to-Peer Systems, Berkeley, Calif., 2003, citeseer.nj.nec.com/fuqua03economic.html Goldberg, A. V., J. D. Hartline, and A. Wright (1999). "Competitive Auctions and Digital Goods," InterTrust Technical Report 99-01. Available at www.intertrust.com/star/tr/tr-99-01.html A. Goldsmith and S.Wicker. Design challenges for energy-constrained ad hoc wireless networks. IEEE Wireless Communications, 9(4):8-27, 2002.

P. Golle, K. Leyton-Brown, I. Mironov, and M. Lillibridge. Incentives for sharing in peer-to-peer networks. In Proc. 3rd ACM Conf. on Electronic Commerce, Tampa, Fla., October 2001.

Z. Haas. A new routing protocol for reconfigurable wireless networks. In IEEE 6th International Conference on Universal Communications Record, volume 2, pages 562-566, October 1997.

Garrett Hardin. The Tragedy of the Commons. Science, 162:1243-1248, 1968. Alternate Location: dieoff.com/page95.htm.

Michael Harkavy, J. D. Tygar, and Hiroaki Kikuchi. Electronic Auctions with Private Bids. In 3rd USENIX Workshop on Electronic Commerce, pages 61-74, September 1998.

X. Hong, K. Xu, and M. Gerla. Scalable routing protocols for mobile ad hoc networks. IEEE Networks, 16(4):11-21, July 2002.

M.-T. Hsiao and A. Lazar. Optimal decentralized flow control of markovian queueing networks with multiple controllers. Performance Evaluation, 13(3):181-204, 1991.

Jackson, M. O., and Asher Wolinsky (1996). "A Strategic Model of Social and Economic Networks." J. Economic Theory 71, 44-74.

M. Jakobsson, J. P. Hubaux, and L. Huttyan. A micropayment scheme encouraging collaboration in multi-hop cellular networks. In Proceedings of Financial Crypto 2003, January 2003.

Y. Jin and G. Kesidis. Equilibria of a noncooperative game for heterogenous users of an ALOHA network. IEEE Communications Letters, 6(7):282-284, July 2002.

D. Johnson, D. Maltz, and Y.-C. Hu. The dynamic source routing protocol for mobile ad hoc networks, April 2003. www.ietf.org/internet-drafts/draft-ietf-manet-dsr-09.txt Johnson, D. S., M. Minko_, and S. Phillips (2000). The prize collecting Steiner tree problem: theory and practice, in "Proceedings of the 11th Symposium on Discrete Algorithms;" pp. 760-769, ACM Press/SIAM, New York/Philadelphia.

Y. Korilis and A. Lazar. On the existence of equilibria in noncooperative optimal flow control. J ACM, 42(3)584-613, 1995.

Korilis, Y., A. A. Lazar, and A. Orda (1995). Architecting noncooperative networks, J. Sel. Areas in Comm 13, 1241-1251.

R. La and V. Anantharam. Charge-sensitive tcp and rate control in the internet. In Proceedings of INFOCOM 2000, 2000.

R. La and V. Anantharam. Optimal routing control: Repeated game approach. IEEE Transactions on Automatic Control, 47(3):437-450, 2002.

Ron Lavi and Noam Nisan. Competitive analysis of incentive compatible on-line auctions. In Proc. 2nd ACM Conf. on Electronic Commerce (EC-00), 2000.

S.-J. Lee, W. Su, J. Hsu, M. Gerla, and R. Bagrodia. A performance comparison study of ad hoc wireless multicast protocols. In Proceedings of IEEE INFOCOM 2000, pages 565-574, March 2000.

A. Legout and E. W. Biersack. Revisiting the fair queueing paradigm for end-to-end congestion control. IEEE Network Magazine, 16(5):38-46, September 2002.

A. B. MacKenzie and S. B. Wicker. Selfish users in aloha: A game-theoretic approach. In Vehicular Technology Conference, 2001. VTC 2001 Fall. IEEE VTS 54th, volume 3, October 2001.

J. MacKie-Mason and H. Varian. Pricing congestible network resources. IEEE Journal on Selected Areas in Communications, 13(7):1141-1149, 1995.

P. Marbach. Priority service and max-min fairness. In Proceedings of IEEE INFOCOM 2002, volume 1, pages 266-275, 2002.

S. Marti, T. J. Giuli, K. Lai, and M. Baker. Mitigating routing misbehavior in mobile ad hoc networks. In Proceedings of MOBICOM 2000, August 2000.

K. Mase, Y. Wada, N. Mori, K. Nakano, M. Sengoku, and S. Shinoda. Flooding schemes for a universal ad hoc network. In Industrial Electronics Society, 2000. IECON 2000, volume 2, pages 1129-1134, 2000.

R. Mazumdar, L. Mason, and C. Douligeris. Fairness in network optimal flow control: Optimality of product forms. IEEE Transactions on Communications, 39(5): 775-782, 1991.

P. Michiardi and R. Molva. Core: A collaborative reputation mechanism to enforce node cooperation in mobile ad hoc networks. In Communication and Multimedia Security 2002 Conference, 2002.

P. Michiardi and R. Molva. Game theoretic analysis of security in mobile ad hoc networks. Technical Report RR-02-070, Institut Eurecom, 2002.

P. Michiardi and R. Molva. A game theoretical approach to evaluate cooperation enforcement mechanisms in mobile ad hoc networks. In Proceedings of WiOpt'03, March 2003.

Dov Monderer and Moshe Tennenholtz. Distributed Games: From Mechanisms to Protocols. In Proceedings of the 16th National Conference on Artificial Intelligence PAD, pages 32-37, 1999.

Moulin, H. (1999). Incremental cost sharing; characterization by strategyproofness, Social Choice and Welfare 16, 279-320.

Moulin, H. and S. Shenker (1997). Strategyproof Sharing of Submodular Costs: Budget Balance Versus Efficiency, to appear in Economic Theory, www.aciri.org/shenker/cost.ps Moulin, Hervé, and Scoff Shenker (2001). "Strategyproof Sharing of Submodular Costs: Budget Balance versus Efficiency." Economic Theory 18, 511-533.

J. B. Nagle. On packet switches with infinite storage. IEEE Transactions on Communications, 35(4):435-438, April 1987.

J. F. Nash. Non-cooperative games. Annals of Mathematics, 54(2):286-295, September 1951.

T.-W. J. Ngan, D. S.Wallach, and P. Druschel. Enforcing fair sharing of peer-to-peer resources. In Proc. 2nd Intl Workshop on Peer-to-Peer Systems, Berkeley, Calif., February 2003.

Noam Nisan and Amir Ronen. Algorithmic mechanism design. Games and Economic Behavior, 35:166-196, 2001.

Nisan, N. (1999). Algorithms for selfish agents, in "Proceedings of the 16th Symposium on Theoretical Aspects of Computer Science," pp. 1-17, Springer-Verlag, Berlin. Lecture Notes in Computer Science, Vol. 1563.

Nisan, N. and A. Ronen (2000). Computationally Feasible VCG Mechanisms, to be presented at "Games 2000." www.cs.huji.ac.il/~noam/vcgbased.ps Noam Nisan and Amir Ronen. Algorithmic Mechanism Design. In Proceedings of the 31st ACM Symposium on Theory of Computing, pages 129-140, 1999.

Osborne, M.-J. and A. Rubinstein (1994). "A Course in Game Theory," MIT Press, Cambridge Mass.

R. Ogier, F. Templin, and M. Lewis. Topology dissemination based on reverse-path forwarding, October 2003. vesuvio.ipv6.cselt.it/internet-drafts/draft-ietf-manet-tbrpf-11.txt E. Ogston and S. Vassiliadis. A Peer-to-Peer Agent Auction. In Proceedings of the First International Joint Conference on Autonomous Agents and Multi-Agent Systems (AAMAS), 2002.

A. Orda, R. Rom, and N. Shimkin. Competitive routing in multi-user communication networks. IEEE/ACM Transactions on Networking, 1(5)610-521, October 1993.

M. J. Osborne and A. Rubinstein. A Course in Game Theory. MIT Press, Cambridge, 1994.

C. Papadimitriou. Algorithms, games, and the internet. In Proc. 33rd ACM Symposium on Theory of Computing, pages 1-5, Hersonissos, Crete, Greece, July 2001.

D. C. Parkes. Iterative Combinatorial Auctions: Achieving Economic and Computational Efficiency (Chapter 2). PhD thesis, University of Pennsylvania, May 2001, www.em.harvard.edu/~parkes/pubs/ch2.ps.

W. Peng, X.-C. Lu. On the reduction of broadcast redundancy in mobile ad hoc networks. In Mobile and Ad Hoc Networking and Computing, 2000. MobiHOC., pages 129-130, 2000.

C. Perkins, E. Belding-Royer, and S. Das. Ad hoc on-demand distance vector (AODV) routing. Request for comments 3561, Internet Engineering Task Force, 2003.

C. E. Perkins, editor. Ad Hoc Networking. Addison-Wesley, Boston, 2001.

Adrian Perrig, Sean Smith, Dawn Song, and J. Doug Tygar. SAM: A Flexible and Secure Auction Architecture Using Trusted Hardware, 1991. citeseer.nj.neccom/perrig9lsam.html V. Rodoplu and H.-Y. Meng. Minimum energy mobile wireless networks. IEEE Journal on Selected Areas in Communications, 17(8):1333-1344, August 1999.

A. Rowstron and P. Druschel. Pastry: Scalable, distributed object address and routing for large-scale peer-to-peer systems. In Proc. IFIP/ACM Intl Conf. on Distributed Systems Platforms, pages 329-350, Heidelberg, Germany, November 2001.

A. Rowstron and P. Druschel. Storage management and caching in PAST, a large-scale, persistent peer-to-peer storage utility. In Proc. 18th ACM Symposium on Operating Systems Principles, pages 188-201, Chateau Lake Louise, Banff, Canada, October 2001.

E. Royer and C.-K. Toh. A review of current routing protocols for ad hoc mobile wireless networks. IEEE Personal Communications, 6(2):46-55, April 1999.

T. Sandholm. Distributed rational decision making. In G. Weiß, editor, Multiagent Systems: A Modern Approach to Distributed Artificial Intelligence, chapter 5. The MIT Press, 1999.

Tuomas Sandholm. Limitations of the Vickrey Auction in Computational Multiagent Systems. In Proceedings of the 2nd International Conference on Multi-Agent Systems (ICMAS). AAAI Press, 1996. Menlo Park, Calif.

S. Shenker. Making greed work in networks: A game-theoretic analysis of switch service disciplines. IEEE/ACM Transactions on Networking, 3(6):819-831, December 1995.

S. Singh, M. Woo, and C. S. Raghavendra. Power-aware routing in mobile ad hoc networks. In Proceeding of MOBICOM 1998, pages 181-190, 1998.

Shapley, L. S. (1953). A value for n-person games, in "Contributions to the Theory of Games," pp. 31-40, Princeton Press.

Sharman Networks. Kazaa Guide: Supernode FAQ, 2003, www.kazaa.com/us/help/faq/supernodes.htm.

J. Shneidman and D. Parkes, "Rationality and Self-Interest in Peer to Peer Networks", In Proc. 2nd Int. Workshop on Peer-to-Peer Systems (IPTPS'03), 2003, citeseer.nj.nec.com/shneidman03rationality.html Jeffrey Shneidman and David C. Parkes. Using Redundancy to Improve Robustness of Distributed Mechanism Implementations, 2003. Working Paper. Poster version to appear at ACM Conference on Electronic Commerce EC'03.

V. Srinivasan, P. Nuggehalli, C. Chiasserini, and R. Rao. Cooperation in wireless ad hoc networks. In Proceedings of INFOCOM 2003, volume 2, pages 808-817, 2003.

A. Urpi, M. Bonuccelli, and S. Giordano. Modelling cooperation in mobile ad hoc networks: a formal description of selfishness. In Proceedings of WiOpt'03, March 2003.

A. van den Nouweland, P. Borm, W. van Golstein Brouwers, R. Groot Bruinderink, and S. TO. A game theoretic approach to problems in telecommunication. Management Science, 42(2):294-303, February 1996.

H. R. Varian. Mechanism design for computerized agents. In Proc. First Usenix Workshop on Electronic Commerce, N Y 1995

Vickrey, W. (1961). Counter-speculation, auctions, and competitive sealed tenders, Journal of Finance 16, 8-37.

Walsh, W. and M. Wellman (1998). A market protocol for decentralized task allocation, in "Proceedings of the Third International Conference on Multi-Agent Systems," pp. 325-332, IEEE Computer Society Press, Los Alamitos.

J. E. Wieselthier, G. D. Nguyen, and A. Ephremides. Algorithms for energy-efficient multicasting in static ad hoc wireless networks. Mobile Networks and Applications, 6:251-263, 2001.

C. Jason Woodard and David C. Parkes, 1st Workshop on the Economics of P2P systems, Strategyproof Mechanisms for Ad Hoc Network Formation, 2003, citeseer.nj.nec.com/woodard03strategyproof.html, www.sims.berkeley.edu/research/conferences/p2pecon/papers/s6-woodard.pdf Z. Zhang and C. Douligeris. Convergence of synchronous and asynchronous greedy algorithms in a multiclass telecommunications environment. IEEE Transactions on Communications, 40(8):1277-1281, 1992.

Urs Anliker,Jan Beutel, Matthias Dyer, Rolf Enzler, Paul Lukowia, Lothar Thiele, Gerhard Troester [AnlikerB-DELTT:03] A Systematic Approach to the Design of Distributed Wearable Systems IEEE Transactions on Computers Samuel Bendahan, Giovanni Camponovo,Yves Pigneur [BendahanCP:03] Multi-issue actor analysis: tools and models for assessing technology environments Journal of Decision Systems Asian Tchamkerten [Tchamkerten:03] On the Discreteness of Capacity-Achieving Distributions IEEE Trans on Information Theory Stephan ten Brink, Asian Tchamkerten [BrinkT:03] Capacity of the Binary Input Rayleigh Channel with Perfect Side Information IEEE Transactions on Communications L. Buttyan, J.-P. Hubaux and S. Capkun [ButtyanHC:03] A Formal Model of Rational Exchange and its Application to the Analysis of Syverson's Protocol Journal of Computer Security Marc Heissenbüttel, Torsten Braun, Thomas Bernoulli, and Markus Waelchli [HeissenbueffelB:04a] BLR: Beacon-Less Routing Algorithm for Mobile Ad-Hoc Networks Elsevier's Computer Communications Journal Olivier Dousse, Francois Baccelli, Patrick Thiran [DousseBT:03a] Impact of Interferences on Connectivity in Ad Hoc Networks IEEE/ACM Transactions on Networking Mario Cagali, Jean-Pierre Hubaux and Christian Enz [CagaliHE:03] Energy-efficient Broadcasting in All-wireless Networks ACM Mobile Networks and Applications (MONET)

Irena Maravic, Martin Vefferli [MaravicV:04a] Exact Sampling Results for Some Classes of Parametric Non-Bandlimited 2-D Signals IEEE Transactions on Signal Processing, Volume 52, Issue 1,January 2004

Christian Plessl, Rolf Enzler, Herbert Walder, Jan Beutel, Marco Plattner, Lothar Thiele and Gerhard Troester [PlessIEWBPTT:03] The Case for Reconfigurable Hardware in Wearable Computing Personal and Ubiquitous Computing, Springer-Verlag, Vol. 7, No. 5, pages 299-308, October 2003

L. Bunyan, J P. Hubaux [ButtyanH:03a] Stimulating Cooperation in Self-Organizing Mobile Ad Hoc Networks ACM/Kluwer Mobile Networks and Applications, Vol. 8, No. 5, October 2003

Karl Aberer, Philippe Cudre-Mauroux, Anwitaman Datta, Zoran Despotovic, Manfred Hauswirth, Magdalena Punceva, Roman Schmidt [AbererCDDHPS:03] P-Grid: A Self-organizing Structured P2P System ACM SIGMOD Record, 32(3), September 2003

Olivier Dousse, Patrick Thiran [DousseT:03] Physical connectivity of self-organized ad hoc wireless networks IEEE Intelligent systems, Vol. 18,Iss. 4, July-August 2003

Frank Siegemund, Michael Rohs [SiegemundR:03] Rendez-vous Layer Protocols for Bluetooth-Enabled Smart Devices (extended version) Personal and Ubiquitous Computing Journal (PUC), vol. 7, nr. 2,July 2003

Benoît Garbinato, Philippe Rupp [GarbinatoR:03b] From Ad Hoc Networks to Ad Hoc Applications ERCIM News, no 54, July 2003

M. Gastpar, B. Rimoldi and M. Vefferli [GastparRV:03] To code or not to code: Lossy source-channel communication revisited IEEE Transactions on Information Theory, 49(5):1147-1158, May 2003

Karl Aberer, Philippe Cudre-Mauroux, Anwitaman Data, Zoran Despotovic, Manfred Hauswirth, Magdalena Punceva, Roman Schmidt, Jie Wu [AbererCDDHPSW:03] Advanced Peer-to-Peer Networking: The P-Grid System and its Applications PIK Journal February 2003: Special Issue on Peer-to-Peer Systems, April-June 2003

Samarjit Chakraborty, Simon KUnzli, Lothar Thiele, Andreas Herkersdorf, Patricia Sagmeister [ChakrabortyKTHS:03] Performance Evaluation of Network Processor Architectures: Combining Simulation with Analytical Estimation Computer Networks, special issue on Network Processors, Volume 41, Issue 5, pages 641-665, Elsevier Science, April 2003

Srdjan Capkun, Levente Buttyan and Jean-Pierre Hubaux [CapkunBH:03] Self-Organized Public-Key Management for Mobile Ad Hoc Networks IEEE Transactions on Mobile Computing, Vol. 2, No. 1, January-March 2003

D. Tunineth and G. Caire [TunineffiG:03] The Long-term average capacity region per unit cost with application to protocol for sensor networks European Transactions on Telecommunications. Special Issue on Selected Papers from the Conference European Wireless 2002. ETT Vol 14, No. 1,January-February 2003

L. Buttyan and J.-P. Hubaux (eds.), G. Avoine, S. Buchegger, S. Capkun,JY. Le Boudec, S. Vaudenay et al. [ButtyanH:03b] Report on a Working Session on Security in Wireless Ad Hoc Networks ACM Mobile Computing and Comm Rev. Vol. 7, No. 1, January 2003

Karl Aberer, Anwitaman Data, Zoran Despotovic, Andreas Wombacher [AbererDDW:03] Separating Business Process from User Interaction in Web-Based Information Commerce Electronic Commerce Research, 3 (1-2): 83-111,January-April, 2003, Kluwer G. Camponovo, Y. Pigneur [CamponovoP:02a] Analyzing the m-business landscape Annals of Telecommunications, Hermes, January-February 2003, vol. 58, no. 1-2

Jeremy Elson, Kay Rijmer [ElsonR:03] Wireless Sensor Networks: A New Regime for Time Synchronization ACM SIGCOMM Computer Communication Review (CCR), January 2003

Karl Aberer, Philippe Cudre-Mauroux, Manfred Hauswirth [AbererCH:02a] A Framework for Semantic Gossiping ACM SIGMOD Record, December 2002

G. Avoine and S. Vaudenay [AvoineV:03a] Cryptography with Guardian Angels: Bringing civilization to pirates—Abstract In L. Buttyan and J.-P. Hubaux (Eds.), Report on a Working Session on Security in Wireless Ad Hoc Networks, ACM Mobile Computing and Communications Review (MC2R),Vol. 7., No. 1., 2003, pp. 74-94

Kay Römer, Oliver Kasten, Friedemann Mattern [RomerKM:02] Middleware Challenges for Wireless Sensor Networks ACM SIGMOBILE Mobile Computing and Communication Review (MC2R), Fall 2002

P. L. Dragoffi, S. Serveffo and M. Vefferli [DragottiSV:02] Optimal filter banks for multiple description coding: analysis and synthesis IEEE Transactions on Information Theory, 48(7):2036-2052, July 2002

R. Karrer and T. Gross [KarrerG:02] Location Selection for Active Services Cluster Computing 5(3): 265-275; July 2002

M. Vefferli, P. Marziliano, T. Blu [VetterliMB:02] Sampling Signals with Finite Rate of Innovation IEEE Transactions on Signal Processing, 50(6), 1417-1428, June 2002

Q. Li, B. Rimoldi, and M. K. Simon [LiRS:02] Bandwidth-Efficient Constant-Energy Trellis-Coded Modulation Schemes with Prescribed Decoding Delay IEEE Trans. on Information Theory, Vol. 48, Number 5, May 2002

L. Blazevic, S. Giordano, J.-Y. Le Boudec [BlazevicGL:02a] Self Organized Terminode Routing Cluster Computing J, 5(2) April 2002

Mark Heitmann, Peter Aschmoneit [HeitmannA:02a] Customer Centred Community Application Design International Journal on Media Management (4:1, Spring 2002)

S. Capkun, M. Hamdi, J. P. Hubaux [CapkunHH:02] GPS-free Positioning in Mobile Ad-Hoc Networks In Cluster Computing Journal, April 2002,Vol. 5, No. 2

Magaly Dubosson, Alexander Osterwalder,Yves Pigneur [DubossonOP:02] eBusiness Model Design, Classification and Measurements Thunderbird International Business Review, January 2002, vol. 44, no. 1: 5-23

K. Aberer, M. Punceva, M. Hauswirth, R. Schmid [AbererPHS:02] Improving Data Access in P2P Systems IEEE Internet Computing, January/February 2002, pp. 58-67

L. Blazevic, L. Buttyan, S. Capkun, S. Giordano, J. P. Hubaux,J. Y. Le Boudec [BlazevicBCGHL:01] Self-Organization in Mobile Ad-Hoc Networks: the Approach of Terminodes IEEE Communications Magazine,June 2001.

S. Serveffo, K. Nahrstedt [ServetioN:01] Broadcast-Quality Video over IP IEEE Trans on Multimedia, 3(1):162-173, March 2001

J. P. Hubaux, Th. Gross, J. Y. Le Boudec, M. Vefferli [HubauxGLV:01] Towards self-organized mobile ad hoc networks: the Terminodes project IEEE Communications Magazine, January 2001.

Evaluation of the Zaurus SL5600 PDA as a platform for ad-hoc networking L. Previtali www.terminodes.org/MV2003-Present/Lu13/Zaurus_Previtali.pdf Simulating large ad-hoc networks with ns-2 V. Naoumov, www.terminodes.org/MV2003-Present/Lu13/Simulating-Naoumov.pdf Security of emergent properties in ad-hoc networks Prof. V. Gligor, Univ. of Maryland www.terminodes.org/MV2003-Present/Ma14/Gligor-MonteVerita.pdf On the self-organization of security in multi-hop networks Prof. JP. Hubaux www.terminodes.org/MV2003-Present/Ma14/Multi-Hop-JPH.pdf Immune Networking Systems Prof. J.-Y. Le Boudec www.terminodes.org/MV2003-Present/Ma14/ImmuneLeBoudec.pdf Fair exchange with guardian angels G. Avoine www.terminodes.org/MV2003-Present/Ma14/FairExchange-Avoine.pdf Spatial analysis of mobile ad-hoc networks under the Signal to Interference Ratio connectivity model Prof. F. Baccelli, Ecole Normale Supérieure and INRIA, Paris www.terminodes.org/MV2003-Present/Me15/Spacial-Baccelli.pdf Connectivity and interferences in wireless ad-hoc networks, a percolation approach O. Dousse www.terminodes.org/MV2003-Present/Me15/OlivierDousseMonteverita.pdf Ad-hoc networks: the worst and the average case Prof. R. Wattenhofer www.terminodes.org/MV2003-Present/Me15/MV-Wattenhofer.pdf www.terminodes.org; www.google.com/search?&g=terminodes; www.ietf.org/html.charters/manet-charter.html.

citeseer.nj.nec.com/
  cs?cs=1&q=manet&submit=Documents; www.google.com/search?&q=%22ad+hoc %22+and+game
citeseer.nj.nec.com/cs?cs=1&q=game+and+%22ad+hoc %22; carmen.cselt.it/idxwg/manet.html

What is claimed is:

1. A digital communication network node, comprising:
a digital packet radio transceiver comprising an electronically steerable antenna array a plurality of antenna elements, each respective antenna element supporting communications over a plurality of distinct spatial communication channels, interfaced with the digital packet radio transceiver being configured to define a plurality of directional patterns the supporting plurality of distinct spatial communication channels within a communication band, each respective spatial communication channel comprising concurrent communications using at least two of the plurality of antenna elements, wherein the plurality of distinct spatial communication channels permit concurrent reuse of respective distinct spatial communication channels; and
at least one automated processor configured to control the digital packet radio transceiver, and to:
 detect through the electronically steerable antenna array, channel conditions of at least one distinct spatial communication channel based on a feedback protocol between the digital packet radio transceiver and a first remote digital packet radio system; and
 detect through the electronically steerable antenna array, a concurrently active second remote digital packet radio transceiver which potentially interferes with communications in the communication band with the first remote digital packet radio system; and
 selectively control the digital packet radio transceiver to communicate information with the first remote digital packet radio transceiver in dependence on at least (i) the detected channel conditions and (ii) the detected concurrently active second remote digital packet radio transceiver, to manage an interference of communications of the second remote digital packet radio transceiver, by either:
 deference to transmissions by the concurrently active second remote digital packet radio transceiver, to avoid interference with communication of the concurrently active second remote digital packet radio transceiver, or
 competition with transmissions by the concurrently active second remote digital packet radio transceiver, to engage in interference with communication of the concurrently active second remote digital packet radio transceiver.

2. The digital communication network node according to claim 1, wherein the electronically steerable antenna array comprises a phased antenna array.

3. The digital communication network node according to claim 1, wherein the digital packet radio transceiver operates in at least a 5.9 GHz band between 5.850 GHz and 5.925 GHz.

4. The digital communication network node according to claim 1, wherein the digital packet radio transceiver is compliant with an IEEE-802.11 protocol.

5. The digital communication network node according to claim 1, wherein the digital packet radio transceiver operates using orthogonal frequency division multiplexing.

6. The digital communication network node according to claim 1, wherein the at least one automated processor is further configured to control the digital packet radio transceiver to forward information wirelessly received from a first digital communication network node to a second digital communication network node.

7. The digital communication network node according to claim 6, wherein the at least one automated processor is further configured to control the digital packet radio transceiver to forward the information selectively dependent on a secure cryptographic token.

8. The digital communication network node according to claim 1, wherein the at least one automated processor is further configured to control the digital packet radio transceiver to use of communication channels selectively in dependence on a secure cryptographic token received from the other digital packet radio transceiver.

9. The digital communication network node according to claim 1, wherein the at least one automated processor is configured to implement decentralized control of communication through the digital packet radio transceiver.

10. The digital communication network node according to claim 1, wherein the at least one automated processor is configured to engage in an auction in which the remote digital packet radio transceiver system competes for allocation of communication resources.

11. A digital communication method, comprising:
providing a digital packet radio transceiver which communicates through an electronically steerable antenna array interfaced with the digital packet radio transceiver, the electronically steerable antenna comprising a plurality of antenna elements defining a plurality of distinct spatial communication channels within a communication band having respectively different directional patterns, each distinct spatial communication channel being dependent on concurrent communications through at least two respective antenna elements, wherein the plurality of distinct spatial communication channels permit concurrent spatial reuse of the communication band;
controlling the digital packet radio transceiver with at least one automated processor;
detecting channel conditions of at least one distinct spatial communication channel based on a feedback protocol between the digital packet radio transceiver and a remote digital packet radio system, selectively controlling the digital packet transceiver to communicate information with the remote digital packet radio system responsive to the channel conditions; and
detecting another digital packet radio transceiver concurrently using the same communication band, and selectively controlling an interference of the communicated information with the remote digital packet radio system with the other digital packet radio transceiver in dependence on at least the detected channel conditions and information from the other digital packet radio transceiver, by either deferring to transmissions by the other digital packet radio transceiver to mitigate interference, or competing with transmissions by the other digital packet radio transceiver to cause interference.

12. The digital communication method according to claim 11, wherein the electronically steerable antenna array comprises a phased antenna array, and the digital packet radio transceiver operates in a 5.9 GHz band comprising a range between 5.850 GHz and 5.925 GHz, compliant with an IEEE-802.11 protocol.

13. The digital communication method according to claim 11, further comprising operating the digital packet radio transceiver using orthogonal frequency division multiplexing.

14. The digital communication method according to claim 11, further comprising controlling the digital packet radio transceiver with the at least one automated processor to forward information wirelessly received from a first digital communication network node to a second digital communication network node.

15. The digital communication method according to claim 14, further comprising forwarding the information selectively dependent on a received secure cryptographic token.

16. The digital communication method according to claim 11, further comprising controlling use of frequency channels within the communication band selectively in dependence on a received secure cryptographic token received.

17. The digital communication method according to claim 11, wherein the at least one automated processor implements decentralized control of communication by the digital packet radio transceiver.

18. The digital communication method according to claim 11, further comprising engaging in an auction in which a plurality of remote digital packet radio transceiver systems compete for allocation of communication resources.

19. A non-transitory computer readable medium storing instructions for controlling an automated processor of a digital communication network node comprising a digital packet radio transceiver which communicates through an electronically steerable antenna array comprising a plurality of concurrently active omnidirectional antenna elements interfaced with the digital packet radio transceiver, defining a directional pattern supporting plurality of distinct spatial communication channels within a communication band having a plurality of communication channels, wherein the plurality of distinct spatial communication channels permit concurrent spatial reuse of communication channels that would interfere absent the directional pattern, the instructions comprising:
instructions for detecting channel conditions based on a feedback protocol between the digital packet radio transceiver and a remote digital packet radio system;
instructions for detecting another digital packet radio transceiver concurrently using the same communication channel; and
instructions for communicating with the remote digital packet radio system while selectively controlling an interference with the other digital packet radio transceiver in dependence on information from the other digital packet radio transceiver and the detected channel conditions, by adopting a strategy of either deferring to transmissions by the other digital packet radio transceiver, or competing with transmissions by the other digital packet radio transceiver.

20. The non-transitory computer readable medium according to claim 19, further comprising instructions for controlling the digital packet radio transceiver to forward information wirelessly received from a first digital communication network node to a second digital communication network node.

* * * * *